United States Patent
Burchard et al.

(10) Patent No.: US 12,358,053 B2
(45) Date of Patent: Jul. 15, 2025

(54) METHOD AND DEVICES FOR INTEGRATING FUNCTIONAL FIBERS INTO A WORKPIECE DURING A SELECTIVE LASER SINTERING PROCESS AND AN FDM 3D PRINTING PROCESS

(71) Applicants: Bernd Burchard, Essen (DE); Benedikt Burchard, Essen (DE)

(72) Inventors: Benedikt Burchard, Essen (DE); Michael Baranowski, Karlsruhe (DE); Jürgen Fleischer, Karlsruhe (DE)

(73) Assignees: Bernd Burchard, Essen (DE); Benedikt Burchard, Essen (DE)

( * ) Notice: Subject to any disclaimer, the term of this patent is extended or adjusted under 35 U.S.C. 154(b) by 256 days.

(21) Appl. No.: 17/790,969

(22) PCT Filed: Jan. 13, 2021

(86) PCT No.: PCT/DE2021/100036
§ 371 (c)(1),
(2) Date: Jul. 6, 2022

(87) PCT Pub. No.: WO2021/143982
PCT Pub. Date: Jul. 22, 2021

(65) Prior Publication Data
US 2023/0339182 A1    Oct. 26, 2023

(30) Foreign Application Priority Data

Jan. 14, 2020 (DE) .................... 10 2020 100 750.7
Sep. 30, 2020 (DE) .................... 10 2020 125 628.0

(51) Int. Cl.
*B22F 10/14* (2021.01)
*B22F 10/12* (2021.01)
(Continued)

(52) U.S. Cl.
CPC .............. *B22F 10/14* (2021.01); *B22F 10/12* (2021.01); *B22F 10/18* (2021.01); *B22F 10/25* (2021.01);
(Continued)

(58) Field of Classification Search
CPC .......... B22F 10/14; B22F 10/12; B22F 10/18; B22F 10/25; B22F 10/28; B22F 10/50;
(Continued)

(56) References Cited

U.S. PATENT DOCUMENTS 9,579,851 B2    2/2017   Mark et al.
10,099,427 B2   10/2018  Mark et al.
(Continued)

FOREIGN PATENT DOCUMENTS

DE    102008027315 A1    12/2009
DE    102010015199 B9    8/2013
(Continued)

OTHER PUBLICATIONS

English translation of JP2017067650A's description retrieved from Espacenet (Year: 2024).*
(Continued)

*Primary Examiner* — Jacob T Minskey
*Assistant Examiner* — Elisa H Vera
(74) *Attorney, Agent, or Firm* — Mindful IP PLLC

(57) ABSTRACT

A process embeds functional fibers in a workpiece during selective laser sintering. In a process variant, parts of a powder layer are sintered before the insertion process, for example using a laser beam. A heating device then subsequently re-melts the already melted workpiece parts. Through a channel in the heating device, the functional fiber is fed to the melt or melt-like mass by means of a feed device and inserted into the melt or melt-like mass at the insertion point. Due to the movement of the heating device, the (Continued)

completely or partially melted area moves away from the heating element and is heated less, causing it to cool and solidify comprising the already inserted functional fiber. This variant can also be used for inserting fibers into objects created, for example, by injection molding or extruder-based 3D printing or other additive manufacturing processes.

18 Claims, 72 Drawing Sheets

(51) Int. Cl.
    *B22F 10/18*     (2021.01)
    *B22F 10/25*     (2021.01)
    *B22F 10/28*     (2021.01)
    *B22F 10/50*     (2021.01)
    *B22F 10/85*     (2021.01)
    *B22F 12/13*     (2021.01)
    *B22F 12/20*     (2021.01)
    *B22F 12/53*     (2021.01)
    *B22F 12/55*     (2021.01)
    *B22F 12/58*     (2021.01)
    *B22F 12/67*     (2021.01)
    *B22F 12/90*     (2021.01)
    *B29C 64/118*     (2017.01)
    *B29C 64/209*     (2017.01)
    *B29C 64/295*     (2017.01)
    *B29C 64/321*     (2017.01)
    *B33Y 10/00*     (2015.01)
    *B33Y 30/00*     (2015.01)
    *B33Y 40/00*     (2020.01)
    *B33Y 70/10*     (2020.01)

(52) U.S. Cl.
    CPC .............. *B22F 10/28* (2021.01); *B22F 10/50* (2021.01); *B22F 12/13* (2021.01); *B22F 12/20* (2021.01); *B22F 12/53* (2021.01); *B22F 12/55* (2021.01); *B22F 12/58* (2021.01); *B22F 12/90* (2021.01); *B29C 64/118* (2017.08); *B29C 64/209* (2017.08); *B29C 64/295* (2017.08); *B29C 64/321* (2017.08); *B33Y 10/00* (2014.12); *B22F 10/85* (2021.01); *B22F 12/67* (2021.01); *B33Y 30/00* (2014.12); *B33Y 40/00* (2014.12); *B33Y 70/10* (2020.01)

(58) Field of Classification Search
    CPC .......... B22F 12/13; B22F 12/20; B22F 12/53; B22F 12/55; B22F 12/58; B22F 12/90; B22F 10/85; B22F 12/67; B22F 2999/00; B22F 2998/00; B29C 64/118; B29C 64/209; B29C 64/295; B29C 64/321; B29C 64/00; B29C 64/188; B29C 64/30; B29C 70/38; B33Y 10/00; B33Y 30/00; B33Y 40/00; B33Y 70/10; B33Y 80/00; C22C 49/14; C22C 47/06; C22C 47/02; C22C 47/14; Y02P 10/25
    See application file for complete search history.

(56) References Cited

U.S. PATENT DOCUMENTS

| | | | |
|---|---|---|---|
| 10,254,499 B1 * | 4/2019 | Cohen ................... | B29C 64/321 |
| 2014/0268607 A1 | 9/2014 | Wicker et al. | |
| 2016/0009029 A1 * | 1/2016 | Cohen ................... | B29C 64/209 |
| | | | 264/250 |
| 2016/0067928 A1 | 3/2016 | Mark et al. | |
| 2016/0200047 A1 | 7/2016 | Mark et al. | |
| 2017/0064840 A1 | 3/2017 | Espalin et al. | |
| 2017/0182712 A1 | 6/2017 | Scribner et al. | |
| 2021/0347115 A1 * | 11/2021 | Fetfatsidis ............ | B29C 64/295 |

FOREIGN PATENT DOCUMENTS

| | | |
|---|---|---|
| EP | 1274976 B1 | 8/2005 |
| EP | 2818305 B1 | 3/2016 |
| JP | 2017067650 A * | 4/2017 |
| WO | 2018067918 A2 | 4/2018 |

OTHER PUBLICATIONS

A Budding, Vaneker T.H.J., XP055707969 : New Strategies for Powder Compaction in Powder-based Rapid Prototyping Techniques, Procedia CIRP, Elsevier, NL, vol. 6, pp. 527-532, Mar. 26, 2013.

Dickson et al., XP055629038 Fabrication of continuous carbon, glass and Kevlar fibre reinforced polymer composites using additive manufacturing, Additive Manufacturing, Aug. 1, 2017, Elsevier, NL, vol. 16, pp. 146-152, Aug. 1, 2017.

Matsuzaki, R., Ueda, M., Namiki, M., Jeong, T.-K., Asahara, H., Horiguchi, K., Nakamura, T., Todoroki, A. & Hirano, Y. (2016), "Three-dimensional printing of continuous fiber composites by in-nozzle impregnation," in Scientific reports, vol. 6, pp. 23058. http://dx.doi.org/10.1038/srep23058.

Wendel, B.Rietzel, D.Kühnlein, F.Feulner, R.Hülder, G.Schmachtenberg, E.: "Additive Processing of Polymers", Macromolecular Materials and Engineering, vol. 293, No. 10, 2008, pp. 799-809, Retrieved from the Internet <URL:http://dx.doi.org/10.1002/mame.200800121>.

Akhoundi, B.Behravesh, A. H.Bagheri Saed, A.: "Improving mechanical properties of continuous fiber-reinforced thermoplastic composites produced by FDM 3D printer", Journal of Reinforced Plastics and Composites, vol. 38, No. 3, 2019, pp. 99-116, Retrieved from the Internet <URL:http://dx.doi.org/10.1177/0731684418807300.>

Zhu, W.Yan, C.Shi, Y.Wen, S.Liu, J.Wei, Q.Shi, Y.: "A novel method based on selective laser sintering for preparing high-performance carbon fibres/polyamide12/epoxy ternary composites", Scientific Reports, vol. 6, 2016, pp. 33780, Retrieved from the Internet <URL:http://dx.doi.org/10.1038/srep33780>.

Thüning, A.: "Recherche zu Anlagenkomponenten in pulverbettbasierten additiven Fertigungsverfahren, Seminararbeit", 2019, Karlsruher Institut Für Technologie.

Prüss, H.Vietor, T.: "Design for Fiber-Reinforced Additive Manufacturing", Journal of Mechanical Design, vol. 137, 2015.

Schmid, M.: "Selektives Lasersintern (SLS) mit Kunststoffen: Technologie, Prozesse und Werkstoffe", 2015, Springer Fachmedien Wiesbaden.

Reis Silva, M.Pereira, A. M.Alves, N.Mateus, G.Mateus, A.Mal A, C.: "Development of an Additive Manufacturing System for the Deposition of Thermoplastics Impregnated with Carbon Fibers", Journal of Manufacturing and Materials Processing, vol. 3, No. 2, 2019, pp. 35, Retrieved from the Internet <URL:http://dx.doi.org/10.3390/jmmp3020035>.

Rahim, T. N. A. T.Abdullah, A. M.Md Akil, H.: "Recent Developments in Fused Deposition Modeling-Based 3D Printing of Polymers and Their Composites", Polymer Reviews, vol. 59, No. 4, 2019, pp. 589-624, Retrieved from the Internet <URL:http://dx.doi.org/10.1080/15583724.2019.1597883>.

Mielicki, C.Wegner, A.Gronhoff, B.Wortberg, J.Witt, G.: "Prediction of PA12 melt viscosity in Laser Sintering by a Time and Temperature dependent rheological model", RTEJOURNAL, 2012.

Baumann, F.Scholz, J.Fleischer, J.: "Investigation of a New Approach for Additively Manufactured Continuous Fiber-reinforced Polymers", Procedia Cirp, vol. 66, 2017, pp. 323-328, Retrieved from the Internet <URL:http://dx.doi.org/10.1016/j.procir.2017.03.276.>.

Breuninger, J., Becker, R., Wolf, A., Rommel, S. & Verl, A. (2013), Generative Fertigung mit Kunststoffen, Springer Berlin Heidelberg, Berlin, Heidelberg. Retrieved from http://dx.doi.org/10.1007/978-3-642-24325-7.

(56) References Cited

OTHER PUBLICATIONS

Din En ISO/ASTM 52900:2018-6 (), Additive manufacturing—Fundamentals—Terminology (ISO/ASTM DIS 52900:2018); German and English version prEN ISO/ASTM 52900:2018, Berlin.

Fidan, I., Imeri, A., Gupta, A., Hasanov, S., Nasirov, A., Elliott, A., Alifui-Segbaya, F. & Nanami, N. (2019), "The trends and challenges of fiber reinforced additive manufacturing", in The International Journal of Advanced Manufacturing Technology, vol. 102, No. 5-8, pp. 1801-1818. http://dx.doi.org/10.1007/s00170-018-03269-7.

Gebhardt, A. (2016), Additive Manufacturing Processes: Additive Manufacturing and 3D Printing for Prototyping—Tooling—Production, 5th, newly revised and expanded ed. Aufl., Hanser, Munich.

VDI 3405, Additive manufacturing processes: Fundamentals, Terms, Process Descriptions, Berlin.

Translation of International Preliminary Report on Patentability issued Apr. 14, 2022, in correlated International Application No. PCT/DE2021/100036.

\* cited by examiner

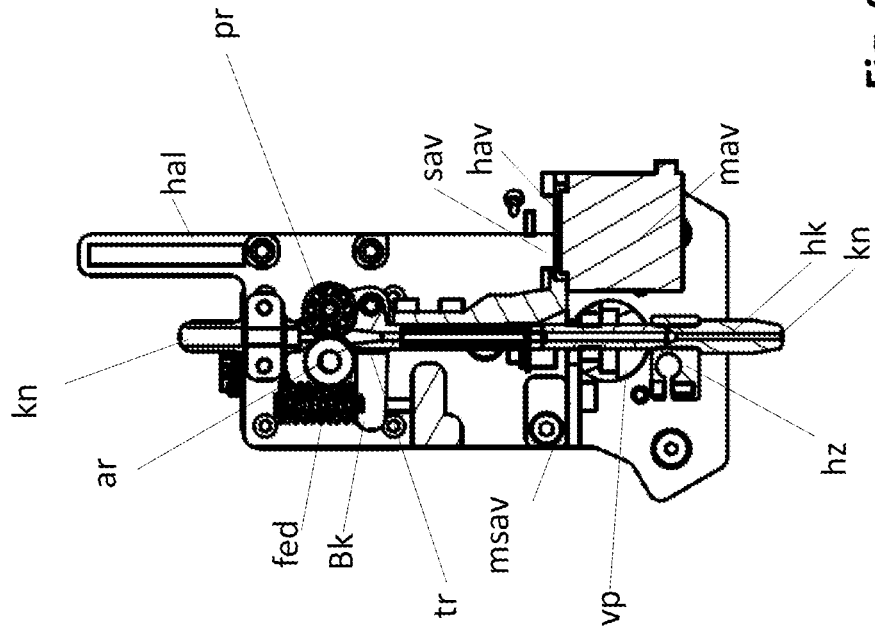
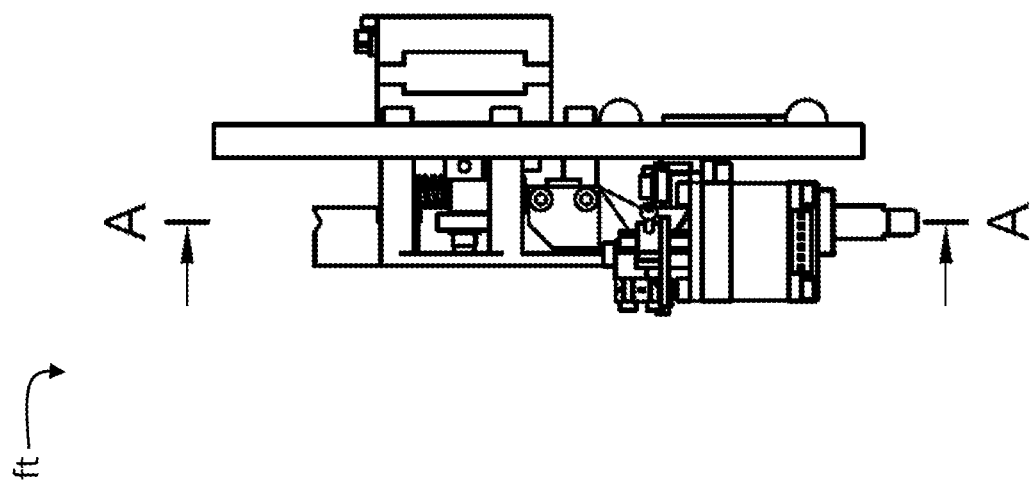
Fig. 66

METHOD AND DEVICES FOR INTEGRATING FUNCTIONAL FIBERS INTO A WORKPIECE DURING A SELECTIVE LASER SINTERING PROCESS AND AN FDM 3D PRINTING PROCESS

CROSS REFERENCE TO RELATED APPLICATIONS

The present patent application is a national stage of, and claims priority to, PCT Application No. PCT/DE2021/100036, filed on Jan. 13, 2021, which application claims the priorities of the German patent application 10 2020 100 750.7 filed on Jan. 14, 2020, and 10 2020 125 628.0 filed on Sep. 30, 2020, the disclosures of which are incorporated by reference in the present patent application in their entireties.

TECHNICAL FIELD

The disclosure is directed to methods for manufacturing a three-dimensional device in particular comprising a region comprising a composite material, in particular for additive manufacturing. A user may apply the method before and after sintering and for simultaneous sintering. In the broadest sense, this sintering may extend to locally complete melting.

BACKGROUND AND GENERAL INTRODUCTION

The task of the disclosure is to embed functional fibers, hereinafter also referred to as functional fibers (ff), into the workpiece (wst), typically a powder layer (pv) that is yet to be melted or has already been melted and resolidified, during selective laser sintering. FDM printers that use an extruder to create objects from filaments can also use the functional fiber insertion direction (ft) proposed in accordance with the disclosure to insert functional fibers into the surface of the workpiece (wst) during FDM printing. The description presented here deals with these two main variants. In addition, this document briefly touches upon other variants from the combination of the pre-shuttered fiber insertion device with other 3D printing processes. The "Relevant Documents" section lists several documents on additive manufacturing and additive manufacturing of composite materials. None solves the problem of inserting the carbon fibers into the workpiece for selective laser sintering (SLS).

A device for inserting composite fibers during 3D printing is known from US 2016/0 067 928 A1. The technical teaching of US 2016/0 067 928 A1 refers to FDM printing in which an extruder melts a filament. The extruder then places the melted material of the filament at predetermined positions on a workpiece surface. In the technical teachings of US 2016/0 067 928 A1, the devices disclosed therein introduce the composite filament in various ways after settling. This has several disadvantages. First, the devices can only introduce one fiber into the settled material coil of filamentary material. Therefore, the density of the composite fibers is approximately limited to the fiber cross-sectional area divided by the cross-sectional area of the extruder die. Use in SLS systems is ruled out because this process does not allow the fibers to be fixed to the workpiece. This is necessary, however, so that in SLS systems a squeegee does not tear out the fibers during subsequent powder application of the subsequent powder layer. The technical teaching of US 2016/0 067 928 A1 therefore does not solve the problem.

The task of creating a solution for embedding functional fibers in workpieces produced by additive manufacturing processes during the implementation of the additive manufacturing process is therefore the basis of the proposal presented here. The solution should not have the above problems.

SUMMARY

Methods and devices for solving this problem are the subject of the independent claims.

The disclosure relates to a method for producing a three-dimensional device, in particular a method for additive manufacturing, and the associated apparatus. The aim is to produce a composite material as part of the additive manufacturing process.

The elaboration of the disclosure led to the realization that all previous attempts to generate composite materials start from one paradigm. This is particularly evident in the lack of relevant literature. The commonly used paradigm is that it is optimal for the 3D printing device to embed the functional fibers (ff) in a common process step with the addition of the material to be deposited. In the case of FDM printing, this means that the filament whose material the 3D printer is to additively deposit on the workpiece surface by means of the extruder already comprises the functional fiber immediately before leaving the extruder and before being deposited on the workpiece surface. The process thereby adds the functional fiber to the filament either in the extruder or already during filament production. No functional processes are known for selective laser sintering.

A key insight now is that this paradigm has a false premise. Typically, the functional fiber (ff) is a different material than the material used to build the workpiece (wst). Processing a functional fiber (ff) in the same basic process as the basic additive manufacturing process used requires compatible material properties. However, this prerequisite is not always given. Therefore, an essential finding is that the insertion of the functional fiber (ff) should be a process that is an optimized process with respect to this insertion of the functional fiber (ff). Furthermore, another essential finding is that then this process of inserting the functional fiber (ff) can be a completely different process than the process of depositing the rest of the material of the workpiece (wst). Briefly, a variant of the processes proposed herein solves the problem in such a way that in the process the material of the workpiece is melted at the surface (of) of the workpiece (wst) and the functional fiber (ff) is then inserted into the melt. In contrast, in the prior art, the material of the filament that has not yet been deposited is melted and deposited together with the functional fiber (ff) on the already manufactured workpiece in one process step.

BRIEF DESCRIPTION OF DRAWINGS

FIG. 17a is a rasterized photograph of an example diamond heater.

FIG. 17b is a drawing of the example diamond heater of FIG. 17a.

FIG. 18a is a rasterized photograph of an example diamond heater.

FIG. 18b is a drawing of the example diamond heater of FIG. 18a.

FIG. 66 shows a section along line A-A through the example functional fiber insertion device of FIG. 64*a*.

DESCRIPTION

Figure 1:
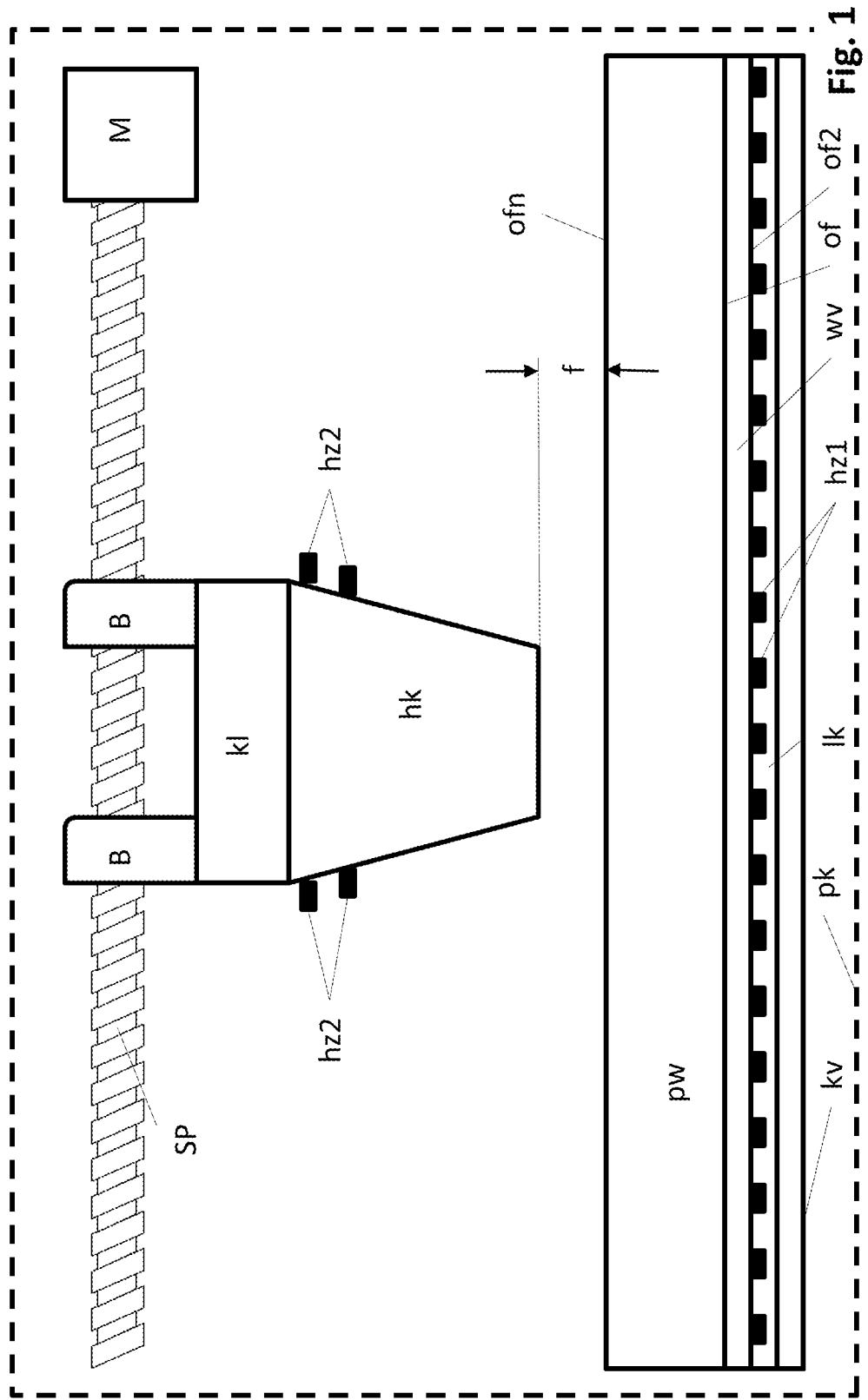
FIG. 1 is a schematic of an example device for integrating functional fibers into a workpiece.

The proposed basic process of additive manufacturing of a workpiece (wst) therefore comprises the steps of Step α: Interrupt a basic additive manufacturing process:

Step β: Introducing a functional fiber (ff) by means of a functional fiber introduction process into a surface (of, ofn) of the workpiece (wst) already created at the time of interruption;

Step δ: Continue the basic additive manufacturing process:

The process preferably produces a composite material comprising at least one functional fiber (ff) as a component of the workpiece (wst). The functional fiber insertion process is different from the basic process. Here it is explained what "differing" means here based on the state of the art for FDM printing of composite materials in FDM printing, a filament feeder, typically located inside the extruder, feeds a filament in wire form to a heated extruder nozzle. A positioning device typically moles and positions the extruder parallel to the surface (of) of the workpiece (wst) during the priming process. In this process, a filament conveying device moves the filament through a channel towards the workpiece surface. At the end of the channel is a heated nozzle that melts the filament. To the extent that the filament conveying device replenishes the filament, the replenished filament material pushes the already melted material of the filament out of the nozzle of the extruder and deposits it on the surface (of) of the workpiece (wst). In the prior art, it is now known to use in such an extruder (extr) a filament which, in addition to the filament material to be melted and located in its sheath, already comprises in its core a functional fiber (ff). Thus, the extrusion process places not only the molten filament material on the surface (of) of the workpiece (wst), but likewise also the functional fiber (ff). The solidifying melt of the filament material on the surface (of) of the workpiece restricts the degree of freedom of the deposited functional fiber (ff). Such an extrusion process using a filament that also includes a functional fiber (ff) thus uses the filament material with the same FDM printing process as the process used to place the functional fiber (ff) and to restrict the degrees of freedom of the set-off functional fiber (ff). This is what this document understands by a "same process" of additive manufacturing. However, in contrast, it is proposed here to deposit the material in a first basic process that is optimized for the material and to deposit the functional fiber an in a second process that is different from the first basic process and, in contrast, is optimized for the functional fiber (ff). In a first example disclosed herein, the basic process is selective laser sintering printing and the process for depositing the functional fiber (ff), the selective heat melting process. In a second example disclosed herein, the basic process is FDM printing using an extruder and the process for depositing the functional fiber (ff) is the selective heat melting process. The proposed method performs this selective heat sintering process only after deposition of the material of the filament on the workpiece (wst). Particularly advantageous is the use of a selective laser sintering process together with a selective heat melting process for embedding the functional fibers (ff) into the material of the surface (of) of the workpiece (wst).

The basic additive a manufacturing process may be, for example, a fused deposition modeling (FDM) process performed by an FDM system, or a selective sintering process, and/or a selective melting process performed by, for example, an SLS system, or a process that includes any of the following VDI 3405 processes: Stereolithography (SL), Selective Laser Sintering (SLS), Selective Laser Beam Melting (SLM=Selective Laser Melting, also: Laser Beam Melting=LBM), Selective Electron Ion or Particle Beam Melting (Electron Beam Melting=EBM), Fused Layer Modeling/Manufacturing (FLM or also Fused Filament Fabrication (FFF)), Multi-Jet Modeling (MJM), Poly-Jet Modeling (PJM), 3-D-Printing (3DP, also Binder Jetting), Layer Laminated Manufacturing (LLM), Digital Light Processing (DLP), Thermal Transfer Sintering (TTS), Metal Laminated Tooling (MELATO), Continuous Liquid Interface Production (CLIP), Selective Heat Sintering (SHS), Laser Metal Deposition (LMD), Wax Deposition Modeling (WDM), Contour Crafting, Cold Gas Spraying resp. Metal-Powder Application (MPA), Lithography-based Ceramic Manufacturing (LCM), 3D screen printing, 3D inkjet printing, 3D inkjet printing of optical elements, Light-guided Electrophoretic Deposition, Shaping-Debinding-Sintering (SDS), Bound Metal Deposition (BMD), processes for the production of metallic or ceramic green bodies by means of Fused Deposition Modeling, Fused Layer Modeling resp. Material Extrusion, Two-Photon Lithography, Arburg Plastic Freeforming, Screw Extrusion Additive Manufacturing (SEAM).

The step of introducing a functional fiber (ff) by means of a functional fiber introduction process thereby preferably comprises a) at least one step β.1 of providing a functional fiber (ff), and b) a step β.2 of positioning and/or depositing and/or laying down the functional fiber (ff) relative to the workpiece (wst), and c) a step β.3 of restricting the degrees of freedom of the functional fiber (ff), wherein this restriction can take place simultaneously with the step β.2 of positioning and/or depositing and/or laying down the functional fiber (ff) relative to the workpiece (wst).

The functional fiber (ff) can be provided, for example in the case of a carbon fiber as the functional fiber (ff), in such a way that the device according to the proposal provides a functional fiber spool comprising the functional fiber (ff) rotatably mounted as a functional fiber supply. An elastic tube, for example on polyethylene or the like, feeds the functional fiber (ff) in the device according to the proposal to the functional fiber insertion device (ft). In the functional fiber insertion device (ft), there is a functional fiber feeding device (mar, ar, pr) which pulls down the functional fiber (ff) on from the functional fiber spool as required and conveys it further in the functional fiber insertion device (ft). Since the processes proposed herein do not generally process continuous fibers as functional fibers (ff), the functional fiber insertion device (ft) preferably also comprises a cutting and severing device (av) for cutting off the functional fiber (ff) after positioning and embedding.

The functional fiber feeding device (ar, pr) continuously conveys material of the functional fiber (ff) towards the workpiece (wst) by its feed of the functional fiber (ff) during positioning and/or depositing and/or laying down of the functional fiber (ff). The at least two-dimensional positioning device thereby repositions the functional fiber insertion device (ft), preferably continuously, in synchronization with the fiber feed of the functional fiber (ff) by means of the functional fiber feeding device (ar, pr) relative to the workpiece (wst). In the simplest case, this means that the at least two-dimensional positioning device offsets the functional fiber insertion device (ft) relative to the surface (of) of the workpiece (wst). As a result, the distance covered by the functional fiber insertion device (ft) relative to and preferably parallel to the workpiece surface essentially corresponds to the feed length experienced by the functional fiber (ff) in the functional fiber insertion device (ft) by means of the functional fiber feeding device (ar, pr). Because of this, the functional fiber insertion device (ft) deposits the functional fiber (ff) on the workpiece (wst) substantially along a line, which may be straight or curved. However, this does not yet establish a mechanical connection between the functional fiber (ff) and the surface (of) of the workpiece (wst). The functional fiber (ff) is therefore still movable relative to the surface (of) of the workpiece (wst).

Restricting the degrees of freedom takes away this mobility of the functional fiber (ff). This restriction can be done along the entire length of the functional fiber (ff) or only in sections for functional fiber sections of the functional fiber (ff). The method proposed herein opens the surface (of) of the workpiece (wst) for insertion of the functional fiber (ff) into this opening. In the example primarily discussed herein, the functional fiber insertion device (ft) melts the material of the surface (of) of the workpiece (wst) locally in a melting region (b). In the example, the functional fiber insertion device (ft) inserts a functional fiber section of the functional fiber (ff) wholly or partially into the melt of the melting region (b). After insertion of the functional fiber section into the melting region (b), the positioning device displaces the melting region (b) in a preferably more or less continuous process by a length that essentially corresponds to the feed length of the functional fiber section of the functional fiber (ff) through the functional fiber feed device in the same period of time. At the insertion point (ep) of the functional fiber (ff), the functional fiber insertion device (ft) inserts the functional fiber (ff) into the surface (of) of the workpiece (wst). The insertion point (ep) is preferably located in the melting region (b). The melting region (b) moves with the insertion point (ep) of the functional fiber (ff) to the extent that the positioning device moves the functional fiber insertion device (ft). As a result, the insertion point (ep) and the melting region (b) move spatially and temporally during the insertion of the functional fiber (ff), preferably synchronously. The feed rate at which the fiber feed device feeds the functional fiber (ff) thus preferably corresponds to the raw at which the positioning device moves the functional fiber insertion device along the surface (of) of the workpiece. In the process, the previously deposited melting region (b) moves out of the heating region, the warm-up area (a, b), then begins to solidify as a solidificating region (c) and finally thus transforms into a solidilicated region (d). In the solidificated region (d), the previously deposited functional fiber sections of the functional fiber (ff) are firmly fused in and thus limited in their degrees of freedom. The embedding and integration of the functional fibers (ff) into the workpiece (wst) should typically be complete after insertion, including the ends of the functional fibers (ff). Typically, there is a cutting distance between the cutting point of the cutting and severing device (av), which cuts the mechanical connection of the functional fiber (ff) between the functional fiber coil and the workpiece (wst), and the insertion point (ep) of the functional fiber (ff) into the melt of the melting region (b) on the surface (of) of the workpiece (wst). Finally, in the course of the continuous repositioning of the functional fiber insertion device (ft) by the positioning device, the insertion point (ep) reaches a point on the surface (of) of the workpiece (wst) that is only this cutting distance away from the planned final position of the planned functional fiber end of the functional fiber (ff). When this point is reached, the cutting and severing device (av) preferably cuts through the functional fiber (ff). Typically, the continuously ongoing repositioning of the functional fiber insertion device (ft) pulls the remaining functional fiber section of the functional fiber (ff) still in the functional fiber insertion device (ft) out of the channel (kn) of the functional fiber insertion device (ft). This separating step of the cutting and severing device (av) constitutes the step $\beta.4$ of optionally separating the functional fiber (ff). Theoretically, in fact, the device can operate in a continuous process.

It is conceivable, before resuming the normal 3D printing process, to insert further, for example n further functional fibers (ff) into the surface (of) of the workpiece (wst) in the same or similar manner. n should be a positive integer. For this purpose, for each functional fiber (ff) of the n functional fibers to be inserted, the proposed apparatus performs the previously described process steps $\beta.1$ to $\beta.3$ and, if necessary, the step $\beta.4$. For simplicity, in this document, the insertion of the first additional functional fiber (ff) into the surface (of) of the workpiece (wst) in addition to the already inserted functional fiber (ff) is denoted with the optional step $\gamma.1$. The insertion of the second additional functional fiber (ff) into the surface of the workpiece in addition to the already two inserted functional fibers (ff) is denoted with the optional step $\gamma.2$. etc. The insertion of the $n^{th}$ additional functional fiber (ff) is in addition to the already inserted n functional fibers (ff). The insertion of this $n^{th}$ additional functional fiber (ff) into the surface (of) of the workpiece (wst) is then designated in an analogous manner by the optional step $\gamma.n$. Each of these process steps $\gamma.1$ to $\gamma.n$ thus represents in each case the previously described process steps $\beta.1$ to $\beta.3$ and possibly the step $\beta.4$.

Now, it is an essential further idea of the disclosure that the method for carrying out the step "step $\beta.3$", i.e., the method for restricting the degrees of freedom of the functional fiber (ff), is different from the basic method of additive manufacturing. So, for example, limiting the degrees of freedom of the functional fibers (ff) may be a modified process of selective heat melting, i.e., selective melting by heat, as described above, while the basic process may be a process of FDM printing or selective laser sintering.

In a special process variant, the restriction of the degrees of freedom of the functional fiber (ff) is carried out using at least the following procedure:

First, for example, a heating device (hk) at least partially melts a surface (of, ofn) of the workpiece (wst) or a layer (pw, pwn) in a warm-up area (a, b). For example, the functional fiber insertion device (ft) inserts at least one functional fiber section of the functional fiber (ff) into the melt of the warm-up area (a, h). Subsequently, the melt of the warm-up area (a, b) solidifies in a solidificating region (c) comprising the inserted functional fiber (ff) to form a solidificated region (d) of the surface (of) of the workpiece (wst). The solidificated region (d) then restricts the functional fiber (ff) in its degrees of freedom. The consolidated region (d) thus fixes, for example, and even envelops the functional fiber (ff) if necessary.

In a second special process variant, the use of at least the following process restricts the degrees of freedom of the functional fiber (ff): A fastening means, in particular an adhesive, fixes the functional fiber (FF) to a surface (of) of the workpiece (wst). However, such a fastening means can not only be an adhesive. Rather, soldered joints and/or welded seams and/or soldering are also conceivable as fastening means for fixing.

In a third special process variant, the process restricts the degrees of freedom of the functional fiber (ff) at least using the following subprocesses:

For example, the functional fiber insertion device (ft) inserts the functional fiber (ff) on or in a clamping or holding structure on the surface (of) of the workpiece (wst). The holding or clamping structure can be, for example, a groove of the workpiece (wst) or a trench on the workpiece surface or a recess in a structure on the workpiece surface or a melting region (b). In this process variant, clamping means, such as wedges and/or clips and/or clamping blocks or the like, can clamp the functional fiber (ff) to or in the clamping or holding structure on the surface (of) of the workpiece (wst). The clamping or retaining structure may possibly exist only temporarily, e.g. only during the exposure of a layer, during the additive manufacturing process. In this process variant, however, clamping does not necessarily have to take place. For example, it is conceivable to manufacture the groove by means of selective laser sintering. Further, it is conceivable that the powder which the variant of the proposed process discussed here uses for selective laser sintering and which is then still in the groove is subsequently sucked out of the groove by a vacuum cleaner or the like. The functional fiber insertion device (ft) can then insert the functional fiber (ff) into the groove thus cleared. This vacuuming preferably refers to a process comprising selective laser sintering of the surface of a powder bed. However, the basic ideas can also be applied to other additive manufacturing processes. Thus, a later section of this paper discusses an FDM printer comprising a tool changing device (wwv). It is proposed, in the case of a selective laser sintering printer, to consider the use of a tool changing device (wwv) together with a positioning device within the process chamber of the selective laser sintering printer. In the case of a selective laser sintering printer, the tool changing device (wwv) can preferably then receive, for example, a functional fiber insertion device (ft) and position the functional fiber insertion device (ft) in cooperation with the positioning device. Alternatively, in this case, the die change device (wwv) can preferably then, for example, also receive and position a suction device comprising a switchable suction valve and a suction hose and pros ide for the removal of the excess powder from the grooves. Preferably, the suction device for the suction hose for removing the powder in the groove is located outside the process chamber (pk) of the selective laser sintering printer. In the case of FDM printing, die step of clearing the groove is not necessary compared to selective laser sintering. In the case, the functional fiber insertion device (ft) can directly insert the functional fiber (ff) into the groove. If the melting region (b) on the surface (of) of the workpiece (wst) is deep enough, it may also not be necessary to manufacture the groove. A heating element (hz) heats, for example, a heating device (hk) of the functional fiber insertion device (ft). Preferably, the functional fiber insertion device (ft) can locally melt the surfaces of the groove, for example its bottom and its side walls, e.g. by means of the heating device (hk). As a result, this melt can then wet the functional fiber (ff) in the resulting melting region (b) during the insertion process of the functional fiber (ff). After renewed solidification and consolidation of the groove surfaces, this solidificated region (d) then restricts the functional fiber (ff) in its degrees of freedom. The solidificated region (d) preferably attaches the functional fiber (ff) to the workpiece (wst) and preferably surrounds the functional fiber (ff).

In a fourth special process variant, a process comprising at least one of the following subprocesses restricts the degrees of freedom of the functional fiber (ff): First, stapling means staple the functional fiber (ff) to the surface (of) of the workpiece (wst). Also, staples can staple the functional fiber (ff) to the surface (of) of the workpiece (wst). Also, nails can nail the functional fiber (ff) to the surface of the workpiece. Instead of the surface (of) of the workpiece (wst), these protruding fastening methods can also use, for example, clamping or retaining structures previously preferably manufactured by means of the basic process on the surface (of) of the workpiece (wst). Again, a groove of the workpiece in particular preferably comes into question here as a clamping or retaining structure, which again has preferably been manufactured by means of the basic additive manufacturing process as used by this example. Since, for example, a squeegee (rk) or an extruder (extr) can cover this groove (nut) with subsequent layers in a subsequent process step of the basic process, which is preferred, the clamping or retaining structure may possibly exist only temporarily during the additive manufacturing process, since it subsequently disappears under the layers deposited later with the basic process. The local tacking or clamping or nailing of the functional fiber (ff) to the surface (of) of the workpiece (ff) is preferably carried out by means of a fastening aid, in particular a staple or a nail or a clamp. It is conceivable that the device provides further means for this purpose. For example, it may be a stapling device that shoots staples into the surface of the workpiece and thus attaches the functional fibers (ff) to the already created part of the workpiece (wst). This then limits the degrees of freedom of the functional fibers (ff). Such a device then has three groups of parts (means): First, it has a first sub-device group, which is necessary for carrying out the basic process. In the case of a selective laser sintering (SLS) system, these are the means necessary tier the selective laser sintering process. Secondly, it has a second sub-device group necessary for the insertion of the functional fiber. In the case discussed here, the process of inserting or depositing the functional fiber (ff) into or onto the surface of the workpiece (wst) is separate from the process of fixing the functional fiber (ff). The means for inserting or depositing the functional fiber (ff) into or onto the surface (of) of the workpiece (wst) is the functional fiber insertion device (ft). Thirdly, in this specific example, the device also has a third sub-device group which is necessary for fixing the functional fiber (ff) to the surface (of) of the workpiece (wst). The means for attaching the functional fiber (ff) to the surface (of) of the workpiece (wst) may be, for example, the stapling device for driving nails or staples into the surface (of) of the workpiece (wst). Typically, such a fixture has only one or only a few positioning devices. Therefore, it is useful to provide a tool changing device (wwv) that can remove a tool from a tool set-down device (wav1, wav2) at a predetermined parking position by means of a fully automatic clamping device and set it down there again. In the example here, in particular in the example shown in FIGS. 64 to 70, the clamping device of the functional titer insertion device (ft) comprises a locking plate (vp) comprising a slot (vrs). Preferably, the tool changing device (wwv) comprises a locking pin (vst) comprising a cross boltz. A rotating device can rotate the locking pin (vst) about its longitudinal axis to a first position having a first orientation of the cross boltz and to a second position having a second orientation of the cross boltz. By means of a suitable movement of the tool changing device (wwv), the positioning device of the tool changing device (wwv) can push the locking pin (vst) comprising a cross boltz through the slot (vrs) of the locking plate (vp) at the first orientation of the cross bolts. An actuating device (btv) causes the rotating device of the locking pin (vst) to rotate it to the first position or the second position. For example, a first tool may be an extruder (extr) for localized targeted deposition of material of a plastic filament. For example, a second tool can be a functional fiber insertion device (ft) (hereinafter also referred to as fiber tool) for the local targeted depositing and/or insertion of functional fiber sections of a functional fiber (ff) into the surface (of) of the workpiece (wst).

For example, a third tool may be a stapling device (hereinafter also referred to as a fixing tool) for the local targeted fixing of the previously deposited and/or inserted functional fiber sections of a functional fiber (ff) to the surface of the workpiece (wst) by means of fixing aids.

For example, a fourth tool may be an adhesive device (hereinafter also referred to as gluing tool) for the local targeted application of adhesive for mechanically bonding the functional fiber sections of a functional fiber (ff) to be deposited and/or inserted later to the surface (of) of the workpiece (wst).

For example, a fifth tool can be a milling device thereinafter also referred to as a milling tool) for the local targeted machining of the surface (of) of the workpiece (wst) and the workpiece edges. With such a tool, a 3D printing device according to the proposal can also produce said grooves.

For example, a sixth tool can be a suction device (hereinafter also referred to as vacuum tool) for the local targeted removal of powder and dust from the surface (of) of the workpiece (wst), in particular from grooves of the workpiece (wst) during selective laser sintering. With such a tool, a 3D printing device according to the proposal can also clean said grooves during selective laser sintering from powder that has not melted, so that subsequently the functional fiber insertion device (ft) can insert a functional fiber section of a functional fiber (ff) into the groove thus cleared in a subsequent operation.

In a fifth special process variant, the knotting of the functional fiber (ff) with a fiber retaining structure restricts the degrees of freedom of the functional fiber (ff). This fiber retaining structure on the surface (of) of the workpiece (wst) can be, for example, a hook or a post, which are preferably manufactured on the surface of the workpiece (wst). This fiber retaining structure may also exist only temporarily during the additive manufacturing process, if necessary, and may be the result of an additive manufacturing process. Other parts of the workpiece (wst) can, for example, cover or overlap it again in the further course of the further printing process.

In a fifth special process variant, the functional fiber (ff) is alternatively sewn to a part of the workpiece (wst) to limit the degrees of freedom of the functional fiber. A sewing device uses the functional fiber (ff) as a sewing thread. Preferably, the functional fiber (ff) is then sewn to a part of the workpiece (wst). The sewing device uses the functional fiber (ff) as sewing thread and as upper thread together with a further fiber as lower thread and/or the functional fiber (ff) as sewing thread and as lower thread together with a further fiber as upper thread. The other fiber can also be a functional fiber (ff).

Preferably, in a process variant, the execution of a step β.1.a takes place during or temporally before step β.1. said providing of a functional fiber (ff). Step β.1.a preferably comprises heating the heating devices (hk) to a process temperature ($\vartheta_2$). In this case, the heating devices (hk) can consist of several heating sub devices (hk1, hk2), which can then also have different process temperatures ($\vartheta_{2a}$, $\vartheta_{2b}$). This enables, during a translatory movement of the heating devices (hk1, hk2) along the surface (of) of the workpiece (wst), that a point on the workpiece surface passes through a temperature curve. Thereby, this point is located in or more precisely directly under the path of the functional fiber insertion device (ft) during said translatory transport of the functional fiber insertion device (ft) along a parallel to the workpiece surface. The positioning of the heating sub devices (hk1, hk2) of the functional fiber insertion device (ft) is preferably decisive for this position determination.

Preferably, in a process variant, the execution of a step β.3.a takes place during step β.3. Step β.3 is the step of limiting the degrees of freedom of the functional fiber (ff). During step β.3. the execution of a step β.3.a of heating the first material of the surface (of) of the material in the region of the heating device (hk) in a warm-up area (a, b) is preferably carried out. In this case, this heating is performed, for example, by the infrared radiation of the heating device (hk) or the heating sub devices (hk1, hk2). An alternative method of heating the first material of the surface (of) in the area of the heating device (hk) in the warm-up area (a, b) is an exemplary heating by electromagnetic radiation. For example, the heating device (hk) or one or more of the heating sub devices (hk1, hk2) may emit and transmit this electromagnetic radiation. This electromagnetic radiation may be, for example, laser radiation or microwave radiation or THz radiation or infrared radiation. For example, an optical waveguide may pass the exemplary laser radiation through an optically transparent heater as an optical waveguide via an optical path. It is conceivable that the heating device has a channel (kn) which forms a coaxial line together with, for example, an electrically conductive functional fiber (ff), for example a carbon fiber, as a functional fiber (ff) to be inserted into the surface (of) of the workpiece (wst). This coaxial line consisting of channel (kn) and functional fiber (ff) can then conduct electromagnetic waves along this coaxial line to the surface (of) of the workpiece (wst), where these can then heat up the surface (of) of the workpiece (wst) and possibly melt it. A disadvantage of this method, however, is its low resolution, which is why it is more suitable for supportive adjustment of the temperature profile. In any case, however, the use of an electromagnetic waveguide to guide the electromagnetic radiation to the warm-up area (a, b) is helpful. These waveguides may be dielectric waveguides, waveguides, microstrip lines, coaxial lines and similar high frequency lines, and/or optical waveguides. In the case of electromagnetic radiation in the infrared, optical or UV range, a 3D printing device according to the proposal may have the usual optical functional elements such as mirrors, lindens, apertures, etc. for beam steering. Therefore, the electromagnetic radiation for heating the heating region (a, b) can also be THz radiation, infrared radiation, optically visible light, UV radiation, etc. Infrared radiation is naturally preferred.

An alternative heat transport into the warm-up area (a, b) at the surface (of) of the workpiece (wst) can be effected by a heat transport by convection from the heated heating device (hk) of the functional fiber insertion device (ft) to the surface (of) of the workpiece (wst). The air in the vicinity of the heating device (hk) heats up. If the heating device (hk) is close enough to the surface (of) of the workpiece (wst), the heated air flows away laterally in the space between the heating device (hk) and the surface (of) of the workpiece (wst). A suitable arrangement and temperature control of further heating elements determines the flow direction of the heated air. A functional fiber insertion device (ft) according to the proposal then comprises means for directing the convection flow of a fluid, typically air, between the heating device (hk) and the surface (of) of the workpiece (wst). This results in stable and preferably laminar flow conditions of the heated fluid at the surface (of) of the workpiece (wst), which stabilizes the work results.

Instead of convection, direct mechanical contact between the heated heating device (hk) and the surface (of) of the workpiece (wst) can also heat up the warm-up area (a, b). Experience has shown that this case is rather theoretical, since typically material of the surface (of) of the workpiece (wst) will adhere to the heated heating device (hk). Typically, this results in damage to the surface (of) of the workpiece (wst). It is therefore necessary that then the surface material can not adhere to the heating device.

The elaboration of the disclosure revealed that the functional fiber (ff) itself can conduct heat well and therefore heat transport through the functional fiber (ff) itself is possible. This heat transport through the functional fiber (ff) plays an important role in heating up the rewarm-up area (a, b). For this purpose, a channel (kn) in a functional fiber insertion device (ft) used in the elaboration of the disclosure guided the functional fiber (ff) through this channel (kn) in the axis of symmetry of the heating device (hk) used. It is therefore very useful to exploit a heating of the warm-up area (a, b) by a heat transport by means of a heat conducting device. In this context, it is particularly preferred to exploit a heating-up of the heating-up region (a, b) by a heat transport by means of the functional fiber section of the functional fiber (ff), which the functional fiber insertion device (ff) inserts into the surface (of) of the workpiece (wst). The heat transport takes place from the heating device (hk) via the functional fiber (ff) into the material of the warm-up area (a, b) of the surface (of) of the workpiece (wst).

As mentioned above, a positioning device typically changes the position of the functional fiber insertion device (ft) and thus of the heating device (hk), which is part of this functional fiber insertion device (ft), along a curve. Preferably, the positioning device performs the change of position along a curve substantially parallel to the surface (of) of the workpiece (wst) at a first distance (f) from surface (of) of the workpiece (wst) at a first speed (v1). Preferably, a functional fiber feed device of the functional fiber insertion device (ft) moves the functional fiber (ff) at this speed v1 in the direction of the surface (of) of the workpiece (wst). Subsequently, the functional fiber insertion device (ft) deposits the functional fiber (ff) along a line on the surface (of) of the workpiece (wst). The curve of the movement of the functional fiber insertion device (ft) parallel to the surface (of) of the workpiece (wst) determines this line. If the surface (of) of the workpiece (wst) is opened by milling, by a prepared groove or by melting along this line, the functional fiber insertion device (ft) introduces the functional fiber (ff) into the milled groove, the prepared groove and/or the melting region (b), if present, and thus into the surface (of) of the workpiece (wst).

This initiates the next step β.3. The step β.3 is a process step for limiting the degrees of freedom of the functional fiber (ff). The device according to the proposal preferably performs a step β.3.b during the execution of the step β.3. Step β.3.b relates to a local melting of a part of the first material m the warm-up area (a, b) as step β.3.b. The local melting of the part of the first material in the warm-up area (a, b) results in a melting region (b) within the warm-up area (a, b). This is a consequence of the local heating of the surface (oil of the workpiece (wst) in the area of the heating device (hk) in step β.3.a to molten material. The proposed method achieves this by increasing the heat transport to the surface (oil of the workpiece (wst) near the intended insertion point (ep) of the functional fiber (ff) into the melting region (b) such that the first material of the surface (of) of the workpiece (wst) in a part of this warm-up area (a, b) melts to said reflow area (b). This melting opens the surface (of) of the workpiece (wst) thermally for the insertion of the functional fiber (ff) in this example. Thus, melting of a part of the first material in the warm-up area (a, b) as step β.3.b to a melting region (b) within the warm-up area (a, b) as a result of the reheating in step β.3.a takes place during and/or temporally after step β.3.a to molten material.

Thus, after thermally opening the surface (of), the execution of step β.2.a can be performed during step β.3 and during step β.3.a and/or temporally after step β.3.a and during step β.3.b and/or temporally after step β.3.b. Step β.2.a relates to the insertion of a functional fiber section of a functional fiber (ff) as step β.2.a into the inching region (b). As described above, this is performed by transporting the functional fiber (ff) in the functional fiber insertion device (ft) by means of a functional fiber feeding device (ar, pr). The device according to the proposal thus inserts the functional fiber (ff) into the melt of the melting region (b) at an insertion print (ep).

After the insertion of the functional fiber (ff) has taken place, the execution of a step β.3.c follows. The execution of step β.3.c occurs during step β.3 and during step β.3.a and/or temporally after step β.3.a and during step β.3.b and/or temporally after step β.3.b and during and/or temporally after step β.2.a. Step β.3.c relates to terminating the melting as step β.3.c. A decrease in the energy transfer of thermal energy from the heating device (hk) to the surface (oft and the resulting decrease in the temperature of the melting region (b) terminate the reflow. The lowering of the temperature of the melting region (b) converts the melting region (b) to a solidificating region (c). First, turning off the energy sources can achieve this reduction in energy transfer. However, in the case of thermal energy, the time constant is usually too long. Therefore, it has proven effective to remove the heating element from the surface of the workpiece. Before this, a cutting and severing device (av) typically cuts through the functional fiber (ff).

Lowering the supply of thermal energy is followed by performing a step β.2.b and a step β.3.d during step β.3 and during and/or temporally after step β.3.a and during and/or temporally after step β.3.b and during and/or temporally after step β.3.c and/or temporally after step β.2.a. Step β.3.d concerns the solidification of the inched material of the melt in the melting area comprising the inserted functional fiber (ff) as step β.3.d to solidified material in a solidificating region (c) of the surface of the workpiece. Complete solidification results in a solidified solidificated region (d) in which as step β.2.b the relevant functional fiber section of the functional fiber (ff) is inserted fully or is inserted partially. For the purposes of this document and for better understanding, the solidificating region (c) is typically not yet completely solidified, in contrast to and in distinction from the solidificated region (d).

The result is a composite material on the surface. This composite material shows modified mechanical, thermal, electrical and possibly also magnetic or other modified physical properties compared to the state without the insertion of the functional fiber (ff) or the functional fibers. In the case of a cross-sectional examination of the composite material, the composite material as a result of the 3D printing method for its manufacture exhibits at least one first layer of a first material of a first printing layer and at least one second layer of the first material of a second printing layer. Thereby, the second printing layer temporally followed the first printing layer in the printing of the composite material. Even in good printing processes, the first layer usually has a layer boundary with respect to the second layer. At this layer boundary, the first layer and the second layer are in direct contact with each other. Now, provided that one of the previously described processes has been used, the composite material has a solidificated region (d) which is due to the melting of the first material of the surface (of) of the workpiece during the 3D printing processes presented here. Typically, the solidificated region (d) includes at least the first layer and the second layer, as the melting region (b) typically extends deeper than the layer thickness of a printed layer. Since the melting of the melting region (b) destroyed the layer boundary, the later formed the solidificated region (d) as a feature of such melting no longer has a layer boundary between the first layer and the second layer in the region of the solidificated region (d) when the melting was complete. In the sense of this document, a significant weakening of the visibility of the layer boundary in the solidification region is already a characteristic of such a disappearance, i.e. a characteristic of the non-existence of the layer boundary. Another indication of a composite material that is the result of one of the processes presented herein is that the solidificated region (d) has an inserted functional fiber (ff).

Since typically such a 3D printing process produces a workpiece (wst), the composite material of such a workpiece (wst) then also exhibits the features of such a composite material explained previously.

The device for three-dimensional printing associated with the above processes thus has first means in the form of a first group of subdevices for carrying out a basic process of layer-by-layer additive manufacturing and second means in the form of a second group of subdevices for carrying out a selective heat sintering process or a selective heat melting process. While the first means deposit the first material of the workpiece (wst), i.e. form the actual workpiece device, the second means melt the surface (of) of the workpiece (wst) and insert the functional fiber (ff) into the resulting melt. The second means comprise, for example, a positioning device and the heating devices (hk1, hk2), which are provided for local melting of the surface (of) of the workpiece (wst).

The second means comprise, for example, a positioning device and, for example, the heating devices (hk, hk1, hk2) for renewed local melting of the workpiece surface in the impact area of the heating devices (hk, hk1, hk2), which enables the functional fibers (ff) to be inserted into the melting region (b).

The proposed device is now characterized in that it comprises third means for this insertion of the functional fibers (ff) during the aforementioned sintering or melting process by means of the second group of sub-devices, i.e., for example, by means of the heating devices (hk, hk1, hk2). As in the functional fiber insertion device (ft), these third means may comprise the second means. As in the functional fiber insertion device (ft), these third means may also be equal to the second means. Due to the different processes, the basic process and the process for inserting the functional fibers (ff), the first means thus differ at least partially from the second means. For the same reason, typically the first means differ at least partially from the third means.

As mentioned above, the third means preferably comprise a functional fiber insertion device (ff) comprising the functional fiber feed device, the cutting and severing device (as) and the heating device (hk) or heating devices (hk1, hk2). Preferably, the functional fiber insertion device (ft) has sensors for monitoring the functional fiber (ff) during the fiber insertion process. A first sensor preferably detects the presence of the functional fiber (ff) upstream of the functional fiber feeding device. A second sensor preferably comprises the presence of the functional fiber (ff) between the functional fiber feeding device and the cutting and severing device lay). A third sensor preferably detects the presence of the functional fiber (ff) in a channel (kn) of the heating device (hk) between the insertion point of the functional fiber (ff) into the melt of the melting region (b) and the cutting and severing device (av). In the simplest case, the three sensors are light barriers, with part of the optical path preferably being an optical waveguide. The presence of the functional fiber (ff) at the appropriate location interrupts or attenuates the light in the optical path of the light barrier. A control system of the device, for example a computer and control system, can detect and evaluate this interruption metrologically by means of corresponding sensors. The control system of the device can then immediately stop the device in the event of a malfunction, for example the unexpected absence of the functional fiber (ff) at one of the points in the functional fiber transport path in the functional fiber insertion device (ft).

Preferably, a temperature measuring device detects a measured temperature value for the temperature of the heating device (hk). The controller regulates the heating energy by means of a regulator ac a function of the measured temperature value for the temperature of the heating device (hk), so that a target temperature is set for the heating device (hk).

The basic additive manufacturing process may be, for example, a fused deposition modeling (FDM) process, wherein the first means are means for performing a fused deposition modeling (FDM) process, and wherein said means may comprise, for example, an extruder for extruding a filament.

The basic additive manufacturing process may be, for example, a selective sintering and/or selective melting process, wherein the first means are means for performing a selective sintering and/or selective melting process, and wherein said means may comprise, for example, a selective laser sintering (SLS) apparatus. For example, it may be a powder handling device typically comprising a squeegee (rk), a powder storage container, a powder waste container and a lowerable workpiece platform, and a process chamber (pk).

More generally, the basic additive manufacturing process may include or be one of the following processes or a process derived therefrom: stereolithography (SL), selective laser sintering (LS), selective laser beam melting (SLM—Selective Laser Melting, also: Laser Beam Melting=LBM), Selective Electron Beam Melting (EBM), Fused Layer Modeling/Manufacturing (FLM or Fused Filament Fabrication (FFF)), Multi-Jet Modeling (MJM), Poly-Jet Modeling (PJM), 3D Printing (3DP, also Binder Jetting), Layer laminated Manufacturing (LLM), Digital Light Processing (DLP), Thermal Transfer Sintering (ITS), Metal Laminated Tooling (MELATO), Continuous Liquid Interface Production (CLIP), Selective Heat Sintering (SUS), Laser Metal Deposition (LMD), Wax Deposition Modeling (WDM), Contour Crafting, Cold Gas Spraying resp. Metal-Powder Application (IPA), Lithography-based Ceramic Manufacturing (LCM), 3D screen printing, 3D inkjet printing, 3D inkjet printing of optical elements, Light-guided Electrophoretic Deposition, Shaping-Debinding-Sintering (SDS), Bound Metal Deposition (BMD), processes for the production of metallic or ceramic green bodies by means of Fused Deposition Modeling Layer Modeling resp. Material Extrusion, two-photon lithography, Arburg plastic free-forming, Screw Extrusion Additive Manufacturing (SEAM). In this regard, the first means here are means for carrying out the relevant basic process of the previously listed basic processes.

Thus, with respect to selective laser sintering (SLS), this document herein proposes an apparatus for three-dimensional printing by selective sintering and/or melting. Preferably, the apparatus for three-dimensional printing by means of selective sintering and/or melting comprises a first group of subdevices for performing a selective laser sintering process and/or a selective laser melting process. Furthermore, the device for three-dimensional printing by means of selective sintering and/or melting preferably comprises a second group of sub-devices for carrying out a selective heat sintering process or a selective heat melting process, wherein it differs from the prior art in that it comprises a sub-device, a functional fiber insertion device (ft), for inserting functional fibers (ff) during a sintering or melting process.

Such devices, materials and processes include a functional fiber (ff) characterized in that it is provided for use in any of the processes described above and/or it is a functional fiber (ff) provided for use in or is a component of the composite material described above and/or it is a functional fiber (ff) for use in any of the devices described above.

Preferably, for better embedding in the melt of the melting region (b), the functional fiber (ff) has a sizing (SL) as a coating. Preferably, during an insertion process of the functional fiber (ff) to the material of the surface (of) of the workpiece (wst), the sizing (SL) of the functional fiber (ff) forms a meniscus (mi) having a contact angle ($\chi$) smaller than 90° at least in some areas of this surface (of). The functional fiber insertion device (ft) thereby inserts the functional fiber (ff) into a workpiece (wst) in an additive manufacturing process. Due to the surface of the functional fiber (ff), in particular due to the wetting properties of the surface of the functional fiber (ff), the melt of the material of a surface (of) of a workpiece (wst) preferably forms a meniscus (mi) having a contact angle ($\chi$) smaller than 90' to the material of the surface of the functional fiber (ff) at least in some areas of this surface of the functional fiber (ff) during an insertion process of the functional fiber (ff) into this surface (of) of the workpiece (wst).

The basic idea of the disclosure is thus, in contrast to the prior art processes, to completely separate the deposition of the functional fiber (ff) from the deposition and sintering of the powder material. In one variant of the process, the process is a so-called selective thermal transfer sintering (TTS) process (English: selective heat sintering process (SHS)), in which the device locally selectively melts all or part of powder that has not yet been sintered and inserts the functional fiber (ff) into the powder melt. The positioning device thereby moves the functional fiber insertion device (ft) at a predetermined speed over the powder surface, which here represents the surface (of) of the workpiece (wst). It heats the powder surface until complete or partial melting of the powder occurs. The functional fiber insertion device (ft) proceeds to insert the functional fiber (ff). After the functional fiber insertion device (ft) has inserted the functional fiber (ff) into the completely or partially melted melt of the melting region (b), and after the positioning device has moved the functional fiber insertion device (ft) further, the powder surface areas (melting region (b)), which are now no longer sufficiently heated and melted by the heating device (hk) of the functional fiber insertion device (ft), solidify again. These now solidifying and previously heated and melted powder surface areas (melting region (b)) fix the already inserted functional fiber sections of the functional fiber (ff) during this solidification.

The device according to the proposal preferably applies the process in a powder-layer manner. In principle, a first process sequence and a second process sequence can take place in the interaction of the basic process steps in the application of the process in selective laser sintering.

The 3D printing device according to the proposal can thus perform both the first process step sequence 1. applying the next powder coat (pw).
2. performing a selective laser sintering step or other functionally equivalent sintering step.
3. carrying out the local insertion of the functional fibers (ff) for this powder layer (pw) as well as the second process sequence 1. applying the next powder coat (pw).
2. aiming out the local insertion of the functional fibers (ff) for this powder layer (pw) as a thermal transfer sintering step (English: selective heat sintering step) for this powder layer.
3. performing a selective laser sintering step or other functionally equivalent sintering step.

This document does not explicitly state that the proposed 3D printing system must necessarily have the ability to perform both process sequences.

Since the functional fibers (ff) are inserted by melting the powder or the surface (of) of the workpiece (wst), the process in the sense of this document can also be a modification of thermal transfer sintering (TTS) (English: selective heat sintering (SHS)) in the case of melting the powder (pw) which has not yet been melted. With regard to the order of terminology, this paper refers here to the standard, VDI 3405, Additive Manufacturing Processes: Fundamentals, Terms, Process Descriptions. Berlin (2014).

At its core, the process then comprises the two main steps of
1. applying the next powder coat
2. performing local insertion of the functional fibers (ff) for this powder layer (pw) as a thermal transfer sintering step (selective heat sintering step) for this powder layer (pw);

The apparatus according to the proposal preferably carries out the process in a temperature-controlled and, if necessary, atmosphere-controlled process chamber (pk). It has been shown during the experimental validation of the concept according to the disclosure that in simple cases, pre-tempering of the powder bed comprising the powder (pw) by a heat spreader (wv) is sufficient.

A device, for example a robot, can also apply the process to the surface (of) of the workpieces (wst) after production has already taken place, in particular after additive manufacturing of the workpiece (wst) has taken place. This has the advantage that it is then also possible to insert functional fibers (ff) whose position is not coplanar with the position of the former powder layers (pw) or the position of extruded layers within the manufactured workpiece (wst).

A process for manufacturing such a workpiece (wst) then has roughly the following process step sequence:
1. Manufacturing the workpiece (wst) by means of an additive manufacturing process, which may also be a process as previously described, in which, for example, functional fiber insertion devices (ft) may have already inserted functional fibers (ff) along the planes of the additive manufacturing layers.
2. Local melting of the surface (of) of the workpiece (wst) and insertion of one or more functional fibers (ff) into the area thus melted—the melting region (b). In this process, the direction vector of at least one functional fiber (ff) in at least one functional fiber part section preferably deviates from the planes of the additive manufacturing layers from the manufacture of the workpiece.
3. Subsequent solidification or the melted area of the workpiece surface in a solidificating region (c) to form a solidificated region (d).

The application of further workpiece layers can supplement such a process. Subsequently, it is then possible to supplement the structure with additional layers of selectively deposited material after printing a core-skeleton, for example by means of an SLS process, and after inserting the functional fibers (ff). For example, an extruder, which can preferably be oriented and positioned by 6 degrees of freedom on a multi-axis robot arm, can apply such additional workpiece layers.

Provided that the functional fiber (ff) to be inserted has a certain rigidity, the functional fiber (ff) can melt the material of the workpiece (wst) or the powder layer as a heat-conducting device with the heat energy of the heating device (hk). However, this can also be done, for example, by the functional fiber (ff) being an optical waveguide for a laser beam used to heat the powder material (pw), which melts the powder material or the workpiece material at the end of the functional fiber (ff) within the powder material during insertion.

To realize this, for example, the functional fiber insertion device (ft) can use the functional fiber (ff) as a heat conductor for the heat required to heat the powder material (pw) from a heating element (hz2). The functional fiber (ff) then melts the powder material or workpiece material at the surface (of) of the workpiece (wst)—in this case, the powder (pw)—along the functional fiber (ff) within the powder material during insertion. Other mechanisms, such as energy input by ultrasound or spark generation, are conceivable. The disclosure presented herein claims these methods and devices as functionally equivalent.

The core of the process idea thus comprises the steps of
1. temporarily opening the surface (of) the workpiece (wst) and creating a workpiece opening.
2. inserting the functional fiber (ff) into the created workpiece opening of the workpiece (wst).
3. closing the workpiece opening after inserting the functional fiber (ff).

In this context, opening means creating a temporary workpiece opening in the surface (of) of the workpiece (wst). A workpiece opening can, for example, be filled with molten, first material of the workpiece (wst). The document presented here understands by first material in the case of the selective laser sintering process as a basic process the substance itself, of which the powder of the layer (pw) as the workpiece (wst) consists. If therefore in the following one speaks of material hum from the first material, then it is meant it that a material, for example a granulate, evenly the first mentioned material with a form characterization—for example granulate consists of evenly this first material as substance without further form characterization. Thus, a workpiece opening is present in the sense of this document when the functional fiber (ff) is movable in the region opening up the workpiece opening within the first material of the workpiece (wst) and the functional fiber insertion device (ft) can position the functional fiber (ff) within the workpiece opening. Such a workpiece opening can be, for example, a groove (nut) or a trench or a recess or a melting region (b). A fluid may fill the workpiece opening. The fluid may be, for example, a gas or a melt or an adhesive.

This paper understands the term workpiece (wst) in context, particularly related to the selective laser sintering process,
a) both a non-sintered powder layer region or a powder layer region which has not yet been melted, on the one hand, and
b) on the other hand a surface (of) of an already manufactured workpiece (wst) or
c) a region of the powder layer which has already been sintered or melted and re solidified, i.e. is a solidificated region (d).

Mechanical opening and closing of the surface (of) of the workpiece (wst) is possible. In this case, for example, a mechanical device, such as a milling machine, creates a trench or said groove in the new surface (oft. For example, a second mechanical device closes this trench or groove again. Thus, the device according to the proposal preferably has several mechanical subdevices. The computer and/or control system of the proposed device preferably selects, by means of a positioning device and a tool changing device (wwv), the tool required for the next process step front among the available mechanical devices. The mechanical tools thus bury the functional fiber (ff) in the case thus quasi under the new surface (ofn) of the workpiece (wst) by mechanical means. A combination of these mechanical steps
a) with thermal process steps, for example the selective melting presented here, and/or
b) with chemical steps, such as the locally selective synthesis of layers, and/or
c) with physical methods, such as locally selective dissolution in solvents or precipitation from solutions and/or
d) with adhesive methods, such as gluing, and/or
e) with buildup welding and/or
f) with deposition soldering or the like
is conceivable.

As a first step, the basic process for combination with selective laser sintering (SLS) is described below. The combination with other processes is analogous. In this respect, this description is exemplary. The basic process is a selective heat melting (SHM) process. For the purposes of this paper, it can be regarded as a subset of the selective heat sintering (SHS) process.

Reference is taken to the book Schmid, M. (2015b). Selective Laser Sintering (SLS) with Plastics: Technologic, Prozesse and Werkstoffe, Hauser, Munich, whose chapter 3 and especially its FIGS. 3a to 3d show the dynamic temperature course during laser sintering.

In a first step of the basic process, a heat spreader (wv) having a planar surface (of) is provided. The heat spreader is, for example, a steel or aluminum plate which is sufficiently smooth and planar on the workpiece side. The task of the heat spreader (wv) is to preheat the workpiece surface, in this case the powder layer (pw), to a temperature below the melting temperature of the first material of the powder layer (pw) or the workpiece (wst). This has the advantage that only a very small amount of energy is required locally to melt the powder of the powder layer (pv). The side of the heat spreader (wv) facing the workpiece (also called the construction platform) is the powder side of the heat spreader (wv). On the side of the heat spreader (wv) opposite the powder side, heating elements, hereinafter referred to as first heating element (hz1), are preferably mounted or manufactured in the firm of meander-shaped heating conductors. A controller supplies the first heating element (hz1) with electrical energy in such a way that a first predeterminable process temperature ($\vartheta_1$) is set. The heat spreader (wv) is preferably provided with a temperature sensor (ts). However, a sensing device can also sense the voltage drop across the heatsealing band at a constant heating current. Based on the typically arising temperature dependence of the electrical resistance of the heatsealing band of the first heating element (hz1), the controller can infer the actual temperature of the heatsealing hand and thus indirectly that of the heat spreader (wv) after suitable calibration. This allows the controller to close the control loop. For the control of the first process temperature ($\vartheta_1$) of the heat spreader (wv), the controller preferably detects the actual temperature ($\vartheta_{wv}$) of the heat spreader (wv) by means of one or more of these temperature sensors as measuring device. Preferably, the controller readjusts the electrical heating power for the first heating element (hz1) and thus the first process temperature ($\vartheta_1$) accordingly as a function of the detected temperature ($\vartheta_{wv}$) of the heat spreader (wv). Preferably, the controller is a PID controller or the like.

Alternatively, for example, a pyrometer can measure the surface temperature of the surface (of) of the layer (pw). With the help of an infrared heater in the process chamber (pk) and a control of the first process temperature ($\vartheta_1$), the controller can then set, control and regulate the temperature gradient in the direction of the heat spreader on the surface (ofn).

Preferably, a squeegee (rk) applies a layer (pw) of a first material to the surface (of) during the feed by a squeegee feed device in a step 2. This layer of first material preferably forms a new surface (ofn) parallel to the previous surface (of). For the purposes of the present disclosure, the first material may also be a mixture of different materials, which are then encompassed by this term. Preferably, the first material is a granular material having a suitable melting temperature or a suitable inciting temperature range above the first process temperature ($\vartheta_1$) and below a second process temperature ($\vartheta_2$). In case of a first material mixture as first material, all partial materials of this first material mixture must have a suitable melting temperature above the first process temperature ($\vartheta_1$) and below the second process temperature ($\vartheta_2$), respectively, to ensure process reliability. If the solidification temperature is not equal to the melting temperature, the solidification temperature should be above the first process temperature ($\vartheta_1$) and below the second process temperature ($\vartheta_2$) to ensure process reliability.

As described above, the 3D priming device according to the proposal can now combine the process with a process for selective sintering. This can be, as described, for example, selective laser sintering (SLS), selective thermal transfer sintering (TTS) (English: selective heat sintering)(SHS)), selective separation sintering (SSS), selective inhibition sintering (SIS), selective laser melting (SLM), selective heat melting (SHM), direct metal laser sintering (DMS). For example, when combined with a selective laser sintering process, it makes sense to perform selective laser sintering first. This is then followed, in an optional step 2a, by selective sintering of the powdered material consisting of the first material of the powder layer (pw) by means of a process of selective laser sintering to sintered material also consisting of the first material. When in the following reference is made to the material to be re-melted, it is meant that a new re-melting process re-melts, preferably locally selectively, the material that has already been previously re-melted and re-solidified, for example by selective laser-sintering. However, such a re-melting process can also locally selectively re-melt the still powdery material from first material of the powder layer (pw) for the first time.

Applying the powder layer (pw) creates a new surface (ofn) that the 3D printing device can now process.

In a third step 3, a positioning device then moves a heating device (hk) to the new surface (ofn). Here, a suitable mechanism, for example a two or more dimensional positioning devices bring the heating device (hk) a predetermined xy position above the new surface (ofn) at a first distance (f). This can be done, for example, by the positioning device bringing the heating device (hk) to the correct xy position relative to the heat spreader (wv), or by the positioning device bringing the heating device (hk) closer to the surface (ofn) of the layer (pw), corresponding to a reduction of the first distance (f). Bringing the heating device (hk) closer to the surface can also be done only once during the processing of the new surface (ofn). In that case, it is favorable if the heating element has only a low heat capacity and is relatively small, and if the heating device (hk) is made of a material having good thermal conductivity, for example copper or diamond. A cooling device preferably cools the heating device (hk) at the same time. In this way, the heating element (hz) and the cooling device can rapidly heat and cool the heating device (hk) having a high rate of temperature rise and fall, which allows the generation of locally structured melting regions (b) in the first material of the new surface (ofn). The selection of the second process temperature ($\vartheta_2$) of the heating device (hk) in terms of value is preferably made as a function of the xy position relative to the new surface (ofn). This value-based selection of the second process temperature ($\vartheta_2$) of the heating device (hk) as a function of the xy position relative to the new surface (ofn) then allows, for example, a local xy coordinate-dependent modulation of the melting width and possibly also of the melting depth of the first material of the new surface (ofn) at the location of melting by the heating device (hk).

In a fourth step 4, the heating of the heating device (hk) to the second process temperature ($\vartheta_2$) takes place accordingly, whereby this heating can also take place before or after the heating device (hk) is brought to the surface (of).

The heating device (hk) can consist of several partial heating elements having different second process temperatures ($\vartheta_{2a}$, $\vartheta_{2b}$). Since the positioning device typically moves the heating device (hk) over the surface (ofn) of the workpiece or powder material of the powder bed at a first velocity (v1). This typically results in a temperature profile that a surface segment of the new surface (ofn) passes through as the heating device (hk) moves over it at this first velocity (v1). Experiments have shown that this leads to better results. In this connection, this paper refers to FIG. 24, which shows the gridded photograph of a test device with which the method of embedding the fibers has been successfully tested.

Now that the heating device (hk) has been brought closer, the first material of the new surface (ofn) in the area of the heating device (hk) can be heated in a warm-up area (a, b) in a fifth step 5.

The energy transfer from the heating device (hk) to the new surface (ofn) can be done preferentially

- by the absorption of the infrared radiation emitted by the heating device (hk) by the relevant part of the new surface (ofn) located close to the heating device (hk), and/or
- by heat transport by convection from the heating device (hk) to the new surface (ofn) and/or
- by a locally limited, direct mechanical contact between the heating device (hk) and the new surface (ofn) and/or
- by heat transport by means of a heat conducting device, in particular a functional fiber (ff), from the heating device (hk) to the new surface (ofn) and/or
- by heat transport by means of a functional fiber (ff) as a special case of a heat conduction device from the heating device (hk) towards the new surface (ofn).

A combination of these methods may be possible, if technically and economically feasible.

In a sixth step 6, this heat transport results in the complete or partial melting of part of the first material of the powder layer (pw) in the central melting region (b) of the wart-up area (a, b). This heat transport converts the warm-up area (a, b) as a result of heating to molten material into a melting region (b) located within the warm-up area (a, b).

In this way, up to this point, the heat transport generated a localized limited inching region (b). One idea can now be that the 3D printing device according to the proposal generates many locally limited melting regions (b) in this way, which then result in a quasi point-shaped mosaic on the new surface (ofn) of the layer (pw).

The seventh step 7 therefore preferably comprises the termination of the melting process.

- A final guiding away of the heating device (hk) from the new surface (ofn) and/or
- a decrease in the temperature of the heating device (hk) below the second process temperature ($\vartheta_2$)

can, for example, cause the melting process to be terminated. By terminating the melting process, the temperature at the new surface (ofn) preferably falls below the melting temperatures of all partial materials of the first material of the layer (pw) and the new surface (ofn). The undershooting of the melting temperature thus converts the respective melting region (b) into a solidificating region (c).

As a result, in an eighth step 8, the molten material of first material solidifies into solidified material of first material in the solidificating region (c). The complete solidification of the solidificating region (c) ultimately transforms it into a solidificated region (d). This transformation of the solidificating region (c) into the solidificated region (d) ends when the solidificating region (c) has completely solidified.

In a refinement of the process, in the sixth step of melting as step 6.1. the positioning device performs a translational displacement of the heating device (hk) during the melting of a part of the first material of the layer (pw) This translational displacement occurs, as already described above, preferably at a first velocity (v1) parallel to new surface (ofn). This translational displacement typically causes at least part of die molten material to leave the heating region (a) and enter a solidificating region (c). This leads to step 6.2, which comprises the solidification of this molten material into solidified material from the first material of the layer (pw) in this solidificating region (c). The complete solidification of the solidificating region (c), ultimately transforms it into the solidificated region (d).

Further refinement of the process suitably repeats the steps previously performed to structure the subsequent, now new, layer of first material of the new powder layer (pw). Repeated application and processing of powder layer after powder layer of the first material typically form a suitable continuation of the process. Whereby the powder layer comprises the first material, which in turn may comprise sub-materials. The method for producing a subsequent layer then comprises additional steps. The method preferably performs these additional steps in time after the melting process (step 7) is completed. As step 9.0, the use of the new surface (ofn) as surface (of) of the heat spreader (wv) for temporally subsequent steps is then preferably carried out. As step 9.1 then a renewed execution of the step 2 and/or the step 2a takes place if applicable. Step 9.2 is then the renewed execution of step 3, if applicable. Step 9.3 is then the renewed execution of step 4. Step 9.4 is then the renewed execution of step 5. Step 9.5 is then the renewed execution of step 6. Step 9.5.1 is then the renewed execution of step 6, if applicable. Step 9.5.2 is then, if necessary, the re-execution of step 6.2. Step 9.6 is then the re-execution of step 7. Step 9.7 is then the re-execution of step 8. Step 9.8 is then, if necessary, the re-execution of steps 9.0 to 9.8.

A further variant of the process comprises the step 9.5.1.1 of feeding a functional fiber on during step 9.5.1 and the step 9.5.1.2 of inserting the functional fiber (ff) into the molten material in the melting region (b) during step 9.5.1. This feeding is preferably carried out through a channel (kn) in the heating device (hk). Means can also be used to feed the functional fiber (ff) to the melting region (b) by other means and to place it in the melting region (b). For example, it is conceivable that the feed is effected via a cannula guided separately from the heating device (hk) in such a way that the functional fiber is inserted into the melt in the melting region (b) at a functionally equivalent insertion point. This has the advantage that this separate cannula can be at a different temperature than the heating device (hk). This increases the freedom in process design and potentially allows a further increase in the quality of the process result.

A further variant then comprises, as step 9.5.1.3, the transport of the functional fiber (ff) in time parallel to step 9.5.1.1 at a second speed (v2). To prevent distortion of the functional fiber (ff), the second speed (v2) is preferably essentially equal to the first speed (v1) during step 9.5.1.

Essentially the same means that slight variations in speed due to inadequacies in the mechanical structure and speed control, do not prevent the embedding of the functional fiber (ff) in the first material of the workpiece or in the new surface (ofn).

Preferably, the heating device (hk) brings the functional fiber (ff) to a third process temperature ($\vartheta_t$). If necessary, a separate partial heating element can also perform this heating. The 3D priming device can use the functional fiber (ff) during the embedding process as a heat conduction device, which causes the melting process itself and then sinks into the melted material of the layer (pw), i.e. the surface (of) of the workpiece wst). For example, it is conceivable that the functional fiber (ff) melts the first material of the new surface (olio or of the workpiece (wst) with the heat transported by the functional fiber (ff). In that case, the functional fiber insertion device (ft) can insert the functional fiber (ff) into the first material perpendicular to the new surface (ofn). The functional fiber section of the functional fiber (ff) that the functional fiber insertion device (ft) can insert into the first material in this way is usually only a short functional fiber section of the functional fiber (ff).

After the functional fiber (ff) has been inserted into the first material of the layer (pw) by melting and subsequent solidification, there is still a mechanical connection between the workpiece (wst) (e.g. in FDM printing) or the resolidified solidificating region (c) in the powder (pw) (e.g. in SLS printing) on the one hand, and the part of the functional fiber (ff) not yet inserted in the channel (kn) on the other hand. This mechanical connection must be severed by the functional fiber insertion device (ft). For this purpose, the functional fiber insertion device (ft) preferably uses a cutting and severing device (av) which cuts the functional fiber (ff) in response to a signal from the computer or control system of the 3D printing device. For this purpose, a step 9.7.1 of cutting through the functional fiber (ff) is preferably carried out. The functional fiber (ff) is severed in such a way that a part of the functional fiber (ff) inserted into the molten material in step 9.5.1.2 remains in the now solidified material after step 9.7. This cutting is preferably carried out by a cutting and severing device (av) above the heating device (hk) However, other positioning is expressly possible. The heating device (hk) should therefore be as short as possible in order to keep the dead space between the cutting and severing device (av) on the one hand and the insertion point (ep) of the functional fiber (ff) into the first material of the new surface (ofn) on the other short Tests have shown that friction occurs between the channel (kn) in the heating device (hk), which serves to transport the functional fiber (ff) in the channel (kn) to the insertion point (ep), on the one hand, and the functional fiber (ff) on the other. In addition to the cutting and severing device (av), there is also preferably a transport mechanism in the form of a functional fiber feeding device (ar, pr) above the heating device (hk), which transports the functional fiber (ff) at the said second speed (v2) in the direction of the insertion point (ep). For further consideration, firstly, the first length of the distance of the access point of this transport mechanism (the functional fiber feeding device (ar, pr)) to the insertion point (ep) is important. Secondly, the second length of the portion of the functional fiber (ff) already in the solidificated region (d) is important. The functional fiber experiences a first frictional force in the channel (kn). The already melted and solidified powder of the solidificated region (d) holds the functional fiber (ff) in the powder bed with a second force counteracting this. If the ratio of first length divided by second length exceeds a critical value, the second force may no longer be sufficient to compensate for the first frictional force after the end of the functional fiber (ff) leaves the functional fiber feeding device (ar, pr). The heating device (hk) then tears the solidificated region (d) comprising the functional fiber (ff) out of the powder layer. Said severing is preferably a mechanical severing, for example by a mechanical cutting or mechanical breaking, or ultrasonic or laser cutting. Said cutting and severing device tail is preferably arranged above the channel (kn) for this purpose. Even better would be an arrangement below the channel (kn), but this usually fails due to space. As a rule, the device according to the proposal places the infrared radiating lowest surface of the heating device (hk) of the functional fiber insertion device (ft) as close as possible to the new surface (ofn) of the layer (pw), i.e. of the workpiece (wst), in order to achieve maximum heating power. The cutting and severing device (av) cuts through the functional fiber (ff) so that its end can conic to rest at the predetermined position after insertion. Therefore, when determining the cut-off timing by a control computer, a computer or control system, the control computer can take into account the fiber length of the functional fiber (ff) between the insertion point (ep) and the cut-off point in the cutting and severing device (av). The functional fiber insertion device (ft) then still inserts the part of the functional fiber (ff) already in the channel (kn) into the melted material of the melting region (b) of first material of the layer (pw), i.e. of the workpiece (wst). Thus, the end of the functional fiber (ff) is also located in this molten material of the melting region (b). After solidification, the end of the functional fiber tin is then embedded in the corresponding solidificated region (d). This restriction of the degrees of freedom of the functional fiber (ff) in the solidilicated region (d) protects the functional fiber (ff) from being torn out by the squeegee (rk) during the squeegee feed when the squeegee (rk) applies the next powder layer (pw) as the new material layer of the workpiece (wst).

Preferably at the very end, when the priming device according to the proposal has produced all layers, a step 10 of removing the first material that is not a solidified material is performed, for example in SLS priming. The printing device preferably performs this step 10 after a step 8 and/or after a step 9.7 and/or after a step 9.7.1. Since the material for SLS printing is preferably dusty or granular first material, it typically trickles out of the created workpiece by itself or with mechanical or fluid assistance if the workpiece provides and has sufficient and suitable trickle channels.

Preferably, an electric heating current brings the heat spreader (wv) to a heat spreader temperature ($\vartheta_{wv}$), which typically corresponds to the first process temperature ($\vartheta_1$). Usually there is a small temperature difference between the heat spreader temperature ($\vartheta_{wv}$) and the first process temperature ($\vartheta_1$), but this should typically be known and compensated.

An apparatus according to the proposal uses the process presented here, as described, preferably together with processes of selective laser sintering (SLS) or FDM printing. For the purposes of this document, the term selective laser sintering (SLS) also includes selective laser melting (SLM). Preferably, therefore, an apparatus according to the proposal uses, at least at times, a process as described above together with at least one further process, different therefrom, for producing three-dimensional bodies, in particular for additive manufacturing, in order to produce at least parts of the workpiece in the form of the three-dimensional device.

A structured, selective heat-transfer sintering process or selective heat melting (SHM) using multiple heating elements is also possible. The heating elements act, as it were, as print heads. Such an extended process then operates using a plurality of heating devices (hk1 to hkn). Preferably, a device according to the proposal performs, at least temporarily, in parallel or successively in time, firstly, with the aid of at least one first heating device (hk1) of the plurality of heating devices (hk1 to hkn), a process as described above. Secondly, a device according to the proposal also carries out a process as described above with the aid of at least one second heating device (hk2) of the plurality of heating devices (hk1 to hkn), which is different from the first heating element (hk1). In this regard, the first procedure that the first heating device (hk1) performs may be different from the second procedure that the second heating device (hk2) performs. For example, the first heating device (hk1) may insert a first functional fiber (ff) having a first functional fiber type, for example, a glass fiber, while the second heating device (hk2) may insert a second functional fiber having a second functional fiber type, for example, a carbon fiber. The first process that the first heating device (hk1) performs may be the same as the second process that the second heating device (hk2) performs.

Preferably, thermal insulation thermally insulates at least the first heating device (hk1) and the second heating device (hk2) from each other Preferably, thermal insulations thermally insulate all heating devices (hk1 to hkn) from each other.

This allows the computer and control system of the 3D printer to control the heaters independently of each other Preferably, they each have their own controller for this purpose.

The methods disclosed herein can potentially use various sub-devices and materials as the functional fiber (ff). For example, a functional fiber insertion device (ft) may embed an optical fiber or electromagnetic waveguide as the functional fiber (ff) in the molten material of first material of layer (pw). The subsequent application of the optical fiber and/or electromagnetic waveguide within the workpiece (wst) may include, for example, optical and/or electromagnetic transmission of data and/or use as a sensor element and/or use as another optical and/or electromagnetic functional element. Furthermore, the insertion of functional fibers (ff) is conceivable to create fiber composites during additive manufacturing or during the steps between the printing of different printing layers. For example, it may be useful to use a carbon fiber as a functional fiber (ff) or as a component of a functional fiber (ff). Likewise, it is possible to use wires as functional fibers (ff) of as a component of a functional fiber (ff). These may include, for example, metal or iron or stainless steel or copper or brass or silver or gold or platinum, etc., and alloys.

It is also conceivable that the functional fibers (ff) have a surface structure, in particular a micro- or nanoscopic one, such as barbs, etc., which improve anchoring in the subsequently solidified material. Of course, the functional fiber (ff) may also comprise a plastic wire or strand or the like. Preferably, a functional fiber (ff) has a melting or decomposition temperature that is higher than the second process temperature ($\vartheta_2$) to enable insertion of the functional fiber (ff) into the material of the workpiece. If the functional fiber (ff) comprises different subdevices, preferably the functional fiber portion of the functional fiber (ff) having the lowest melting or decomposition temperature has a melting or decomposition temperature higher than the second process temperature ($\vartheta_2$). Of course, it is also conceivable that with full intention parts of the functional fiber change due to the temperature treatment before insertion. Then this condition applies analogously to the functional fiber parts that the functional fiber insertion device (ft) is to insert. Of course, a stranded wire as a functional fiber (ff) or a component of a functional fiber (ff) may comprise wires of the same or different materials and wire surface structure. A sheathing, in particular a sizing for changing the wetting properties of the strand surface, can additionally sheathe the strand. Also, the functional fiber (ff) may comprise a shape memory wire, in particular a nition wire. The term wire in the sense of a possible functional fiber (ff) is intended to include, for the purposes of this document, more complicated electrical wire-shaped devices such as coaxial cables. Likewise, the functional fiber (ff) may also include a natural fiber, for example a silk or cotton fiber, or a mineral fiber, for example an asbestos fiber. Further methods and/or devices may combine these functional fibers (ff) comprising the previously described examples of the functional fibers (ff) to form more complex functional fibers (ff). Also, the functional fiber (ff) may comprise a preferably linear fluidic device. Such a linear fluidic device in the sense of this document is, for example, a hose and/or a tube as a special case of a hose and/or a multiple tube comprising multiple sub-tubes, which may also comprise fluidic functional elements such as mixers, heat immersors, etc. For the purposes of this document, the term tube also includes hoses which are particularly suitable for the insertion process because of their flexibility.

The functional fiber (ff) can also comprise a flexible electronic circuit. Such a flexible circuit may, for example, be a flexible circuit carrier comprising very small components (keyword "electronic dust"). For example, it is conceivable that an electrical component, for example a temperature-dependent resistor having, for example, a first terminal and a second terminal, is located in a tube. For example, a first weld or solder joint may then electrically and mechanically connect the first terminal of the temperature-dependent resistor to a first piece of wire. For example, a second weld or solder joint may then electrically and mechanically connect the second terminal of the temperature-dependent electrical resistor to a second piece of wire. The use of components other than an electrical resistor, for example the use of transistors, diodes, light emitting diodes, photodiodes, microswitches, sensors, microintegated circuits, etc., is of course conceivable. A designer will adapt the number of wires or conductive tracks, if any, used on the functional fiber (ff) to the particular purpose and design of such a flexible circuit. If necessary, the functional fiber (ff) uses stranded wires or similar functionally equivalent electrical connections instead of wires. This combination of first wire piece and second wire piece and electrical component is then preferably inserted and mounted in the said hose, which is to serve here as an exemplary circuit carrier. The tube comprising the electrical functional elements inside it is then an exemplary functional fiber (ff), which a suitably dimensioned functional fiber insertion device (ft) can insert into the workpiece (wst) in the manner described. Thus, in this example, the functional fiber insertion device (ft) can provide the workpiece (wst) comprising a temperature sensor inside the workpiece (wst). In particular, such an electronic circuit intended as part of a functional fiber (ff) for a functional fiber insertion device (ft) to embed in a workpiece (wst) may include an antenna for receiving electrical energy and exchanging data with its environment for its operation. Thus, the functional fiber (ff) inserted into the first material of the layer (pw) may include, for example, RFID functionality for individual marking of the workpiece. It is conceivable to deposit manufacturing data and other data in this RFID system that is then stored in the later workpiece and then read out during later use. Such data can be, for example, serial numbers, machine parameters, batch numbers of materials, etc. Also, such an antenna deposited by means of the methodology presented herein can supply such an RFID system with electrical energy during later operation. In combination with a reader, the RFID system can, for example, record and/or store and/or keep ready and/or wirelessly transmit to the reader system physical values of the environment of the RFID system within the workpiece in the specific situation of use by means of any sensors of the RFID system that may be present. The challenge in inserting such circuit systems is that the circuit must fit through the channel (kn) and that its overall height must be less than the thickness of the melting region (b) of the layer (pw). Also, the allowed bending radius must be small to allow insertion through a functional fiber insertion device (ft). It should therefore preferably be a microsystem.

The minimum bending radius within the functional fiber insertion device (ft) thus influences the design of such a microsystem or circuit carrier. If this minimum bending radius within the functional fiber insertion device (ft) is too small, then falling below the minimum bending radius when inserting the microsystem into the workpiece (wst) will damage the microsystem or circuit carrier. The design of the 3D priming process and the corresponding device should furthermore take this minimum bending radius into account quite generally when also embedding the other functional fibers (ff) into the material of the powder bed or the workpiece (wst). In this connection, reference is taken to FIG. 20 and a method for increasing the maximum bending radius.

Also the functional fiber (ff) may comprise a braid of the same functional fibers (ff) or different functional fibers (ff). Also, the functional fiber (ff) may comprise a fabric made of the same functional fibers (ff) or different functional fibers (FF). For example, the functional fiber (ff) may comprise said tube comprising an electrical circuit, for example, in the film of a woven tube of glass fibers. It is also possible and conceivable to insert a narrow- or wide-mesh fabric as a functional fiber (ff), if said fabric fits through the channel (kn) of the functional fiber insertion device (ft). The functional fiber (ff) can also comprise a sensor element, in particular a strain gauge or an electromagnetic waveguide or an optical waveguide comprising an optically active section. In the case of the optical waveguide, for example, this may have one or more quantum dots. In the case of quantum dots and/or fluorescent paramagnetic centers in the optical waveguide and/or electromagnetic waveguide, the optical waveguide or electromagnetic waveguide may also have crystals, preferably micro- or nano crystals comprising such quantum dots and/or paramagnetic centers. It is particularly advantageous if it has one or more diamonds in the form of crystals and if these in particular have one or inure NV centers. This enables extremely high sensitivity magnetic field and acceleration measurements. Also such an optical waveguide or electromagnetic waveguide intended to serve as a functional element may comprise further optical functional elements. Such further optical functional element may be, for example, a doped section in the optical waveguide and/or a digital optical sub-device, in particular a photonic crystal or other electromagnetic filter. For example, such a section may be doped erbium, e.g., for light amplification or for generating nonlinear optical effects, etc.

It is particularly advantageous if a functional fiber (ff) comprises an actuator, in particular a heating wire or a cooling element or a wire showing a memory effect (shape memory wire) or a ferromagnetic wire. These can cause targeted thermal, chemical, optical, mechanical, magnetic and electrostatic effects within the workpiece in later operation, if necessary, by means of such actuators.

To induce a thermal effect, it is useful, for example, if the 3D printing device embeds a resistance wire as an electrical functional fiber (ff) in the workpiece (wst).

To evoke an optical effect, it is useful, for example, if the 3D printing device embeds an optical waveguide or an electromagnetic waveguide or an electrical circuit comprising a light source, in particular an LED or a laser, as a functional fiber (ff) comprising an optical functional element in the workpiece. It is also conceivable that the 3D device embeds a sufficiently small, optical functional element, for example a reflective functional fiber (ff) or a functional fiber (ff) of predetermined color as an optical functional element and thus as an optical functional fiber (ff) into the workpiece (wst) by means of the functional fiber insertion device (ft).

To produce an electrostatic effect, it is useful, for example, for the 3D printing device to embed an electrically conductive functional fiber (ff), for example a metal wire or a metal strand, as an electrostatic functional element in the form of an electrostatic functional fiber (ff) by means of the functional fiber insertion device (ft). One function of such an electrostatic functional fiber (ff) can then be that of an electrostatic electrode, for example.

To produce a magnetic effect, it can be useful, for example, if the 3D printing device embeds a ferromagnetic functional fiber (ff), for example a ferromagnetic wire or a ferromagnetic strand, as a magnetic functional element in the form of a magnetic functional fiber (ff) in the workpiece by means of the functional fiber insertion device (ft). The workpiece can then use this magnetic functional fiber (ff) as a power source for magnetic forces. In particular, the functional fiber (ff) may comprise a functional fiber (ff) having a permanent magnetic property. Also, the functional fiber (ff) may comprise a hard magnetic material. The relevant material of the functional fiber (ff) may also only assume such hard magnetic properties during subsequent magnetization or be intended to assume such hard magnetic properties. It is also conceivable that the functional fiber (ff) comprises a Wiegand wire or a Nitiol wire or a shape memory wire. When using a shape memory wire as the functional fiber (ff), it is advantageous if the 3D printing device otherwise manufactures the workpiece (wst) at least partially from mechanically elastic material by means of the additive printing process. It is advantageous if the 3D printing device introduces the shape memory wire as a functional fiber (ff) into the workpiece during the printing process. In particular, it is conceivable that the 3D printing device introduces the shape memory wire as a functional fiber (ff) by means of the method presented herein or another method for introducing functional fibers (ff) into a workpiece (wst) during the additive manufacturing process. After completion of the additive manufacturing process, and preferably after completion of the fabrication of the workpiece, an activation signal may activate the shape memory wire in the intended use at the intended use location. Such an activation signal may be, for example, a suitable temperature increase of such a shape memory wire. Depending on the type of shape memory wire, the shape memory wire then resumes its predetermined mechanical shape. As an inserted functional fiber (ff), the shape memory wire hereby deforms the material of the workpiece (ff) and thus the workpiece (wst) itself. As a result, the workpiece (wst) assumes its intended final shape. This process is of particular interest for medical implants which, for example, minimally invasive surgery can move to predetermined locations in the body. It is thus advantageous if a 3D printing device uses a methodology presented here to produce medical implants that first unfold in the body.

Both magnetic and electrostatic functional fibers (ff) can therefore also cause mechanical effects if necessary. The same applies when electric current flows through electrically conductive functional fibers (ff), possibly generating a magnetic field.

A suitable functional fiber (ff) can generate chemical effects, for example. Various start signals, in particular from the computer and/or control system, can initiate chemical effects. For example, parts of the functional fiber (ff) and/or the functional fiber (ff) as a whole can have contact, for example, with a liquid wetting the workpiece (wst), e.g. an electrolyte. Such a chemical effect can also occur or be initiated during the insertion of the functional fiber (ff) into the melt of the melting region (b). If the functional fiber (ff) is electrically conductive, the application of a voltage between such a functional fiber (ff) and an electrolyte surrounding the workpiece (wst) or otherwise in electrical contact with the functional fiber (ff) may provoke an electrochemical reaction. When this document claims embedding here, it expressly includes non-full embedding, for example, allowing direct electrical contact between the functional fiber (ff) and electrolyte.

Of course, the preceding functional fiber types of the functional fibers (ff) can also be expressed only locally in certain functional fiber sections of the functional fibers (ff), without possibly changing the stress as a result.

Such a device for producing a three-dimensional device, in particular for additive manufacturing, preferably comprises a heating device (hk), a heat spreader (wv), a channel (kn) and a functional fiber feed device for the functional fiber (ff). The heat spreader (wv) is preferably provided and suitable for a squeegee feed device to preferably apply a layer (pw) of a material to the heat spreader (wv) by means of the squeegee (rk). The heating device (hk) is preferably provided and suitable for locally selectively melting the material of the layer (pw) and/or, when combined with a selective sintering process, in particular a selective laser sintering process, the already sintered material of the layer (pw) directly or indirectly to form a melting region (b). The heating device (hk) preferably has a channel (kn). The functional fiber feed device is preferably suitable and provided for introducing a functional fiber (ff) through the channel (kn) into the melting region (a, b). For example, the functional fiber feeding device may comprise two wheels (ar, pr) within the functional fiber insertion device (ft), which provide the functional fiber (ff) with a mechanical transport towards the workpiece (wst).

As a result of these processes, which may have been carried out on the previously described device, a corresponding workpiece (wst) is obtained.

Thus, this document also discloses an apparatus for additive manufacturing by means of selective sintering and/or melting, comprising a first group of subdevices for performing a selective laser sintering process. Among other things, these are typically the laser and its electronics and power supply, the LASER optics and the associated dynamic beam guidance. Furthermore, the device comprises a second group of subdevices for performing a selective heat sintering process (TTS). In this process, a heating device (hk), as the previous sections have already described it, sintered a powder layer (pw) in a powder bed selectively and for a short time locally on the surface and/or melted this powder layer (pw). In contrast to the prior an, the device has a sub-device for inserting functional chamfers (ff) during this sintering or melting process. The text of this document refers to this sub-device with the term functional fiber insertion device (ft).

In the example presented here, the second group of subdevices for carrying out a selective heat sintering process (TTS) also includes a part of the subdevice for inserting functional fibers (ff), namely the heating device (hk), which is now additionally provided comprising a channel (kn) for the functional fiber (ff). In addition to the devices known for selective thermal transfer sintering (TTS), the subdevice for inserting functional fibers (ff) also has a functional fiber feed device. This functional fiber feeding device comprises, as described in the preceding sections above, e.g. for example, the fastening means (B), the drive roller (ar), the pressure roller (pr) for transporting the functional fiber (ff), the pressure spring (df), the beam (bk), which is typically L-shaped and rotatable about an axis (AC), the upper functional thread guide (off), the pressure roller (pr) for transporting the functional fiber (ff), the lower functional thread guide (uff) and the channel (kn), which has a counterpart in the beam (bk).

Typically, this device features a temperature-controlled process chamber (pk).

In the process chamber (pk) there are preferably infrared emitters which additionally heat the surface (ofn) of the powder (pw) or the workpiece so that the temperature of the heat spreader (wv) is a little lower than the temperature of the surface (ofn) of the powder layer (pw).

A positioning device for this subdevice for inserting functional fibers (ff) is located at least to a substantial extent in this process chamber (pk). Preferably, said sub-device for inserting functional fibers (ff) comprises a functional fiber feeding device (ar, pr). For example, a controller can preferably temper the process chamber (pk) to a process chamber temperature ($\vartheta_4$) that is preferably below the melting point of the material of the workpiece (wst) or layer (pv). As already described above, the functional fiber feeding device (ar, pr) carries out the feed of the functional fiber (ff) during the insertion of the functional fiber (ff). In contrast, the positioning device positions the subdevice for inserting functional fibers (ff) within the process chamber (pk). The problem now is that the process chamber temperature ($\vartheta_4$) is usually so high that operation of inexpensively available motors for driving the functional fiber feeding device (ar, pr) and the positioning device is not possible in the process chamber at the process chamber temperature ($\vartheta_4$). Therefore, preferably the motors of the positioning device and the motors of the functional fiber feeding device (ar, pr) are placed outside the process chamber (pk). In general, preferably only one motor for the functional fiber feeding device (ar, pr) and one motor (M) for the positioning device are used. The motor for the functional fiber feeding device (ar, pr) is typically the said motor (VSM) for transporting the functional fiber (ff) towards the surface (OF) of the layer (pw). The device preferably has mechanical means, in particular shafts and/or splines (kw1, kw2, kw3) and for example cone gear wheels (kz1 to kz4). These mechanical means serve for the transport of mechanical energy from the motor or motors (M) of the positioning device to the feed device (SP) of the positioning device and boor the transport of mechanical energy from the motor or motors (VSM) of the functional fiber feeding device (ar, pr) to the functional fiber feeding device (ar, pr) itself.

A second cone gear wheel (kz2) and a fourth cone gear wheel (kz4) and a second spline shall (kw2) preferably mechanically couple the feed device (SP) of the positioning device to the motor or motors (M) of the positioning device.

Similarly, a first spline shaft (kw1) and a first cone gear wheel (kz1) and a third cone gear wheel (kz3) and a third spline shaft (kw3) may mechanically couple the functional fiber feeding device (ar, pr) to the motor or motors (VSM) of the functional fiber feeding device (ar, pr).

Embedding Thick Functional Fibers

It may happen that thick functional fibers prevent a complete embedding of the functional fiber (ff) in one step. For this case, a special procedure is proposed. A process is described (FIG. 53) for embedding a thick functional fiber (ff) in a workpiece (wst), for example the surface of a possibly already sintered powder layer, in the following as an example. The workpiece (wst) or the powder layer (pw), whose designation in this document is also "first layer", typically base a surface (of). The material on the surface (of) of the workpiece (wst) or the powder layer (pw) can comprise unconsolidated and consolidated regions, in particular solidificated regions (d) Thus, for example, a selective laser-sintering process may have already solidified the surface (of) of the workpiece (wst) with all or part of it or not. Also, an extruder (extr) may have applied or made the layer. It is conceivable that the surface (of) was previously produced in other ways. The surface (of) of the workpiece (wst) or the powder layer (pw) may therefore also be a structured surface (of) and need not necessarily form a flat surface. The proposed process then preferably comprises the steps Step 0: (provided in FIG. 53) producing a workpiece (wst) comprising a surface (of) and/or producing a first layer, in particular a powder layer (pw), and/or providing a workpiece comprising a surface (of), the material of the surface (of) of the workpiece (wst) being suitable, at least in sections, for enabling the surface (of) of this material to be melted in a process step of the following method.

Step 1: selective melting and solidification of the material of the workpiece (wst) on the surface (of) of the workpiece (wst) or the first layer, in particular the powder layer (pw) (FIGS. 42, 43):

Step 2: Application of a second layer (npw) to the surface (of) of the workpiece (wst) or the surface of the first layer, in particular to the surface of the powder layer (pw) (FIGS. 44, 45):

Step 3: selective melting and solidification of the second layer (FIGS. 43, 44) comprising at least partial insertion of a functional fiber (ff) into the melt during this melting:

Step 4: Application of a third layer (npw) to the surface (of) of the workpiece (wst) (FIG. 49) by an additive manufacturing process;

Step 5: selective melting and solidification of the third layer (FIGS. 50, 51, 52) in the region of the inserted functional fiber (ff) so that the solidified region, i.e. the solidificated region (d), of the material of the second layer and the solidified material of the third layer at least partially enclose this functional fiber (ff).

The manufacturing of the workpiece (wst) preferably comprises additive manufacturing processes. Such exemplary additive manufacturing processes are in particular: Stereolithography (SL). Laser-Sintering (LS), Selective Laser-Sintering (SLS). Laser Beam Melting (SLM=Selective Laser Melting, also: Laser Beam Melting=LBM). Electron Beam Melting (EBM), Fused Layer Modeling: Manufacturing (FLM or also Fused Filament Fabrication (FFF)) Multi-Jet Modelling (MJM), Poly-Jet Modelling (PJM), 3D Printing (3DP, also known as Binder Jetting), Layer Laminated Manufacturing (LLM), Digital Light Processing (DLP), Thermal Transfer Sintering (TTS), Metal Laminated Tooling (MELATO), Continuous Liquid Interface Production (CLIP), Selective Heat Sintering (SITS), Laser Metal Deposition (LMD), Wax Deposition Modeling (WDM), Contour Crafting, Cold Gas Spraying resp, Metal-Powder Application (MPA), Lithography-based Ceramic Manufacturing (LCM), 3D screen printing, 3D inkjet printing especially of optical elements, light-guided electrophoretic deposition, SUS process (Shaping-Debinding-Sintering), production of metallic green bodies by means of Fused Deposition Modeling Fused Layer Modeling or Material Extrusion, two-photon lithography, Arburg plastic free-forming, Screw Extrusion Additive Manufacturing (SEAM).

Other processes such as injection molding and machining processes can also produce such a workpiece (wst) prior to embedding the functional fiber (ff). These workpiece considerations apply explicitly to the workpiece (wst) throughout this document.

The process can be simplified if the functional fiber insertion device performs the insertion of the functional fiber (ff) together with the selective sintering. Such a process is shown, for example, in FIG. 54. Now, however, it comprises the steps:

Step 0: (assumed in FIG. 53) producing a workpiece (wst) comprising a surface (of) and/or producing a first layer, in particular a powder layer (pw) and/or providing a workpiece comprising a surface (of), the material of the surface (of) of the workpiece (wst) being suitable, at least in sections, for melting in the following process.

Figure 42:
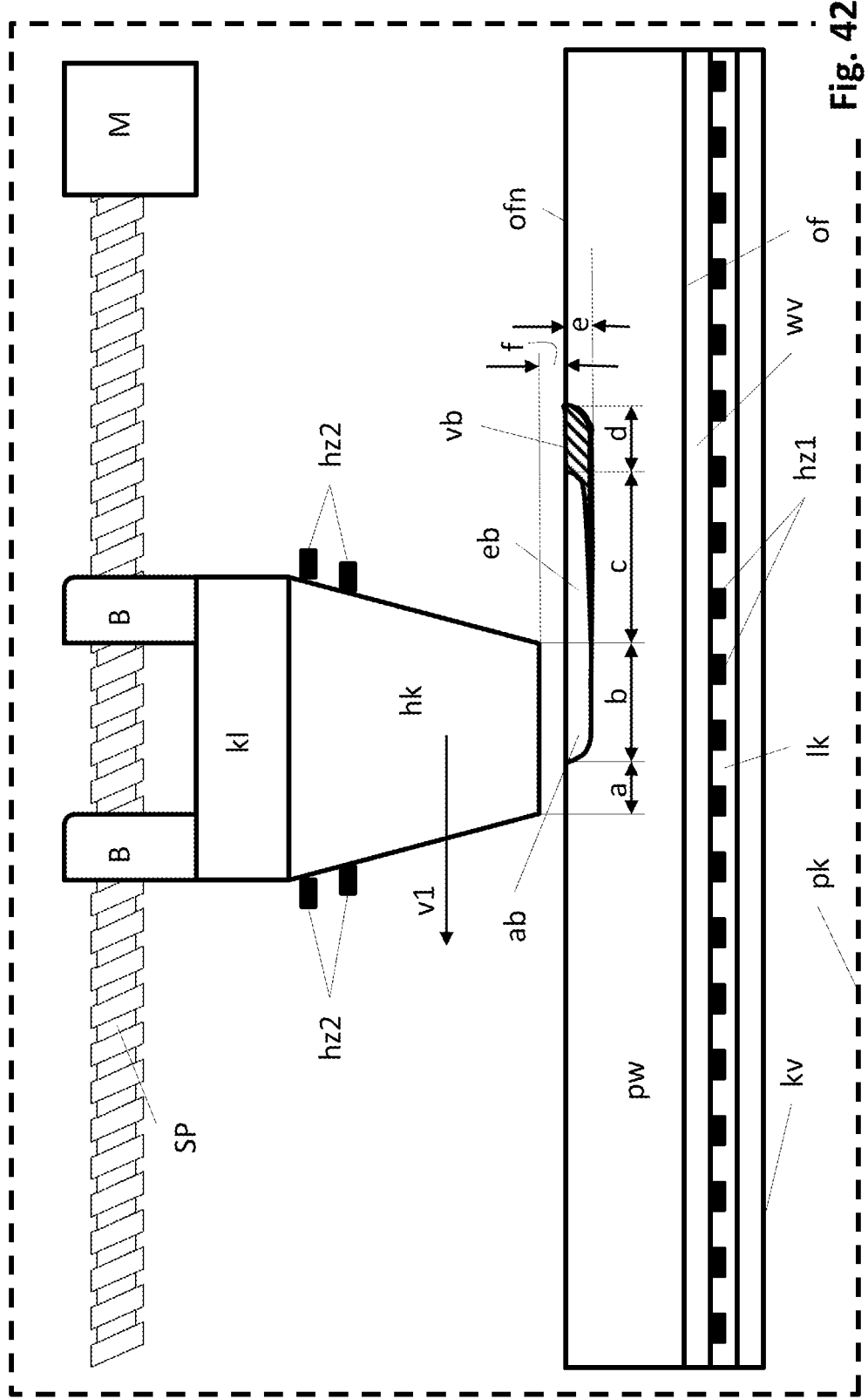
FIG. 42 illustrates an example first step in an example process of embedding a thick functional fiber comprising local melting.
Figure 43:
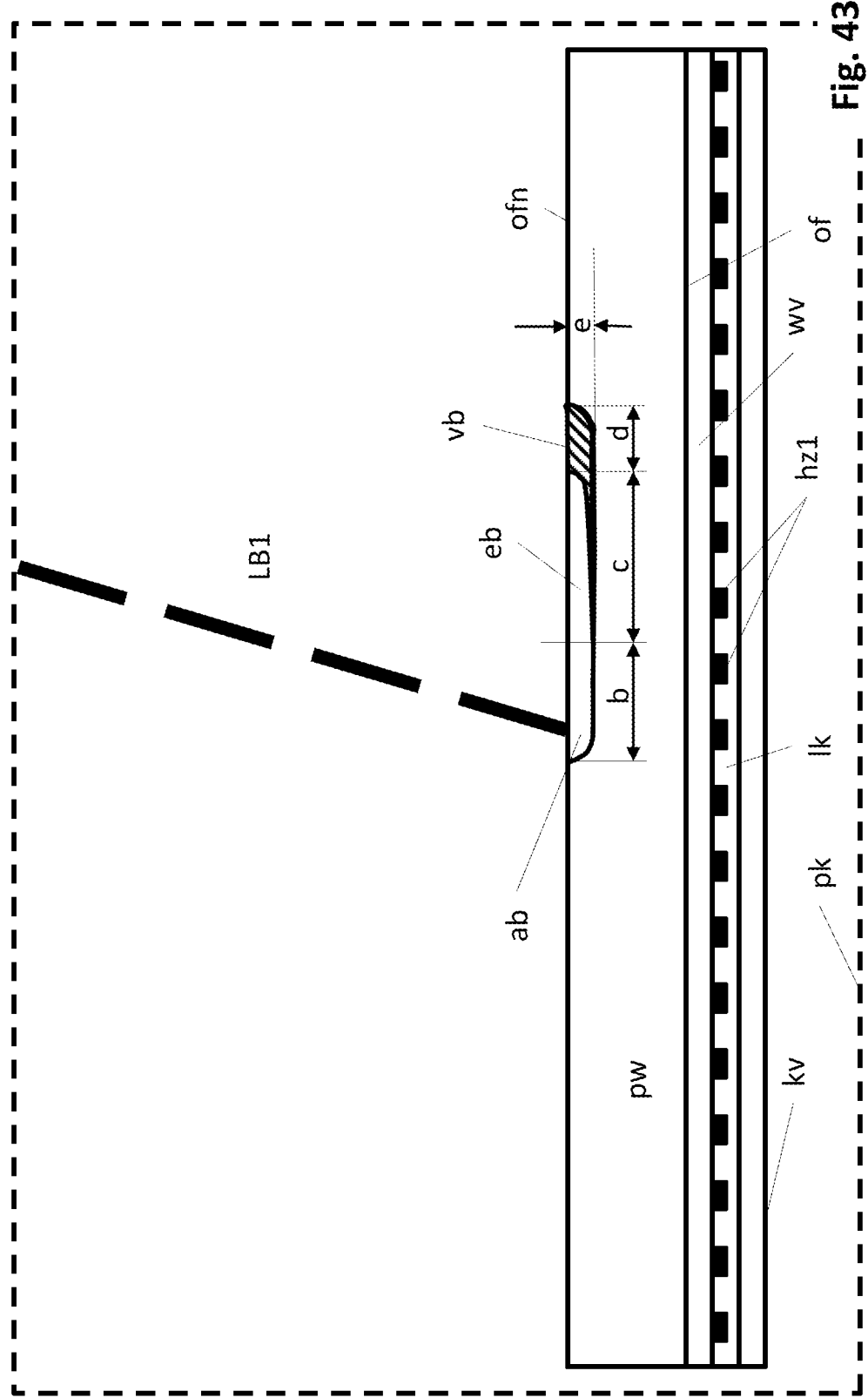
FIG. 43 illustrates an alternative example of the first local melting step by application of a laser sintering process.
Figure 49:
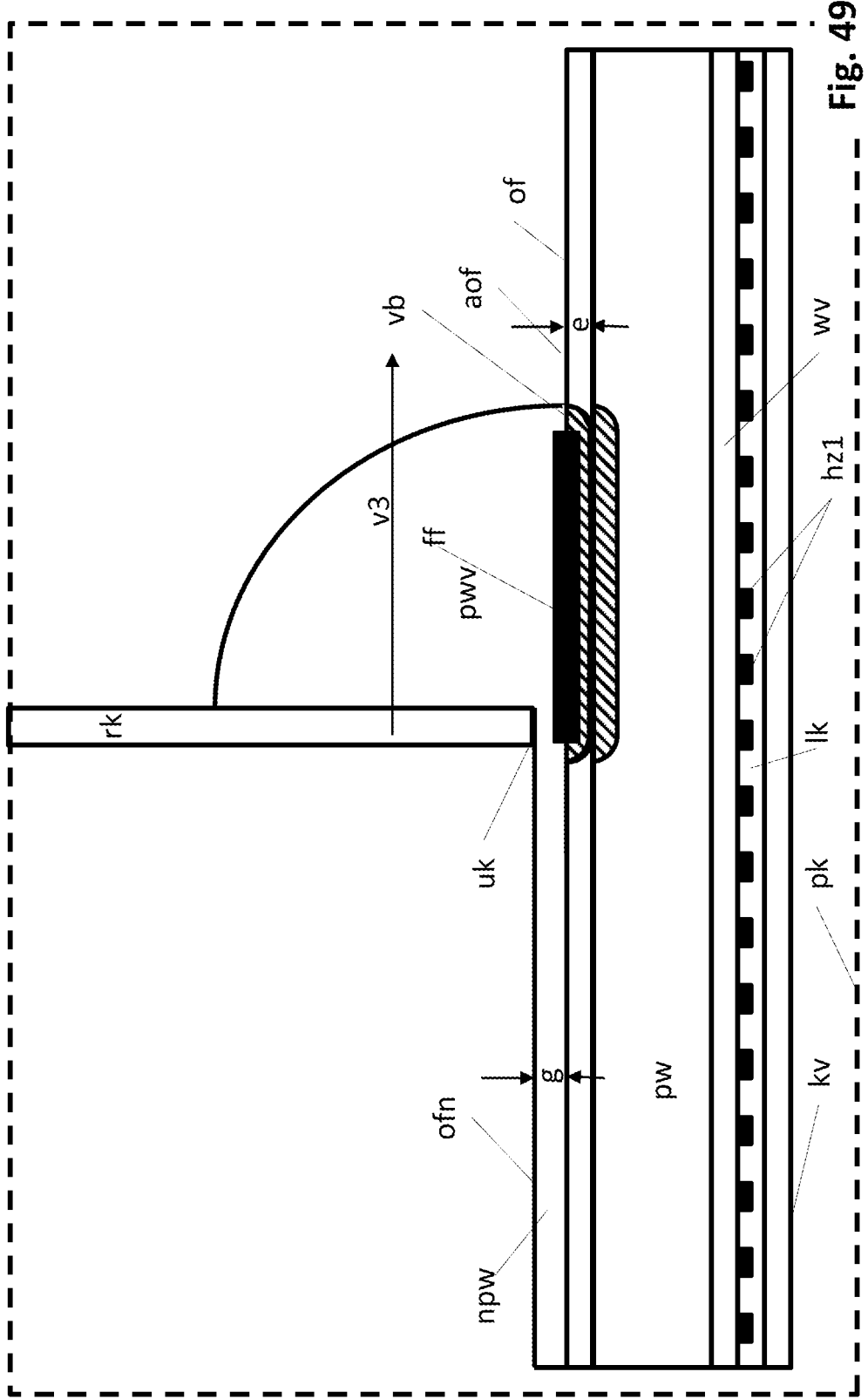
FIG. 49 illustrates the application of a further powder to the old surface in a fourth process step.

Step 1: selectively melting and solidifying the material of the workpiece (wst) on the surface (of) of the workpiece (wst) or a first layer on the surface (OF) of the workpiece (wst) (FIGS. 42, 43);

Step 2: selective melting and solidification of the material of the workpiece at the surface of the workpiece (FIGS. 47, 48) comprising at least partial insertion of a functional fiber (ff) into the melt during melting;

Step 3: Application of a further, second layer (npw) to the surface (of) of the workpiece (wst) (FIG. 49);

Step 4: selective nicking and solidification of the second layer (FIGS. 50, 51, 52) in the region of the inserted functional fiber (ff), so that the solidified region of the material of the first layer and the solidified material of the workpiece at the surface of the workpiece, i.e. the solidificated region (d), at least partially enclose this functional fiber (ff). Thus, the process is one step shorter.

A further simplification of the procedure is possible. The procedure then comprises only the step:

Step 1: selective melting and solidification of the material of the workpiece at the surface of the workpiece (FIGS. 42, 43) comprising at least partial insertion of a functional fiber (ff) into the melt during inching so that the solidified region of the solidified material of the workpiece at the surface of the workpiece, i.e. the solidificated region (d), at least partially encloses this functional fiber (ff). However, this process is then no longer suitable for embedding thick functional fibers (ff).

A summary of the selective sintering process presented here, in particular selective laser sintering, is as follows:

The device according to the proposal interrupts the selective sintering process. The device according to the proposal provides a functional fiber (ff). Then, the apparatus according to the proposal performs positioning of the functional fiber (ff) relative to the workpiece (wst). The device according to the proposal performs a restriction of the degrees of freedom of the functional fiber (ff) by welding, embedding, bonding, in particular in form-fitting or force-fitting manner. Provided that the functional fiber pieces of the functional fiber (ff) are not prefabricated, the cutting and severing device (av) separates the functional fiber (ff) and thus shortens functional fiber (ff) to a functional fiber section having a predefined length. The 3D printing device then typically continues the selective sintering process.

The degrees of freedom of the functional fiber (ff) can be restricted by at least locally melting the surface (of) of the workpiece (wst) to form a melt, inserting the functional fiber (ff) into the inch, and finally restricting the degrees of freedom of the functional fiber (ff) by solidifying the melt.

More generally, this results in a modified fused deposition modeling (FDM) process for incorporating a functional fiber (ff) into the workpiece to be created, in which the 3D printing device interrupts the FDM process as a basic process in a first step. In the example discussed here, it is assumed that the 3D priming device has a tool changing device (wwv). The 3D printing device, by means of the tool changing device (wwv), in cooperation with the positioning device of the 3D priming device, sets down the extruder for FDM printing at a first parking position. The 3D printing device, by means of the tool changing device (wwv) in cooperation with the positioning device of the 3D printing device, then picks up a functional fiber feeding device instead of the extruder and is then ready to insert the functional fiber (ff) when the heating device (hk) has reached a target temperature. For example, the 3D printing device provides the functional fiber (ff) via this functional fiber feeding device. The functional fiber feeding device may include a spool comprising the functional fiber wound up and held ready. A functional fiber feed device in the functional fiber insertion device (ft) preferably moves the functional fiber (ff) toward the surface (of) of the workpiece (wst) during the insertion process. Preferably, spindle also has a motor. Preferably, during the insertion process and during the insertion of the functional fiber (ff) into the material of the surface (of) of the workpiece (wst), the motor unwinds the functional fiber (ff) front the spindle in a corresponding length. This corresponding length in a time interval corresponds to the length of the same time interval by which the functional fiber feeding device transports the functional fiber (ff) toward the surface (of) of the workpiece (wst). In some cases, it may be useful if the functional fiber feeding device can move the functional fiber (ff) back again by a certain length in certain operating states. For example, it is useful if the motor of the spindle then causes the spindle to rewind the excess length of the functional fiber (ff) by running backwards. Preferably, a functional fiber tension sensor determines a measured value for the mechanical tension of the functional fiber (ff) in the section between the spindle and the functional fiber feed device. Preferably, this measured value of the mechanical functional fiber tension influences the control of the motor of the spindle of the functional fiber (ff). For this purpose, a functional fiber tension controller controls the motor of the functional fiber spindle depending on the measured value of the determined mechanical functional fiber tension. The functional fiber tension controller regulates the mechanical functional fiber tension in such a way that the functional fiber (ff) at one point in the section between the functional fiber spindle and the functional fiber feed device has a mechanical functional fibre tension that is essentially always approximately equal in value. Mechanical guidance of the functional fiber (ff) in a tube on the section between the spindle and the functional fiber feed device has proved particularly effective. Preferably, the functional fiber feeding device (ff) comprises said functional fiber feeding device and a channel (kn) for mechanically guiding the functional fiber (ff) inside the functional fiber insertion device (ft). Typically, the hose and the channel (kn) have the same inner diameter. So, in a way, the hose represents an extension of the channel (kn) from the functional fiber insertion device (ft) towards the spindle. The difference is that the hose is flexible and thus allows the positioning of the functional fiber insertion device (ft) with respect to the workpiece (wst). Therefore, an essential step of the method is that the control of the 3D printing device can bring the workpiece (wst) and the functional fiber insertion device (ft) into a predetermined position relative to each other, for example, with the aid of an x-y-z positioning device. Thus, positioning of the functional fiber (ff) relative to the workpiece (wst) is performed as a process step. The functional fiber insertion device (ff) then preferably performs the restriction of the degrees of freedom of the functional fiber (ff). Various things in this regard have already been described. After the restriction of the degrees of freedom, a cutting and separating device separates the functional fiber (ff). Of course, it is still possible to insert the functional fiber (ff) with a remnant whose length corresponds to the distance between the insertion point (ep) and the separation point of the functional fiber (ff) in the cutting and severing device (av) after separation. In this respect, the separation can also take place during the insertion of the functional fiber (ff) into the material of the surface (off. However, it is important that the functional fiber insertion device (ff) has already inserted a minimum length of the functional fiber (ff) into the material of the surface (of) of the workpiece (wst) before the separation, in order to ensure that the parasitic friction between the wall of the channel (kn) on the one hand and the functional fiber (ff) on the other hand does not prevent the workpiece (wst) from still being able to pull the remaining piece of the functional fiber (ff) out of the channel (kn).

After separating and inserting the remaining piece of the functional fiber (ff) into the surface (of) of the workpiece (wst), the positioning device of the proposed 3D printing device preferably moves the functional fiber insertion device (ft) away from the workpiece (wst) again. Preferably, the 3D printing device sets the functional fiber insertion device (ft) back down at the second parking position by means of the tool changing device (wwv) and the positioning device. Preferably, said exemplary tool changing device (wwv) replaces functional fiber insertion device (ft) with a tool that performs the basic process. In the example discussed herein at this point in the text, the basic process is an FDM printing process. Therefore, the tool changing device (wwv) preferably exchanges the functional fiber insertion device (ft), as one tool, back against an extruder, as another tool, so that the 3D printing device can then perform FDM printing. To do this, the 3D priming device preferably picks up the extruder again at the first parking position by means of the tool changing device (wwv) and the positioning device. The 3D printing device then continues the previously interrupted FDM process.

Thus, a more general additive manufacturing process includes the steps:
Interrupting the additive manufacturing process:
Providing a functional fiber (ff).
Positioning the functional fiber (ff) relative to the workpiece (wst);
Restricting the degrees of freedom of the functional fiber (ff)
Optional separating the functional fiber
Continuing the process of additive manufacturing:

An alternative and/or supplementary possibility for limiting the degrees of freedom of the functional fiber (ff) is the fastening of the functional fiber an to or in the surface (of)

of the workpiece (wst) by other methods. Such fastening can be performed, for example, by bonding, in particular using an adhesive, and/or by welding and/or by soldering, in particular with formation of a eutectic, and/or by melting according to one or more of the previously described methods and/or by mechanical fastening, in particular stapling and/or nailing and/or screwing and/or riveting.

Figure 20:
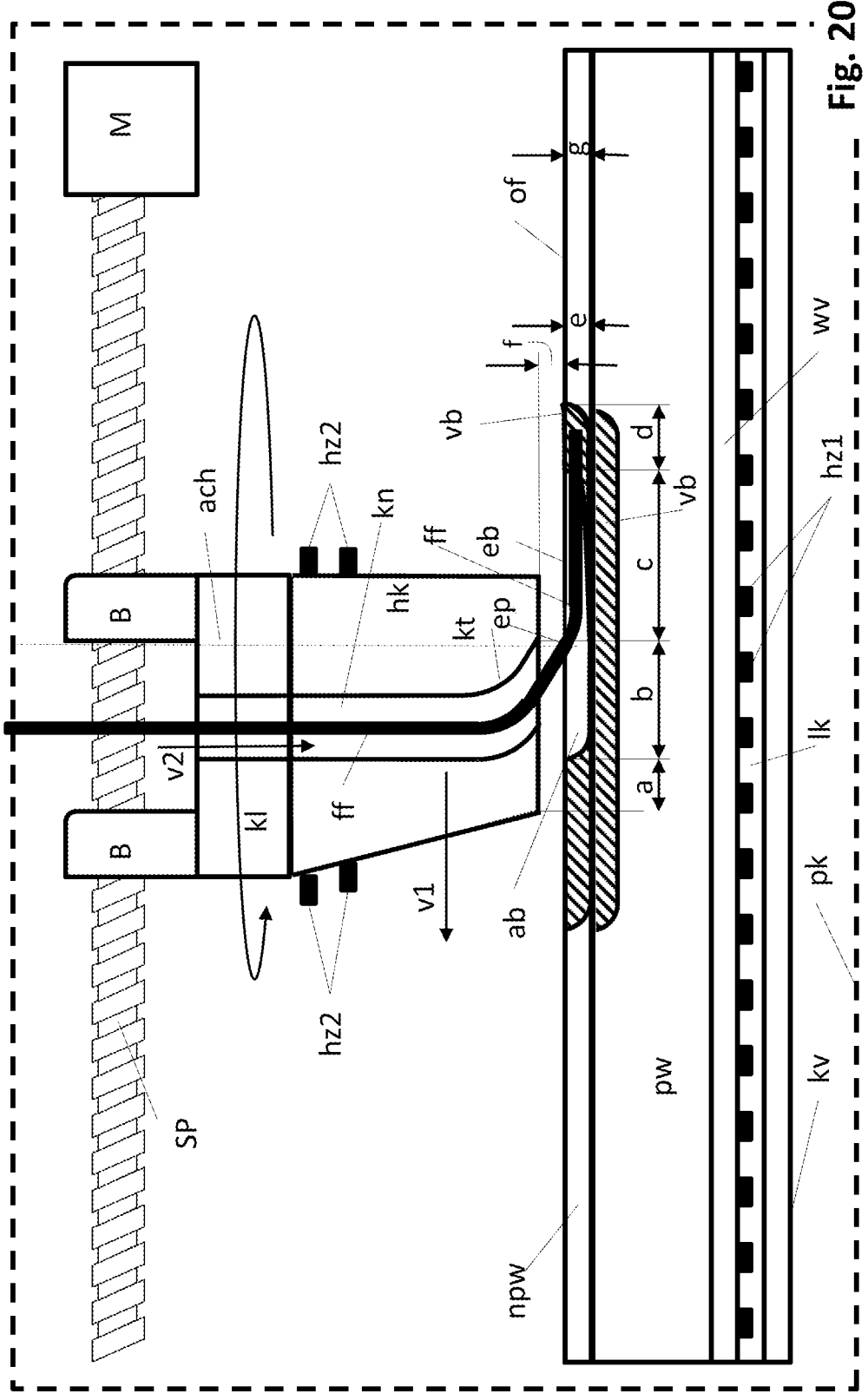
FIG. 20 corresponds to FIG. 14 with a modification to process functional fibers having a larger radius.

The core of the paper presented here is thus a functional fiber insertion device (ft), also referred to here as a fiber tool, in which the functional fiber (ff) is guided in the direction of the surface (of) of the workpiece (wst) in a channel (kn) of the functional fiber insertion device (ft). Thereby, a motor or other function-equivalent device, for example the fiber feed device of a functional fiber insertion device (ft), preferably unwinds functional fiber (ff) from a spindle, the functional fiber spool, having the functional fiber supply inside or outside the 3D printer. For example, a tube preferably feeds the functional fiber (ff) to the channel (kn) of the functional fiber insertion device (ft) on the side of the functional fiber insertion device (ft) facing away from the workpiece (wst). Experience has shown that it makes sense to minimize the frictional forces between the functional fiber (ff) and the channel (kn). Therefore, a straight channel (kn) from the side where the functional fiber (ff) is fed to the side where the functional fiber (ff) is inserted into the workpiece is preferable. Of course, cursed channels (kn), such as shown in FIG. 20, are also conceivable. To enable successful insertion of the functional fiber IM at the insertion point (ep), for example into the melt of the melting region (b), it is useful if the functional fiber insertion device (ff) comprises a functional fiber feed device which transports the functional fiber (ff) in the direction of the surface (of) of the workpiece. For example, a drive roller (ar) and a pressure roller (pr) that a spring (fed) presses against the drive roller (ar) can realize such a functional fiber feeding device. The drive of the drive roller (all can, for example, be a suitable stepper motor which is as small as possible. For simplicity, the figures do not show this stepper motor. A drive via a flexible shaft is conceivable, but had not proved successful in the tests. The functional fiber feed device thus provides the feed of the functional fiber (ff) in the functional fiber insertion device (ft). This paper proposes, for example, the heating device (hk) already described several times for carrying out a selective heat transfer printing process (English: Selective Heat Sintering or Selective Heat Melting). This heating device (hk) preferably has the said heating element (hz). A temperature sensor (ts) is preferably located in the heating device (hk) and/or in the vicinity thereof. If the temperature sensor (ts) is located in the vicinity of the heating element (hz), sufficient thermal coupling is required between the heating element (hi) and the temperature sensor (ts) and between the heating device (hk) and the temperature sensor (ts). The heating element (hz) can then heat the heating device (hk), whereby a controller regulates the temperature of the heating device (hk) in dependence on the measured value of the temperature sensor (ts) according to a preset value by regulating the electrical heating current of the heating element (hz).

Furthermore, the proposed functional fiber insertion device (ft) preferably has a cutting and severing device (av). The cutting and severing device (av) preferably has a blade that deforms the functional fiber (ff) at a predetermined point during the cutting process. This deformation preferably separates the functional fiber (ff). In the case of a carbon fiber, the blade has a counterpart in the form of a groove and possibly a functional fiber guide (ff). If the blade presses the functional fiber (ff) into the groove, the groove restricts the functional fiber in its degrees of freedom during the separation process. The functional fiber (ff) then cannot escape the separation process. In the Proposed Carbon Fiber Separation Process, during the separation process, the blade forces a local bending radius of the carbon fiber at the contact point between the blade and the carbon fiber in said groove of the mating part that is smaller than the minimum bending radius of the carbon fiber (English: carbon fiber). This causes the carbon fiber to break, resulting in carbon fiber separation. Similar and identical separation processes and devices are conceivable for other functional fibers. Preferably, according to the disclosure of this document, the heating device (hk) is suitable and provided for melting the material of a surface (of) of a workpiece (wst) in an additive manufacturing process temporally after the deposition of the material of the workpiece (wst) and temporally after the formation of this surface (of) as a solid surface. In this regard, according to the technical teachings of this paper, the functional fiber insertion device (ft) (fiber tool) can feed a functional fiber (ff) via the channel (kn) by means of the functional fiber feeding device (ar, pr). The functional fiber insertion device (ft) (fiber tool) can then insert the functional fiber (ff) into the melt of the material of the surface (of) in a melting region (b) by means of the functional fiber feeding device (ar, pr) and the channel (kn). The functional fiber inserting device (f) (fiber tool) can then separate the functional fiber (ff) by means of the cutting and severing device (av), if necessary. As already described above, the functional fiber insertion device (ft) (fiber tool) thereby preferably comprises a clamping device in the form of locking plate (vp) as a corresponding part to a locking pin (vst) of a tool changing device (wwv). The clamping device is thereby preferably suitable for mechanically coupling the functional fiber insertion device (ft) (fiber tool) to a tool carrier of a tool changing device (wwv) and/or for mechanically decoupling the functional fiber insertion device (ft) (fiber tool) from the tool carrier of the tool changing device (wwv) again. The tool carrier is preferably coupled to the tool changing device (wwv) at a positioning device of the 3D printing device. The functional fiber insertion device (ft) (fiber tool) preferably comprises a tool set-down device (wav1, wav2) which fixes the functional fiber insertion device (ft) (fiber tool) at the respective parking position in a predetermined position and in a predetermined orientation. As a result, the clamping device of the tool changing device (wwv) can pick up or set down the functional fiber insertion device (ft) (fiber tool) at the parking position, depending on the situation. The tool set-down device (wav1) is thus preferably suitable for mechanically setting down the functional fiber insertion device (ft) (fiber tool) at a tool set-down point, i.e., the corresponding parking position, with limited mobility, and for mechanically picking up the functional fiber insertion device (ft) (fiber tool) again at this tool set-down point, i.e., the corresponding parking position. The tool carrier of the tool changing device (wwv) can be positioned relative to the workpiece, in particular with at least one degree of freedom, in particular by a control device as a positioning device.

The proposed 3D printing apparatus for additive manufacturing therefore preferably comprises a positioning device (SP, B, wv), means for executing a basic additive manufacturing process, a functional fiber feeder, in particular a tube, for a functional fiber (ff), a controller in the form of a computing and control system, and a functional fiber insertion device (ft) (fiber tool). The functional fiber insertion device (ft) (fiber tool) performs a functional fiber insertion process as described in the preceding text, which is different from the basic process. The positioning device (SP, B, wv) positions the functional fiber insertion device (ft) (fiber tool) relative to the surface (of) of a workpiece (wst) in response to signals from the controller. The functional fiber feeder feeds the functional fiber (ff) to the functional fiber insertion device (ft) (fiber tool).

The elaboration of the disclosure revealed that, in order to be able to embed the functional fiber well, a functional fiber (ff) or strand of functional fibers (ff) to be embedded should have a suitable surface. One possibility is that the functional fiber (ff) or the strand of functional fibers (ff) comprises a sizing (SL) on its surface. Preferably, during an insertion process of the functional fiber (ff) into a workpiece (wst), this sizing (SL) of the functional fiber (ff) forms a meniscus (mi) having a contact angle ($\chi$) to the molten material of the surface (of) of the workpiece (wst) at least in some areas of this surface (of). This contact angle ($\chi$) is preferably smaller than 90°. Provided that the used process does not use a sizing (SL), preferably the surface of the functional fiber (ff) should be such, in particular wetting, that the melt of the material of a surface (of) of a workpiece (wst) during an insertion process of the functional fiber (ff) into this surface (of) of the workpiece (wst) forms to the material of the surface of the functional fiber (ff) at least in some areas of this surface of the functional fiber (ff) a meniscus (mi) having a contact angle ($\chi$) which is smaller than 90°. In this way, the correct bent angle ensures optimum adhesion between the functional fiber (ff) and the material of the surface of the workpiece (wst).

The features of the disclosure summarize them again. Applications of the technical teaching can combine the features with each other, provided that these combinations do not cause factual contradictions. In this respect, the dependencies and references presented here represent only particularly preferred, exemplary examples.

Feature 1: Method for producing a three-dimensional device, in particular for additive manufacturing. (FIG. 30) comprising the steps of Step A: Providing a surface (of) of a material from a first material, in particular the surface of a workpiece (wst) and/or a layer (pw):

Step B: Heating the heating device (hk) to a second process temperature ($\vartheta_2$), whereby the heating device (hk) can consist of several heating devices (hk1, hk2), which can then also have different second process temperatures ($\vartheta_{2a}$, $\vartheta_{2b}$);

Step C: Heating of the material in the area of the heating device (hk) in a warm-up area (a, b).
- by infrared radiation of the heating device (hk) and/or
- by heat transfer by convection from the heating device (hk) to the surface (of) and/or
- by direct mechanical contact between heating device (hk) and surface (of) and/or
- by heat transfer by means of a heat conducting device, in particular a functional fiber, from the heating device (hk) to the surface (of), and
- by changing the position of the heating device (hk) along the surface (of) at a first distance (f) from surface (of) with a first velocity (v1);

Step D: Melting a portion of the material in the warns-up area (a, b) in a melting region (b) within the warm-up area (a, b) as a result of the heating in step C to molten material;

Step E: Inserting a functional fiber section of a functional fiber (ff) into the melting region (b).

Step F: Terminating the melting by reducing the energy transfer from the heating device (hk) to the surface (of) and by lowering the temperature of the melting region (b) as a result, this lowering of the temperature of the melting region (b) converting the melting region (b) to a solidificating region (c);

Step G: Solidifying the molten material into solidified material in the solidificating region (c), said solidification convening the solidificating region (c) into a solidificated region (d) in which the respective functional fiber portion of the functional fiber (ff) is wholly or partially inserted.

Feature 2: Method (FIG. 31) for producing a three-dimensional device, in particular for additive manufacturing, comprising the steps of.

Step 1: Providing a heat spreader (wv) comprising a planar surface (of);

Step 2: Applying a layer (pw) of a material on the surface (of) with formation of a new surface (ofn) parallel to the surface (of);

Step 3: Bringing a heating device (hk) to the new surface (ofn);

Step 4: Heating of the heating device (hk) to a second process temperature ($\vartheta_2$), wherein the heating can also take place temporally before or temporally after the heating device (hk) is brought to the surface (of) and wherein the heating device (hk) can consist of several heating devices (hk1, hk2) having different second process temperatures ($\vartheta_{2a}$, $\vartheta_{2b}$);

Step 5: Cleating the material in the area of the heating device (hk) in a warm-up area (a, b).
- by infrared radiation of the heating device (hk) and/or
- by heat transfer by convection from the heating device (hk) to the new surface (ofn) and/or
- by direct mechanical contact between heating device (hk) and new surface (ofn) and/or
- by heat transfer by means of a heat conducting device, in particular a functional fiber (ff), from the heating device (hk) to the new surface (ofn);

Step 6: Melting a portion of the material in the warm-up area (a, b) in a melting region (b) within the warm-up area (a, b) as a result of the heating in step 5 to molten material;

Step 7: Finishing the melting process
- by finally transporting the heating device (hk) away from the new surface (ofn) and/or
- by lowering the temperature of the heating device (hk) below the second process temperature ($\vartheta_2$), the lowering of the temperature of the heating device (hk) in the respective case convert converts the inching region (b) into a solidificating region (c);

Step 8: Solidificating the melted material to solidified material in the solidificating region (c).

Feature 3: Method (FIG. 32) for producing a three-dimensional device, in particular for additive manufacturing, according to feature 2 comprising the additional step of Step 2a: Selective sintering or melting of the material of the layer by means of a process of selective sintering and/or melting, in particular selective laser sintering and/or selective thermal transfer sintering (TTS), to sintered material;

Feature 4: Method (FIG. 33) according to one or more of the features 2 to 3 comprising the additional steps of Step 6.1: translational displacing the heating device (hk) during melting of a part of the material or sintered material, whereby this translational displacement occurs wing a first velocity (v1) parallel to new surface (ofn), and whereby because of this translational displacement, at least part of the molten material leaves the warm-up area (a, b) and enters a cooling region comprising the solidificating region (e) and the solidificated region (d);

Step 6.2: Solidifying said molten material in said solidificating region (c) into solidified material in said cooling region, wherein the solidification of said molten material in said solidificating region (c) transforms said solidificating region (c) into a solidificated region (d).

Feature 5: Method (FIG. 34) according to one or more of the features 2 to 4 comprising the additional steps that are temporally after the completion of the melting (step 7):

Step 9.0: Using the new surface (ofn) as the surface (of) of the heat spreader for subsequent steps in time;
Step 9.1: Performing step 2 and/or step 2a again;
Step 9.2: If necessary, repeating step 3;
Step 9.3: Carrying out step 4 again;
Step 9.4: Performing step 5 again;
Step 9.5: Performing step 6 again;
Step 9.5.1: If necessary, repeating step 6.1;
Step 9.5.2: If necessary, repeating step 6.2;
Step 9.6: Performing step 7 again;
Step 9.7: Performing step 8 again;
Step 9.8: If necessary, carry out steps 9.0 to 9.8 again and/or carry out steps 9.1 to 9.8 again and or carry out steps 9.3 to 9.8 again.

Feature 6: Method (FIG. 35) according to one or more of features 2 to 5, comprising the steps of Step 9.5.1.1: Feeding a functional fiber during step 9.5.1 and
Step 9.5.1.2: Inserting the functional fiber into the melted material in the melting region (b) during step 9.5.1.

Feature 7: Method (FIG. 35) according to feature 6 comprising the step of

Step 9.5.1.3: transporting the functional fiber (ff) in time parallel to step 9.5.1.1 at a second speed (v2) during step 9.5.1.
wherein the second velocity (v2) is substantially equal to the first velocity (v1).

Feature 8: Method according to one or more of the features 6 to 7
wherein the heating device (hk) changes the functional fiber (ff) to a third process temperature ($\vartheta_3$).

Figure 36:
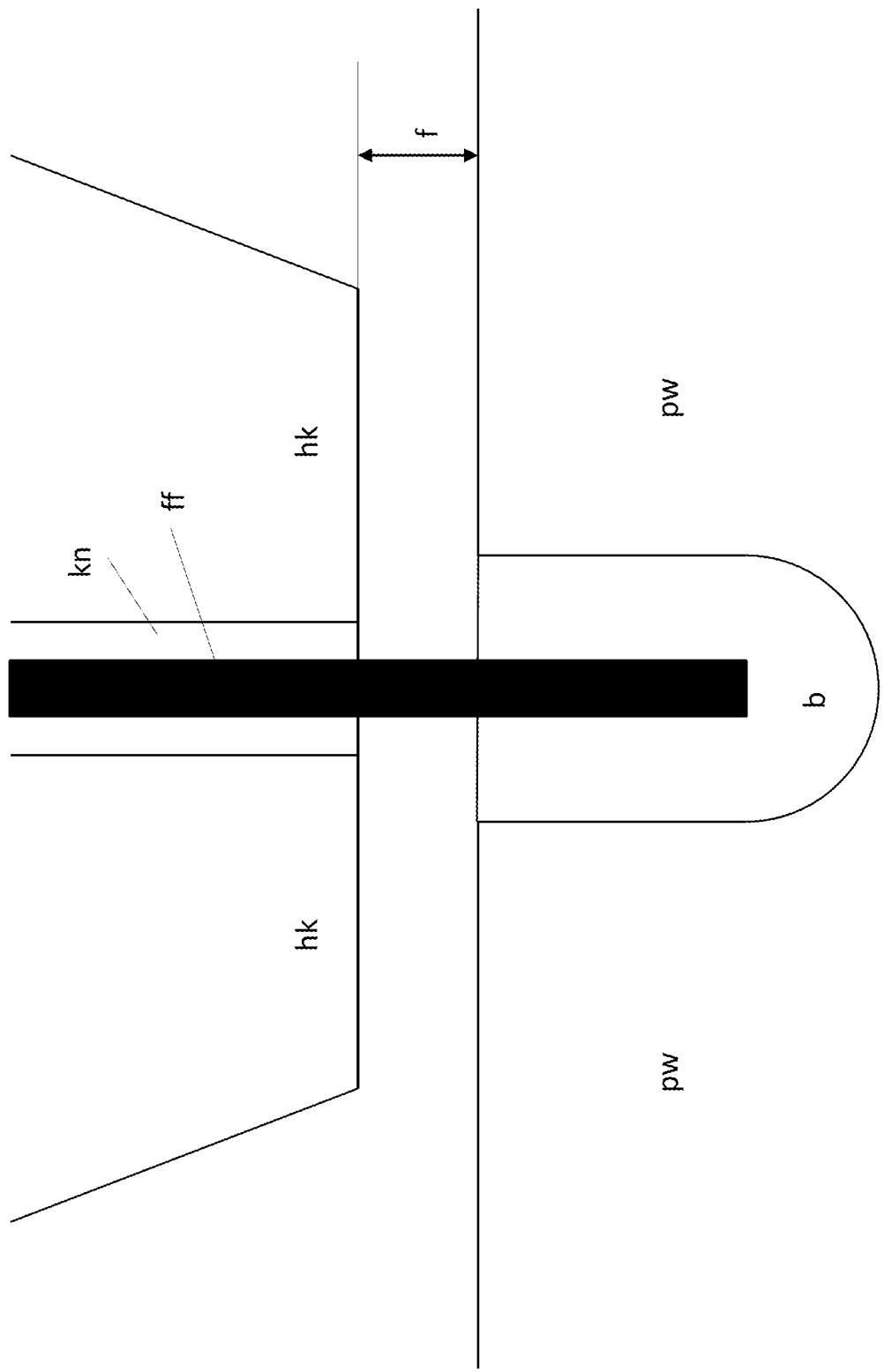
FIG. 36 illustrates an example of using the functional fiber as a thermal conduction device.

Feature 9: Method (FIG. 36) according to feature 8
wherein the method uses the functional fiber (ff) as a heat conducting device.

Figure 37:
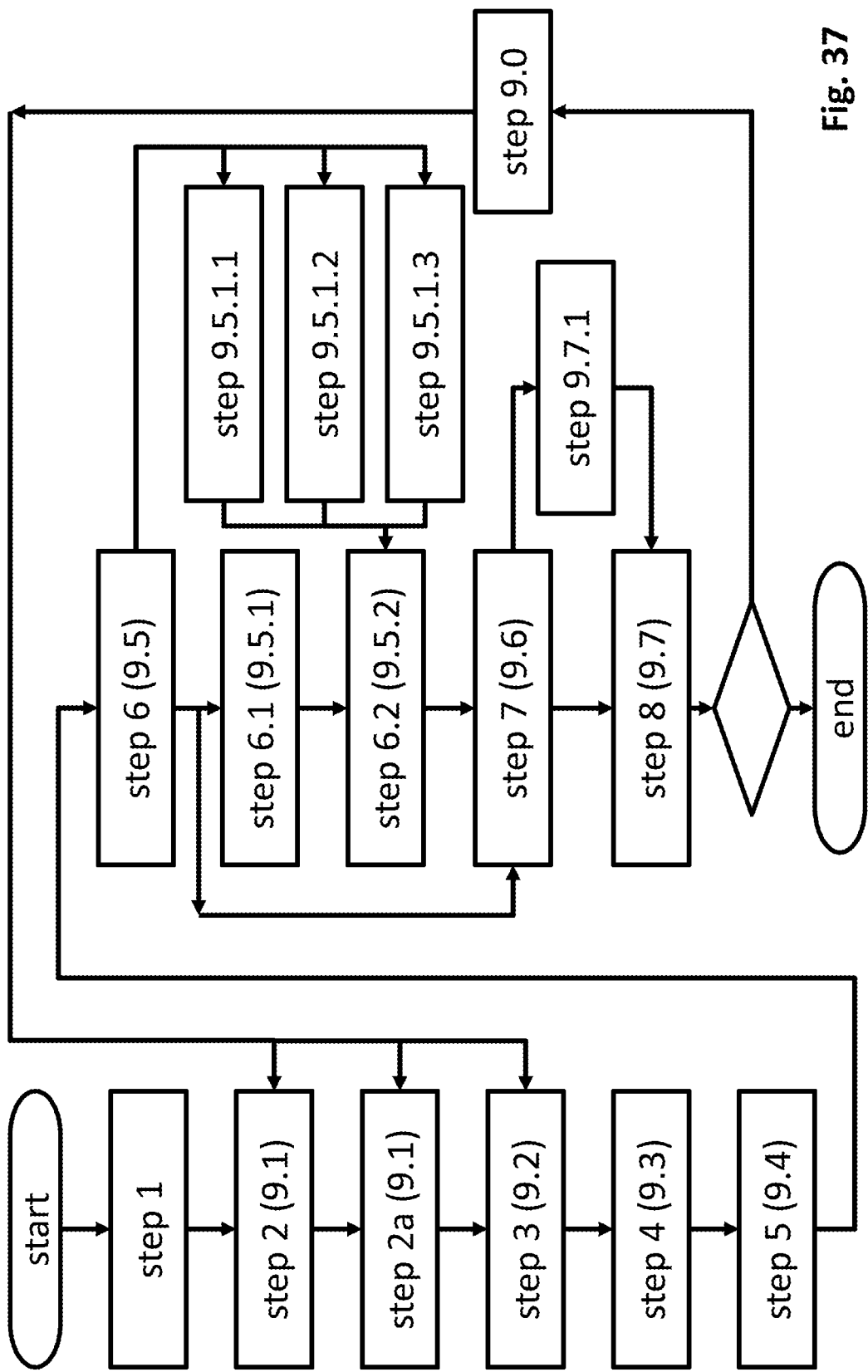
FIG. 37 corresponds to the exemplary step sequence of FIG. 35 including an optional step for severing.

Feature 10: Method (FIG. 37) according to one or more of features 6 to 9, comprising the step:
Step 9.7.1. Cutting, in particular mechanical cutting, of the functional fiber in such a way that a part of the functional fiber inserted into the molten material in step 9.5.1.2 remains in the now solidified material after step 9.7.

Feature 11. Method according to one or more of the features 6 to 10 comprising the
Step 10: Remove the material that is not solidified material according to step 8 and/or according to step 9.7 and/or step 9.7.1.

Feature 12: Method according to one or more of features 2 to 11 comprising the step of
Tempering the actual temperature ($\vartheta_{wv}$) of the heat spreader (wv) to a target heat spreader temperature ($\vartheta_1$).

Feature 13. Method for producing a three-dimensional device, in particular for additive manufacturing, characterized in that,
that the method at least temporarily uses a method according to one or more of the features 1 to 12 at least as a sub-method, and
that the method uses at least one further method at least as a sub-method for producing three-dimensional bodies, in particular for additive manufacturing, to produce parts of the three-dimensional device, and
wherein said further method is not a method according to one or more of features 1 to 2 and/or features 4 to 12.

Feature 14: Procedure according to feature 13
wherein the further process is a process of selective laser sintering and/or
wherein the further process is an extruder-based additive manufacturing process, for example an FDM process.

Feature 15: Method according to one or more of features 2 to 14
wherein the method uses a plurality of heating devices ($hk_1$ to $hk_n$), and
wherein the process is at least at times temporally parallel or temporally sequentially
firstly, using at least one first heating device of the plurality of heating devices ($hk_1$ to $hk_n$), carrying out a method according to one or more of features 2 to 14 at least as a sub-method, and
secondly, the method carries out a method according to one or more of the features 2 to 14 at least as a sub-method with the aid of at least one second heating device of the plurality of heating devices ($hk_1$ to $hk_n$), which is different from the first heating device.

Feature 16: Procedure according to feature 15
whereby at least the first heating device (hk1) and the second heating device (hk2) are thermally insulated from each other. Thermally insulated means that the temperature of the first heating device (hk1) preferably influences the temperature of the second heating device (hk2) so little that this is of secondary importance for the work result.

Feature 17: Method according to one or more of features 2 to 16 and according to feature 6 or according to feature 1.
wherein the functional fiber (ff) as defined herein may be one or more of the following fibers, or wherein the functional fiber (ff) may comprise one or more of the following fibers anchor materials:
a fiber optic cable,
a carbon fiber,
an optical fiber.
a ceramic fiber,
a fiber comprising a metallic glass,
a wire, in particular comprising steel or copper or brass or silver or gold or platinum or tungsten or an alloy or comprising another metal,
a shape memory wire, in particular a nitiol wire,
a plastic wire,
a synthetic fiber,
a one wire strand,
a fabric tape,
a textile,
a natural fiber,
a radioactive or radiolabeled fiber or wire or strand,
a shape memory wire;
a tube or other linear fluidic device,
a flexible, in particular ribbon-shaped electrical circuit,
an RFID system,
a sensor element, in particular a strain gauge,
an optical waveguide comprising an optically active section, in particular comprising a quantum dot, in particular comprising a NV center, and/or in particular comprising a rare-earth duping, in particular comprising an erbium doping
an actuator, in particular a heating wire or a cooling element or a wire having a memory effect (shape memory wire) or a ferromagnetic wire,
a wire or strand or fiber having at least locally ferromagnetic properties, a ferromagnetic or magnetically marked functional fiber or wire.

Feature 18: Method (FIG. 38) according to one or more of features 2 to 17 and according to feature 6,
wherein, after the functional fiber (ff) is placed in the fused material in the fusing region (b) during step 9.5.1 or during step 6, the functional fiber (ff) has a non-zero curvature having a curvature axis in at least one region (coil).

Feature 19: Method according to one or more of features 1 to 18,
wherein the material of the layer (pw) comprises one or more of the following:
a plastic, in particular a thermoplastic,
a metal,
a ceramic and/or material that transforms into ceramic during a firing process,
aluminum,
a glass,
iron,
copper,
gold,
platinum,
titan,
vanadium,
neodymium,
steel and/or stainless steel,
a composite material,
a semiconductor,
a radioactive material,
an electrically conductive material,
an optically transparent material,
a colored material,
a ferromagnetic material and/or a ferromagnetic material component,
a material soluble in a solvent and/or a material component soluble in a solvent, wherein in particular the first material of the layer (pw) is not soluble in the solvent.

Feature 20: Method (FIG. 39) for modifying a three-dimensional device, in particular for the additive manufacturing of composite materials, comprising the steps of
Step I: Providing a workpiece (pw) from a first material and a surface (ofn);
Step II: Transporting a heating device (hk) to the surface (ofn);
Step III: Heating of the first material of the workpiece (pw) on the surface (ofn) in the area of the heating device (hk) in a warm-up area (a, b)
by electromagnetic radiation which the heating device (hk) emits or which the heating device transmits, and/or
by heat transfer by convection from the heating device (hk) to the surface (ofn) of the workpiece (pw) and/or
by direct mechanical contact between the heating device (hk) and the surface (ofn) of the workpiece (pw) and/or
by heat transfer by means of a heat conducting device, in particular a functional fiber, from the heating device (hk) to the surface (ofn) of the workpiece;
Step IV: Melting a portion of the first material in the warm-up area (a, b) in a melting region (b) within the wane-up area (a, b) as a result of the heating in step III to molten first material;
Step V: Displacing the heating device (hk) during the melting of part of the first material,
whereby this displacement occurs having a first velocity (v1) parallel to the contour of the surface (ofn) and
whereby, in particular, this displacement can be a change in the position and/or orientation of the heating device utilizing rotational and/or translational degrees of freedom, and
feeding a functional fiber (ff) during translational displacement and
inserting the functional fiber (ff) into the melted first material in the melting region (b) and
whereby, due to this displacement, at least part of the melted first material comprising the inserted functional fiber (ff) leaves the warm-up area (a, b) and enters a cooling region created by displacement, the solidificating region (c);

Step VI: Solidifying said molten first material in said solidificating region (c) to solidified first material in said cooling region formed by displacement, wherein solidification of said molten first material in said solidificating region (c) converts said solidificating region (c) to a solidificated region (d);

Step VII: Finishing the melting, in particular
by lowering the intensity of the electromagnetic radiation which the heating device (hk) emits or which the heating device transmits, and/or
by reducing the heat transfer by convection from the heating device (hk) to the surface (ofn) of the workpiece (pw) and/or
by terminating the direct mechanical contact between the heating device (hk) and the surface (ofn) of the workpiece (pw) and/or
by terminating or reducing the heat transport by means of a heat conducting device, in particular a functional fiber, from the heating device (hk) to the surface (ofn) of the workpiece,
which in each case converts the melting region (b) into a cooling region, the solidificating region (c);

Step VIII: Solidifying the molten first material to solidified first material in the cooling region, which converts it to a solidificated region (d).

Feature 21. Method (FIG. 40) according to feature 20 comprising the step of
Step V.I: Forwarding the functional fiber (In in time parallel to step V at a second speed (v2) substantially equal to the first speed (v1), while step V.

Feature 22: Method according to one or more of features 20 to 21
wherein the heating device (hk) brings the functional fiber (ff) to a third process temperature ($\vartheta_4$).

Feature 23: Procedure according to feature 22
wherein the method uses the functional fiber (ff) as a thermal conduction device, and
wherein in particular the thermal energy transported by the functional fiber (ff) generates a melting region (b) on the surface (of) of the workpiece (wst).

Feature 24: Method (FIG. 41) according to one or more of features 20 to 23 comprising the step:
Step VII: severing, in particular mechanical severing, of the functional fiber (ff) in such a way that a part of the functional fiber (ff) inserted into the molten first material in step V, in particular a functional fiber section of the functional fiber (ff), remains in the solidified first material.

Feature 25: Method for producing a three-dimensional device, in particular for additive manufacturing,
characterized in that,
that the method at least temporarily uses a method according to one or more of the features 20 to 24 at least as a sub-method, and that the method uses at least one further method for producing three-dimensional items, in particular for additive manufacturing, at least as a sub-method in order to produce parts of the workpiece (pw) as a three-dimensional device, and wherein said further method is not a method according to one or more of features 20 to 24.

Feature 26: Procedure according to feature 25
wherein the further process is a process of selective laser sintering and/or
wherein the further process is a process of extruder-based additive manufacturing.

Feature 27 Method according to one or more of features 1 to 26,
wherein the functional fiber (ff) comprises one or more of the following materials, hereinafter referred to as the second material:
a modification of the carbon and/or
a glass made of an electrical insulator or a metal or a silicon compound or another semiconductor or a semimetal and/or
a polycrystalline modification of an electrical insulator or a metal or a silicon compound or another semiconductor or a semimetal and/or
a metal, in particular iron and/or copper and/or brass and/or bronze and/or silver and/or gold and/or platinum and/or tungsten and/or titanium and/or niobium and/or rare earths and/or uranium and/or plutonium and/or thorium and/or germanium and/or silicon and/or palladium and/or indium and/or an alloy or another metal and/or a semimetal and/or
a plastic and/or
a thermoplastic and/or
a thermoset and/or
a fibrous or textile and/or woven second material and/or
a ferromagnetic and/or permanent magnetic second material and/or
a ceramic second material and/or a precursor material that a firing can convert into a ceramic material, and/or
a radioactive second material.

Feature 28: Method according to one or more of features 1 to 27,
wherein the functional fiber t in comprises one or more of the following fiber types:
a crystal fiber, especially asbestos,
a ceramic fiber,
a carbon fiber,
an optical fiber, in particular an optical waveguide,
a fiber of metallic glass,
a wire,
a shape memory wire, in particular a nitiol wire,
a synthetic and/or natural fiber,
a one wire strand,
a fabric and/or fabric tape,
a tube or other fluidic device, in particular linear,
a flexible, in particular ribbon-shaped, electrical circuit,
an RFID system,
a sensor element, in particular a strain gauge or an optical waveguide comprising an optically active section, in particular comprising a quantum dot and/or in particular comprising a NV center and/or in particular comprising another paramagnetic impurity center and/or in particular comprising a rare-earth doping, in particular comprising an erbium doping,
an actuator, in particular a heating wire or a cooling element or a wire having a memory effect (shape memory wire) or a ferromagnetic wire,
a wire or strand or fiber or fabric having at least locally ferromagnetic and/or permanent magnetic properties,
a flexible circuit comprising electronic components, in particular in the form of a narrow ribbon-shaped flexible circuit.
wherein the bending radius and the height and width of the functional fiber (ff) are small enough for transport through the channel (kn) of a functional fiber insertion device (ft), and
wherein the functional fiber (ff) may be suitable for insertion into the melt of a melting region (b) or other restriction of the degrees of freedom of the functional fiber (ff)—for example by bonding.

Feature 29: Method according to one or more of features 1 to 28,
wherein at least a part of the functional fiber (ff) after insertion constitutes an electrical component, in particular an electromagnetically active device, in particular a coil and/or antenna.

Feature 30. Method according to one or more of claims 1 to 29.
wherein the functional fiber (ff) or at least the portion of the functional fiber (ff) to be inserted has a melting or decomposition or damage temperature that is above the second process temperature ($\vartheta_2$).

Feature 31: Method according to one or more of features 20 to 30
wherein the material of the workpiece (wst), in particular a powder layer (pw), and/or the layer (pw) comprises one or more of the following:
plastics, especially thermoplastics,
metal,
aluminum,
a glass,
iron,
a composite material,
a semiconductor material,
a ferromagnetic material and/or a ferromagnetic material component,
a solvent soluble material and/or a solvent soluble material component.

Feature 32: Heating device (dhk) (FIG. 19) for additive manufacturing device,
wherein the heating device (dhk) is transparent to electromagnetic heating radiation, in particular the heating radiation of a laser beam (LLB1, LB2) and/or
wherein the heating device (dhk) is transparent to optical heating radiation, in particular the heating radiation of a laser beam (LLB1, LB2) and/or
wherein the heating device (dhk) is transparent to electromagnetic heating radiation, in particular the heating radiation of a microwave transmitter.

Feature 33: Heating device (dhk) (FIG. 16) for an additive manufacturing device.
wherein a temperature sensor (Is) is integrated into the material of the heating device (dhk) and
wherein the temperature sensor may comprise one or more doped structures within a material of the heating device, and/or
wherein the temperature sensor may comprise one or more electrically conductive structures within an electrically insulating material of the heating device.

Feature 34: Heating device (dhk) (FIGS. 16-18) for additive manufacturing device,
  wherein an actuator, in particular a heating element (hz2), is integrated into the material of the heating device (dhk).

Feature 35: Heating device (dhk) (FIGS. 17-18) for an additive manufacturing device, in particular according to Feature 32 and/or 33 and/or 34.
  wherein the material of the heating device (dhk) includes diamond.

Feature 36: Heating device (dhk) (FIGS. 16-18) for additive manufacturing device.
  wherein the heating device (dhk) has a continuous channel (kn), and
  wherein said heating device (dhk) comprises a third material enclosing said channel (kn) along a hollow cylinder of said channel (kn) and
  wherein the heating device (hk) has two opposite openings (o1, o2) in its third material forming the beginning and the end of the channel (kn), and
  wherein a second material, in particular in the form of a functional fiber (ff), can then be introduced into this channel (kn) through the first opening (o1) in the first material and removed from the channel (kilt via the second opening (o2) in the third material, and
  wherein the third material is at least partially electrically insulating at operating temperature, and
  wherein the third material is thermally conductive and
  wherein the third material is electrically conductive at operating temperature locally in first regions of the third material by local modification or is locally converted in first regions of the third material to a third electrically conductive material by local modification and
  wherein the second material is deposited on or in the workpiece (wst), in particular on or in a powder layer (pw).

Feature 37: Heating device (FIGS. 16-18) according to feature 36
  wherein at least one of these first areas is used as a second heating element 1hz2).

Feature 38: leafing device (FIG. 17) according to feature 36 and/or 37 wherein at least one of these first areas is used as a temperature sensor its).

Feature 39: Heating device (FIGS. 17-18) according to one or more of Features 36 to 38.
  wherein at least one step of the modification is an ion implantation of atoms and/or molecules into the third material in the first regions.

Feature 40: Heating device (FIGS. 17-18) according to one or more of Features 36 to 39.
  wherein the third material is or comprises diamond.

Feature 41: Heating device (FIGS. 17-18) according to one or more of Features 36 to 40.
  wherein the third material comprises graphite and/or wholly or partially amorphized carbon.

Feature 42: Heating device (FIGS. 17-18) according to one or more of Features 36 to 41.
  wherein the third material comprises an electrically doped, in particular p-doped, third material.

Feature 43: Apparatus characterized
  in that it comprises means (hk1, hk2, wv) for carrying out one or more of the processes according to one or more of features 1 to 31.

Feature 44: Device (FIG. 25) tier manufacturing a three-dimensional device, in particular tier additive manufacturing.
  comprising a heating device (hk), in particular according to one or more of the features 32 to 42, and
  comprising one channel (kn) and,
  comprising a functional fiber feeding device (ar, pr) and
  comprising a workpiece (wst), which can in particular be a powder layer (pw).
  wherein the workpiece (wst) has a surface (ofn) and
  wherein the heating device (hk) comprises the channel (kn) and
  wherein said heating device (hk) being provided and adapted to melt locally to a melting region (b) the solid material of the workpiece, which may in particular be the material of a solidified and/or non-consolidated powder layer (pw),
    by infrared radiation of the heating device (hk) and/or
    by electromagnetic radiation, which can be transmitted in particular through the heating device (hk), and/or
    by heat transfer by convection from the heating device (hk) to the surface (ofn) of the workpiece (wst) and/or
    by direct mechanical contact between the heating device (hk) and the surface (ofn) of the workpiece (wst) and/or
    by heat transfer by means of a heat conducting device, in particular by means of a functional fiber (ff), from the heating device (hk) to the new surface (ofn), and
  wherein the functional fiber feed device in cooperation with the channel (kn) and the heating device (hk) is suitable and provided for introducing a functional fiber (ff) through the channel (kn) into the melting region (b).

Feature 45: Device (FIGS. 25 and 29) according to feature 44
  wherein the heating device (hk) is attached to a positioning device (SP, B, M).
  wherein the positioning device (SP, B, M) allowing the translatory positioning of the heating device (hk) with at least one degree of freedom, in particular along a linear or curved line, according to an absolute or relative translators position which can be predetermined by a computer or control system, and/or
  wherein the positioning device (SP, B, M) permits the rotational positioning of the heating device (hk) with at least one degree of freedom, in particular a rotation about an axis of the heating device (hk), according to an absolute or relative rotational position which can be preset by a computer or control system.

Feature 46: Device (FIG. 29) according to feature 45.
  wherein the device has more than two, in particular three and/or four and/or and/or five and/or six or more than six, controllable axes (a1-a6, AC).

Feature 47: Device according to one or more of features 43 to 44
  comprising a heat spreader (wv) and
  wherein the heat spreader (wv) is provided and adapted to have a layer (pw) of a first material applied thereto, and
  wherein said layer (pw) at least partially represents the workpiece (wst) and/or the workpiece (wst) and/or an object comprising a portion of a workpiece (wst) or a workpiece (wst) yet to be formed.

Feature 48: Device according to one or more of features 43 to 47
  wherein the workpiece (wst) is attached to a possibly further positioning device.
  wherein the optionally further positioning device permits the translatory positioning of the workpiece (wst) with at least one degree of freedom, in particular along a linear or curved line, corresponding to an absolute or relative translatory position which can be predetermined by a computer or control system and/or wherein the optionally further positioning device permits the rotational positioning of the workpiece (wst) with at least one degree of freedom, in particular a rotation about an axis of the workpiece (wst), according to an absolute or relative rotational position which can be preset by a computer or control system.

Feature 49: Workpiece characterized in that, it has been manufactured by means of a process according to one or more of the features 1 to 31, and/or, in that a device manufactured using a device according to one or more of features 32 to 48.

Feature 50: Material characterized in that.

it has been manufactured by means of a process according to one or more of the features 1 to 31, and/or, in that it was manufactured using a device according to one or more of features 32 to 48.

Feature 51: Apparatus for three-dimensional printing by means of selective sintering and/or melting comprising a first group of subdevices for performing a selective laser sintering process, and comprising a second group of subdevices for performing a thermal transfer sintering process (English: selective heat sintering process (SLS)) and/or a selective heat melting process, characterized by a sub-device for inserting functional fibers (ff), in particular a functional fiber insertion device (ft), during a sintering or melting process.

Feature 52. Device according to feature 51 comprising a process chamber (pk) and comprising a sub-device for inserting functional bevels (ff), in particular a functional fiber insertion device (ft), and comprising a positioning device for this sub-device, in particular the functional fiber insertion device (ft), for inserting functional bevels (ff), comprising a functional fiber feeding device (ar, pr), which is part of the subdevice, in particular the functional fiber insertion device (ft), for inserting functional bevels (ff), wherein the process chamber (pk) can be tempered to a process chamber temperature ($\vartheta_1$).

wherein the functional fiber feeding device (ar, pr) accomplishes the transport of the functional fiber (ff) during the insertion of the functional fiber (ff), wherein the positioning device positions the subdevice, in particular the functional fiber insertion device (ff), for inserting functional bevels (M within the process chamber (pk), and wherein, in particular, the motor or motors of the positioning device are preferably placed outside the process chamber (pk), and wherein, in particular, the motor or motors of the functional fiber feeding device (ar, pr) are preferably placed outside the process chamber (pk), and wherein the device comprises mechanical means, in particular shafts and/or spline shafts (kw1, kw2, kw3), for transporting mechanical energy from the motor or motors (M) of the positioning device to the teed device (SP) of the positioning device, and wherein the device comprises mechanical means, in particular shafts and/or spline shafts shafts (kw1, kw2, kw3), for transporting mechanical energy from the motor or motors (VSM) of the functional fiber feeding device (ar, pr) to the functional fiber feeding device (ar, pr).

Feature 53: De ice according to feature 52 wherein the feed device (SP) of the positioning device is mechanically coupled to the motor or motors IM) of the positioning device by means of a second cone gear wheel (kz2) and a fourth cone gear wheel (kz4) and a second splined shaft (kw2).

Feature 54: Device according to feature 32 and/or feature 53 wherein the functional fiber feeding device (ar, pr) is mechanically coupled by means of a first spline shaft (kw1) and a first cone gear wheel (kz1) and a third cone gear wheel (kz3) and a third spline shall (kw3) and to the motor or motors (VSW) of the functional fiber feeding device (ar, pr).

Feature 35: Functional fiber (ff) for insertion into the material of a workpiece by means of a process according to one or more of the features 1 to 31 and/or for use with a device according to one of more of the features 32 to 36 and/or for use in a device according to one or more of the features 37 to 48 and/or for use in a device according to one or more of the features 51 to 54.

Figure 44:
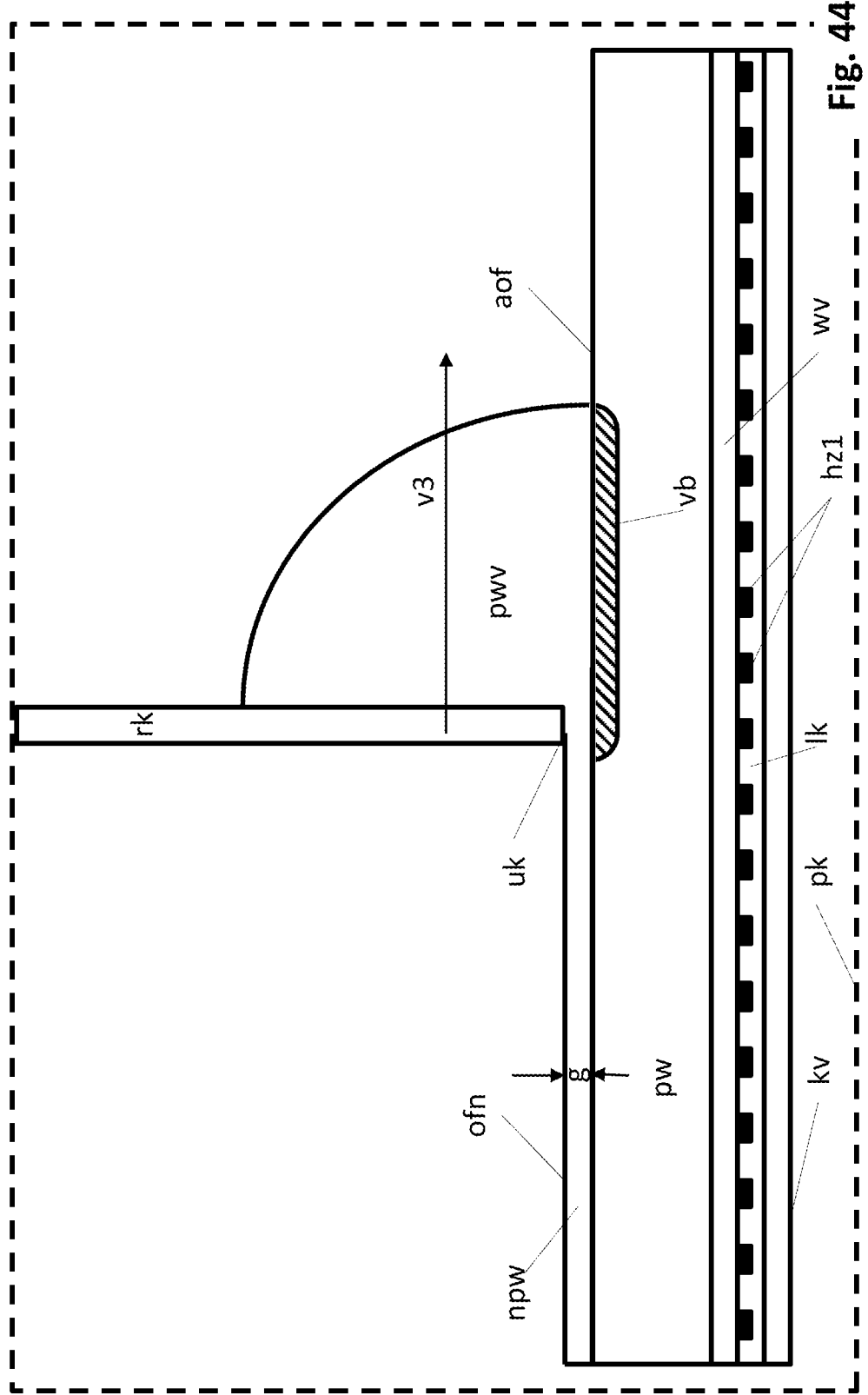
FIG. 44 illustrates a second step in the example process of embedding a thick functional fiber comprising applying a new power layer through a squeegee device.
Figure 45:
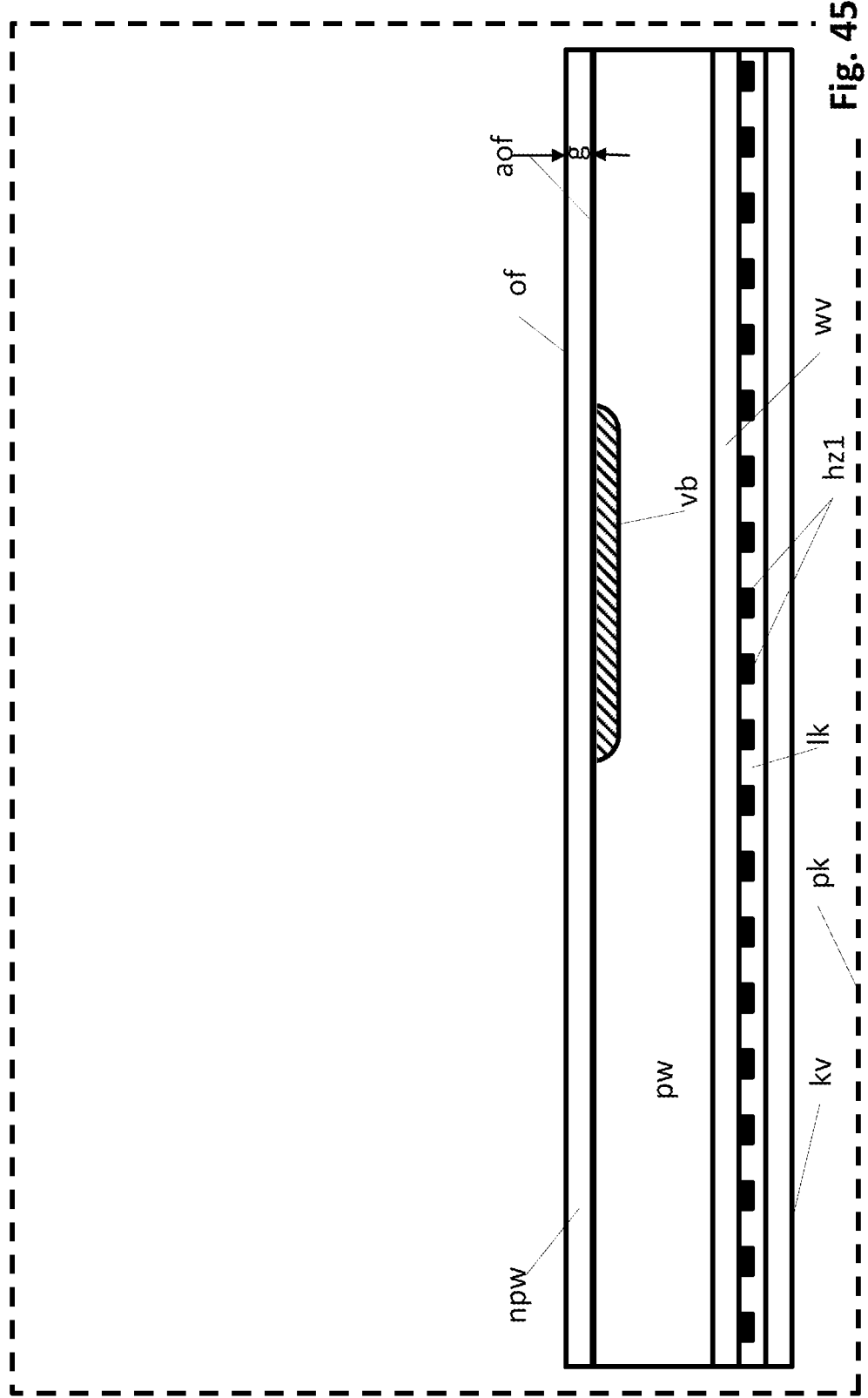
FIG. 45 corresponds to a condition of the workpiece after the second step of FIG. 44.
Figure 46:
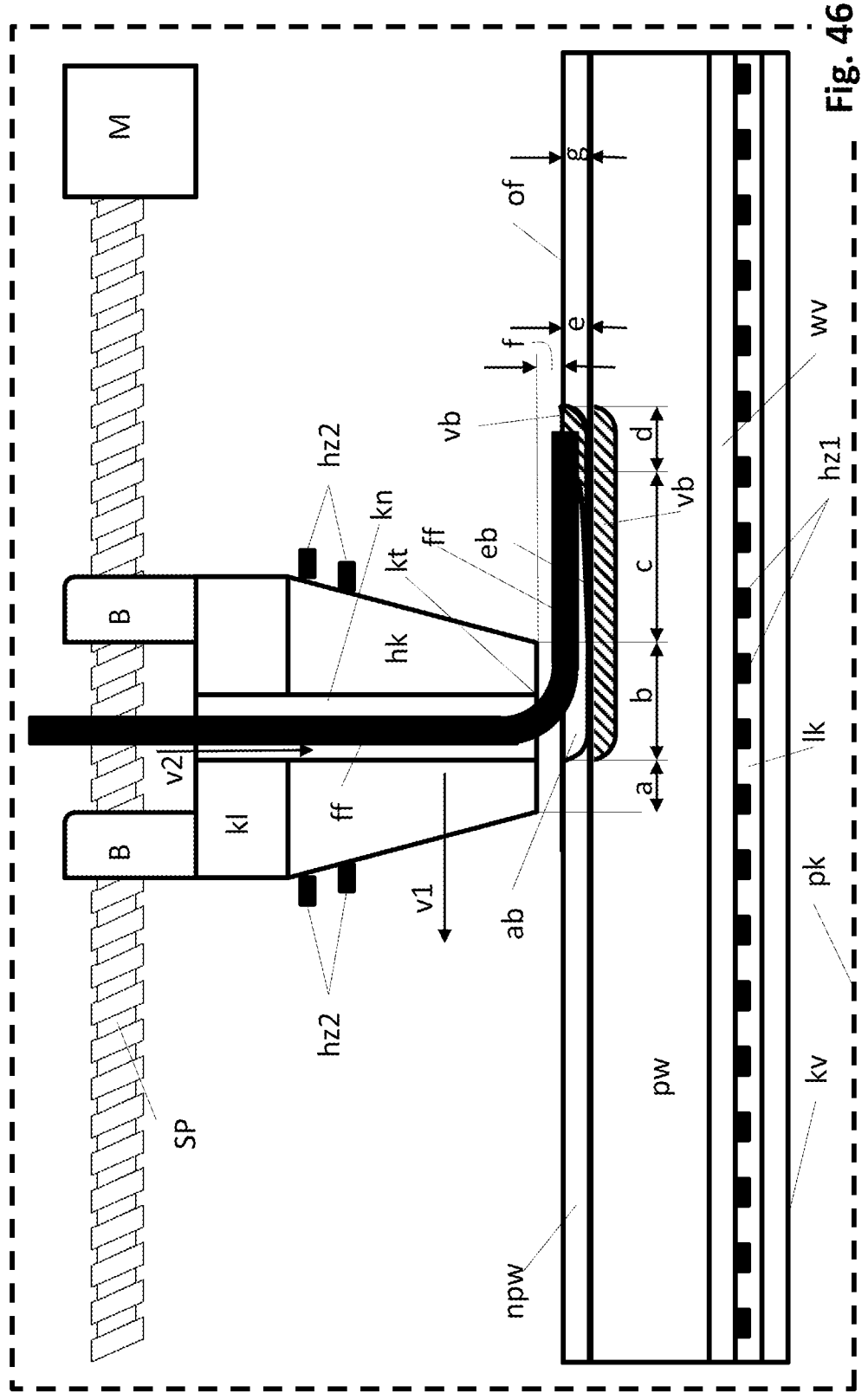
FIG. 46 illustrates an example third step in an example process of embedding a thick functional fiber comprising inserting the thick functional fiber into a melting region.
Figure 47:
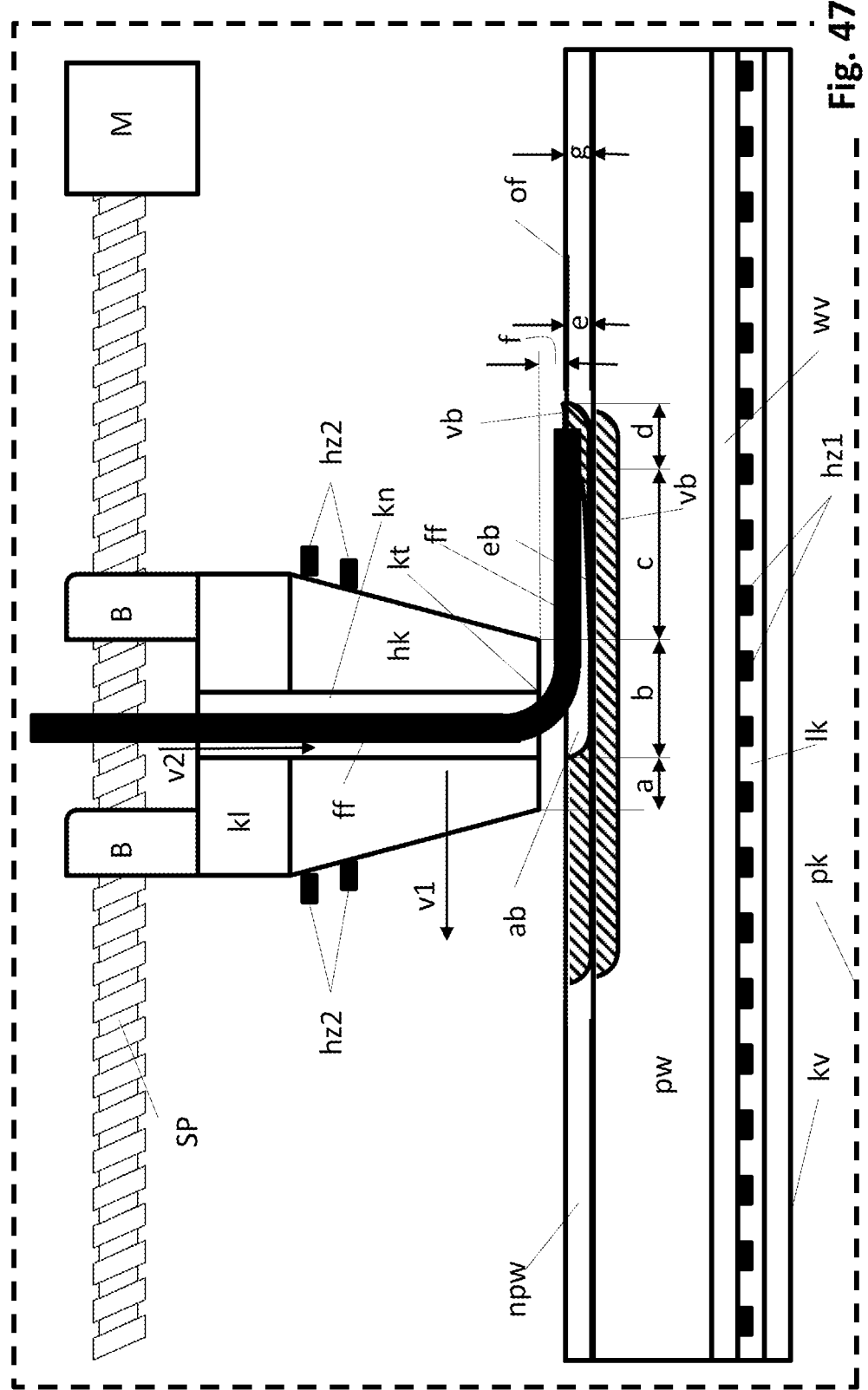
FIG. 47 corresponds to FIG. 14 and illustrates inserting the thick function fiber into a previously molten and then re-solidified area.

Feature 56: Method (FIG. 53) for embedding a functional fiber (in in a workpiece (wst)

wherein the workpiece (wst) has a surface (of) and wherein the material on the surface (of) of the workpiece (wst) may include unconsolidated and consolidated areas, comprising the steps Selective melting and solidifying the material of the workpiece (wst) on the surface (of) of the workpiece, in particular by means of one or more lasers (FIG. 43) and/or by means of one or more heating elements (hk) (FIG. 42);

Applicating a first layer (npw) to the surface (of) of the workpiece (wst) (FIGS. 44, 45);

Selective melting and solidifying the first layer (FIGS. 46, 47) comprising at least partial insertion of at least one functional fiber section of a functional fiber (ff) into the melt during melting (FIGS. 46, 47);

Applicating a second layer (npw) to the surface (of) of the workpiece (wst) (FIG. 49);

Selectively melting and solidifying the second layer (FIGS. 50, 51, 52) in the region of the inserted functional fiber section of the functional fiber (ff), so that the solidified region of the material of the first layer and the solidified material of the second layer, in particular in the form of one or more solidificated regions (d), at least partially enclose this functional fiber section of the functional fiber (ff).

Feature 57: Method (FIG. 54) of embedding a functional fiber (ff) in a workpiece.

wherein the workpiece (wst) has a surface (of) and wherein the material on the surface (of) of the workpiece (wst) may include unconsolidated and consolidated areas, comprising the steps Selective melting and solidifying the material of the workpiece (wst) at the surface (of) of the workpiece (FIG. 43, 42);

Selective inciting and solidifying of the material of the workpiece (wst) at the surface (of) of the workpiece (wst) (FIGS. 46, 47) comprising at least partial insertion of at least one functional fiber section of a functional fiber (ff) into the melt during the melting;

Applying of a first layer (npw) to the surface (of) of the workpiece (wst) (FIG. 49);

Selectively melting and solidifying the first layer (FIGS. 50, 51) in the region of the inserted functional fiber portion of the functional fiber Oil so that the solidified region, the solidificated region (d), of the material oldie first layer and the solidified material attic workpiece (wst) at the surface (of) of the workpiece (wst) at least partially enclose the functional fiber portion of this functional fiber (ff).

Feature 58: Method of embedding a functional fiber (ff) in a workpiece (wst), wherein the workpiece (wst) has a surface (of) and wherein the material on the surface (of) of the workpiece (wst) may include unconsolidated and consolidated areas, comprising the steps Selectively melting and solidifying the material of the workpiece (wst) on the surface (of) of the workpiece (wst) (FIGS. 50, 51) comprising at least partial insertion of at least one functional fiber portion of a functional fiber (ff) into the melt during the melting, so that the solidified region, the solidificated region (d), of the solidified material of the workpiece (wst) on the surface (of) of the workpiece (wst) at least partially encloses this functional fiber portion of the functional fiber (ff).

Feature 59: Method for selective sintering, in particular for selective laser sintering, comprising the steps of Interrupting the selective sintering process;

Providing a functional fiber;

Positioning the functional fiber (ff) relative to the workpiece (wst);

Limiting the degrees of freedom of the functional fiber (ff);

Optional separating the functional fiber (ff);

Continuing the selective sintering process.

Feature 60: Procedure according to feature 59 wherein restricting the degrees of freedom of the functional fiber (ff) comprises the steps of the at least local melting of the surface (of) of the workpiece (wst) to a melt and of inserting the functional fiber (ff) into the melt and of limiting the degrees of freedom of the functional fiber (ff) by solidifying the melt.

Feature 61: Process according to feature 59 and/or 60 wherein restricting the degrees of freedom of the functional fiber (ff) comprises the step of attaching the functional fiber (ff) to or in the surface (of) of the workpiece (wst).

Feature 62: Procedure according to feature 61 wherein the fastening takes place by adhesion, in particular using an adhesive, and/or by welding and/or by soldering, in particular comprising formation of a eutectic, and/or by melting, in particular according to one or more of the processes according to one or more of the features 1 to 31 and/or according to one or more of the processes according to one or more of the features 56 to 58 and/or by mechanical fastening, in particular stapling and/or nailing and/or screwing and/or riveting.

Feature 63: Method of additive manufacturing of a workpiece (wst) comprising the steps of.

Step α: Interrupting a basic additive manufacturing process:

Step β: Inserting a functional fiber (ff) comprising substeps β.1 to β.3 and optionally step β.4:

Step β.1: Providing a functional fiber (ff):

Step β.2: Positioning and/or depositing and/or laying down the functional fiber (ff) relative to the workpiece (wst):

Step β.3: Restricting the degrees of freedom of the functional fiber (ff),

1.—wherein this restriction can occur simultaneously with the step β.2 of positioning and/or depositing and/or laying down the functional fiber (ff) relative to the workpiece (wst):

Step β.4: Optional separating the functional fiber optional steps γ.1 to γ.n with n as a whole positive number: per step of the steps γ.1 to γ.n optional repetition of the steps β.1 to β.4 for each further functional fiber (ff) to be inserted of possibly further n functional fibers (ff) to be inserted:

Step δ: Continuing the basic additive manufacturing process,

Feature 64: Procedure according to feature 63 wherein the method for performing the step "step β.3", i.e., the method for limiting the degrees of freedom of the functional fiber (ff), is different from the basic additive manufacturing method;

Feature 65: Method according to feature 63 and/or 64 wherein the basic procedure is one of VDI 3405 and/or DIN EN ISO/ASTM 52900:2018 and/or wherein the basic additive manufacturing process is a fused deposition modeling (FDM) process or wherein the basic additive manufacturing process is a process of selective sintering and/or selective melting, or wherein the basic additive manufacturing process comprises or is any of the following:

Stereolithography (SL),

Selective laser sintering (LS),

Selective laser beam melting (SLM=Selective Laser Melting, also: Laser leant Melting=LBM), Selective electron, ion or particle beam melting (Electron Beam Melting=EBM), Fused Layer Modeling/Manufacturing (FLM or also Fused Filament Fabrication (FFF)), Multi-Jet Modeling (MJM), Poly-Jet Modeling (PJM), 3D printing (3DP, also known as binder jetting), Layer Laminated Manufacturing (LLM), Digital Light Processing (DLP), Thermal Transfer Sintering (TTS), Metal Laminated Tooling (MELATO), Continuous Liquid Interface Production (CLIP), Selective Heat Sintering (SHS), Laser Metal Deposition (LMD), Wax Deposition Modeling (WDM), Contour Crafting, Cold gas spraying or metal powder application (MPA) process, Lithography-based Ceramic Manufacturing (LCM), 3D screen printing, 3D Inkjet Printing, 3D inkjet printing of optical elements, Light-guided electrophoretic deposition, Shaping-Debinding-Sintering (SDS), Bound Metal Deposition (BMD), Process for the production of metallic or ceramic green bodies by means of fused deposition modeling: fused layer modeling or material extrusion, Two-photon lithography,
Arburg Plastics Free Molds,
Screw Extrusion Additive Manufacturing (SEAM).

Feature 66: Method according to one or more of the features 63 to 65
wherein restricting the degrees of freedom of the functional fiber (ff) is performed using at least one of the following methods:
At least partial melting of a surface (of, ofn) of the workpiece (wst) or of a layer (pw, pwn) in a melting region (b) and inserting least a part of the functional fiber (ff), in particular of a functional fiber section, into the melt of the melting region (b) and solidifying the melt of the melting region (b) in a solidificating region (c) to form a solidificated region (d) of the surface (of) of the workpiece (wst) and/or
Fixing the functional fiber (FF), or the functional fiber section, to a surface (of) of the workpiece (wst) by means of a fastener, in particular by means of an adhesive, and/or
Clamping and/or insertion of the functional fiber (ff) or the functional fiber section on or in a clamping or holding structure on the surface of the workpiece (wst), in particular in a groove of the workpiece, where the clamping or holding structure may exist only temporarily during the additive manufacturing process, and/or
Fastening the functional fiber (In to or in the surface tot) of the workpiece (wst), wherein in particular the fastening can be effected by bonding, in particular using an adhesive, and/or welding and/or soldering, in particular comprising formation of a eutectic, and/or can be effected by melting, and/or
Stapling or nailing the functional fiber (ff) or the functional fiber section to the surface tot) of the workpiece (ff) and/or to or in a clamping or retaining structure on the surface (of) of the workpiece (wst), in particular in a groove of the workpiece, it being possible for the clamping or retaining structure to exist only temporarily during the additive manufacturing process, by means of a fastening aid, in particular a staple or a nail or a clamp, and/or
knotting the functional fiber (ff), or the functional fiber section, with a fiber holding structure, for example a hook or a post, on the surface of the workpiece (wst), where the fiber holding structure may exist only temporarily during the additive manufacturing process, and/or
sewing the functional fiber (ff), or the functional fiber section, to a part of the workpiece, using the functional fiber (ff) as a sewing thread, and/or
sewing the functional fiber (ff) to a part of the workpiece,
wherein the functional fiber (ff) is used as a sewing thread and as an upper thread together with another fiber as a lower thread, and/or wherein the functional fiber (ff) is used as a sewing thread and as a bobbin thread together with a further fiber as an upper thread, and wherein the further fiber can also be a functional fiber (ff).

Feature 67: Method of manufacturing a three-dimensional device comprising functional fibers (FF) according to one or more of features 63 to 66, comprising the steps:
Executing of step β.1.a during or temporally before step β.1: heating of the heating device (hk) to a process temperature ($\vartheta_2$), wherein the heating device (hk) can consist of several heating sub-devices (hk1, hk2), which can then also have different process temperatures ($\vartheta_{2a}$, $\vartheta_{2b}$);
Carrying out step β.3.a during step β.3: heating the first material of the surface (of) of the material in the area of the heating device (hk) in a warm-up area (a, b)
by infrared radiation of the heating device (hk) and/or
by electromagnetic radiation emitted by the heating device (hk) or one or more of the heating sub-devices (hk1, hk2) or transmitted by the heating device or the one heating sub-device or the several heating sub-devices (hk1, hk2).
I. wherein the electromagnetic radiation may be laser radiation and/or
II. wherein the electromagnetic radiation may be microwave radiation and/or
III. wherein the electromagnetic radiation may be THz radiation and/or
IV. wherein the electromagnetic radiation may be infrared radiation and/or
V. wherein the electromagnetic radiation may be optically visible light, and/or
by heat transfer by convection from the heating device (hk) to the surface (of) and/or
by direct mechanical contact between heating device (hk) and surface (of) and/or
by heat transport by means of a heat conducting device, in particular by heat transport by means of a functional fiber, from the heating device (hk) to the surface (of), and
Changing the position of the heating device (hk) along the surface (of) at a first distance (f) from surface (of) having a first velocity (v1);
Performing step β.3.b during step β.3 and during and/or timed after step β.3.a: melting a portion of the first material in the warm-up area (a, b) as step β.3.b to a inciting region (b) within the warm-up area (a, b) as a result of the heating in step β.3.a to molten material;
Performing step β.2.a during step β.3 and during and/or temporally after step β.3.a and during and/or temporally after step β.3.b: inserting a functional fiber portion of a functional fiber (ff) as step β.2.a into the melting region (b);
Executing step β.3.c during step β.3 and executing step β.3.c during β.3.a and/or executing step β.3.c temporally after step β.3.a and executing step β.3.c during after step β.3.b and/or executing step β.3.c temporally after step β.3.b and executing step β.3.c during step β.2.a and/or executing step β.3.c temporally after step β.3.a: Terminating the melting as step β.3.c by reducing the energy transfer from the heating device (hk) to the surface (of) and by lowering the temperature of the melting region (b) as a result, whereby the melting region (b) becomes a solidificating region (c);
Carrying out step β.2.b anti step β.3.d during step β.3 and during and/or temporally after step β.3.a and during and/or temporally after step β.3.b and during and/or temporally after step β.3.c and/or temporally after step β.2.a: solidifying the molten material as step β.3.d to solidified material in the solidificating region (c) which thereby becomes a solidificated region (d) in which the respective functional fiber portion of the functional fiber (ff) is inserted as step β.2.b is completely or partially inserted.

Feature 68: Composite material characterized.
in that the composite material comprises at least a first layer of a first material, and in that the composite material comprises at least a second layer of the first material, and in that the first layer has a layer boundary with respect to the second layer at which the first layer and the second layer are in direct contact, and in that the composite material has a solidificated region (d), and in that the consolidation region comprises at least the first layer and the second layer, and in that the consolidation region has no layer boundary between the first layer and the second layer, and in that a functional fiber (ff) is inserted into the bonding area.

Feature 69: Workpiece (wst) characterized.

in that it comprises a composite material according to feature 68.

Feature 70: Device for three-dimensional printing comprising first means to perform a basic layer-by-layer additive manufacturing process: and comprising second means of sub-devices tux carrying out a selective heat sintering process or a selective heat melting process, characterized in that it comprises third means for inserting functional chamfers (ff) during the sintering or inciting process by means of the second group of sub-devices, wherein the third means may comprise the second means or may be the second means, and said first means being at least partially different from said second means, and the first means being at least partially different from the third means.

Feature 71: Device according to feature 70, characterized, that the basic additive manufacturing process is a fused deposition modeling (FDM) process, wherein the first means are means for performing a fused deposition modeling (FDM) process, and which means may comprise, for example, an extruder for extruding a filament, or in that the basic additive manufacturing process is one of selective sintering and/or selective melting, wherein the first means are means for carrying out a process of selective sintering and/or selective melting, and which means may comprise, for example, a selective laser sintering (SLS) device, or in that the basic additive manufacturing process comprises or is any of the following:

Stereolithography (SL),
Selective laser sintering (LS),
Selective laser beam melting (SLM=Selective Laser Melting, also: Laser Beam Melting=LBM),
Selective electron-kin or particle beam melting (Electron Beam Melting=EBM),
Fused Layer Modeling Manufacturing (FLM or also Fused Filament Fabrication (FFF)),
Multi-Jet Modeling (MJM),
Poly-Jet Modeling (PJM),
3D printing (3DP, also known as binder jetting),
Layer Laminated Manufacturing (LLM),
Digital Light Processing (DLP),
Thermal Transfer Sintering (TTS),
Metal Laminated Tooling (MELATO),
Continuous Liquid Interface Production (CLIP),
Selective Heat Sintering (SHS),
Laser Metal Deposition (LAD),
Wax Deposition Modeling (WDM),
Contour Crafting,
Cold gas spraying or metal powder application (MPA) process,
Lithography-based Ceramic Manufacturing (LCM),
3D screen printing,
3D Inkjet Printing,
3D inkjet printing of optical elements,
Light-guided electrophoretic deposition,
Shaping-Debinding-Sintering (SDS),
Bound Metal Deposition (BMD),
Process for the production of metallic or ceramic green bodies by means of fused deposition modeling/fused layer modeling or material extrusion,
Two-photon lithography,
Arburg Plastics Free Molds,
Screw Extrusion Additive Manufacturing (SEAM),
wherein the first means then comprises means for performing the basic additive manufacturing process of the relevant basic process listed previously.

Feature 72: Device for three-dimensional printing by means of selective sintering and/or melting comprising a first group of subdevices for performing a selective laser sintering process and/or a selective laser melting process, and comprising a second group of subdevices for performing a selective heat sintering process or a selective heat melting process, characterized in that it comprises a sub-device, in particular a functional fiber insertion device (ft), for inserting functional fibers (ff) during a sintering or melting process.

Feature 73: Functional fiber insertion device (ft) (Fiber-Tool)

comprising one channel (kn) and comprising a functional fiber feed device, in particular comprising a drive roller (ar) and in particular comprising a pressure roller (pr), and/or in particular for the transport of a functional fiber (ff), and comprising a heating device (hk) and comprising heating element (hz) and comprising a cutting and severing device (av) and comprising a temperature sensor (ts), wherein the heating device (hk) can be heated by the heating element (hz), and wherein the temperature sensor (ts) is thermally coupled to the heating device (hk), characterized in that the heating device (hk) is suitable and intended to melt material of a surface (of) of a workpiece (wst) in a process of additive manufacturing temporally alter the deposition of this material of the workpiece (wst) and in time after formation of tins surface (of) as a solid surface in that the functional fiber insertion device (ft) (fiber tool) can feed a functional fiber (ff) via the channel (kn) by means of a functional fiber feeding device (ar, pr) to an insertion point (ep) on the surface (of), and in that the functional fiber insertion device (ft) (fiber tool) can insert the functional fiber (ff) into the melt of the material of the surface (of) in a melting region (b) by means of the functional fiber feeding device (ar, pr) and the channel (kn) at the insertion point (ep), and in that the functional fiber insertion device (ft) (fiber tool) can, if necessary, cut the functional fiber (ff) by means of the cutting and severing device (av).

Feature 74: functional fiber insertion device (ft) (fiber tool) according to feature 73, characterized
in that the functional fiber insertion device (ft) (fiber tech comprises a clamping device (vp), and
in that the clamping device (vp) is adapted to mechanically couple the functional fiber insertion device (ft) (fiber tool) to a tool carrier (wzt) and/or to mechanically decouple the functional fiber insertion device (ft) (fiber tool) from the tool carrier (wzt) again, and
in that the functional fiber insertion device (ft) (fiber tool) comprises a tool set-down device (wav), and
in that the tool set-down device (wav) is adapted to mechanically set down the functional fiber insertion device (ff) (fiber tool) to a first tool set-down point (pp1) having limited mobility, and
in that the tool set-down device (wav) is adapted to mechanically retrieve the functional fiber insertion device (ft) (fiber tool) at the first tool set-down point (pp1), and
wherein the tool carrier (wzt) can be positioned relative to the workpiece (wst), in particular with at least one degree of freedom, in particular by a control device, for example a computer or control system.

Feature 75: Additive manufacturing device
comprising a positioning device (SP, B, wv) and
comprising means to perform a basic additive manufacturing process, and
comprising a feed, in particular a hose, for feeding a functional fiber (ff) and
comprising a control system, in particular a computer and/or control system, and
comprising the functional fiber insertion device (ft) (fiber tool) according to feature 73 or 76 to perform a functional fiber insertion process that is different from the basic process.
wherein the positioning device (SP, B, wv) positions the functional fiber insertion device (ft) (fiber tool) relative to the surface (of) of a workpiece (wst) in response to signals from the controller, and
wherein the feeder feeds the functional fiber (ff) to the functional fiber insertion device (ft) (fiber tool), in particular from a functional fiber supply device and/or from a functional fiber spool.

Feature 76: Device according to feature 75
wherein the functional fiber insertion process comprises one or more of the following processes as a subprocess:
Stereolithography (SL),
Selective laser sintering (LS),
Selective laser beam melting (SLM=Selective Laser Melting, also: Laser Beam Melting=LBM),
Selective electron-ion or particle beam melting (Electron Beam Melting=EBM),
Fused Layer Modeling/Manufacturing (FLM or also Fused Filament Fabrication (FFF)),
Multi-Jet Modeling (MJM),
Pole-Jet Modeling (NM),
3D printing (3DP, also known as binder jetting),
Layer Laminated Manufacturing (LLM),
Digital Light Processing (DLP),
Thermal Transfer Sintering (TTS),
Metal Laminated Tooling (MELATO),
Continuous Liquid Interface Production (CLIP),
Selective Heat Sintering (SHS),
Laser Metal Deposition (LMD),
Wax Deposition Modeling (WDM),
Contour Crafting,
Cold gas spraying or metal powder application (MPA) process,
Lithography-based Ceramic Manufacturing (LCM),
3D screen printing,
3D Inkjet Printing,
3D inkjet printing of optical elements,
Light-guided electrophoretic deposition,
Shaping-Debinding-Sintering (SDS),
Bound Metal Deposition (BMD),
Process for the production of metallic or ceramic green bodies by means of fused deposition modeling, fused layer modeling or material extrusion,
Two-photon lithography,
Arburg Plastics Free Molds,
Screw Extrusion Additive Manufacturing (SEAM),
wherein the second means then comprises means for carrying out the relevant sub-process of the functional fiber introduction process according to the above list.

Feature 77: Functional fiber (ff) characterized,
in that it is intended for use in a method according to one or more features 63 to 67, and/or
in that it is a functional fiber an for use in a composite material according to feature 68 and/or
in that it is a functional fiber (ff) for use in a device according to one or more of features 70 to 76.

Feature 78: Functional fiber (ff),
wherein the functional fiber (ff) may be a functional fiber an according to feature 73, and
wherein the functional fiber (ff) comprises a sizing (SL) especially at its surface and
wherein the suing (SL) of the functional fiber (ff) during an insertion process of the functional fiber (ff) into a workpiece (wst) in an additive manufacturing process forms at least in some areas of this surface (of) a meniscus (mi) having a contact angle ($\chi$) to the material of the surface (of) of the workpiece (wst) where the contact angle ($\chi$) is smaller than 90° and/or
wherein the surface of the functional fiber (m is designed in such a way, in particular in a wetting way, that the melt of the material of a surface (of) of a workpiece (wst) during an insertion process of the functional fiber (ff) into this surface (of) of the workpiece (wst) forms a meniscus (mi) having a contact angle ($\chi$) to the material of the surface of the functional fiber (ff) at least in some areas of this surface of the functional fiber (ff) which is smaller than 90°.

Such processes for manufacturing a three-dimensional device, in particular for additive manufacturing, allow functional fibers in the form of functional fibers (ff) to be embedded in the workpiece or a surface during the performance of an additive manufacturing process. However, the advantages are not limited to this.

DESCRIPTION OF THE DRAWINGS

The figures show simplified examples of essential parts of the proposed devices and methods.
FIG. 1
FIG. 1 shows an exemplary, schematically simplified, basic structure of a proposed device. A heat spreader (wv) comprising its first surface (of) determines the working area of the proposed additive manufacturing system. The heat spreader (wv) is typically made of a material that conducts heat relatively well. The heat spreader (wv) and the heating device (hk) are shown as an exemplary sectional view. For example, steel and aluminum are well suited for this purpose. The heat spreader (wv) has a first surface (of), which is typically the working surface of the proposed additive manufacturing system. Further, the heat spreader (wv) has a second surface (of2), which is typically located opposite the first surface (of). The second surface (of2) is preferably electrically insulating. In the case of an aluminum plate as heat spreader (wv), for example, an anodization of the aluminum plate can achieve this electrical insulation. If the heat spreader (wv) is a steel plate, various galvanic coatings and/or paint finishes are possible. The second surface (of2) preferably has electrical leads of a first heating element (hx1), which can beat the heat spreader relative to the ambient temperature when electrically energized. In the FIG. 1 an optional first cooling device (kv) is drawn, which is used to cool down the heat spreader (wv) in order to be able to control it faster. The first cooling device (kv) can, for example, be a water cooling device. The first heating element (hz1) would then work against the first cooling device (kv), allowing a better defined and faster temperature setting. To detect the temperature of the heat spreader (wv), a temperature sensor is preferably provided, which detects the first actual temperature of the heat spreader (wv) as heal spreader temperature ($\vartheta_{wv}$). An undrawn, first controller then energizes the first heating element (hz1) with an electric heating current in the manner depending on the heat spreader temperature ($\vartheta_{wv}$) detected by means of the temperature sensor. The electrical heating current controlled by a controller then regulates the heat spreader (wv) to a first defined process temperature ($\vartheta_1$) in dependence on the heat spreader temperature ($\vartheta_{wv}$) detected by means of the temperature sensor. The first temperature deviations of the sensed heat spreader temperature ($\vartheta_{wv}$) as the first actual temperature compared to the first process temperature ($\vartheta_1$) are then limited to system noise and unavoidable control errors. Typically, the first heating element (hz1) is made of simple conductor tracks. These are then preferably protected against corrosion by a lacquer layer (lk) and electrically insulated from their surroundings.

A layer (pw) of a first material is applied to the surface (of) of the heat spreader (wv). This layer (pw) of the first material defines a new surface (ofn) of the heat spreader (wv) parallel to the surface loll of the heat spreader (wv). The layer is preferably a powder layer.

A heating device (hk) is arranged at a first distance (f) from the new surface (ofn) of the heat spreader (wv). In one variant of the process, this first distance (f) is at least temporarily so large that the heating device (hk) dues not het significantly influence the first material of the layer (pw) in the area of the heating device (hk) in the sense of this document.

The heating device (hk) preferably comprises a second heating element (hz2) in this example. One or more electrically insulated and thermally coupled windings of a heating wire around the heating device (hk) can, for example, form this second heating element (hz2). A second temperature sensor, which is not drawn in, detects the heating device temperature ($\vartheta_{hk}$) as a second actual temperature of the heating device (hk). A second controller, which is not drawn in, then supplies the second heating element (hz2) with a second electrical heating current as a function of the detected heating device temperature ($\vartheta_{hk}$) as the second actual temperature in such a way that a second process temperature ($\vartheta_2$) is established as the heating device temperature ($\vartheta_{hk}$) of the heating device (hk). Thereby, this second heating element (hz2) preferably works against a second cooling device (kl), which preferably cools the heating device (hk). This second cooling device (kl) can, for example, be a water cooling device or an air cooling device.

The heating device (hk) comprising its second heating element (hz2) and comprising the optional second cooling device (kl) is attached by means of fastening means (B) to a feed device, here an exemplary spindle (SP). An exemplary motor (M) typically rotates the spindle (SP) in response to control signals from an undrawn computer, the computer and/or control system. This allows the computer to determine the position of the heating device (hk) relative to the layer along this spindle (SP) as a positioning device.

A temperature-controlled process chamber (pk) preferably accommodates the entire device. An unmarked controller preferably brings the process chamber (pk) to a defined fourth process temperature ($\vartheta_4$) by means of an unmarked fourth temperature sensor and an unmarked fourth heating device. The motor (M) is preferably a stepper motor. Preferably, the motor (M) is positioned outside a chamber (KA2) not drawn in here for clarity, as the fourth heating device usually heats the process chamber (pk) to a fourth process temperature ($\vartheta_4$) just below the lowest melting point of the first material of the layer (pw). This allows the use of simpler and less expensive motors (M).

In addition to the positioning device (SP, M, B) for the heating device (hk) shown here, further positioning options in other directions and about other axes are preferably provided. For example, it may be useful to be able to move the heating device linearly in translation not only in the N-direction, but also in a Y-direction not parallel to it, so that such a movement can reach every xy-coordinate of every punk of the new surface (ofn) of the layer (pw) on the heat spreader (wv) by the heating device (hk).

As will become clear later (FIG. 20), it is furthermore useful, for example, to be able to rotate the heating device (hk) about an axis of rotation perpendicular to the new surface (ofn) of the layer (pv) on the heat spreader (wv) by means of a further stepper motor in response to signals from the said computer. Finally, it is useful if a computer of the computer and control system can, for example, change the first distance (f) by means of a fourth stepper motor and, for example, by means of a further spindle by control signals from the computer to the fourth stepper motor. This further spindle and the fourth stepper motor are an example of a lifting device that can lift the heating device (hk). Preferably, the computer controls the current value of the first electric heating current and the second electric heating current depending on, among other things, the position and orientation of the heating device.

FIG. 2

Figure 2:
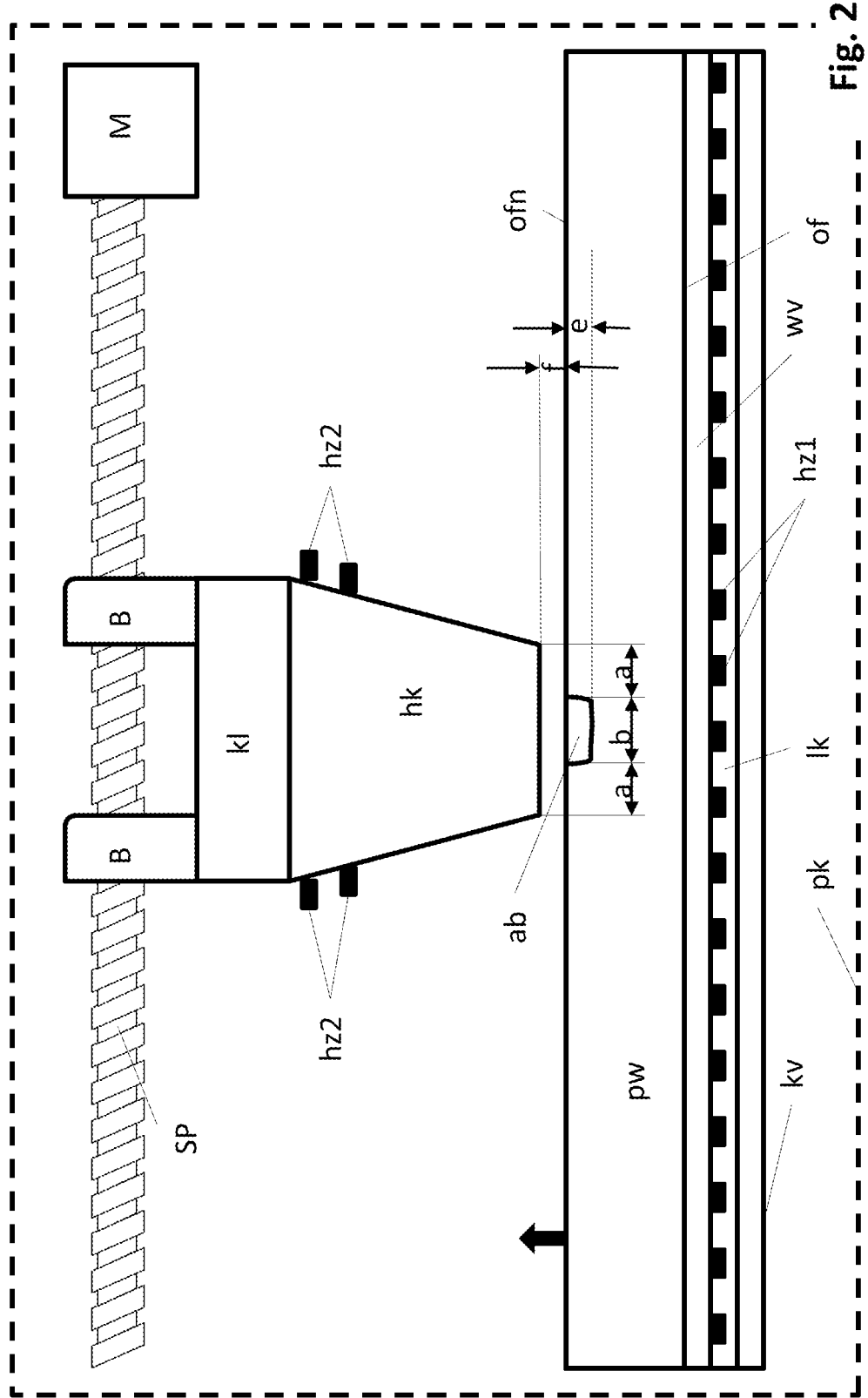
FIG. 2 is a schematic of an example device for integrating functional fibers into a workpiece.

FIG. 2 corresponds largely to FIG. 1. FIG. 2 represents an example of a proposed device. An undrawn lifting device has reduced the first distance (f) of the heating device (hk) to the new surface (ofn) of the heat spreader (wv) and thus to the surface (ofn) of the layer (pw) of the first material.

The first material of the layer (pw) in the area of the heating device (hk) is now heated in a heating area (a and b) by the infrared radiation of the heated heating device (hk). Compared with the situation in FIG. 1, the infrared radiation of the heating device (hk) into the new surface (ofn) is now increased because the lifting device, which is not shown, has reduced the first distance (f). Alternatively or additionally, the device can also provide for heat transport by means of convection from the heating device (hk) to the new surface (ofn) and/or heat transport by means of direct mechanical contact between the heating device (hk) and the new surface (ofn) and/or heat transport by means of a heat-conducting device, in particular a functional fiber (ff), from the heating device (hk) to the new surface (ofn).

Of course, a temporally dynamic change of the second process temperature ($\vartheta_2$) is also possible to achieve a function-equivalent effect, which can complement the raising of the heat spreader (wv). Also, lowering the of the heating device (hk) by reducing the distance to the surface of the workpiece (wst) is conceivable to produce the function-equivalent effect.

If the first process temperature ($\vartheta_1$) and the second process temperature ($\vartheta_2$) are suitably selected, melting of part of the first material of the layer (pw) in the heating region (a and b) now occurs in a melting region (b) located therein within the heating region (a and b) as a result of the heating. Melted material of the first material of the layer (pw) is formed in a melted region, the melting region (b). In this process, the material of the layer melts to a depth (e) below the new surface (ofn). This depth (e) depends on a) the second process temperature ($\vartheta_2$) of the heating device (hk), more precisely the heater temperature ($\vartheta_{hk}$), and b) the heat distribution temperature ($\vartheta_{wv}$) and c) the first distance (f) of the lower edge of the heating device (hk) from the new surface (ofn) and d) the emission coefficient of the lower side of the heating device (hk) and e) the infrared absorption coefficient of the new surface (ofn) below the lower side of the heating device (hk).

Melting may be limited to sintering, if necessary.

FIG. 3

Figure 3:
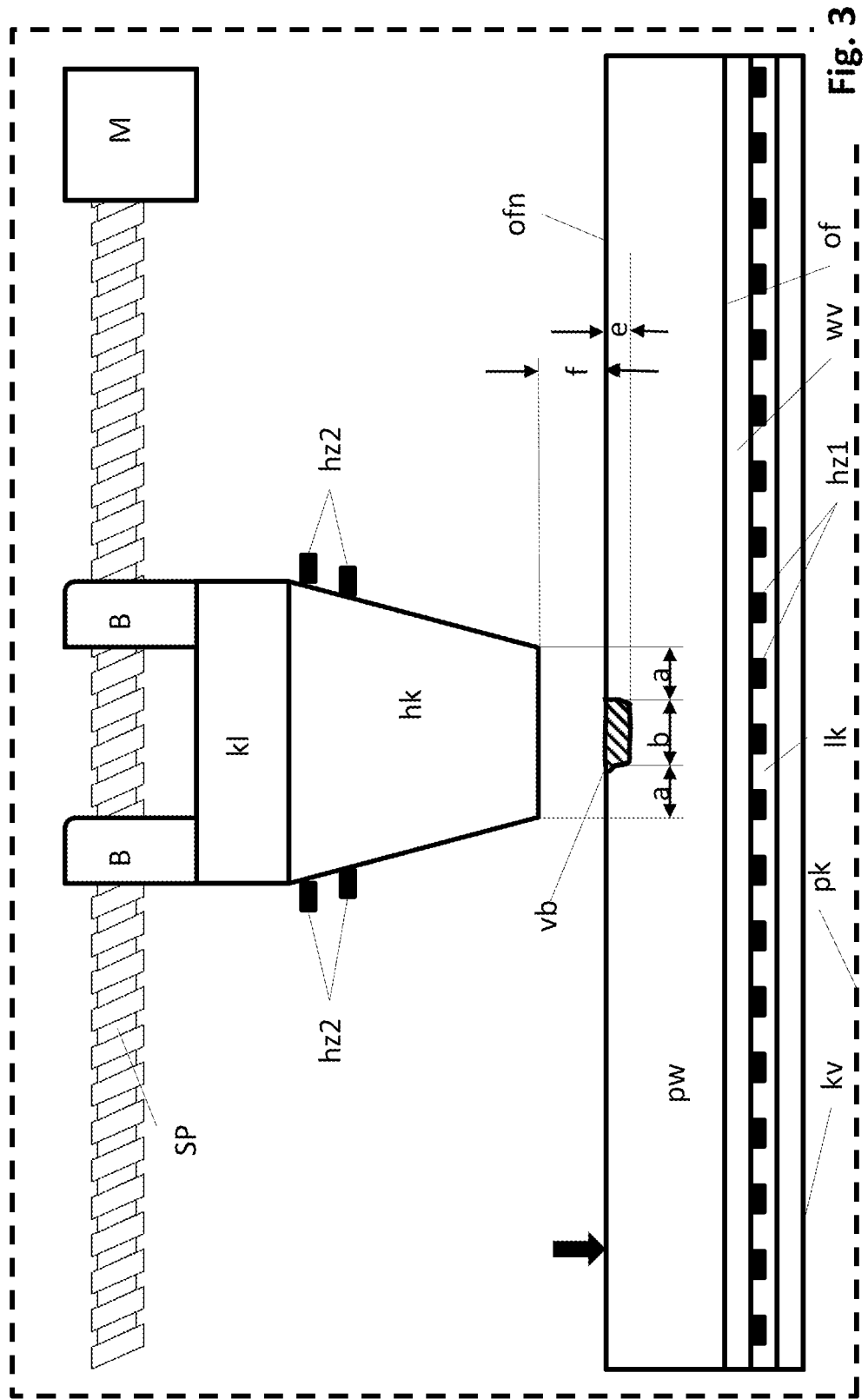
FIG. 3 is a schematic of an example device for integrating functional fibers into a workpiece illustrating an example of terminating a melting process.

The process then preferably terminates this inching process in a defined manner. FIG. 3 shows an example of this. Various methods for terminating the melting process are possible. Preferably, the process step for terminating the melting reverses the action that initiated the melting.

If melting has been initiated by, among other things, a reduction in the first distance (f) of the underside of the heating device (hk) from the new surface (ofn) of the heat spreader (wv), the positioning device or a functionally equivalent device preferably increases this first distance (f) back to the initial value in order to end the melting process.

For example, an increase of the second process temperature ($\vartheta_2$) of the heating device (hk) may have caused the melting, e.g. by an increase of the current flow of the second heating element (hz2) by the undrawn controller or by a correspondingly increased setpoint, e.g. by said computer and control system. In this case, the controller may cause a lowering of the second process temperature ($\vartheta_2$) of the heating device (hk) by lowering the current applied to the second heater (hz2) by the undrawn controller. Typically, this is preceded by a lowered setpoint value specification, e.g. by the said computer and control system.

The melted region (b) [melting region (b)] of FIG. 2 transforms preferably by solidification (or chemical reaction) into a solidifying region [solidificating region (c)] and then into a solidified area (vb) [solidificated region (d)].

FIG. 4

Figure 4:
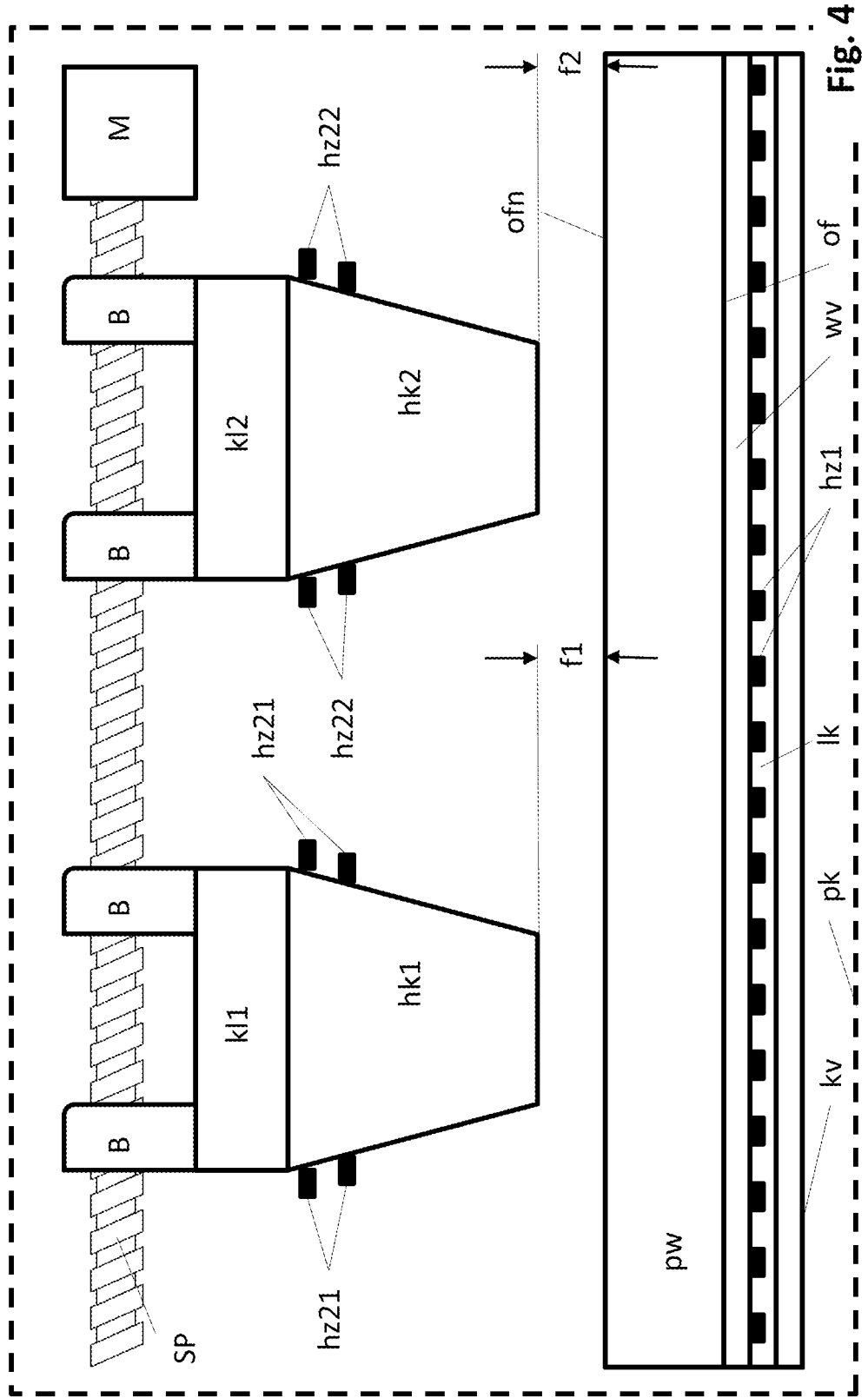
FIG. 4 is a schematic of an example device for integrating functional fibers including two heating devices.

FIG. 4 shows an exemplary situation with a parallelization of the process using several heating devices (hk1, hk2).

FIG. 4 shows an example of a first heating device (hk1), wherein a second cooling device (kl1) of the first heating device (hk1) cools the first heating device (hk1) and the second heating element (hz21) of the first heating device (hk1) heats the first heating device (hk1).

FIG. 4 shows an example of a second heating device (hk2), wherein a second cooling device (kl2) of the second heating device (hk2) cools the second heating device (hk2) and the second heating element (hz22) of the second heating device (hk2) heats the second heating device (hk2).

The first heating device (hk1) is arranged at a first distance (ft) of the first heating device (hk1) from the new surface (ofn) of the heat spreader (wv).

The second heating device (hk2) is arranged at a first distance (f2) of the second heating device (hk2) from the new surface (ofn) of the heat spreader (wv).

Thus, the initial situation for the first heating device (hk1) and the second heating device (hk2) corresponds in each case to the initial situation of FIG. 1 for the heating device (hk) there.

With appropriate control, this plurality of heating devices (hk1, hk2) may be able to generate a pattern more quickly by locally selective melting in the new surface (ofn) of the layer (pw).

FIG. 5

Figure 5:
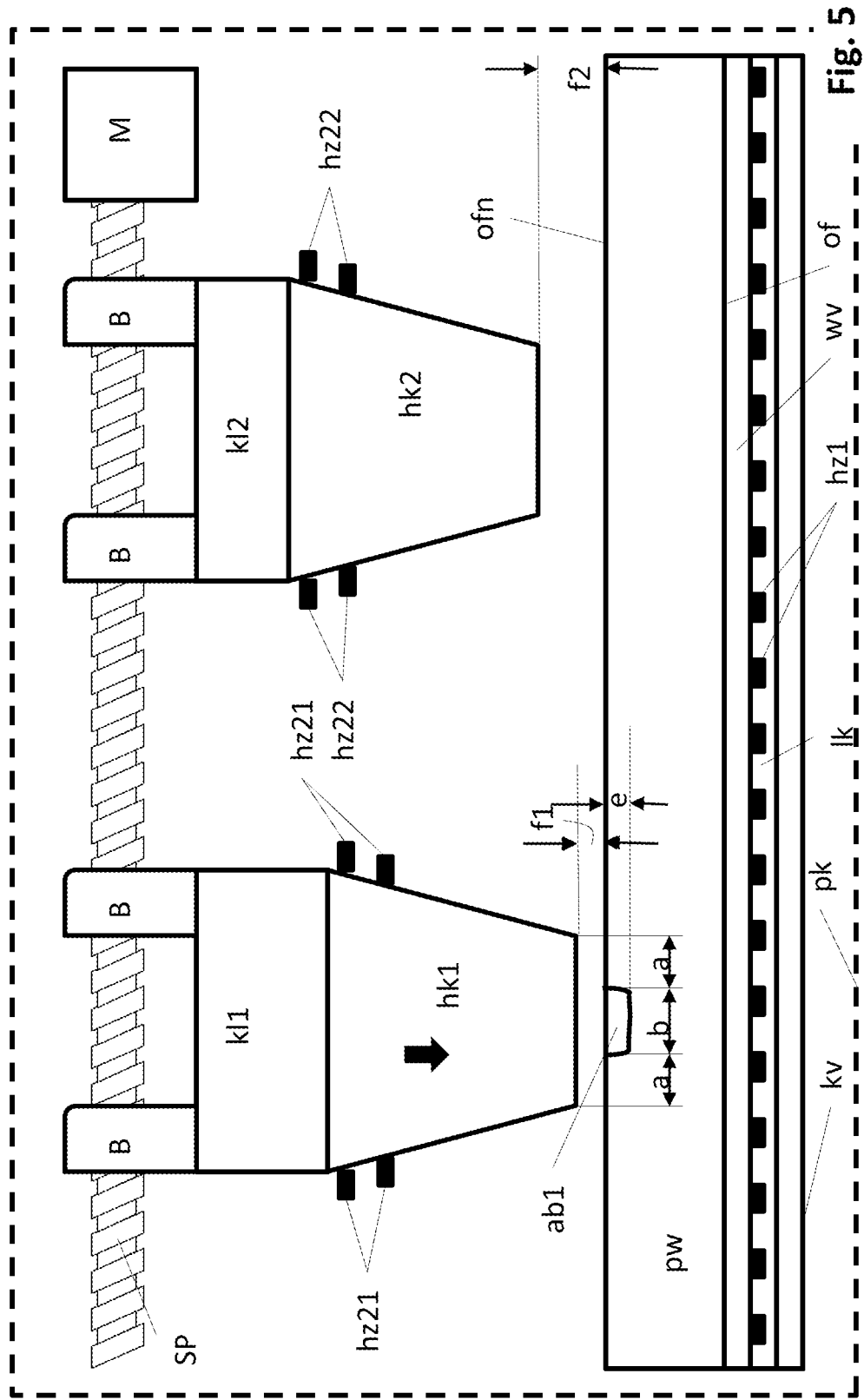
FIG. 5 is a schematic of the example device of FIG. 4 illustrating an example heating process.

Now, for example, the first of the two exemplary heating devices (hk), hk2) can, if necessary, generate a first melted region [melting region (ab1)] in a warm-tip area (a, b). For example, if the method uses the first heating device (hk1) for this purpose, a positioning device can, for example, reduce the first distance (fit of the first heating device (hk1) to the new surface (ofn) of the heat spreader (wv). In parallel or alternatively, a controller can increase the second process temperature ($\vartheta_{21}$) of the first heating device (hk1) by means of the second heating element (hz21) of the first heating device (hk1). Typically, this is preceded by an increased setpoint value specification, e.g. by the said computer system, for the second process temperature ($\vartheta_{21}$) of the first heating device (hk1). This situation is shown in FIG. 5.

Instead and/or in parallel, the second of the two exemplary heating devices (hk1, hk2) can also generate a second melting region (ab2) if required.

For example, if the process uses the second heating device (hk2) for this purpose, the positioning device can, for example, reduce the second distance (f2) of the second heating device (hk2) to the new surface (ofn) of the heat spreader (wv). In parallel or alternatively, a controller can increase the second process temperature ($\vartheta_{22}$) of the second heating device (hk2) by means of the second heating element (hz22) of the second heating device (hk2). Typically, this is preceded by an increased setpoint value specification, e.g. by said computer system, for the second process temperature ($\vartheta_{22}$) of the second heating device (hk2).

FIG. 6

Figure 6:
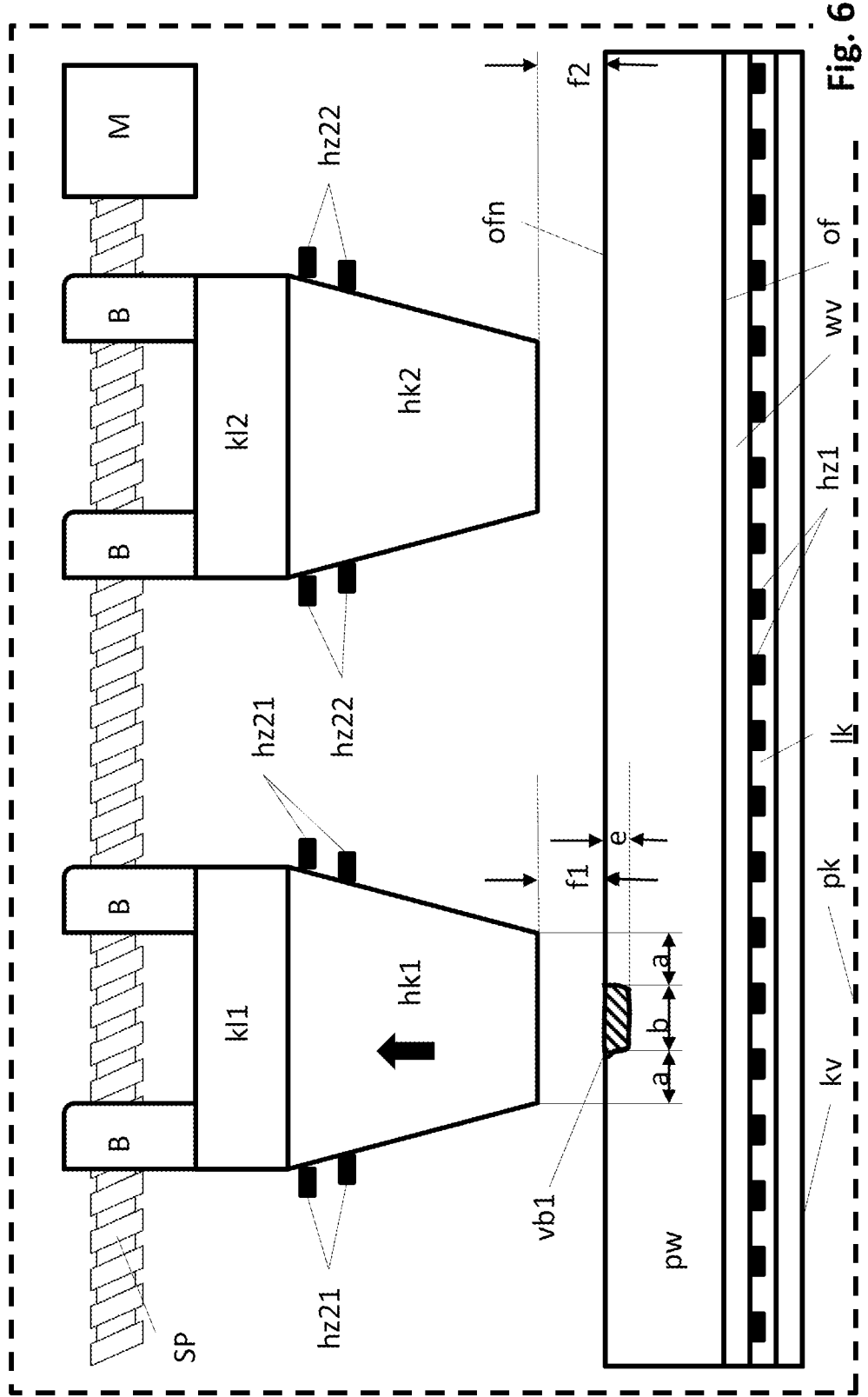
FIG. 6 illustrates an example continuation of the process illustrated in FIG. 5.

If the melting process according to FIG. 5 is finished, the device typically reverses the measures taken. If, for example, the first heating device (hk1) of the two exemplary heating devices (hk1, hk2) was used to generate a first melting region (ab1), the computing or control system can, for example, increase the first distance (f1) of the first heating device (hk1) to the new surface (ofn) of the heat spreader (wv) again by means of a lifting device. Parallel or alternatively, the second process temperature ($\vartheta_{21}$) of the first heating device (hk1) can be lowered again by means of the second heating element (hz21) of the first heating device (hk1) by a controller. Typically, this is preceded by a lowered setpoint value, e.g. by the said computer system, for the second process temperature ($\vartheta_{21}$) of the first heating device (hk1). This situation is shown in FIG. 6. The first solidified area (vb1) is then firmed by the solidification of the first melting region (ab1) triggered by the temperature reduction.

If, for example, the second of the two exemplary heating devices (hk1, hk2) has been used to generate a second inciting region (ab2), the computing or control system of the device can, for example, increase the second distance (f2) of the second heating device (hk2) to the new surface (ofn) of the heat spreader (wv) again for this purpose, for example by means of a second lilting device. Alternatively or in parallel, a controller can lower the second process temperature ($\vartheta_{22}$) of the second heating device (hk2) again by means of the second heating element (hz22) of the second heating device (hk2) The second solidified area (vb2) is then formed as a result of the solidification of the second melting region (ab2) triggered by the temperature reduction.

FIG. 7

Now, for example, the first and the second of the two exemplary heating devices (hk1, hk2) can also generate a first melting region (ab1).

For example, if the process uses the first heating device (hk1) for this purpose, the positioning device for this purpose can, for example, reduce the first distance (f1) of the first heating device (hk1) to the new surface (ofn) of the heat spreader (wv). Alternatively or in parallel, a controller can increase the second process temperature ($\vartheta_{21}$) of the first heating device (hk1) by means atilt second heating element (hz21) of the first heating device (hk1).

In parallel, the second of the two exemplary heaters (hk1, hk2) can also generate a second melting region (ab2) in parallel therewith and independently thereof.

For example, if the process uses the second heating device (hk2), a positioning device for this purpose can reduce the first distance (f2) of the second heating device (hk2) to the new surface (ofn) of the heat spreader (wv). In parallel or alternatively, a controller can increase the second process temperature ($\vartheta_{22}$) of the second heating device (hk2) by means of the second heating element (hz22) of the second heating device (hk2).

Figure 7:
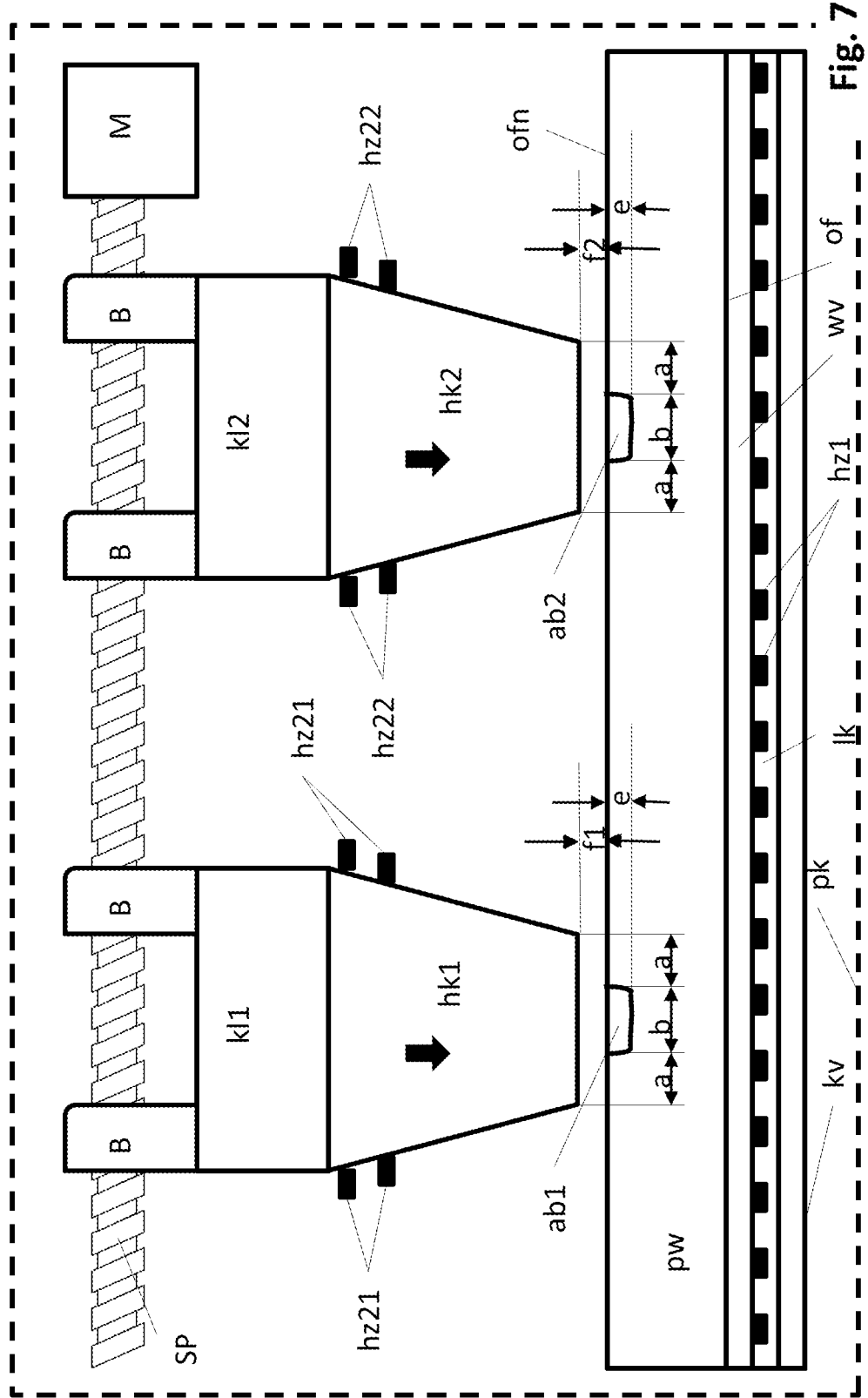
FIG. 7 illustrates an example continuation of the process of FIG. 6.

This situation using two active heating devices (hk1, hk2) is shown in FIG. 7.

FIG. 8

If the melting process according to FIG. 7 is completed, the computing and control unit of the device typically reverses the measures taken.

Figure 8:
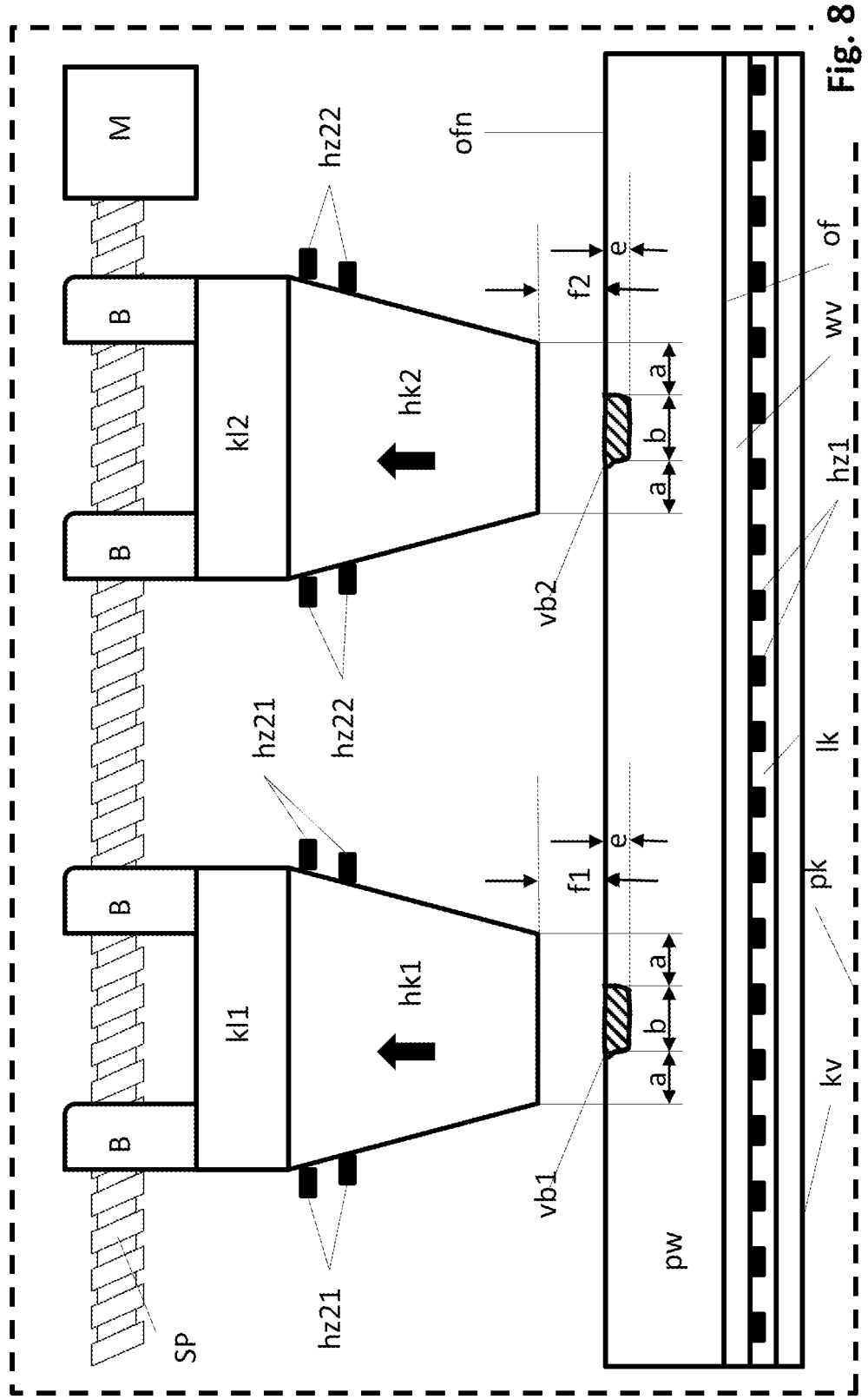
FIG. 8 illustrates an example continuation of the process of FIG. 7.

If, for example, the first of the two exemplary heating devices (hk1, hk2) has generated a first melting region (ab1), the computing and control unit can, for example, increase the first distance (f1) of the first heating device (hk1) to the new surface (ofn) of the heat spreader (wv) again for this purpose by means of the said titling device. Alternatively or in parallel, a controller can decrease the second process temperature ($\vartheta_{21}$) of the first heating device (hk1) again by means of the second heating element (hz21) of the first heating device (hk1). This situation is shown in FIG. 8. As a result of the solidification of the first melting region (ab1) triggered by the temperature reduction, the first solidified area (vb1) is formed.

If for example, the second of the two exemplary heating devices (hk1, hk2) has reached a second melting region (ab2), the computing and control unit can, for example, increase the second distance (f2) of the second heating device (hk2) to the new surface (ofn) of the heat spreader (wv) again by means of the said second lifting device. Alternatively or in parallel, a controller can lower the second process temperature ($\vartheta_{22}$) of the second heating device (hk2) again by means of the second heating element (hz22) of the second heating device (hk2). The solidification of the second melting region (ab2), the melting region (b), which is then triggered as a result of the temperature reduction, then firms the second solidified area (vb2) as the solidificated region (d).

This situation using two previously active heating devices (hk1, hk2) is shown in FIG. 8.

FIG. 9

Figure 9:
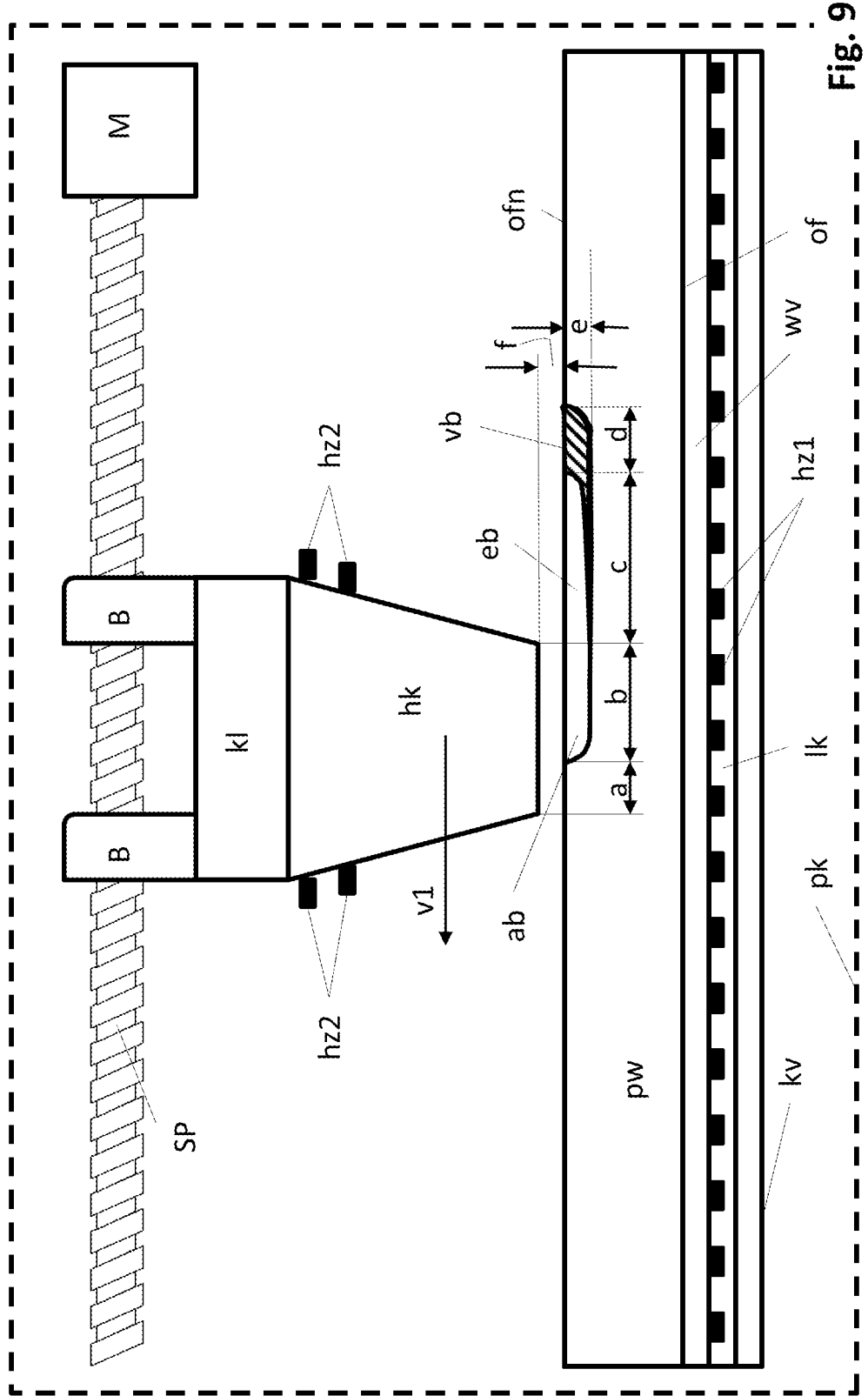
FIG. 9 is a schematic of the example device according to FIG. 1 illustrating a use case.

FIG. 9 shows the situation according to FIGS. 1 to 3, but now the spindle (SP) in cooperation with the motor (M) moves the heating device (hk) having a first speed (v1) along the spindle direction.

The FIG. 9 corresponds to FIG. 2 with the difference that the area of the melt in the inching region (b) now leaves the melting region (b) by the transport of the heating device (Ilk) relative to the heat spreader (wv). This leaving of the area of the melt of the re-melting region (b) by the transport of the heating device (hk) relative to the heat spreader (wv) transferred the re melting region (b) into an area of solidification (eh) in the solidificating region (c), where the melt gradually solidifies again. The former melt ultimately solidifies completely, reaching a solidified area (vb) in the solidilicated region (d).

FIG. 10

After the entire melt has solidified, a squeegee (rk), for example, can now apply further material as a new layer (npw). Preferably, the material is a dusty, meltable granulate of very fine grain size from said first material. A squeegee feed device moves the squeegee (rk) with a leading material supply (pwv) over the previous powder surface, which comprises the previous surface (of) of the workpiece (wst). The squeegee feed device of the squeegee (rk) thereby preferably keeps the lower edge (uk) of the squeegee (rk) at a preferably constant second distance (g) from the old surface (soft of the layer (pw), which was previously the new surface (ofn). Through this, the feed movement of the squeegee (ti) with the powder that the feed movement of the squeegee (rk) leaves from the material supply (pwv) on the previous surface (aof) forms a new surface (ofn) of the new layer (npw) for the next pass above the old surface (aof). The squeegee feed device thereby moves the squeegee (rk) preferably at a third speed (v3) over the old surface (aof).

FIG. 11.

Figure 10:
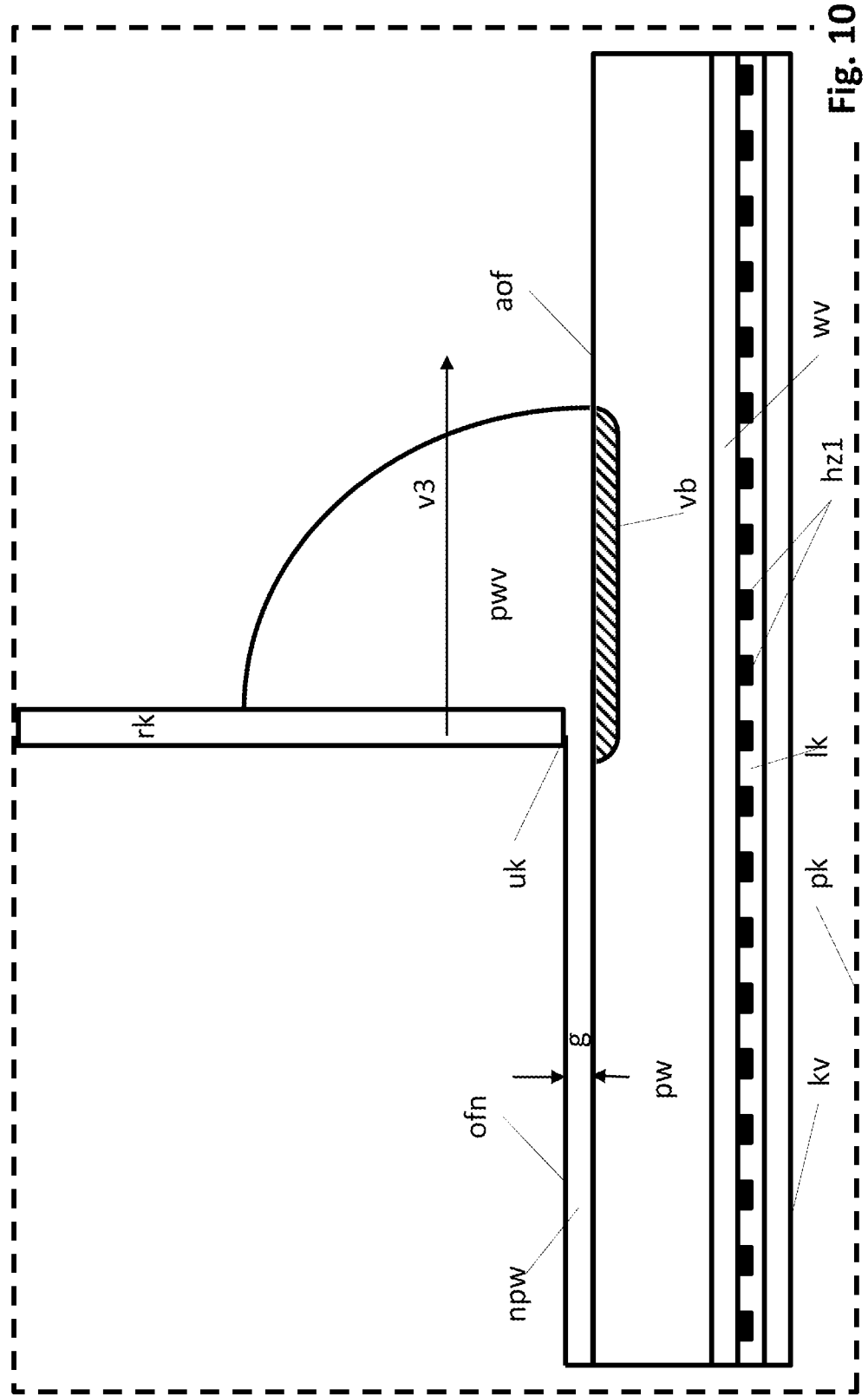
FIG. 10 illustrates an example process of using a squeegee to apply additional material to the workpiece.
Figure 11:
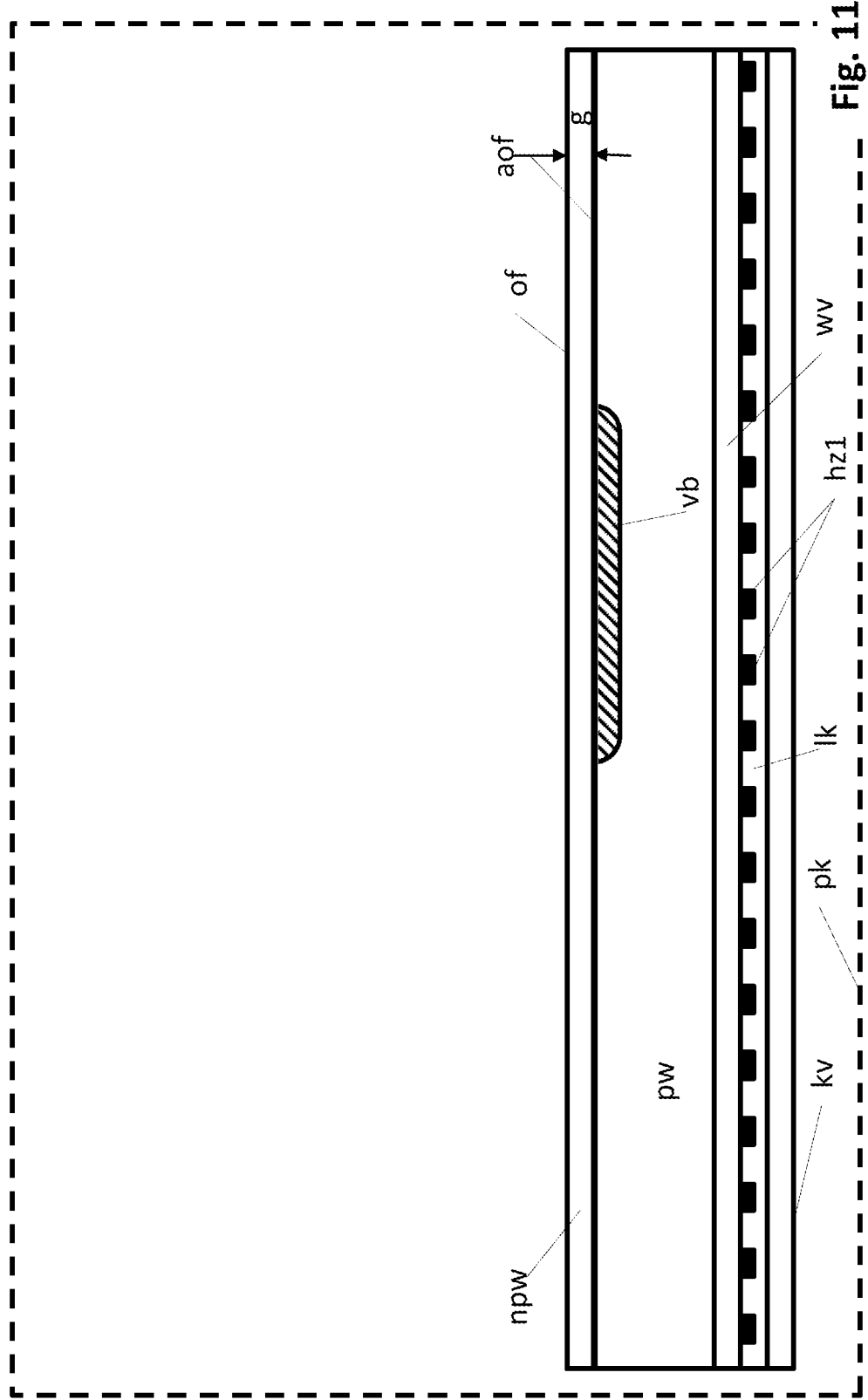
FIG. 11 illustrates an example of a workpiece after the example process of FIG. 10.

Ater completion of the application of the new layer (npw), as shown in FIG. 10, the new situation is as shown in FIG. 11. The application of the new layer (npw) has forted a new layer (npw), which plays the function of the layer of the material in the subsequent pass, above the old surface (aof). The new layer (npw) of the material now preferably completely covers the solidified area.

Instead of applying by feeding a squeegee (rk) through a squeegee feed device, dispensing methods, printing methods, and painting methods, etc., are also possible.

FIG. 12

Figure 12:
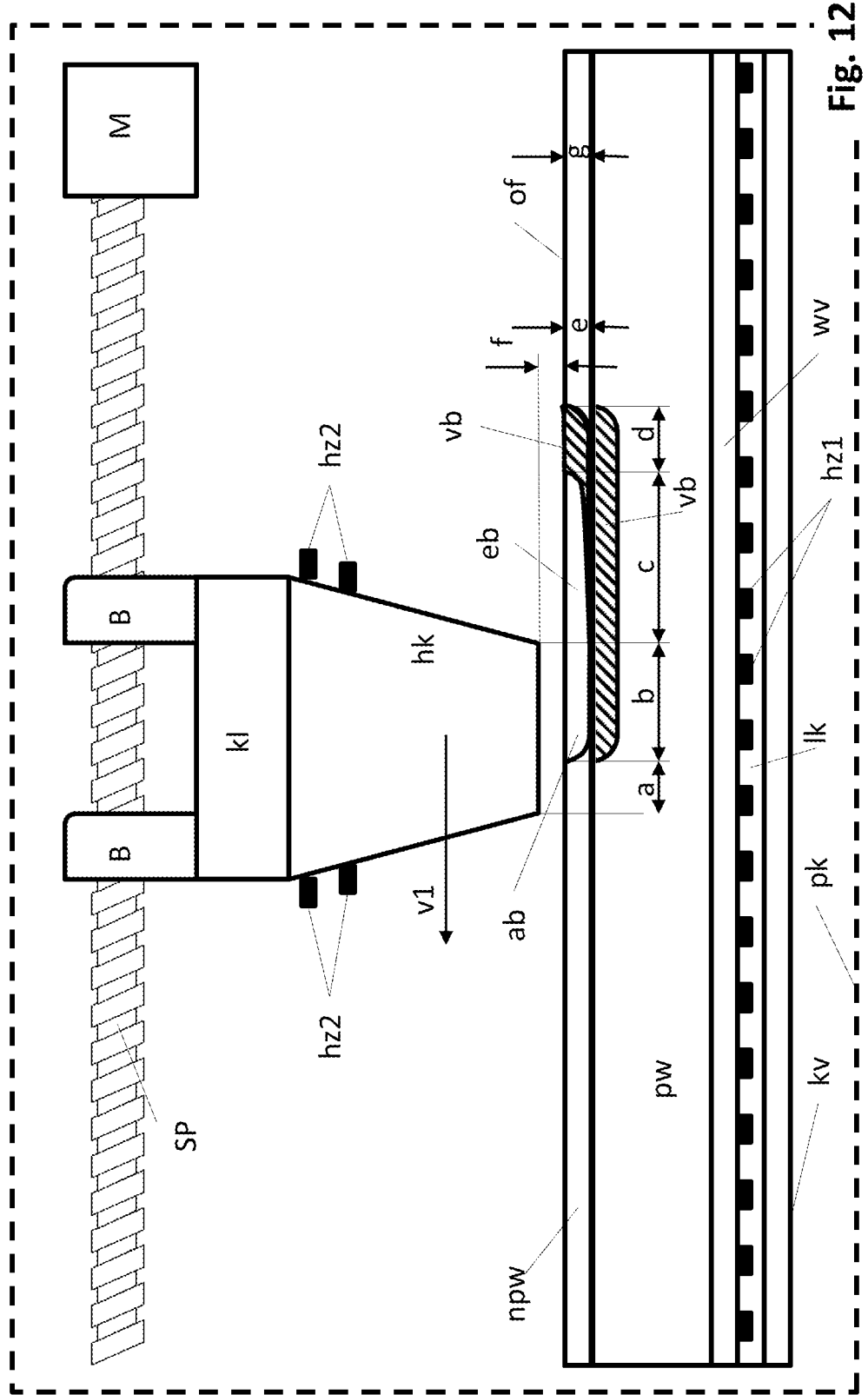
FIG. 12 illustrates an example of the use case of FIG. 9 wherein the 3D printing device processes a new layer.

The illustration of FIG. 12 corresponds to the illustration of FIG. 9 with the difference that the 3D printing device according to the proposal now processes the new layer (npw) instead of the original layer (pw). The newly formed solidified area (vb) is arranged on top of the old solidified area (vb), i.e. stacked, so to speak. Note that the depth (e) of melting of the material of the layer (pw) measured from the new surface (ofn) can be greater than the layer thickness (g). The layer thickness (g) is determined by the second distance (g) of the lower edge (uk) of the squeegee (rk) during the feed through the squeegee feed device to the old surface (aof) of the layer (pw). The layer thickness (g) then corresponds to the thickness of the new layer (npw). Thus, the 3D printing device according to the proposal can melt more powder layers than just one powder layer.

FIG. 13

Figure 13:
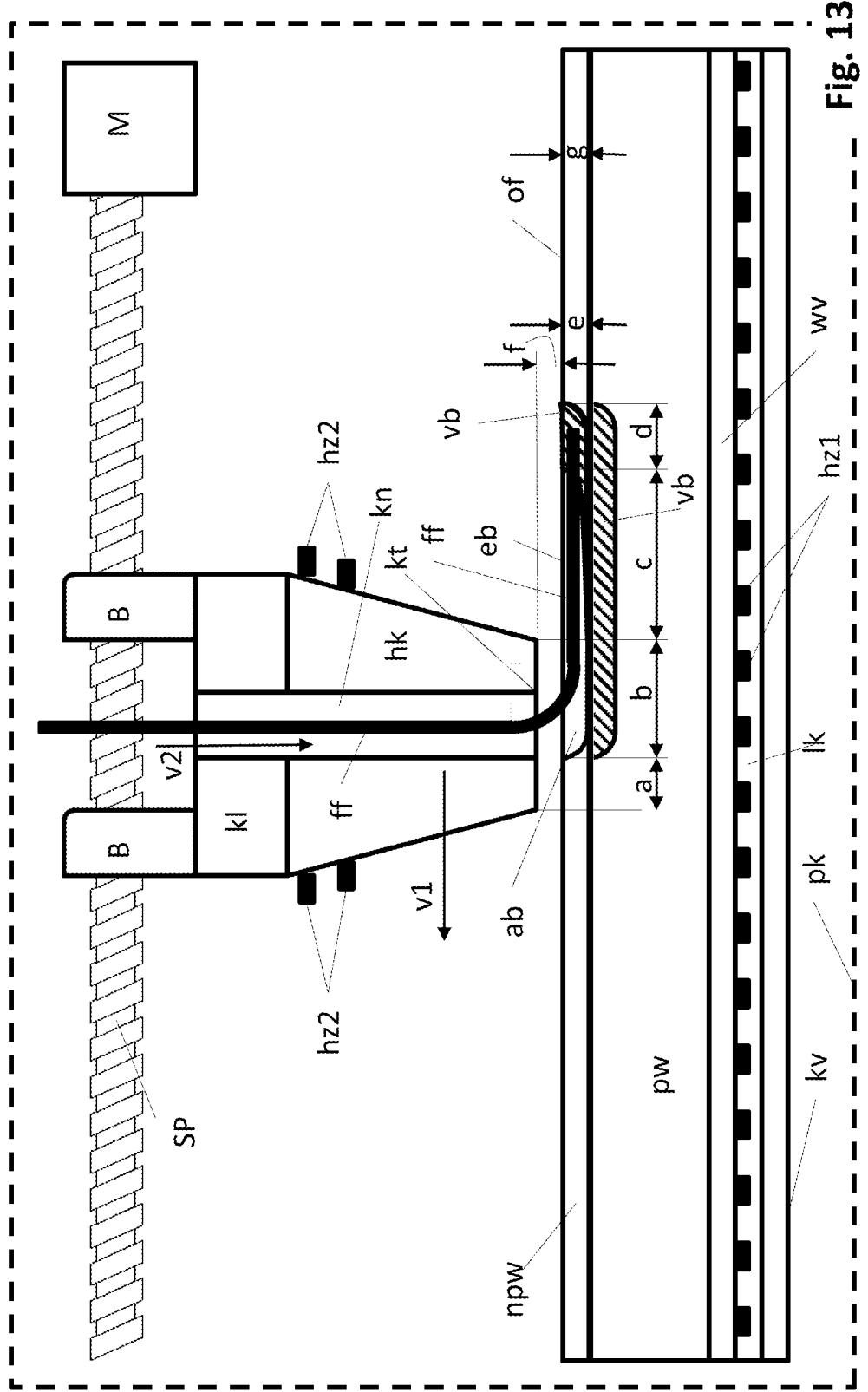
FIG. 13 corresponds to FIG. 12 with the difference that the functional fiber feed device feeds a functional fiber to the functional fiber insertion device.

The illustration in FIG. 13 corresponds to FIG. 12 with the difference that the functional fiber feed device now feeds a functional fiber (ff) to the functional fiber insertion device (ft) via a channel (kn) in the heating device (hk) at a second speed (v2). A functional fiber insertion device or the 3D printing device can theoretically also comprise such a functional fiber feeding device for the functional fiber (ff) as an independent subdevice of the overall device, independently of the heating device (hk). I.e. the channel (kn) for guiding the functional fiber (ff) does not necessarily have to be part of the heating device (hk). However, it has been shown in the experiments that realization as part of the heating device is particularly advantageous, since the heating device (hk) then preheats the functional fiber (ff) before insertion into the molten surface (of) of the layer (pv) or workpiece (wst). Preferably, the inner lower edge (kt) of the channel (kn) has a suitable radius that is larger than the minimum allowed bending radius of the functional fiber on along the course of the functional fiber section of the functional fiber (ff) to be inserted. The second velocity (v2) is preferably substantially equal in amount to the first velocity (v11, so that no forces can build up. This process thereby incorporates the functional fiber (ff) into the material of the solidified area (vb) i.e. the solidificated region (d). Preferably, the functional fiber (ff) comprises a carbon fiber and/or a glass fiber and/or a mineral fiber and/or natural fibers and/or mineral fibers and/or plant fibers and/or silk fibers and/or a wire, which in particular may be made of a wire material that may comprise gold, silver, copper, aluminum, titanium, magnesium, manganese, nickel, rare earths, platinum, uranium, plutonium, thorium, iron, and the like, and/or a shape memory wire, in particular a nitiol wire, and/or a stranded wire comprising such wires and/or fibers.

FIG. 14

Figure 14:
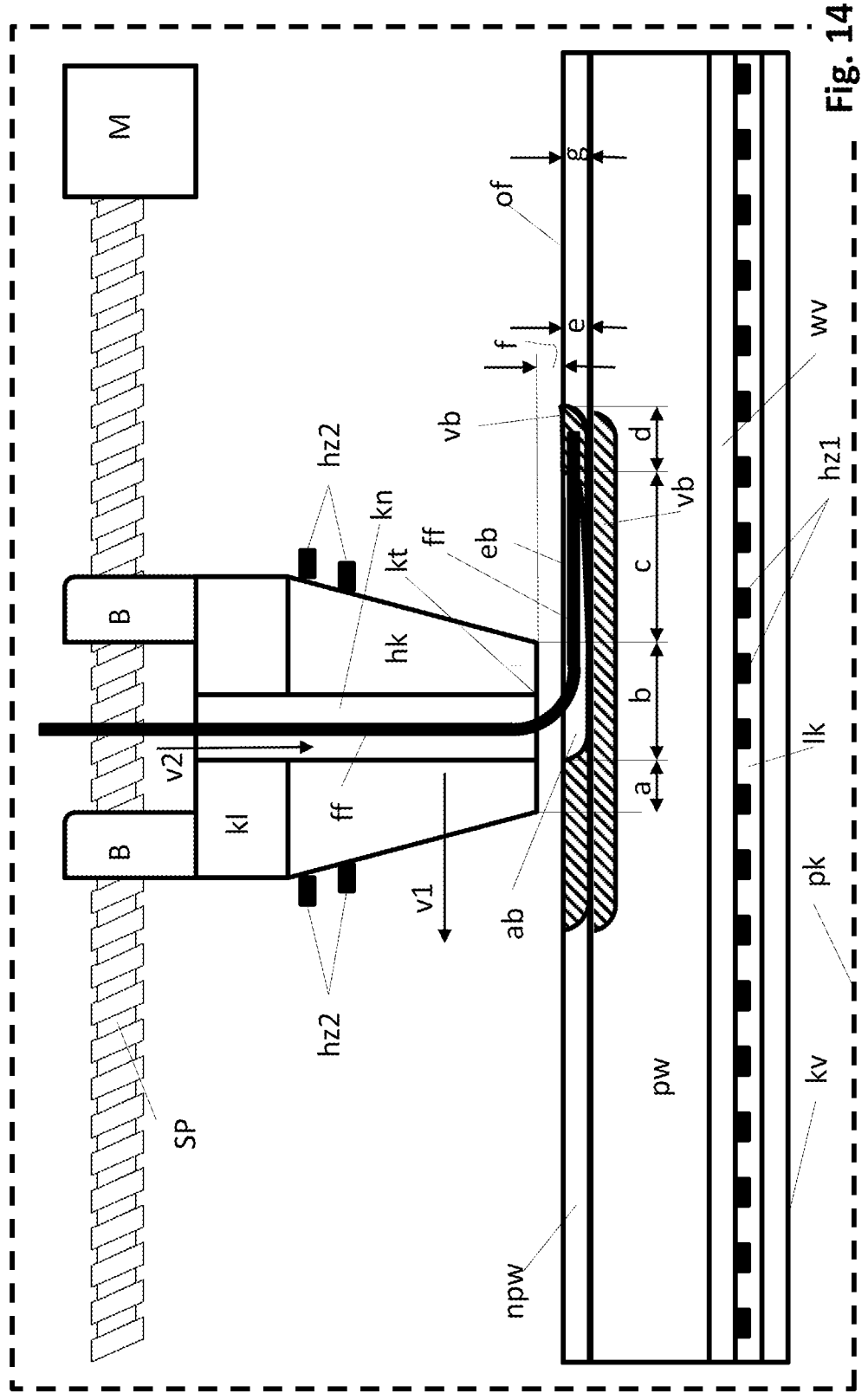
FIG. 14 corresponds to FIG. 13 with the difference that a step 2a has already created a structure in the new layer by a selective sintering process.

The illustration of FIG. 14 corresponds to FIG. 13 with the difference that now a step 2a has already created a structure in the layer by means of a selective sintering process, for example by means of selective laser sintering. Now the functional fiber insertion device (ft) using its heating device (hk) melts this previously already sintered material aging. Thus, in this example, the material of the layer undergoes two heat treatments. First, the areas of the surface (of) of the new layer (npw) to be sintered are sintered, and then some of these already melted and solidified material areas are re-melted comprising the insertion of the functional fiber (ff).

FIG. 15

Figure 15:
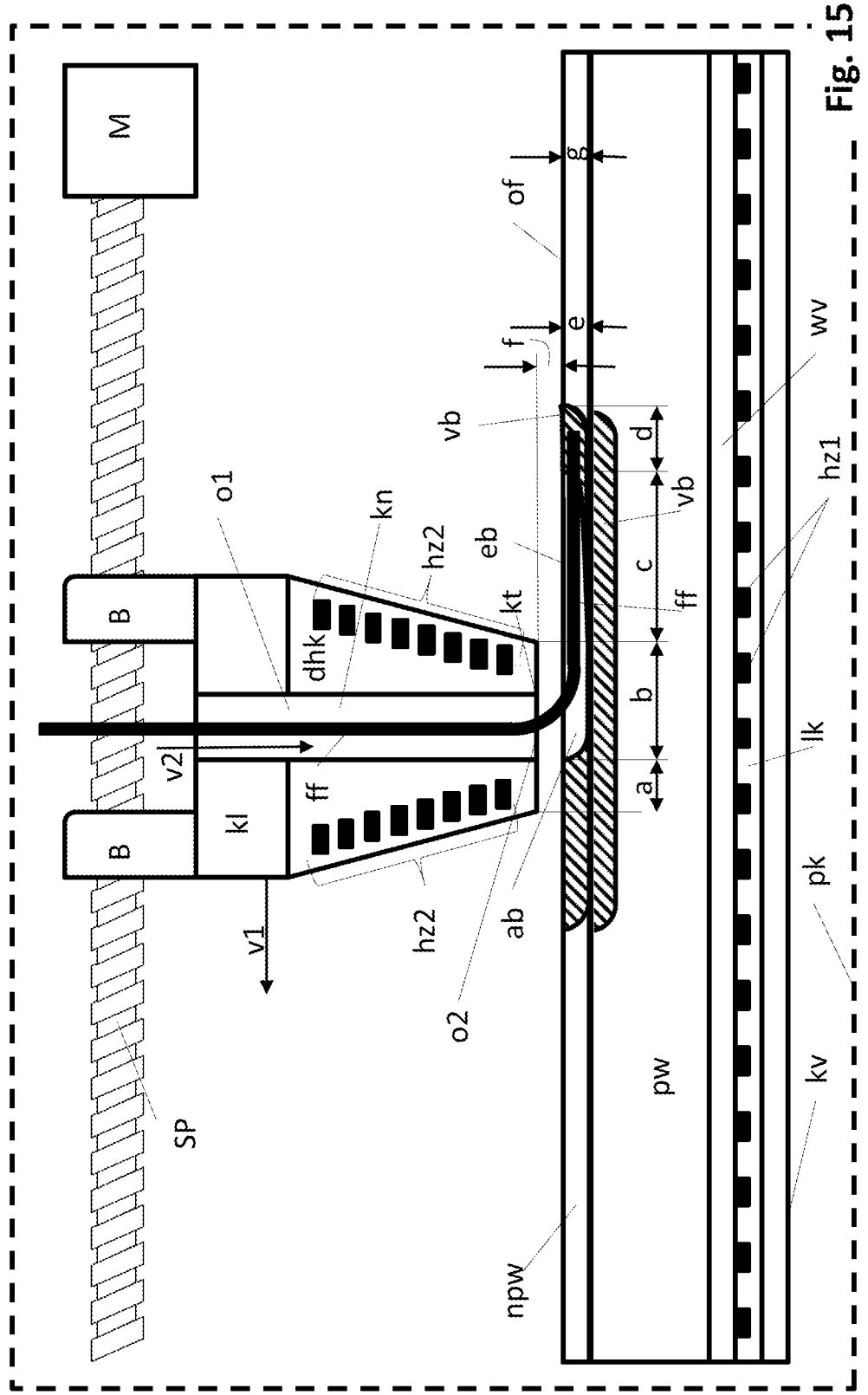
FIG. 15 corresponds largely to FIG. 14 with the difference that the heating device is made of diamond.

FIG. 15 corresponds largely to FIG. 14 with the following differences: The heating device (hk) in this example is made of diamond. Diamond is an example of a material in which the monolithic integration of electrical functionalities is possible. For Diamond the manufacturing of electronic components in diamond is known. The diamond heating device (dhk) in this example is functionally equivalent to the previously discussed heating device (hk). However, the second heating element (hz2) is now integrated and fabricated in the material of the diamond heating device (dhk) in this example. For example, it may be a highly p-doped p+ layer in the diamond of the diamond heating device (dhk). Localized and patterned implantation (focused ion beam implantation) of boron atoms into the diamond material of the diamond heating device (dhk) and subsequent heat treatment can achieve such a highly p-doped layer. A lower dose implantation leads to less good conducting layers, whose use as resistors or temperature sensor is possible. A very high dose leads to areas whose use as electrical contacts is possible. The use of titanium for the production of ohmic contacts is also known. In the diamond, a first opening (o1) and a second opening (o2) are preferably made axially, preferably by laser drilling, which are connected by the channel (kn). In the example of FIG. 15, the diamond material of the diamond heating device (dhk) comprises the second heating element (hz2) as an electrical, in particular preferably p-doped resistor. When electrically energized, this electrical resistor heats up and gives off the heat. With regard to the manufacture of such diamond bodies, this paper refers to Bernd Burchard, "Elektronische and opto-elektronische ßauelemente und ßauelementstrukturen auf Diamantbasis", dissertation, Hagen, 1994 and the document EP 1274 976 B1.

FIG. 16

Figure 16:
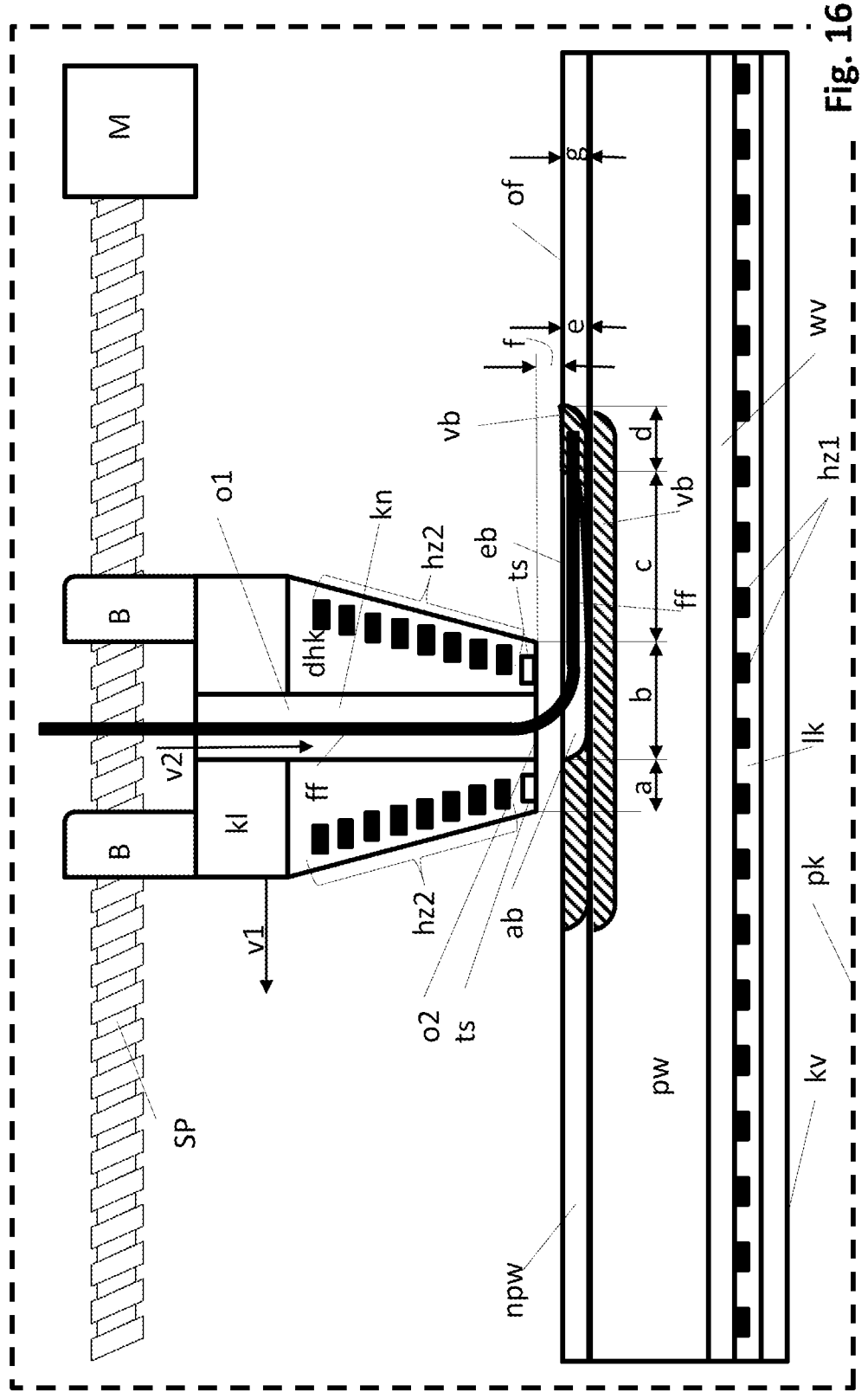
FIG. 16 corresponds to FIG. 15 with the difference that the lower boundary surface of the diamond heating device comprises one or more temperature sensors.

FIG. 16 corresponds to FIG. 15 with the difference that the lower boundary surface of the diamond heating device (dhk) still comprises one or more temperature sensors (ts) as an example. These are, for example, again resistors and/or pn diodes. Fabrication of such electronic components in the diamond heating device (dhk) may utilize an implantation of impurity atoms into the diamond as a fabrication step. Through this, tier example, a control of said computerized controller can very precisely control the temperature at the bottom edge of the diamond heating device (dhk). A PID controller, for example, can control the electrical current through the second heating element (hz2) depending on the current electrical resistance value of the electrical resistance of the temperature sensor (ts). An advantage of using diamond together with a heat sink (k1) is the fast temperature drop of the diamond heating device (dhk) after the heating is finished due to the extremely good thermal conductivity of diamond, which is much better than that of copper.

FIG. 17

Figure 17:
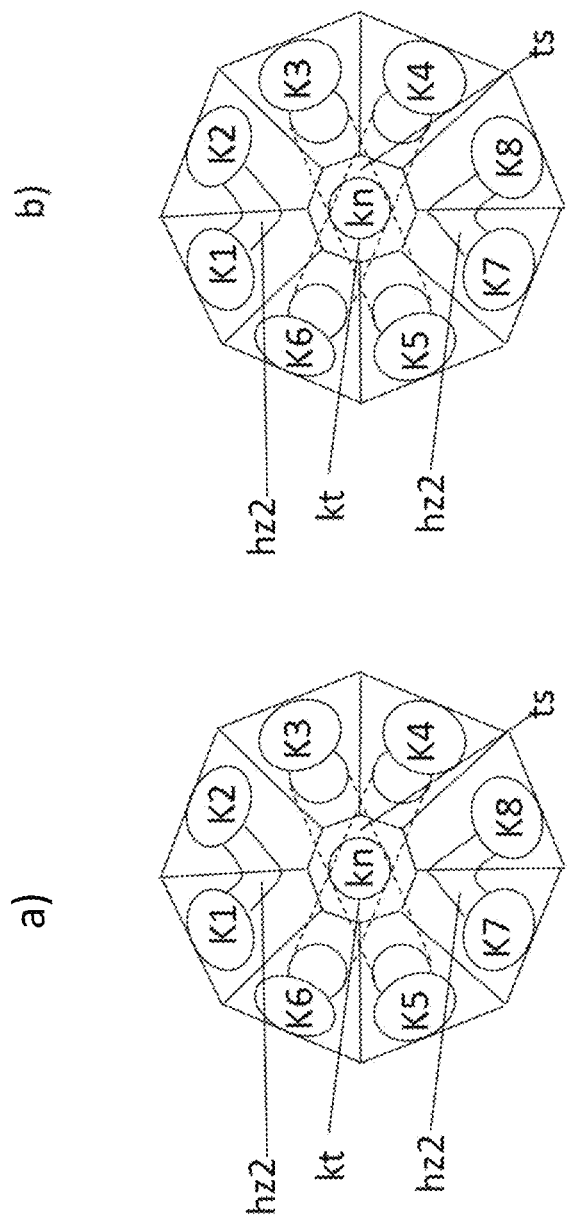

FIG. 17 shows an exemplary diamond heating device (dhk) in a top view of the underside of the diamond heating device (dhk), namely the tip of the diamond heating device (dhk) as seen from the workpiece side. FIG. 17a shows a rasterized photograph of such a diamond heater. FIG. 17b shows a drawing showing the diamond heating device of FIG. 17a. By showing it in duplicate, the document presented here ensures that even if the reproduction of FIG. 17 is poor, the contents are still recognizable. The exemplary diamond heating device (dhk) has a first contact (K1) and a second contact (K2) which enable electrical contacting and operation of a first second heating element (hz2). The exemplary diamond heating device (dhk) has a seventh contact (K7) and an eighth contact (K8) that enable electrical contacting and operation of a second second heating element (hz2). A third contact (K3), a fourth contact (K4), a fifth contact (K5) and a sixth contact (K6) allow the contacting of the temperature sensors. The temperature sensors are not visible due to the rasterization of the image. The channel (kn) can be seen in the center of the diamond heating device (dhk). Placing spring-loaded contact pins on the contact surfaces of the contacts (K1 to K8) can, for example, enable electrical connection of the diamond heating device (dhk). The corresponding holders, spring pins and connections are not shown in the preceding figures for clarity. In FIG. 17b, a first strip-shaped p-implantation in the diamond is shown having dashed edges. In FIG. 17b, a second strip-shaped p-implantation in the diamonds having dashed edges are shown. The first p-implantation connects the sixth contact (K6) to the fourth contact (K4). The second p-implantation connects the filth contact (K5) to the third contact (K3). Preferably, the diamond heating device (dhk) manufacturing process performs the first p-implantation and the second p-implantation at different implantation depths. Therefore, these two implantation areas, the first p-implantation in the form of a first electrically semiconducting implantation layer at a first implantation depth and the second p-implantation in the form of a second electrically semiconducting implantation layer at a second implantation depth, just touch each other in the area of the channel. This electrical transition between the first semiconducting implantation layer and the second semiconducting implantation layer is preferably high-resistance due to different choices of the first implantation depth and the second implantation depth with respect to the surface of the diamond. This electrical transition is therefore typically highly temperature dependent. By taking a Kelvin measurement at the tour contacts (K3, K4, K5, K6), a resistance measuring device of the computer and control system of the 3D printing device can precisely determine the electrical resistance value of this electrical junction in the region of the channel (kn). A controller of the computer and control system can then use this determined resistance value to control the electrical heating power of the first second heating element (hz21 and the second second heating element (hz2). This electrical junction is only one example of a temperature sensor (ts) among other examples, such as semiconductor diodes, thermocouples (English: thermo-couple), etc. FIG. 17b shows an exemplary, preferred position of such a temperature sensor (ts). In this context, this document refers to the document EP 1 274 976 B1.

FIG. 18

Figure 18:
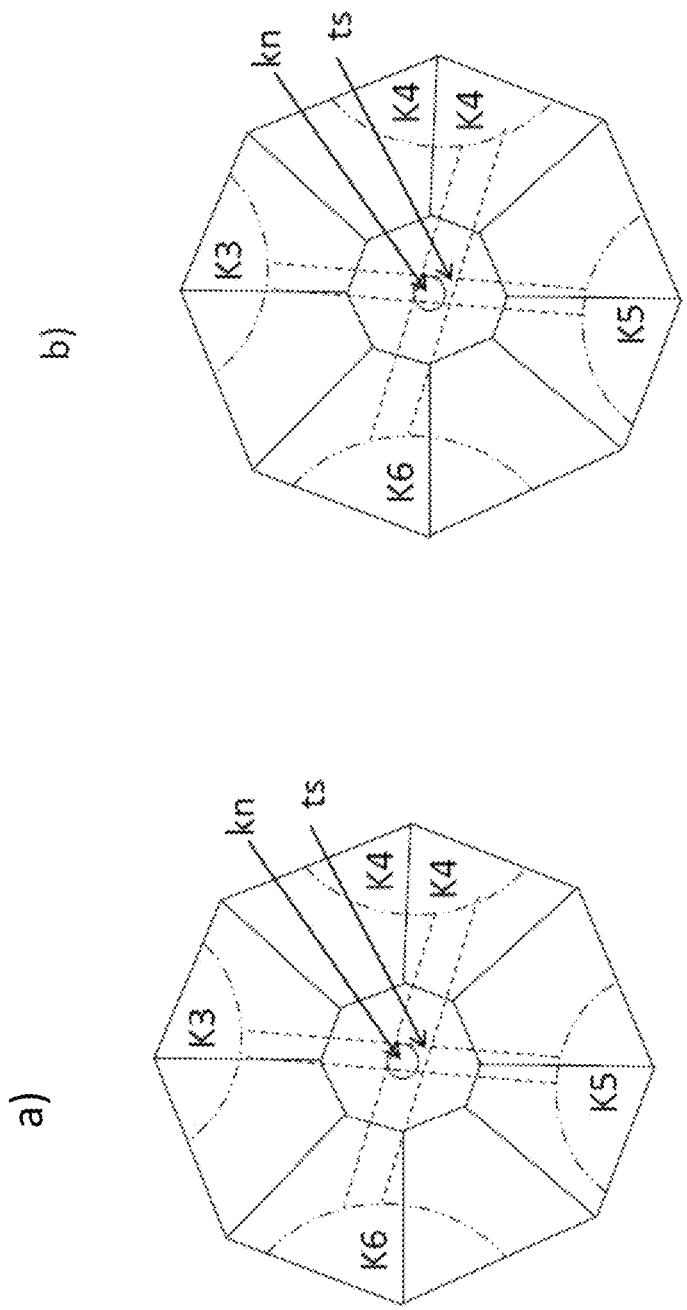

FIG. 18 shows another exemplary diamond heating device (dhk) in top view from the workpiece side FIG. 18a shows a rasterized photograph of such a diamond heating device (dhk). FIG. 18b shows a drawing showing the diamond heating device (dhk) of FIG. 18a. The double representation ensures that even if the reproduction of FIG. 18 is poor, the contents are still recognizable. The exemplary diamond heating device (dhk) has a first contact (K1) and a second contact (K2) and a third contact (K3) and a fourth contact (K4). The resistance measuring device of the computer and control system contacts the cross-shaped temperature sensor (ts) via these contacts (K1, K2, K3, K4). The channel section of the heating device (hk) of the channel (kn) of the functional fiber insertion device is located in the center of the picture. When this diamond heater is used, an external second heating element (hz2) is preferably required. The inventors refer to the explanation of the temperature sensor (ts) above.

FIG. 19

Figure 19:
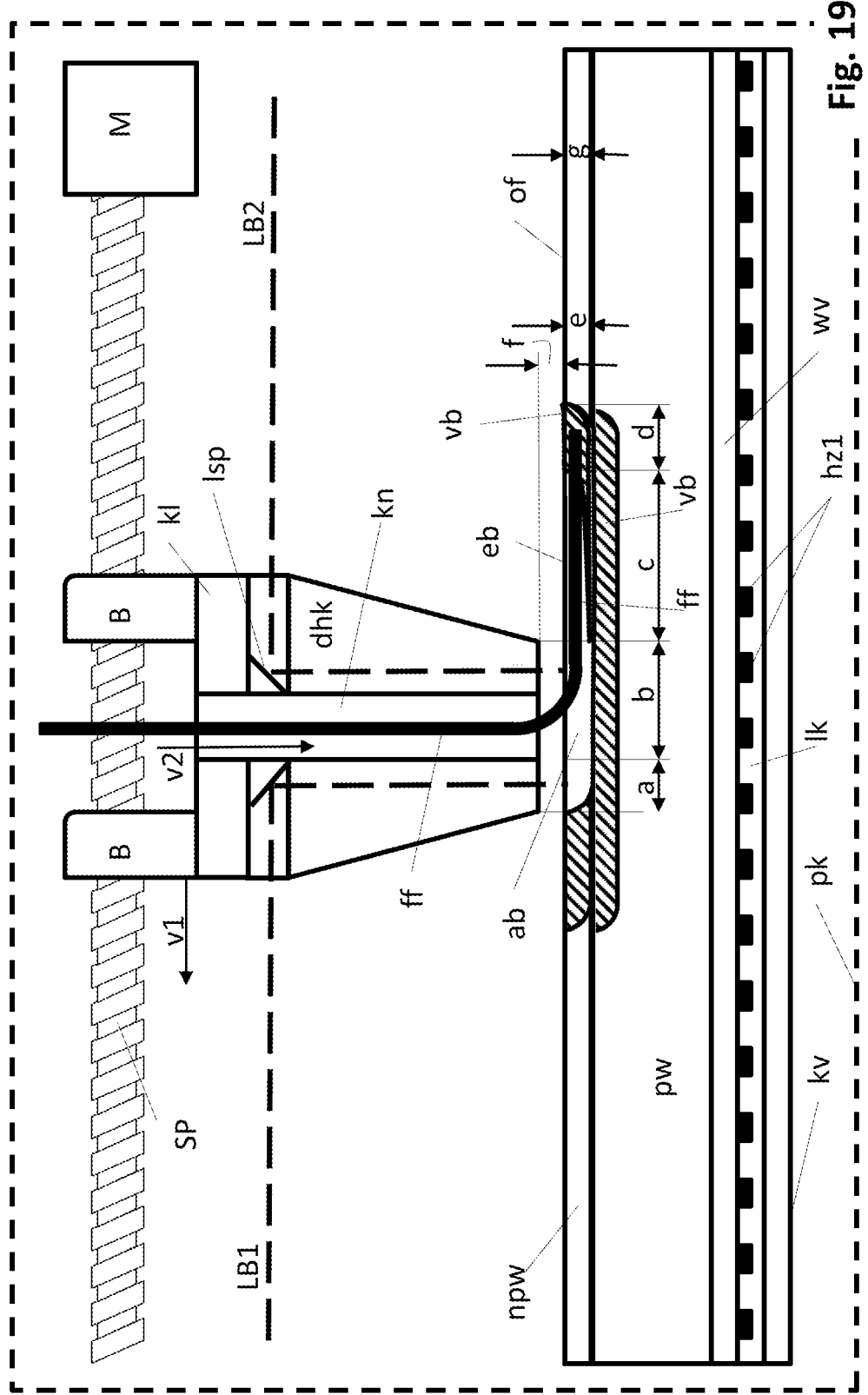
FIG. 19 corresponds to FIG. 16 with the difference that the diamond heating device is transparent.

FIG. 19 corresponds to FIG. 16 with the difference that the diamond heating device (dhk) in this example is optically transparent. Another difference is that now the diamond heating device (dhk) applies the heating power by means of an exemplary first laser beam (LB1) and by means of an exemplary second laser beam and by means of mirrors (lsp) into the heating area. In this process, the electromagnetic radiation penetrates the diamond heating device (dhk) itself to reach the surface of the workpiece (wst). This is just one example of several possible for the possible melting of the material of the surface (of) of the workpiece (wst) by means of electromagnetic radiation. In this example, the underside of the heating device (hk) is preferably planar in a larger area for this purpose. In this example, the diamond heating device (dhk) preferably also represents an optical functional element that directs heating energy in the form of laser beams (LB1, LB2) to the warm-up area (a, b) in cooperation with the mirrors (lsp) as further optical functional elements.

FIG. 20

FIG. 20 corresponds essentially to FIG. 14. A modification of the device makes it possible to process functional fibers (ff) having a larger bending radius. As a result, the heating device (hk) is no longer symmetrical and the functional fiber (ff) no longer strikes the surface (of) of the new layer (npw) perpendicularly. To solve this problem, a rotating device can rotate the heating device (hk) about a rotation axis (ach) by means of a computer-controlled stepper motor, depending on the current xy insertion position of the insertion point (ep) and the intended insertion direction of the functional fiber (ff) for this insertion point (ep). The rotation axis (ach) preferably passes through the insertion point (ep). The rotation controls the preferably said computing and control system. The rotation device then preferably always rotates the heating device (hk) in such a way that the component of the first velocity (v1) of the motion vector of the heating device (hk) in the xy-plane is preferably substantially parallel to the component of the of the direction vector of the functional fiber (ff) in the xy-plane. This alignment of the ejection direction of the functional fiber (ff) out of the channel (kn) of the functional fiber insertion device (ft) by means of the turning device onto the surface (of) of the workpiece (wst) enables the laying of especially thick functional fibers (ff) in curves. FIG. 20 shows the rotating device is not in the for better clarity itself. However, a possible direction of rotation and the virtual axis (ach) about which the rotation of the heating device (hk) takes place are drawn.

Figure 21:
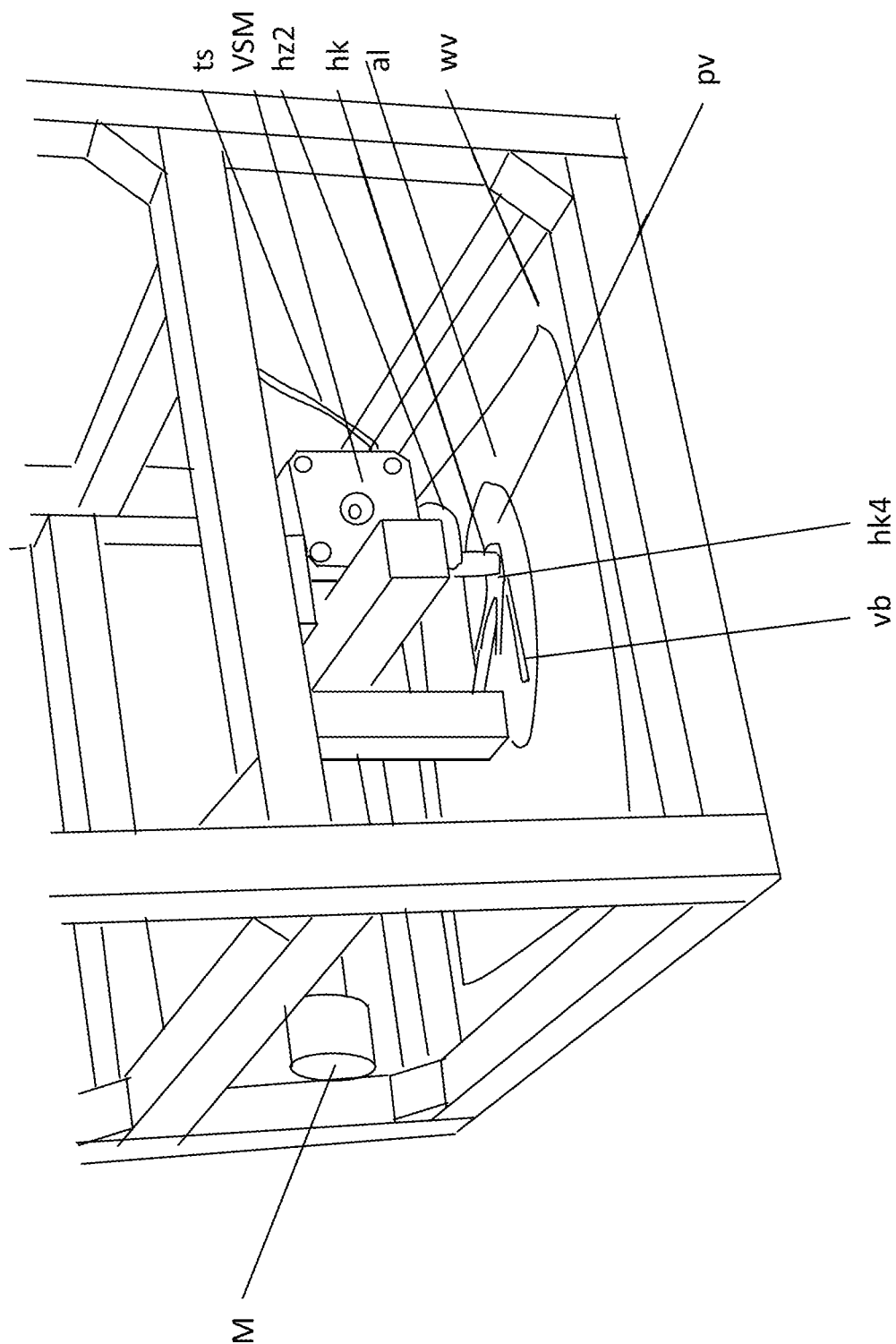
FIG. 21 is a drawing of an example test setup.
Figure 22:
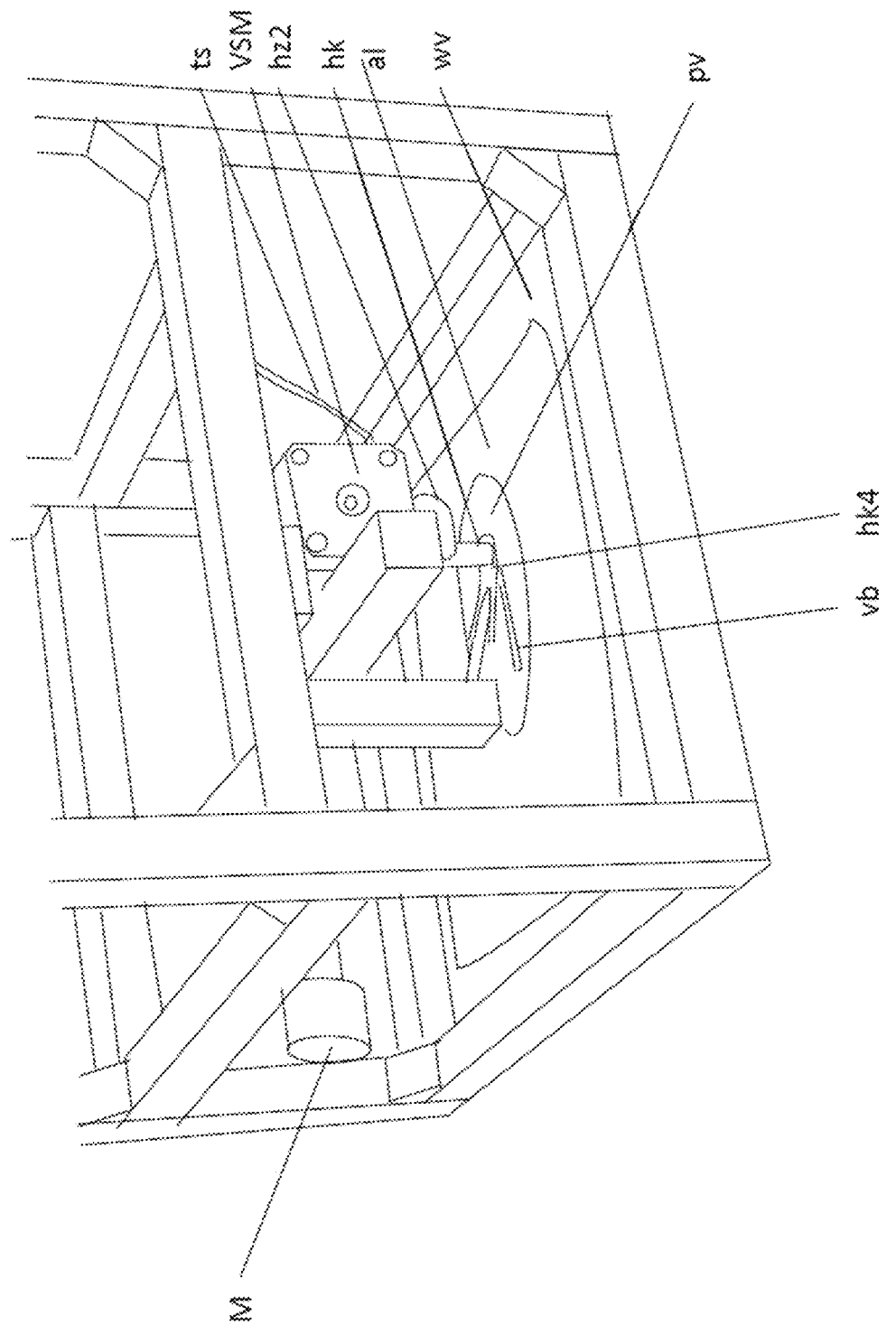
FIG. 22 is a rasterized photograph of the example test setup of FIG. 21.

FIG. 21 and FIG. 22

FIG. 21 and FIG. 22 show the test setup. FIG. 21 shows a drawing of the test setup. FIG. 22 shows a corresponding rasterized photo of the test setup corresponding to the drawing. The photo shows the motor (M), the solidified area (vb), the heating device (hk), the powder layer (pv), the heat spreader (wv), an additional aluminum foil for better separability of the workpiece (wst) after fabrication from the heat spreader, a second heater (hk2), the second heating element (hz2), the stepper motor (VSM) for transporting the functional fiber (ti) toward the surface (of) of the layer (pw), and the feed line of the temperature sensor (ts) to the second heating element (hz2). FIG. 22 also shows the linkage for the spindle (SP) driven by the motor (M) and part of the wiring.

Figure 23:
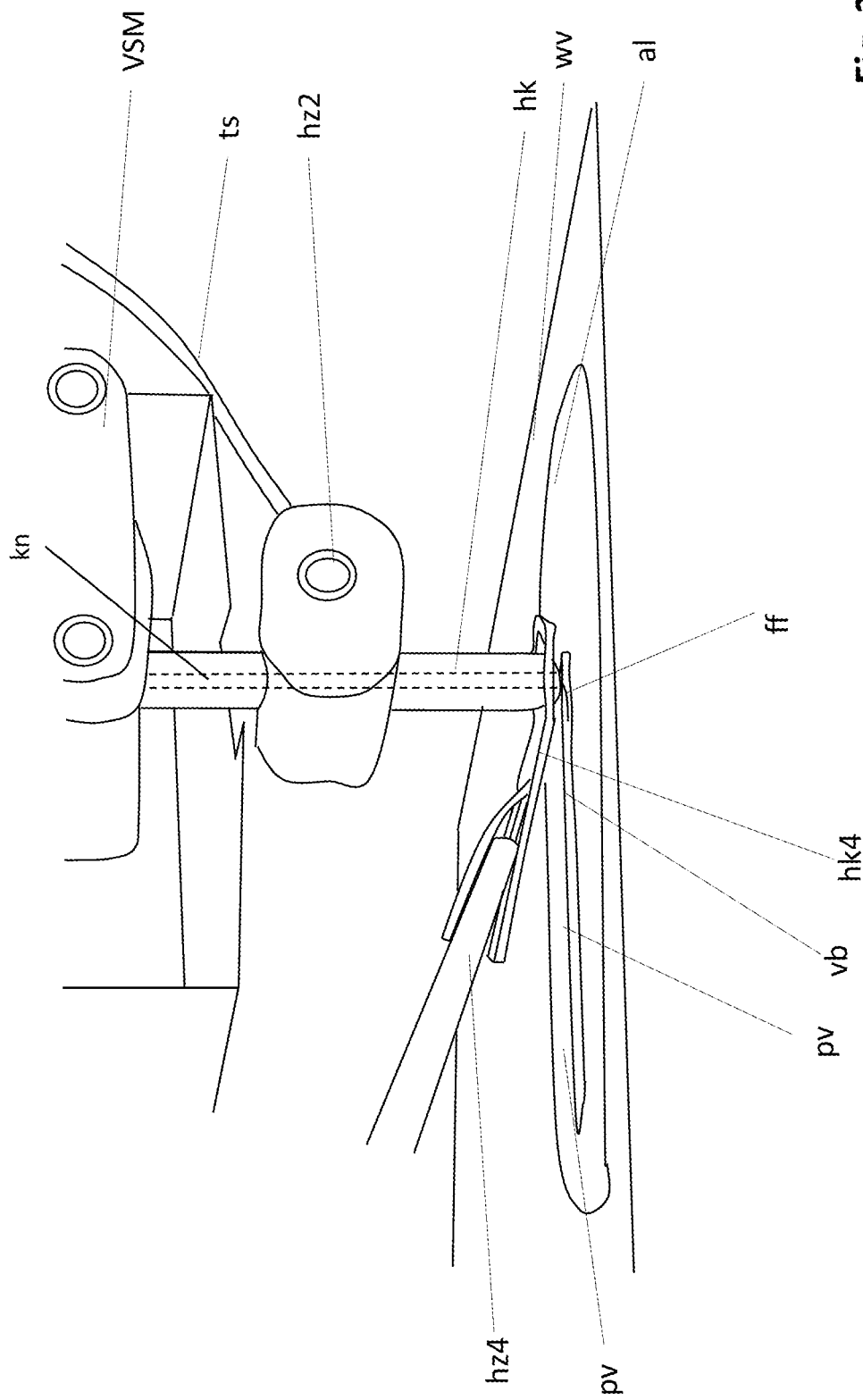
FIG. 23 is a drawing illustrating additional details of the example test setup of FIG. 21.
Figure 24:
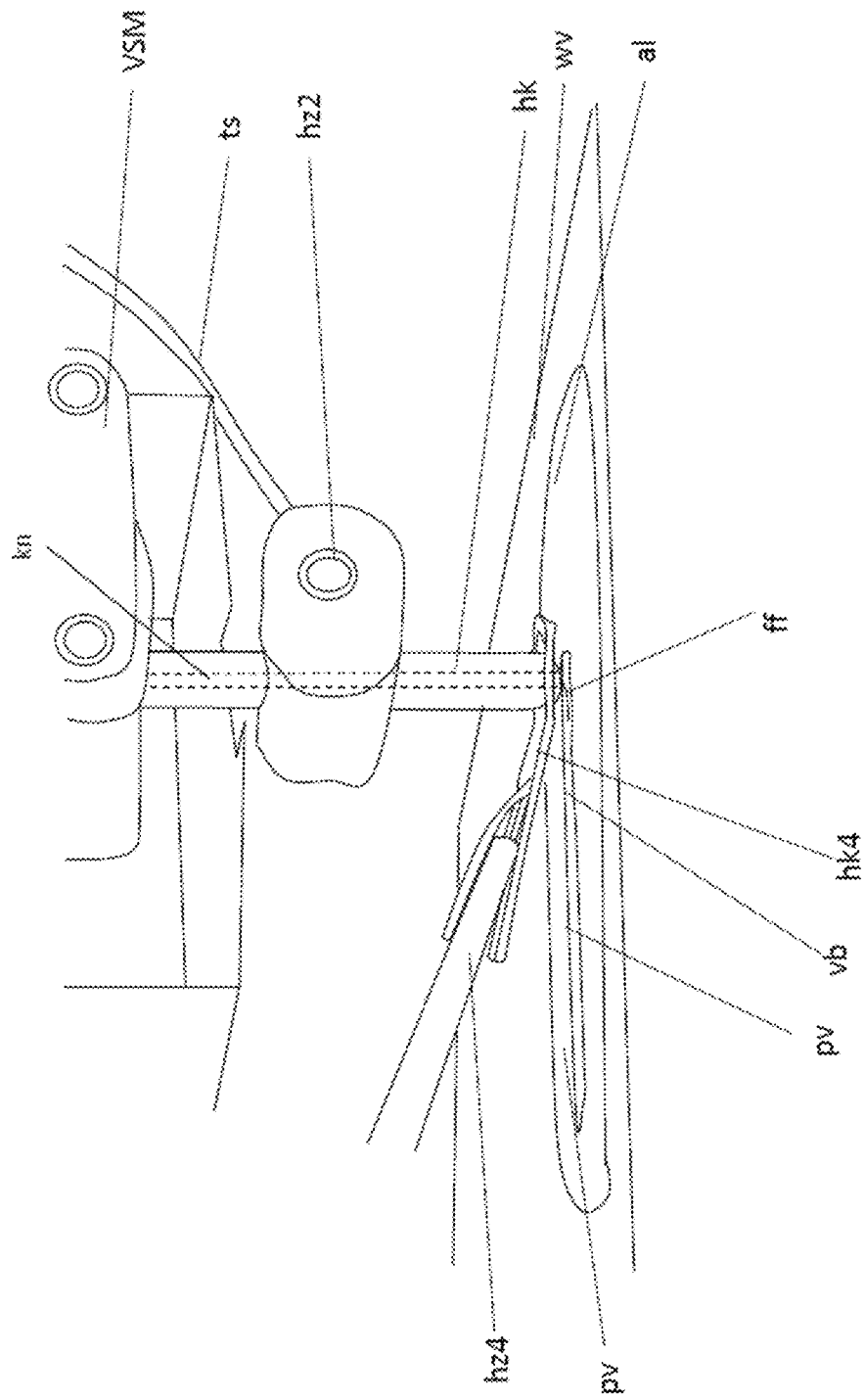
FIG. 24 is a rasterized photograph corresponding to the drawing of FIG. 23.

FIG. 23 and FIG. 24

Figure 25:
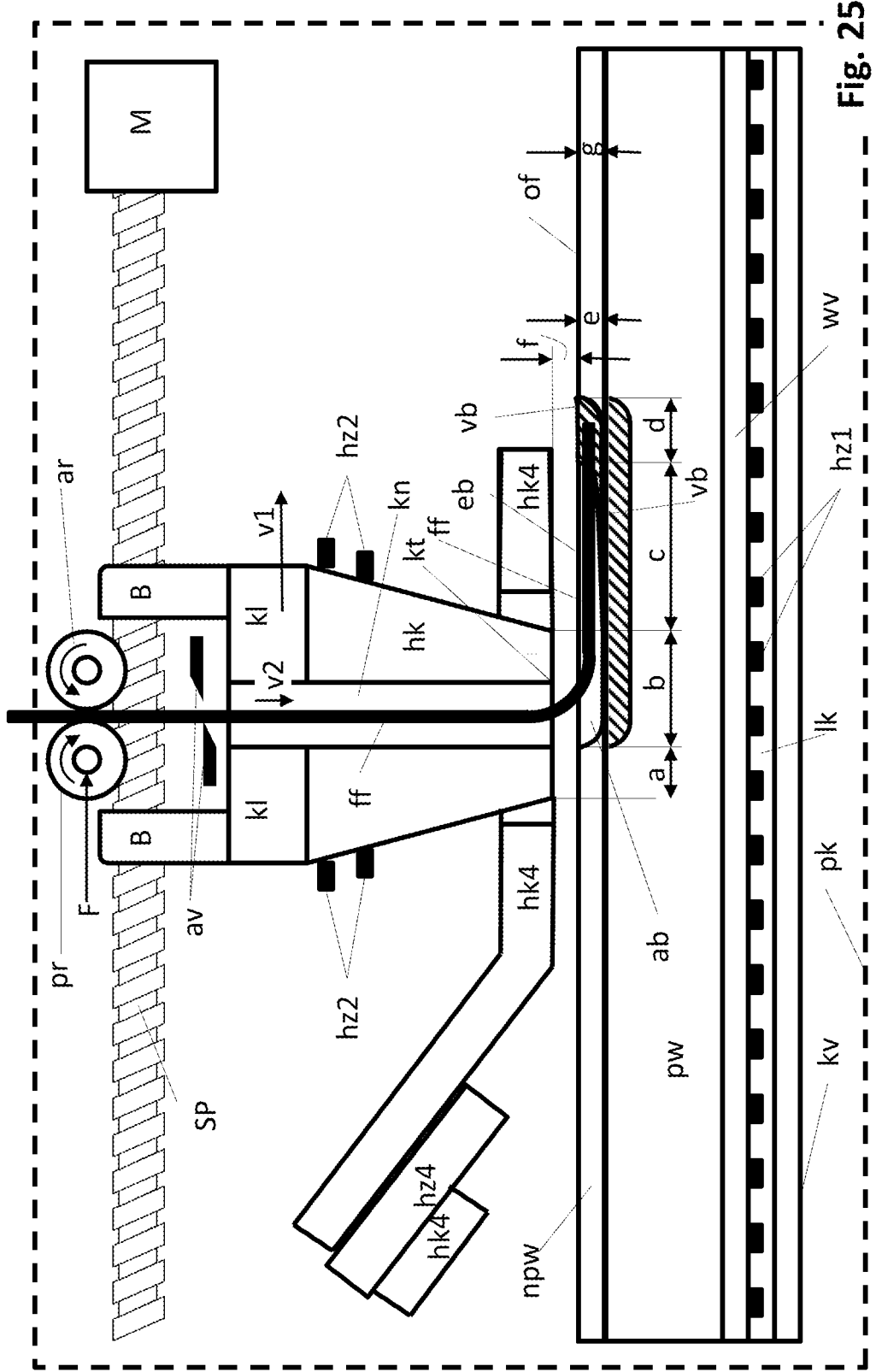
FIG. 25 corresponds to FIG. 14 with a modification to include a fourth heating device.

FIG. 23 and FIG. 24 show a detail of the device of FIGS. 21 and 22. FIG. 23 is a drawing whose contents correspond to the image of FIG. 24. The double representation in FIGS. 23 and 24 ensures that even if the reproduction of FIG. 24 is poor, the contents in FIG. 23 are still recognizable. FIG. 24 shows a detailed view of the device of FIGS. 21 and 22. A fourth, typically optional, heating element (hz4) can be seen. This is exemplarily formed as a ceramic rod, as is known from soldering irons. This fourth heating device heats a metal shoe, which is formed as a metal sheet comprising a hole, via a thermally conductive mechanical connecting sleeve which is plugged onto said ceramic rod. The metal sheet of the metal shoe is oriented substantially parallel to surface (of) of the layer (pv). A hole is made in the sheet metal of the metal shoe into which the heating device (hk) extends without touching the metal shoe. As a result, the metal shoe and the heating device (hk) are substantially thermally isolated from each other. In this case, the metal shoe serves as a fourth heating device (hk4) which, when the heating device (hk) moves at the first velocity (v1) parallel to the surface (of), generates a temperature profile at the swept points on the surface of the layer (pv). If necessary, the use of even more heating devices allows the realization of more complicated temperature profiles. The solidified area (vb), the additional aluminum foil (a1), the heat spreader (wv), the second heating element (hz2), the feed line for the thermocouple for measuring the temperature of the second heating element (hz2) and the stepper motor (VSM) for transporting the functional fiber (ff) in the direction of the surface (of) of the layer (pw) can be seen.
FIG. 25

FIG. 25 again corresponds essentially to FIG. 14. Now the fourth heating device (hk4) known from FIGS. 21 to 24 is sketched in as an example. The fourth heating device serves to shape the temperature profile when the heating device (hk) moves over the surface (of) of the layer (pw) at the first distance (f). The fourth heating device (hk4) is preferably fixedly connected to the mourning of the heating device (hk), so that it preferably remains permanently in the approximately same position relative to the heating device (hk).

FIG. 25 shows an example of the feed unit which transports the functional fiber (ff) in the direction of the surface (of) of the layer (pv). In this example, the feed unit in the form of the fiber feed device comprises a drive roller (ar) which is driven, for example, by a stepper motor (VSM). The axis of the drive roller is mounted in such a way that the drive roller (ar) does not change its position relative to the channel (kn) and the heating device (hk). Opposite the drive roller (ar) is a resiliently and rotatably mounted pressure roller (pr), which presses the functional fiber (ff) against the drive roller (ar) using a force F due to the resilient mounting. The drive roller (ar) preferably has grooves or teeth to maximize the friction between the functional fiber (ff) and the drive roller (ar).

An exemplary cutting and severing device (av) of the functional fiber insertion device (ft) cuts the functional fiber (ff) when the termination of the insertion process of a functional fiber section is necessary. The transport of the heater at the first speed (v1) in cooperation with the friction between the solidi tied area (vb) and the powder bed (pw, npw) pulls the residual section of the functional fiber remaining in the channel (kn) out of the channel. It should be noted that the residual piece of/the functional fiber (ff) in the channel (kn) experiences a frictional force on contact with the inner wall of the channel (kn) which is opposite to this. If the functional fiber section already embedded in the solidified area (vb) is too small, the friction between this solidified area (vb) and the powder bed (pw, npw) is not sufficient to overcompensate for this force and the solidified area (vb) starts to move and the remaining section of the functional fiber does not reliably leave the channel (kn) For this reason, a minimum length of the functional fiber (ff) must be embedded in the consolidated area before separation by the cutting and severing device (av) can take place.

The use of a further fourth heating device (hk4), which is tempered by the fourth heating element (hz4), is conceivable. Various factors can generate a temperature profile over time for a point on the surface of the powder (pw) (as workpiece (wst)) for carrying out the insertion process of the functional fiber (ff) at this point. A first factor may be the distance between the bottom of the fourth heating device (hk4) and the surface of the workpiece. A second factor may be the shaping on the underside of the fourth heating device (hk4). A third factor may be the choice of the first speed (v1). Other factors such as ventilation or the temperature of the process chamber (pk) can also influence the temperature profile.

Figure 26:
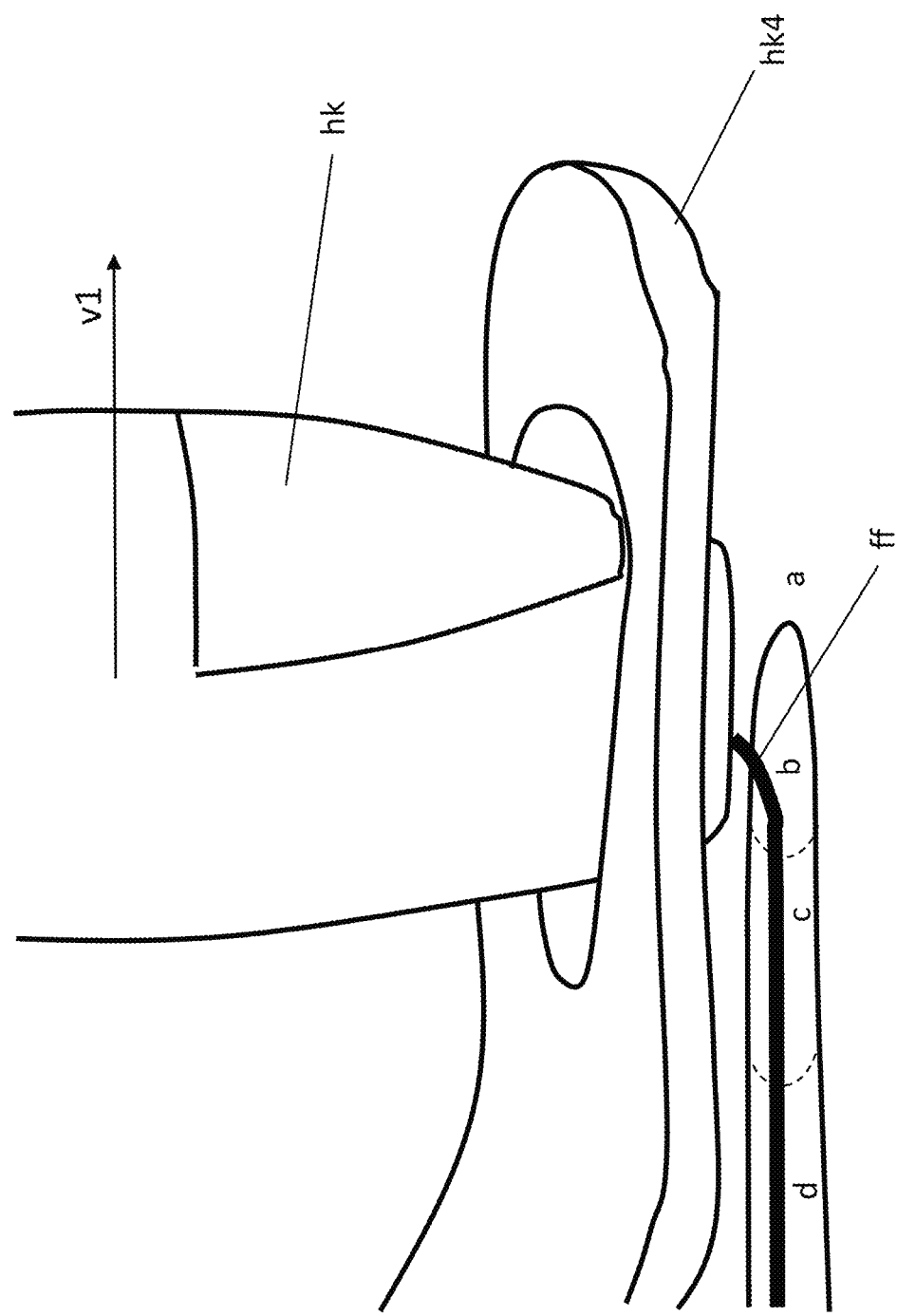
FIG. 26 is a drawing illustrating an insertion of a functional fiber into a melted area.
Figure 27:
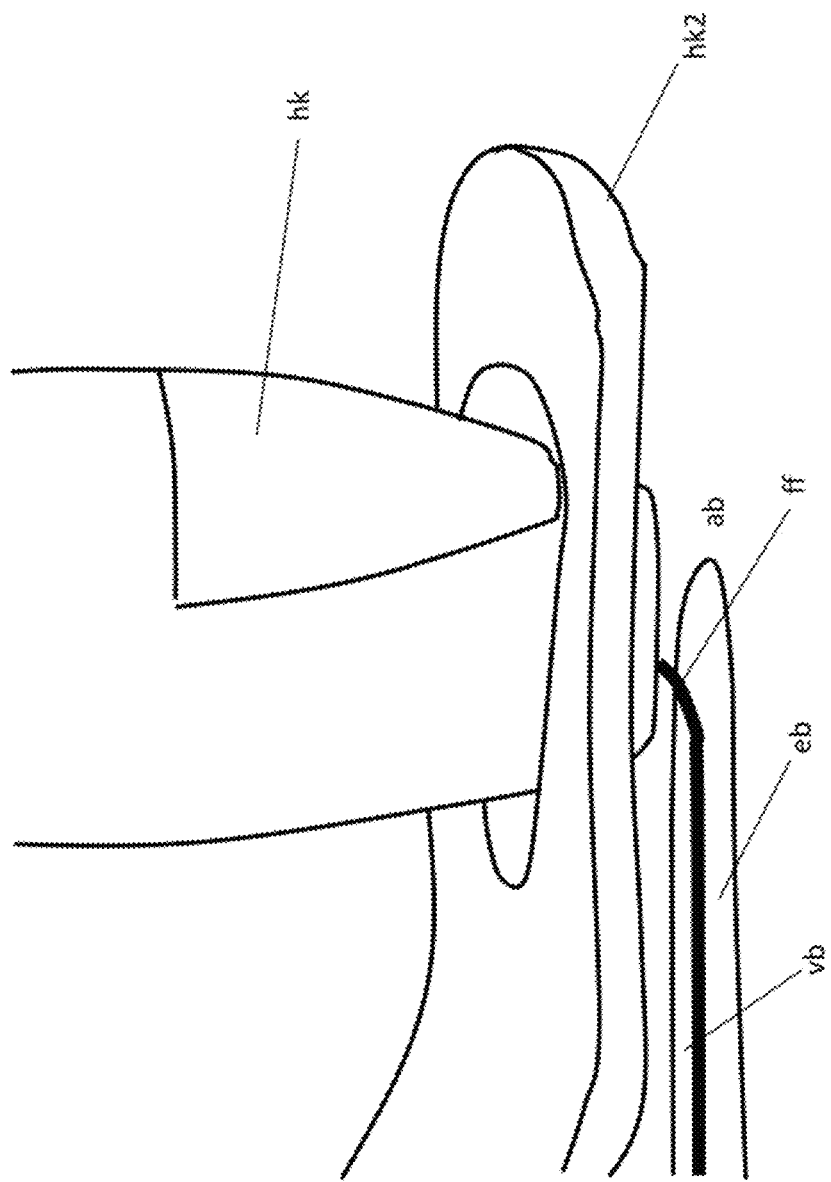
FIG. 27 is a rasterized photograph corresponding to the drawing of FIG. 26.

FIGS. 26 and 27

FIGS. 26 and 27 show the insertion of a functional fiber (ff) coming from the channel (kn) of a heating device (hk) into a melted area, the melting region (b). FIG. 27 shows the rasterized photograph of the insertion of a functional fiber (ff) from the heating device (Ilk) into a melting region. FIG. 26 shows a corresponding simplified and schematic drawing. Since the area immediately below the heating device (hk) hovers very closely above the surface (of) the layer (pv) (or workpiece (wst)), this area is difficult to illuminate, which is why the image is very bright.

In this picture, the functional fiber (ff) can be seen exiting the channel (kn). FIG. 26 and FIG. 27 show the solidifying area (eb) and the solidified area (vb) as well as a not yet melted reheating area (ab).

FIG. 28

Figure 28:
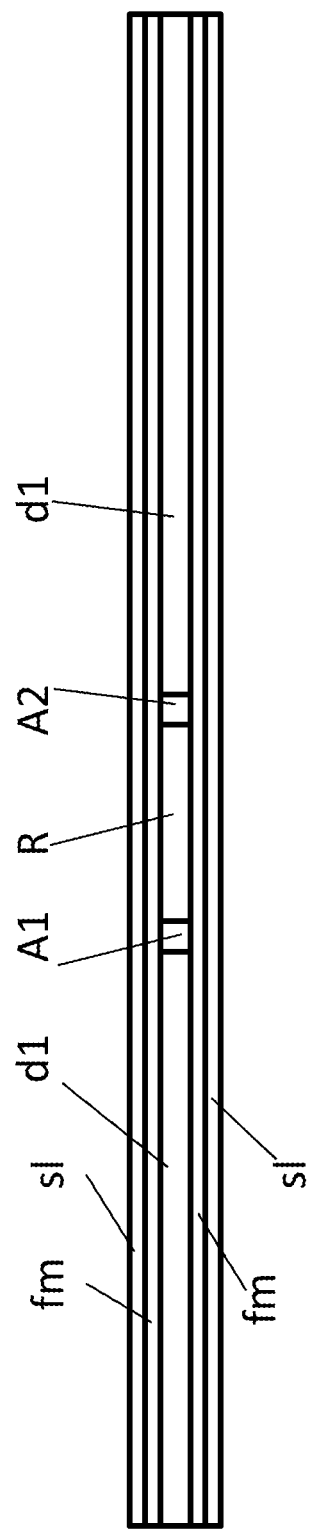
FIG. 28 illustrates an example electrical functional fiber.

FIG. 28 shows an exemplary electrical functional fiber (ff). An exemplary first weld or solder joint electrically and mechanically connects a first wire (d1) to a first terminal (A1) of a resistor (R). An exemplary second weld or solder joint electrically and mechanically connects a second wire (d2) to a second terminal (A2) of a resistor (R). A filler material (fm) surrounds this sub-device. This construction is then located in a tube (s1). The previously presented methods and devices can, for example, embed this tube (s1) in the material of the surface (of) of the workpiece (wst) during additive manufacturing. Instead of the resistor, it may also be, for example, another electronic component or microelectronic integrated circuit, etc., that the relevant processes or devices embed. A multicore cable may also replace the first wire and/or the second wire, if necessary, when stranded wires are used. Insulation materials preferably electrically insulate the cores of such a multicore cable from each other. As insulation, the cores are preferably covered using glass fabric in order to be able to withstand the heating during the insertion process.

FIG. 29

Figure 29:
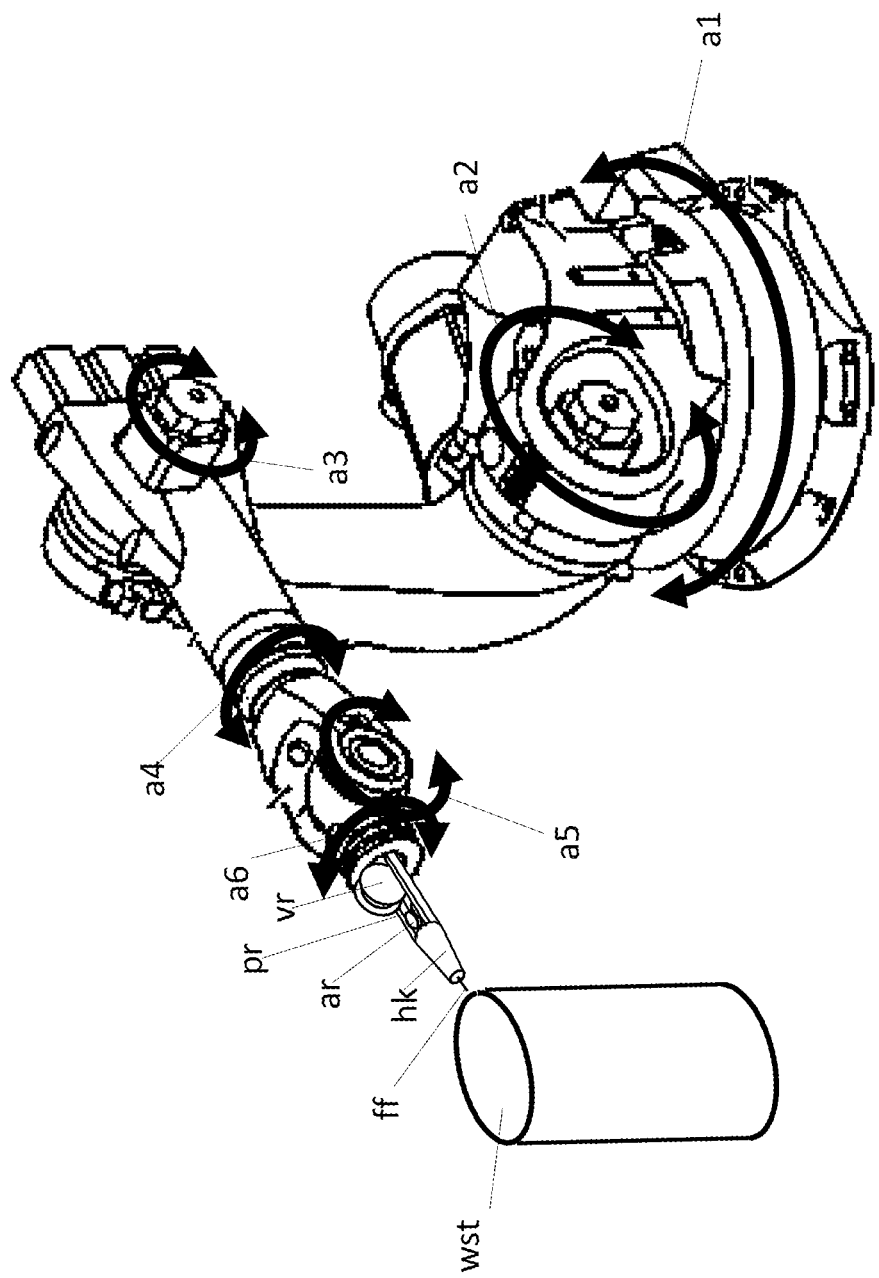
FIG. 29 illustrates an example robot for positioning a heating device with a functional fiber feed device.

FIG. 29 shows a robot having six degrees of freedom (a1 to ab) for positioning the heating device (hk) with the functional fiber feed device comprising the pressure roller (pr) and the drive roller (ar). The motors, cutting device, etc., are not shown for simplicity. Preferably, a motor unwinds the functional fiber (ff) from a supply roll (vr). The functional fiber feed device threads the functional fiber into a subsequent section of the channel (kn). Preferably, a workpiece heater (not shown) preheats the workpiece (wst). The functional fiber insertion device (ft) inserts the functional fiber (ff) into the surface (of) of the workpiece (wst) by locally selectively inciting the surface (of) in this example. The infrared radiation emitted front the heating device (hk) invokes this locally selective melting of the surface (of) of the workpiece (wst) in this example. Except for the more complex positioning device in the form of a robot, the situation corresponds to that of FIG. 14. In FIG. 29, the powder of the powder bed is removed in this example. Preferably, the workpiece (wst) is a result of additive manufacturing. After inserting the functional fibers (ff), the robot can change the tool for inserting the functional fibers (ff) to an extruder tool comprising, for example, an extruder and a filament. The robot can then apply the next layer of filament material to the workpiece (wst). Subsequently, the robot can again change the extruder tool against the tool for inserting the functional fibers (ff) and insert the next layer of functional fibers (ff) into the newly applied layer, and so on.

FIG. 30

Figure 30:
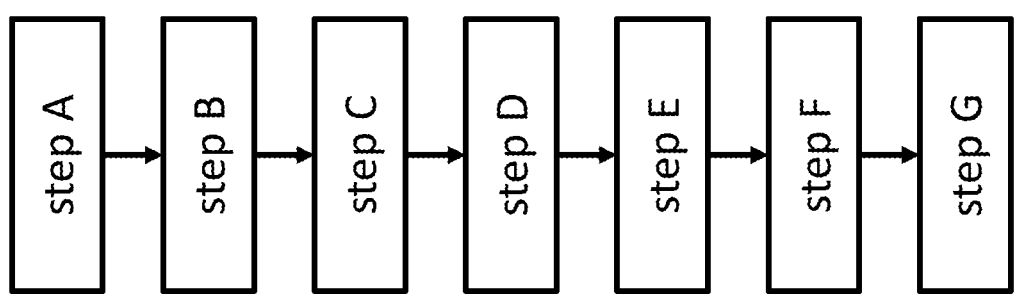
FIG. 30 is a block diagram of an example process for producing a three-dimensional device including embedding a functional fiber.

FIG. 30 shows an exemplary variant of a process for producing a three-dimensional device, in particular for additive manufacturing. FIG. 30 shows the exemplary step sequence for embedding a functional fiber section in the surface (of) of a workpiece (wst) and/or the surface (OF) of a layer (pw, npw) The layer (pw, npw) and/or the workpiece are made of a first material The exemplary method comprises the steps Step A: Providing a surface (of) of a first material, in particular the surface of a workpiece (wst) and/or a layer (pw).

Step B: Heating the heating device (hk) to a second process temperature ($\vartheta_2$), wherein the heating device (hk) can consist of several heating devices (hk1, hk2), which can have different second process temperatures ($\vartheta_{2a}$, $\vartheta_{2b}$).

Step C: Heating of the material in the area of the heating device (hk) in a warm-up area (a, b).
- by infrared radiation of the heating device (hk) and/or
- by heat transfer by convection from the heating device (hk) to the surface (on and/or
- by direct mechanical contact between heating device (hk) and surface (of) and/or
- by heat transfer by means of a heat conducting device, in particular a functional fiber, from the heating device (hk) to the surface (of).

A positioning device changes the position of the heating device (hk) by transporting the functional fiber insertion device (ft) along the surface (of) at a first distance (f) from the surface (of) at a first speed (v1). For curved surfaces (of) of a workpiece (wst), a multi-axis positioning device (see FIG. 29), for example a robot, can be used.

Step D: Melting a portion of the material in the warm-up area (a, b) in a melting region (b) within the warm-up area (a, b) as a result of the heating in step C to molten material;

Step E: Inserting a functional fiber section of a functional fiber (ff) into the melting region (b).

Step F: Terminating the melting by reducing the energy transfer from the heating device (hk) to the surface (of) and by lowering the temperature of the melting region (b), the resulting lowering of the temperature of the melting region (b) converting the melting region (b) to a solidificating region (c):

Step G: Solidifying the niched material into solidified material in the solidificating region (c), wherein the solidification converts the solidificating region (c) into a solidificated region (d) in which, for example, the functional fiber insertion device (ft) has at least partially inserted the relevant functional fiber portion of the functional fiber (ff).

FIG. 31

Figure 31:
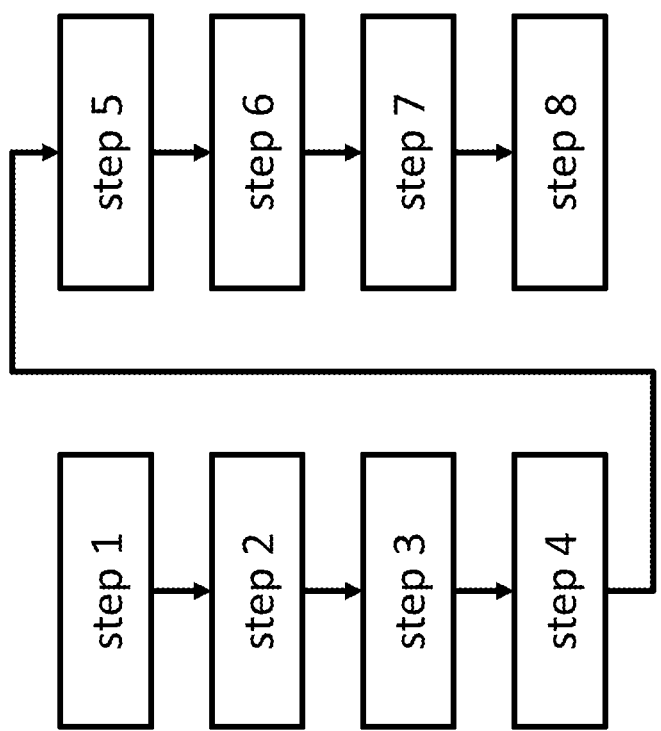
FIG. 31 is a block diagram of an example process for producing a three-dimensional device including use of a powder bed.

FIG. 31 shows the exemplary step sequence of a further proposed process for the production of a three-dimensional device, in particular for additive manufacturing. The process focuses on the use of a powder bed without limiting the applicability of the process to it. This process version comprises the steps Step 1 Providing a heat spreader (wv) comprising a planar surface (of);

Step 2 Applying a layer (pw) of a material on the surface (of) with formation of a new surface (ofn) parallel to the surface;

Step 3 Approaching a heating device (hk) to the new surface (ofn);

Step 4 Heating the heating device (hk) to a second process temperature ($\vartheta_2$), wherein the heating can also take place temporally before or temporally after the heating device (hk) is brought close to the surface (of) and wherein the heating device (hk) can consist of several heating devices (hk1, hk2) hating different second process temperatures ($\vartheta_{2a}$, $\vartheta_{2b}$):

Step 5 Heating the material in the area of the heating device (hk) in a warm-up area (a, b).
- by infrared radiation of the heating device (hk) and/or
- by heat transfer by correction from the heating device (hk) to the new surface (ofn) and/or
- by direct mechanical contact between heating device (hk) and new surface (ofn) and/or
- by heat transport by means of a heat-conducting device, in particular a functional fiber, from the heating device (hk) to the new surface (ofn):

Step 6 Melting a portion of the material in the warm-up area (a, b) in a melting region (b) within the warm-up area (a, b) as a result of the heating in step 5 to molten material:

Step 7

Stop melting by lowering the temperature of the melting area below the melting point. This can take place
- by finally transporting the heating device (hk) away from the new surface (ofn) and/or
- by lowering the temperature of the heating device (hk) below the second process temperature ($\vartheta_2$), the lowering of the temperature of the heating device (hk) below the second process temperature ($\vartheta_2$) in each case convening the melting region (b) into a solidificating region (c).

Step 8: After the temperature in the melting region (b) has been lowered, the molten material solidifies to form solidified material in the solidificating region (c). The solidification of the melt fixes the functional fiber (ff) which, for example, the functional fiber insertion device (ft) may have previously inserted into the melt in the melting region (b).

FIG. 32

Figure 32:
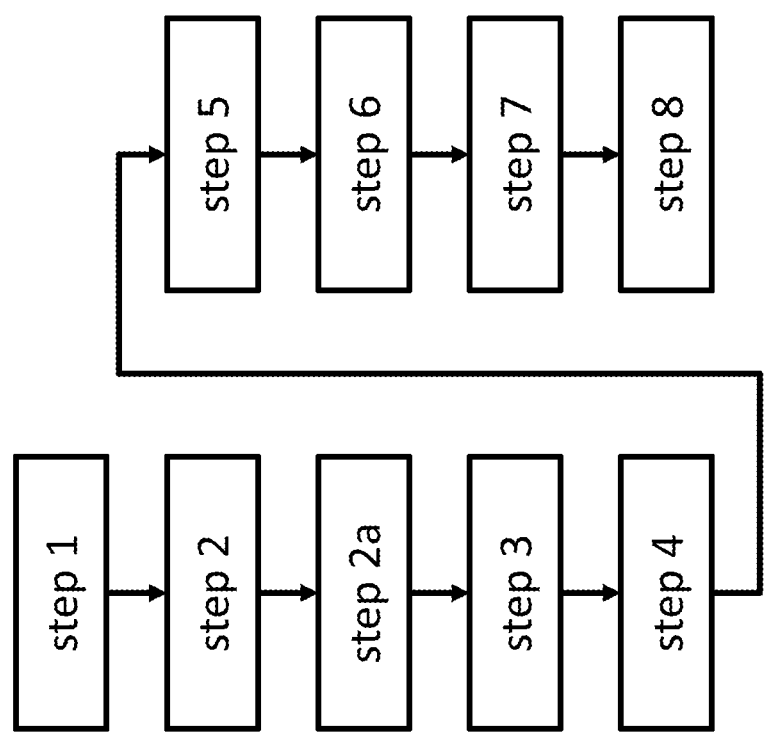
FIG. 32 is a block diagram of an example process for producing a three-dimensional device including use of a powder bed and application of a sintering or melting step.

FIG. 32 shows the exemplary step sequence of a further proposed process for the production of a three-dimensional device, in particular additive manufacturing. The process focuses on the use of a powder bed without limiting the applicability of the process to this. In contrast to the process of FIG. 31, the process version now discussed comprises an inserted sintering or melting step (step 2a). This process version comprises the steps Step 1: Providing a heat spreader (wv) comprising a planar surface (of):

Step 2: Applying a layer (pw) of a material on the surface (of) with formation of a new surface (ofn) parallel to the surface:

Step 2a Selective sintering or melting of the material of the layer by means of a process of selective sintering and/or melting, in particular selective laser sintering and/or selective heat sintering, to sintered material;

Step 3 Approaching a heating device (hk) to the new surface (ofn);

Step 4 Heating the heating device (hk) to a second process temperature ($\vartheta_2$), wherein in particular the heating element (hz) can also heat the heating device (hk) temporally bet re or temporally after the heating device (hk) is brought to the surface (of). Furthermore, the heating device (hk) can also comprise several heating devices (hk1, hk2) comprising different heating devices and having different second process temperatures ($\vartheta_{2a}$, $\vartheta_{2b}$);

Step 5 Heating of the sintered material in the region of the heating device (hk) in a heating region (a) by infrared radiation of the heating device (hk) and/or heat transport by convection from the heating device (hk) to the new surface (ofn) and/or by direct mechanical contact between the heating device (hk) and the new surface (ofn) and/or heat transport by means of a heat conducting device, in particular a functional fiber, from the heating device (hk) to the new surface (ofn):

Step 6 Melting a portion of the sintered material in the reheating area in a reheating area within the reheating area as a result of the reheating in step 5 to molten material:

Step 7 Stop melting by finally moving the heating device (hk) away from the new surface (ofn) and/or by lowering the temperature of the heating device (hk) below the process temperature, wherein lowering the temperature of the heating device (hk) below the process temperature converts the melting region (b) to a cooling region, respectively;

Step 8 Solidifying the molten material to solidified material in the cooling area.

FIG. 33

Figure 33:
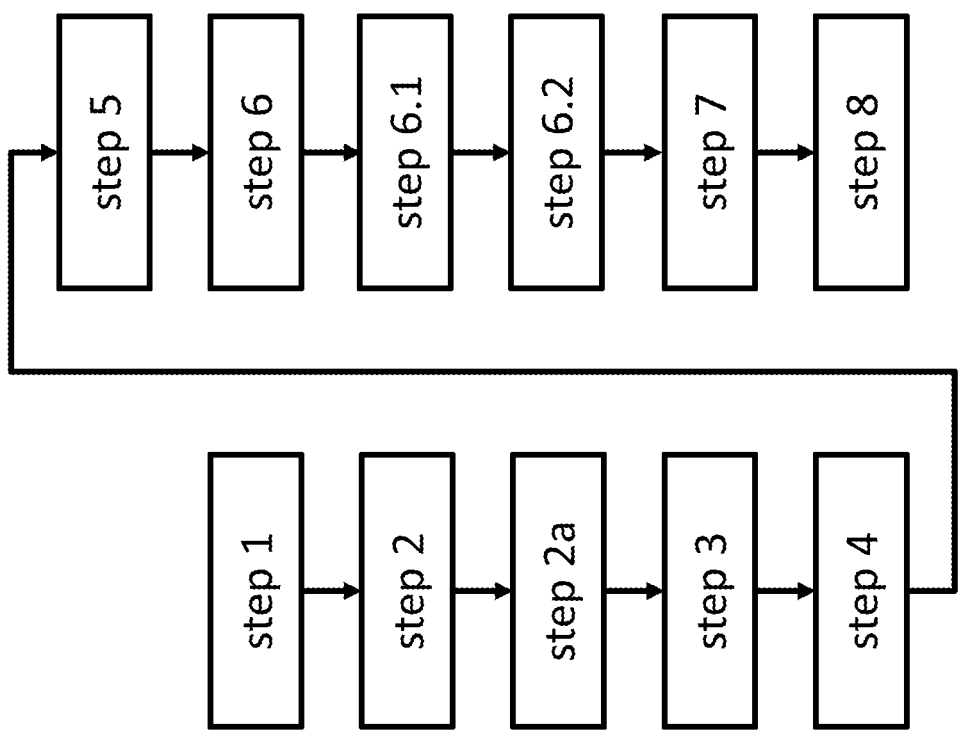
FIG. 33 is a block diagram of an example modified process based on the example process of FIG. 32.

FIG. 33 illustrates an example of a modified method based on the method of FIG. 32. It preferably comprises the additional steps of As step 6.1 the method comprises the additional translational displacement of the heating device (hk) during the melting of a part of the material or sintered material. This translational displacement takes place having a first velocity (v1) parallel to new surface (ofn). Due to this translators displacement, at least a part of the melted material then leaves the warm-up area (a, b) and through this leaving then enters a cooling area (c, d).

As step 6.2, the resulting temperature reduction of the melt then results in solidification of this molten material to solidified material in this cooling region.

The insertion of these steps corresponds to a transition from FIG. 2 to FIG. 9.

FIG. 34

Figure 34:
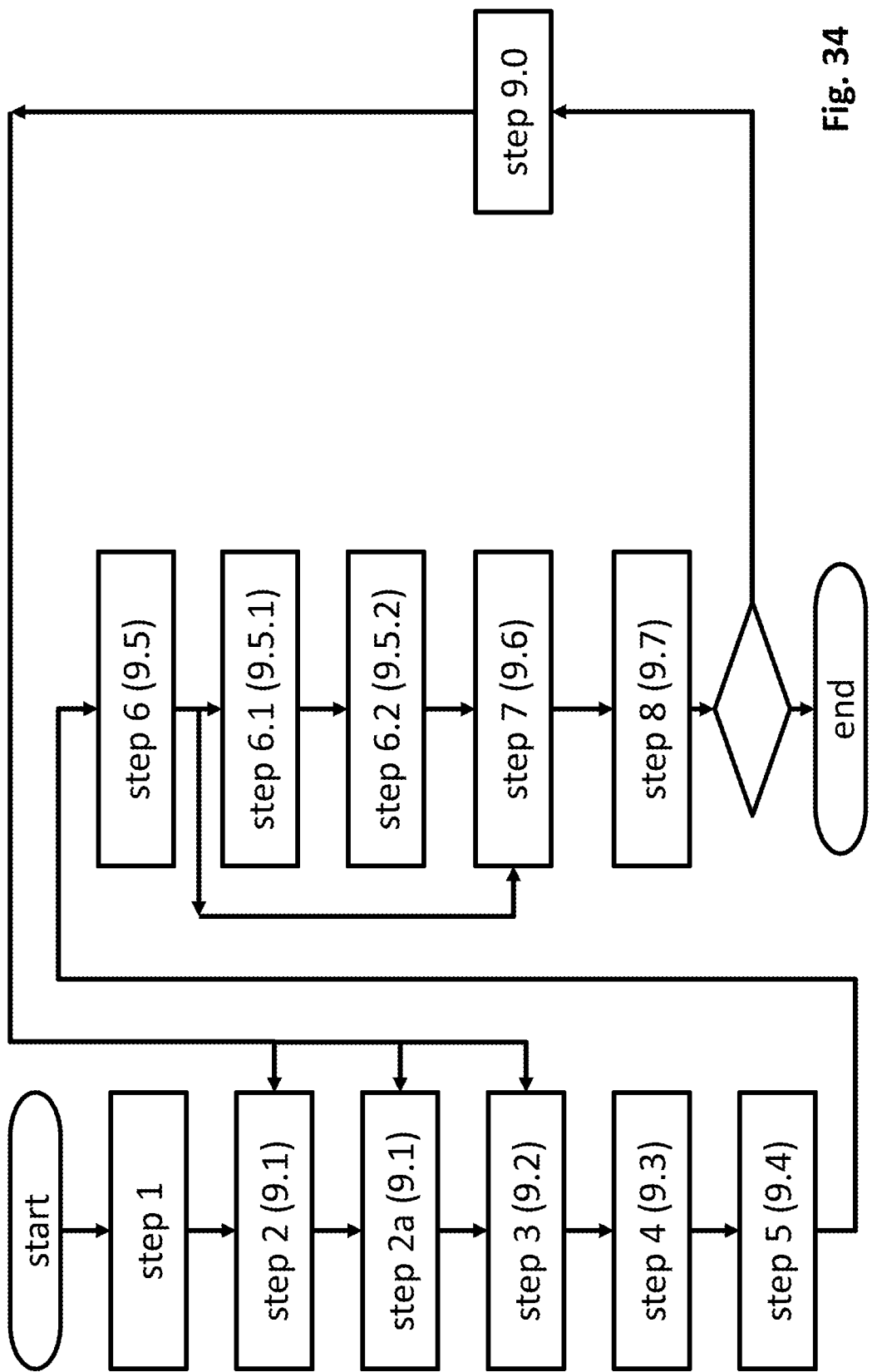
FIG. 34 is a block diagram of an example step sequence for additive manufacturing of a three-dimensional device.

FIG. 34 shows the exemplary step sequence of a further proposed process for manufacturing a three-dimensional device, in particular for additive manufacturing. The process focuses on the repetition of the various process steps for subsequent powder coatings without limiting the applicability of the process to this. In contrast to the process of FIG. 32, the process now performs most of the steps multiple times. In particular, the process applies multiple layers if necessary. This version of the process includes the steps after the end of the melting process (step 7):

Step 9.0 Using the new surface (ofn) as the surface (of) of the heat spreader for subsequent steps in time;

Step 9.1 Re-performing step 2 if the process is to stars a new layer, and/or step 2a if the process is to process only a different area of the surface lot) of the layer (pw);

Step 9.2 If necessary, performing step 3 again if the process is to treat a different area of the surface (of) of the layer (pw);

Step 9.3 Performing step 4 again;

Step 9.4 PerIbrming step 5 again;

Step 9.5 Performing step 6 again;

Step 9.5.1 If necessary, performing step 6.1 again;

Step 9.5.2 If necessary, performing step 6.2 again. This step is omitted if the process is only to melt a point-shaped area;

Step 9.6 If necessary, performing step 7 again. This step is omitted if the process is only to melt a point-shaped area;

Step 9.7 Performing step 8 again;

Step 9.8 If necessary, performing steps 9.0 to 9.8 again and/or performing steps 9.1 to 9.8 (new layer) again and/or performing steps 9.3 to 9.8 again (new functional fiber/new fusion zone).

FIG. 35

Figure 35:
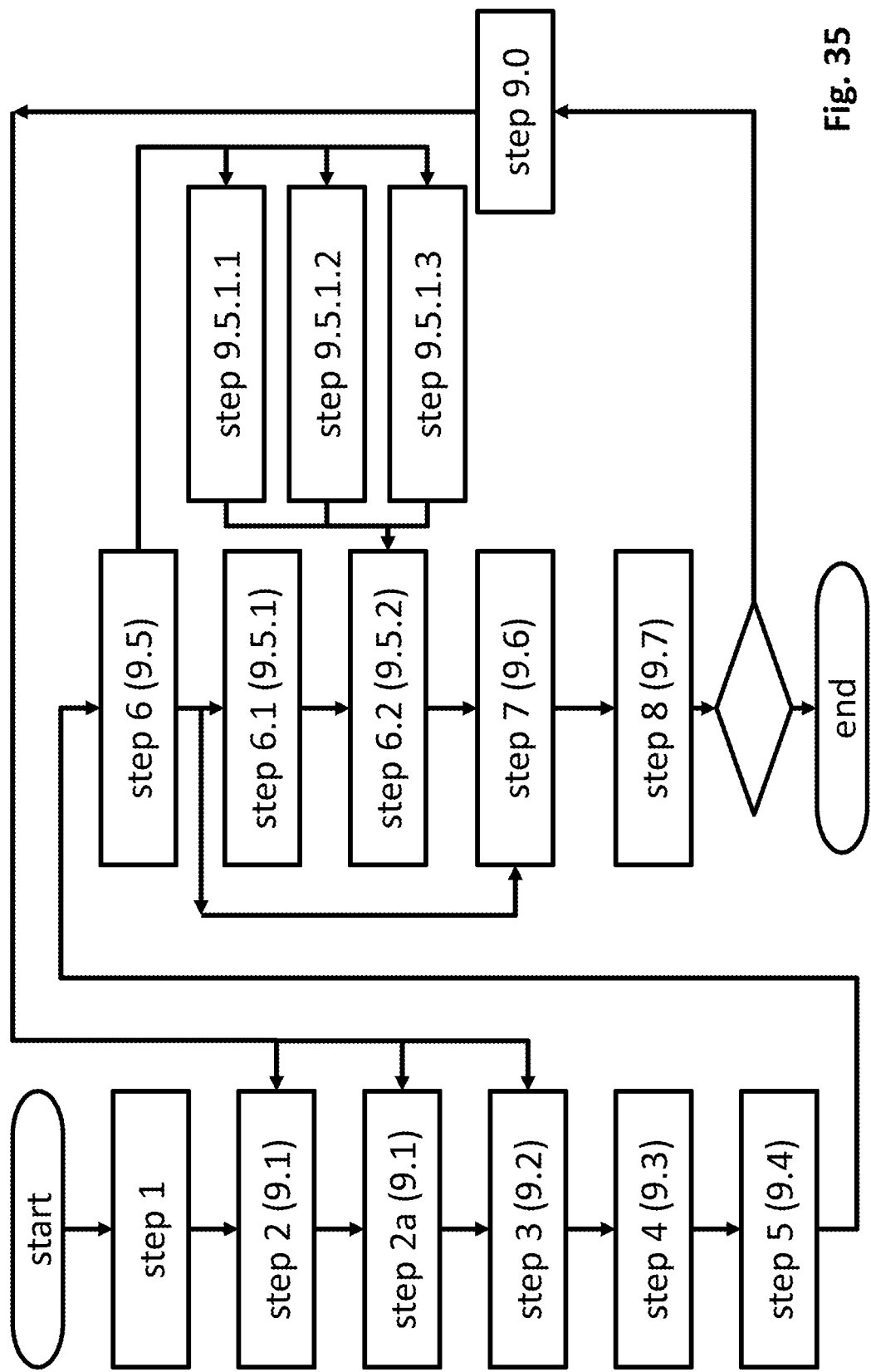
FIG. 35 corresponds to the example step sequence of FIG. 34 wherein substeps are added for inserting function fiber.

FIG. 35 corresponds largely to FIG. 34. In addition to the steps of FIG. 34, two substeps of step 9.5.1 now take place during step 9.5.1. The first substep of step 9.5.1 is step 9.5.1.1 of feeding a functional fiber (ff). The second sub-step of the step 9.5.1 is the step 9.5.1.2 of inserting the functional fiber (ff) into the inched material in the melting region (b). These two substeps are synchronous with the translatory feed of the heating device (hk) at the first speed (v1). This preferably occurs, among other things, for example in a third substep of step 9.5.1, the step 9.5.1.3. In step 9.5.1.3, the functional fiber feeding device transports the functional fiber (ff) in the direction of the workpiece (wst) in time parallel to step 9.5.1.1 during step 9.5.1. The feed preferably has a second speed (v2), which is essentially the same as the first speed (v1).

Preferably, the heating device (hk) brings the functional fiber (In to a third process temperature ($\vartheta_1$) before it is inserted into the melt of the melting region (b), which prevents the melt from solidifying at the insertion point (ep) due to the insertion of the functional fiber (ff) which typically has a different temperature.

FIG. 36

The functional fiber insertion device (ft) can use the functional fiber (ff) as a thermal conduction device. This is the case when the amount of thermal energy conducted through the functional fiber (ff) is greater than the amount of energy that melting the first material of the layer (pw) extracts from the functional fiber (ff). It is then possible to melt a hole in the first material of the layer (pw) with the functional fiber (ff) and insert the functional fiber (ff) vertically. If the controller of the computing and control system of the device throttles the energy supply for the heating device (hk) and thus for the functional fiber (ff), the melt solidifies in the melting region (b) and the functional fiber (ff) is inserted vertically into the surface (of) of the workpiece (wst). It should be noted here that such vertical insertion into the surface can lead to problems if the process used employs a squeegee (rk). When using the functional fiber (ff) as a heat conducting device, the functional fiber insertion device (ft) can thus insert the functional fiber an vertically and horizontally into the melt in the melting region (b).

FIG. 37

FIG. 17 corresponds largely to FIG. 35 In addition, the process now comprises the optional step 9.7.1 of severing, in particular mechanical severing, of the functional fiber (ff), in particular using a cutting and severing device (av), in such a way that a part of the functional fiber (ff) inserted into the molten material in step 9.5.1.2 remains in the material now solidified after step 9.7.

FIG. 38

Figure 38:
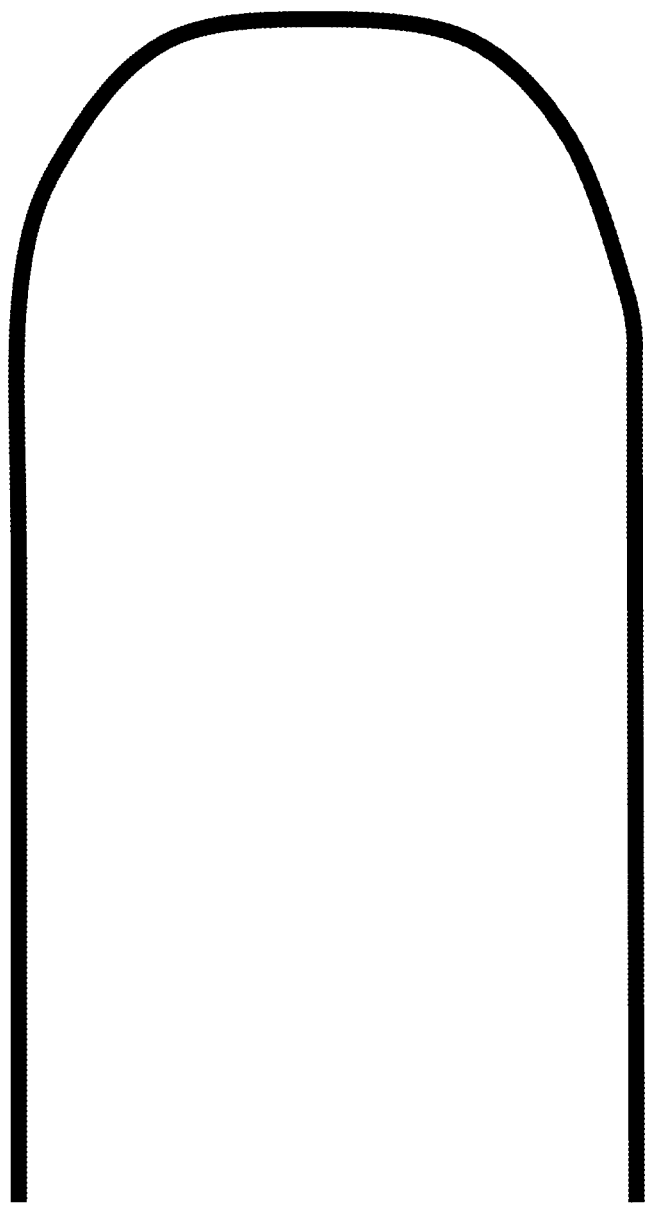
FIG. 38 is a top view illustrating insertion of a u-shaped function fiber.

FIG. 38 shows an exemplary top view of how the functional fiber insertion device (ft) can insert a functional fiber (ff), which here is to be an electrical cable, for example, in a U-shape. The U-shape is interesting for current sensing. When an electric current is applied to the electrically conductive functional fiber, a magnetic field is generated. In some applications, it may be necessary to locally amplify the magnetic field to be generated. For this purpose, the functional fiber insertion device (ft) can insert the functional fiber (ff) into the molten material in the melting region (b) during insertion of the functional fiber (ff) in such a way that, after solidification of the melt, it has a non-zero curvature having a curvature axis in at least one region. The functional fiber insertion device inserts the functional fiber using this non-zero curvature into the surface of the workpiece during step 9.5.1 or during step 6. In this way, 3D priming devices according to the proposal can manufacture electrical coils, i.e. inductors and the like. Particularly preferably, in the case of electrical inductors, these are flat coils. Preferably, individual planes of the flat coils have the shape of a logarithmic spiral. Preferably, several flat coils of different planes (slices) are electrically connected to each other, so that they form an electrical series connection of these flat coils.

FIG. 39

Figure 39:
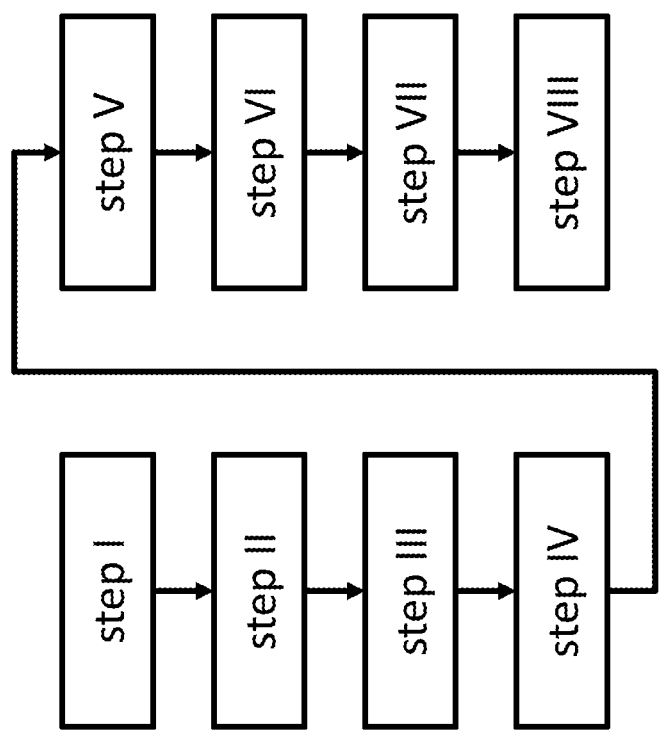
FIG. 39 is a block diagram of an example process for inserting a functional fiber into an existing workpiece.

FIG. 39 illustrates another exemplary process (FIG. 39). Instead of manufacturing the workpiece, inserting the functional fiber at into the surface (of) of the workpiece (wst) now modifies a workpiece (wst). Therefore, this is a method for modifying a three-dimensional device, especially for additive manufacturing of composite materials. It comprises the steps:

Step I Providing a workpiece (pw) made of a first material and a surface (ofn):

Step II Transporting a heating device (hk) to the surface (ofn):

Step III Heating of the first material of the workpiece (pw) on the surface (ofn) in the area of the heating device (hk) in a heating region (a). This can be done in particular
- by electromagnetic radiation which the heating device (hk) emits e.g. as infrared radiation (FIG. 2) or as laser radiation (FIG. 19) or which the heating device (hk), which is then preferably transparent to this electromagnetic radiation, transmits through itself, and/or
- by heat transfer by convection from the heating device (hk) to the surface (ofn) of the workpiece (pw) and/or
- by direct mechanical contact between the heating device (hk) and the surface (ofn) of the workpiece (pw) and/or
- by heat transfer by means of a heat conducting device, in particular a functional fiber, from the heating device (hk) to the surface (ofn) of the workpiece;

Step IV Melting a portion of the first material in the heating region in a melting region (b) within the heating region (ab) as a result of the heating in step III to form melted first material;

Step V Displacing the heating device (hk) during melting of a part of the first material.
- where this displacement occurs at a first velocity (v1) parallel to the contour of the surface (ofn) and
- wherein, in particular, this displacement can be a change in the position and/or orientation of the heating device using rotational and/or translational degrees of freedom, and
- transporting a functional fiber (ff) during translational displacement and
- inserting the functional fiber (ff) into the melted first material in the melting area, and
- whereby this displacement causes at least part of the melted first material comprising the inserted functional fiber (ff) to leave the heating region and enter a cooling region created by displacement. FIG. 29 sketches the mechanical device for this purpose.

Step VI Solidifying of this melted first material to solidified first material in this cooling region created by displacement.

Step VII Terminating the melting process, in particular
- by lowering the intensity of the electromagnetic radiation emitted by the heating device (hk) or transmitted through it by the heating device, and/or
- by reducing the heat transfer by correction from the heating device (hk) to the surface (ofn) of the workpiece (pw) and/or
- by ending the direct mechanical contact between the heating device (hk) and the surface (ofn) of the workpiece (pw) and/or
- by terminating or reducing the heat transport by means of a heat conducting device, in particular a functional fiber (ff), from the heating device (hk) to the surface (ofn) of the workpiece.

wherein the termination of melting in each case converts the melting region to a cooling region:

Step VIII Solidificating the melted first material to solidified first material in the cooling area.

FIG. 40

Figure 40:
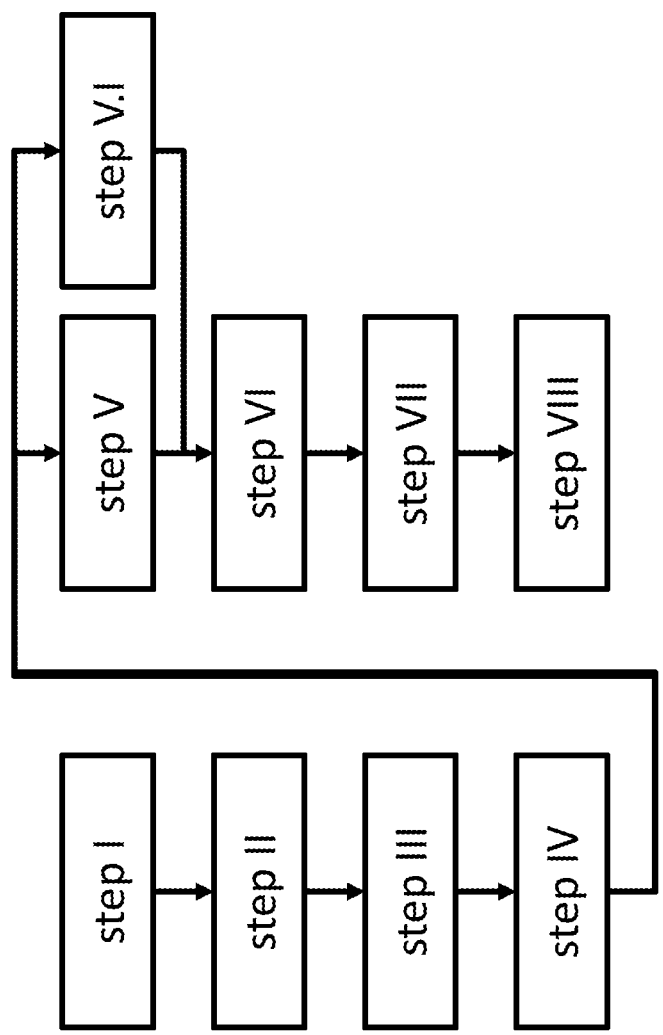
FIG. 40 corresponds to FIG. 39 whereby a step V.I of the transport of the functional fiber takes place temporally parallel to step V at a second speed during step V.

FIG. 40 corresponds in content to FIG. 39, whereby a step V.I of the transport of the functional fiber (ff) takes place temporally parallel to step V at a second speed (v2) during step V. The second speed (v2) is typically substantially equal to the first speed (v1). The second speed (v2) is typically substantially equal to the first speed (v1).

FIG. 41

Figure 41:
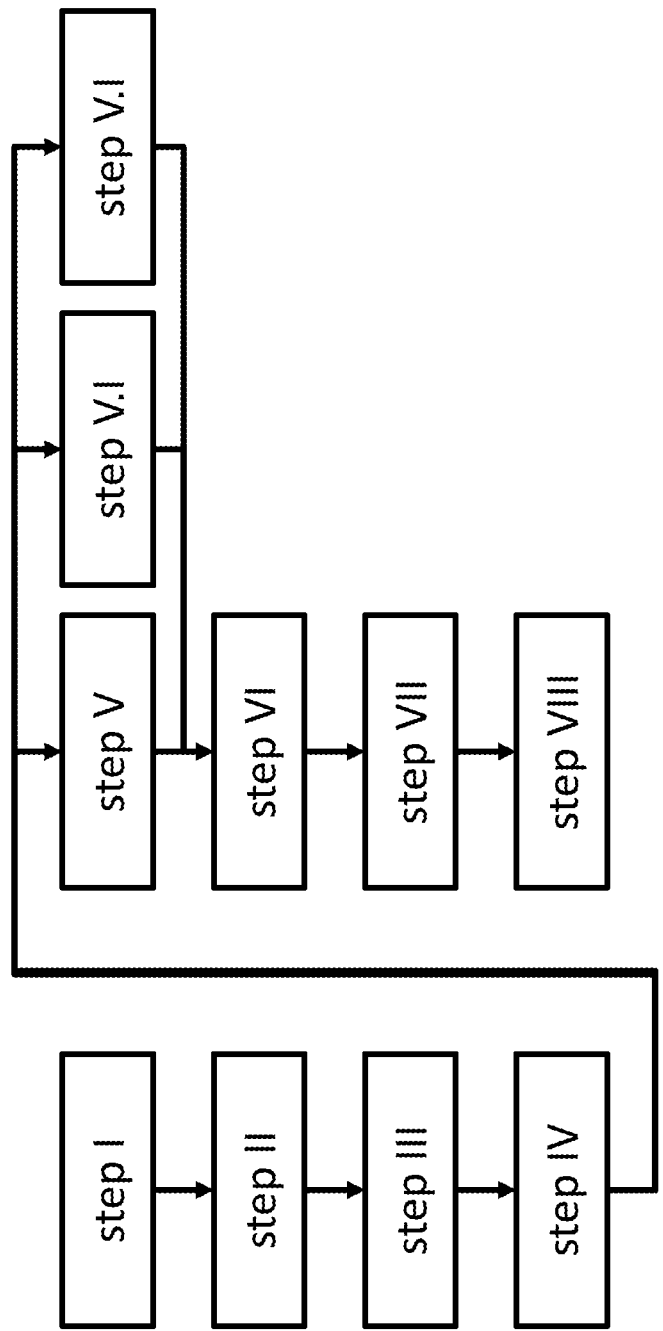
FIG. 41 corresponds to FIG. 40, further comprising a step V.II of cutting and severing.

FIG. 41 corresponds in content to FIG. 40, wherein a step V.II of the cutting, in particular the mechanical cutting using a cutting and severing device (av), of the functional fiber (ff). The cutting and severing device (av) preferably cuts through the functional fiber (ff) in such a way that a part of the functional fiber (ff) inserted into the molten first material in step V remains in the solidified first material.

FIGS. 42 to 52

FIGS. 42 to 52 show the complete embedding of a thick functional fiber (ff).

A thick functional fiber (ff) according to the present disclosure is a functional fiber Oil whose thickness is greater than the depth (e) of melting of the material of the layer (pw) measured from the new surface (ofn).

FIG. 42

FIG. 42 illustrates the first step of such an embedding process. In FIG. 42, the embedding process performs the first step as a step of thermal transfer sintering (TTS) (Selective Heat Sintering (SSH)). The figure corresponds completely to FIG. 9. A heating device (hk) locally melts the layer (pw) in FIG. 42. In FIG. 42, this melted area solidifies again to form a solidified area (vb). At this point, reference is made to the comments on FIG. 9.

FIG. 43

FIG. 43 shows an exemplary alternative process for carrying out the first step. Instead of a thermal transfer sintering (TTS) method (Selective Heat Sintering), the process now exemplified uses a selective laser sintering (SLS) process. A laser beam (LB1) melts the powder layer (pw) locally to a predetermined depth (e) in a heating region lab). This then solidifies again to firm a solidified area (vb). With regard to the other reference signs, reference is again made to the previous explanations, the list of reference signs and, for example, the description of FIG. 9.

FIG. 44

In a second step, the feed of a squeegee (rk) through a squeegee feed device now applies a new powder layer having a thickness corresponding to the second distance (g) of the lower edge (uk) of the squeegee (rk) from the old surface (aof) of the layer (pw). FIG. 44 corresponds completely to FIG. 10, and reference is made to the explanations given there.

FIG. 45

FIG. 45 corresponds to the condition after application of the additional powder layer in the second step of FIG. 44.

FIG. 46

In FIG. 46, in a third process step, the functional fiber insertion device (ft) now inserts a thick functional fiber (ff) into a melting region (ab) generated by the heating device (hk) of the functional fiber insertion device (ft) Here, the heating device (hk) generates the melting region in an exemplary legion of the layer (pw) that has not yet been melted. FIG. 46 corresponds to FIG. 13, but in contrast to FIG. 13, complete insertion of the functional fiber (ff) into the melt in the melting region (ab) is now not possible. This means that the functional fiber (ff) still protrudes beyond the surface (of).

FIG. 47

FIG. 47 corresponds to FIG. 14. In FIG. 47, in a third process step, the functional fiber insertion device (ft) now inserts a thick functional fiber (ff) into a melting region (ab) generated by the heating device (hk) of the functional fiber insertion device (ft). In this case, the heating device generates the molten region, by way of example, not as in FIG. 46 in a region of the layer (pw) which has not yet been molten, but in a previously molten and then re-solidified former solidified area (vb). In contrast to FIG. 14, however, complete insertion of the functional fiber (ff) into the melt in the melting region (ab) is now not possible. This means that the functional fiber (ff) still protrudes beyond the surface (of).

FIG. 48

Figure 48:
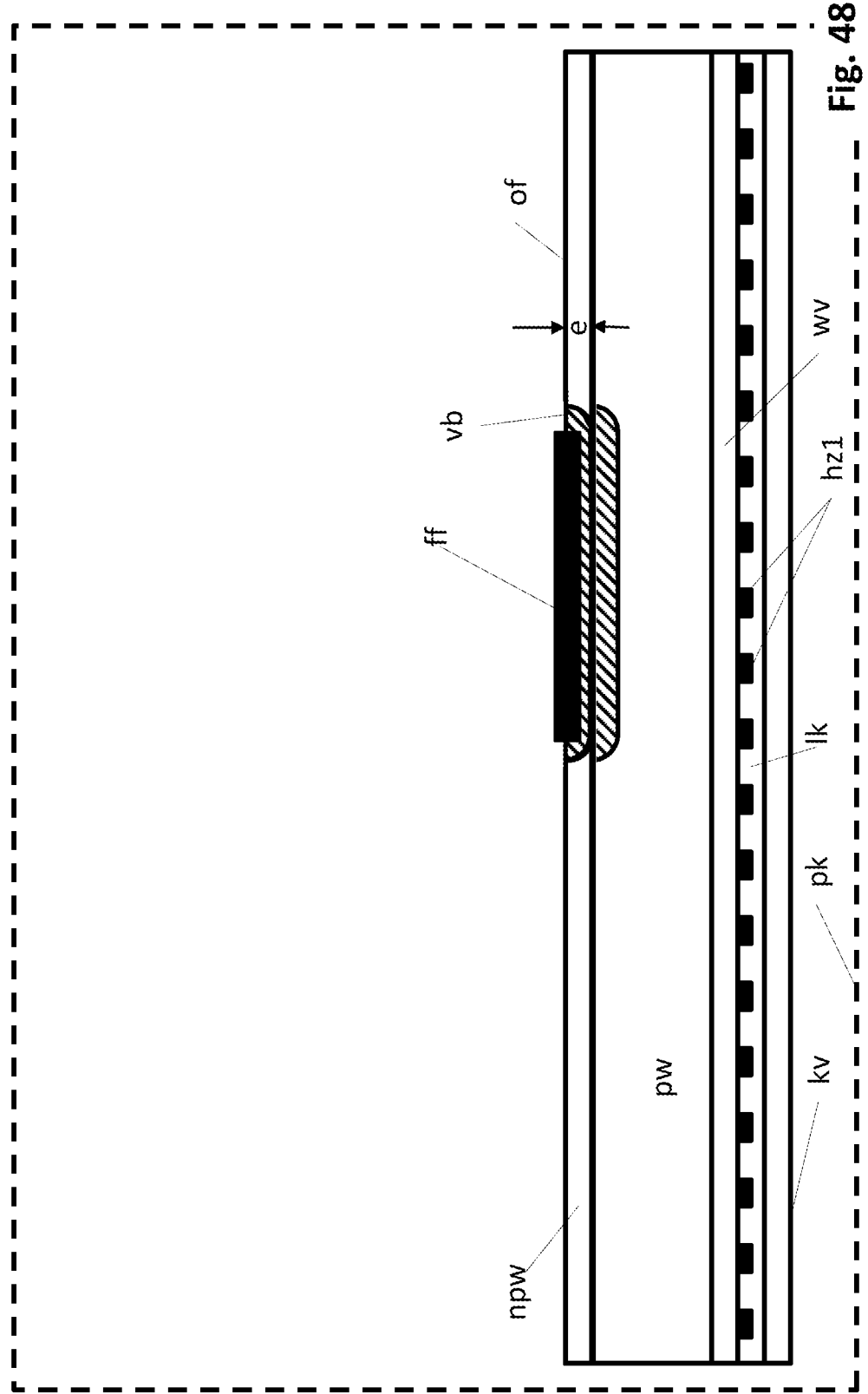
FIG. 48 corresponds to a condition of the workpiece after the insertion of the thick functional fiber according to FIG. 47.

FIG. 48 shows the situation after insertion of the functional fiber (ff) into the former melting region (ab) after solidification to the solidified area (vb). For simplification. FIG. 48 shows the functional fiber (ff) and the surrounding solidified areas (vb) in abbreviated form.

FIG. 49

FIG. 49 shows the application of a further powder layer (npw) to the old surface (aof) in a fourth process step. The process step typically corresponds to the second process step of FIG. 44. FIG. 49 differs front the condition of FIG. 44 in that the functional fiber (ff) protrudes from the old surface (oaf). Due to the partial embedding of the functional fiber (ff) in the solidified area (vb), the squeegee (rk) does not tear the functional fiber (ff) during its transported through the squeegee feed device when it applies the next powder layer. This is a known problem from the prior art, which is thus solved. The partial embedding of the functional fiber (ff) in the solidified area (vb) restricts the degrees of freedom of the functional fiber (ff). This restriction of the degrees of freedom of the functional fiber (ff) prevents the functional fiber (ff) from being torn out of the powder bed in this work step.

FIG. 50

Figure 50:
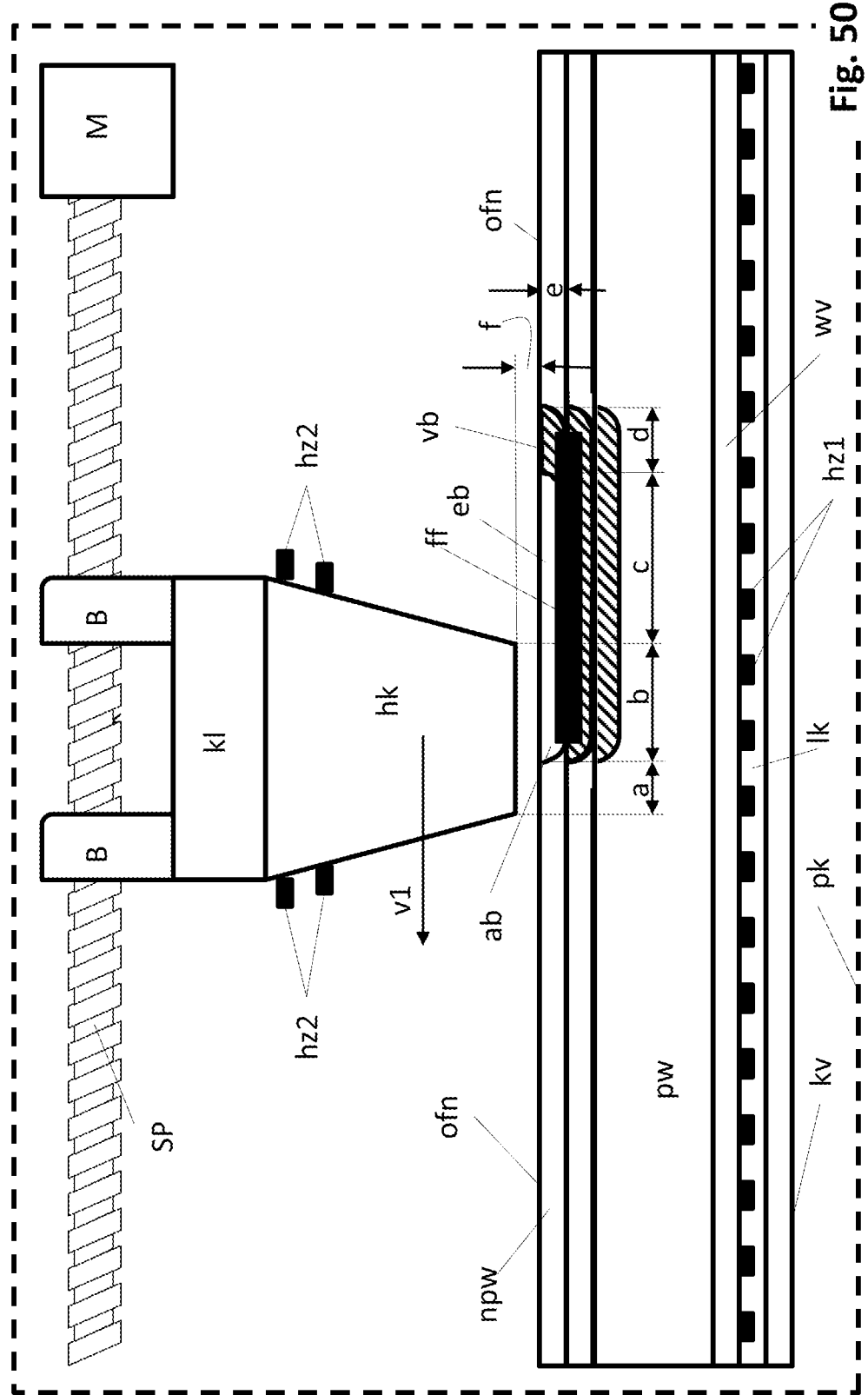
FIG. 50 corresponds in large part to that of FIG. 42 and illustrates more completely embedding the previously partially embedded functional fiber.

The content of FIG. 50 corresponds in large part to that of FIG. 42. However, the functional fiber insertion device (ft) now completely embeds the already partially embedded functional fiber (ff) by means of its heating device (hk) in a fifth process step by melting the previously additionally applied layer in the new melting region (ab). This is a selective heat sintering process.

FIG. 51

Figure 51:
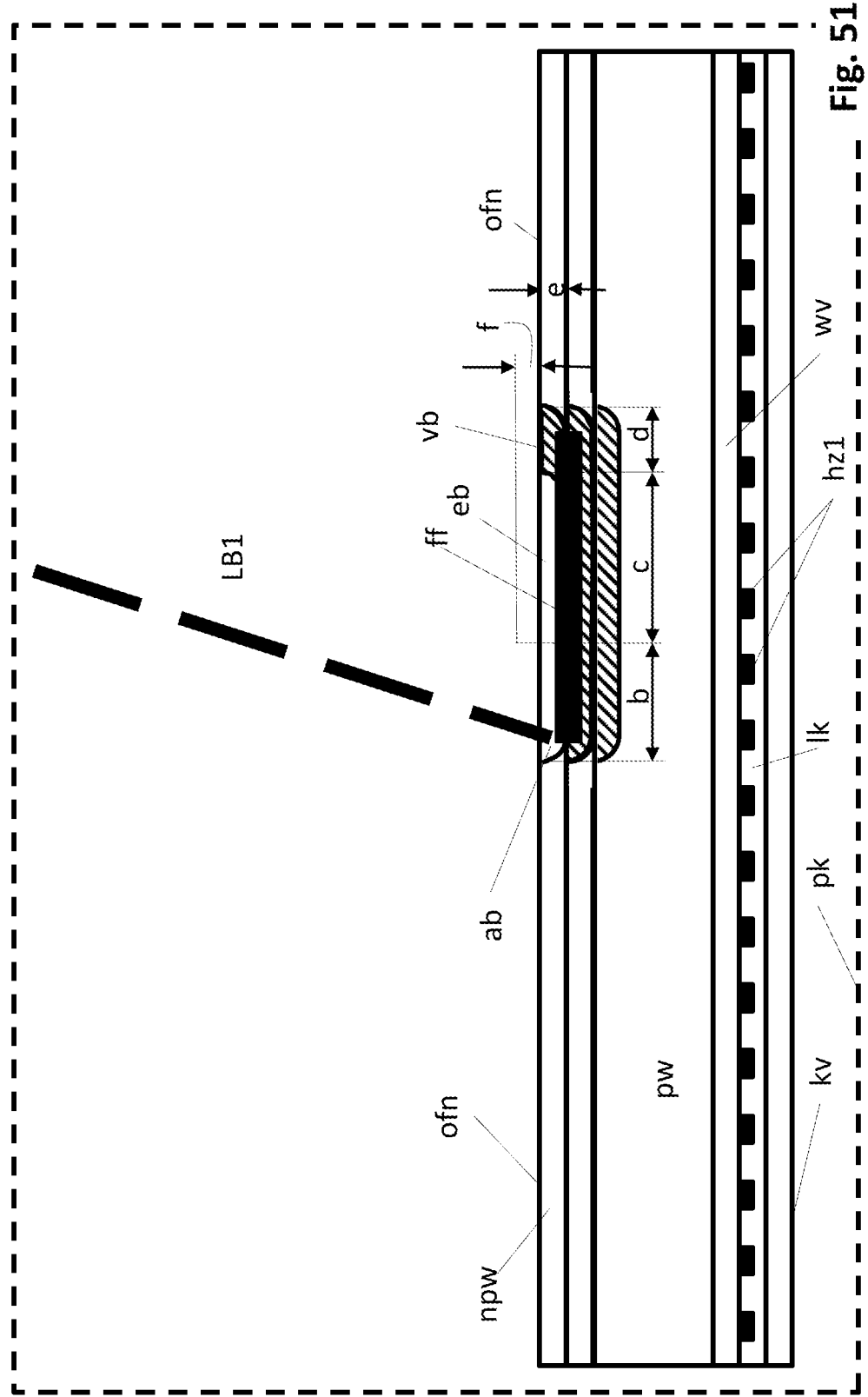
FIG. 51 illustrates a fifth process step of melting a layer in a region by a laser beam.

FIG. 51 shows an alternative example of the filth process step by melting the layer (npw) in a melting region (ab) by means of a laser beam (LB1). This is a selective laser sintering process.

FIG. 52

Figure 52:
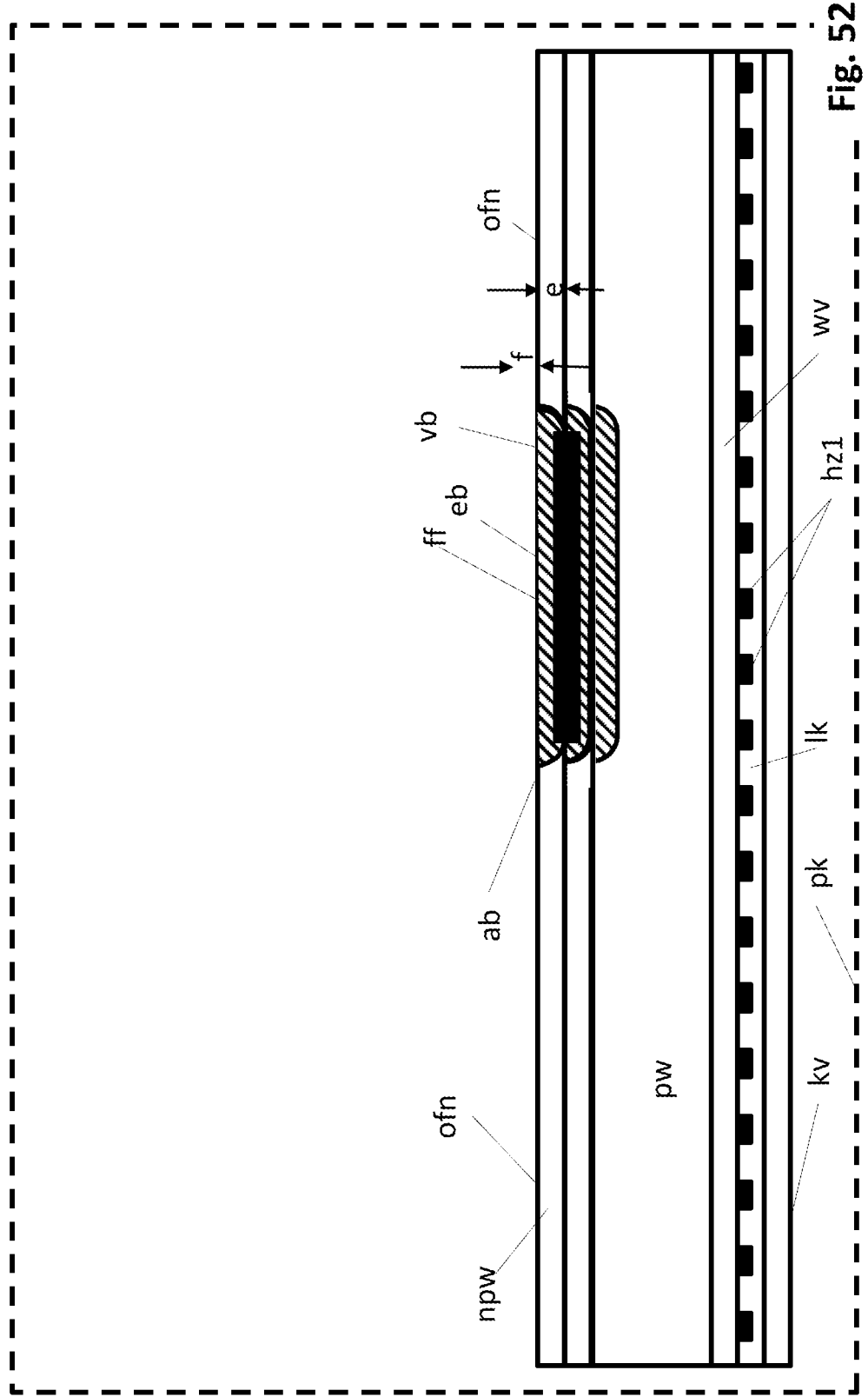
FIG. 52 illustrates an example final result of the previous five process steps.

FIG. 52 represents the final result of the five process steps. The process sequence of FIGS. 42 to 52 does not show the process step of separating the continuous fiber of the functional fiber (ff) only for simplicity of presentation. This document refers to the above explanations in this regard.

FIG. 53

Figure 53:
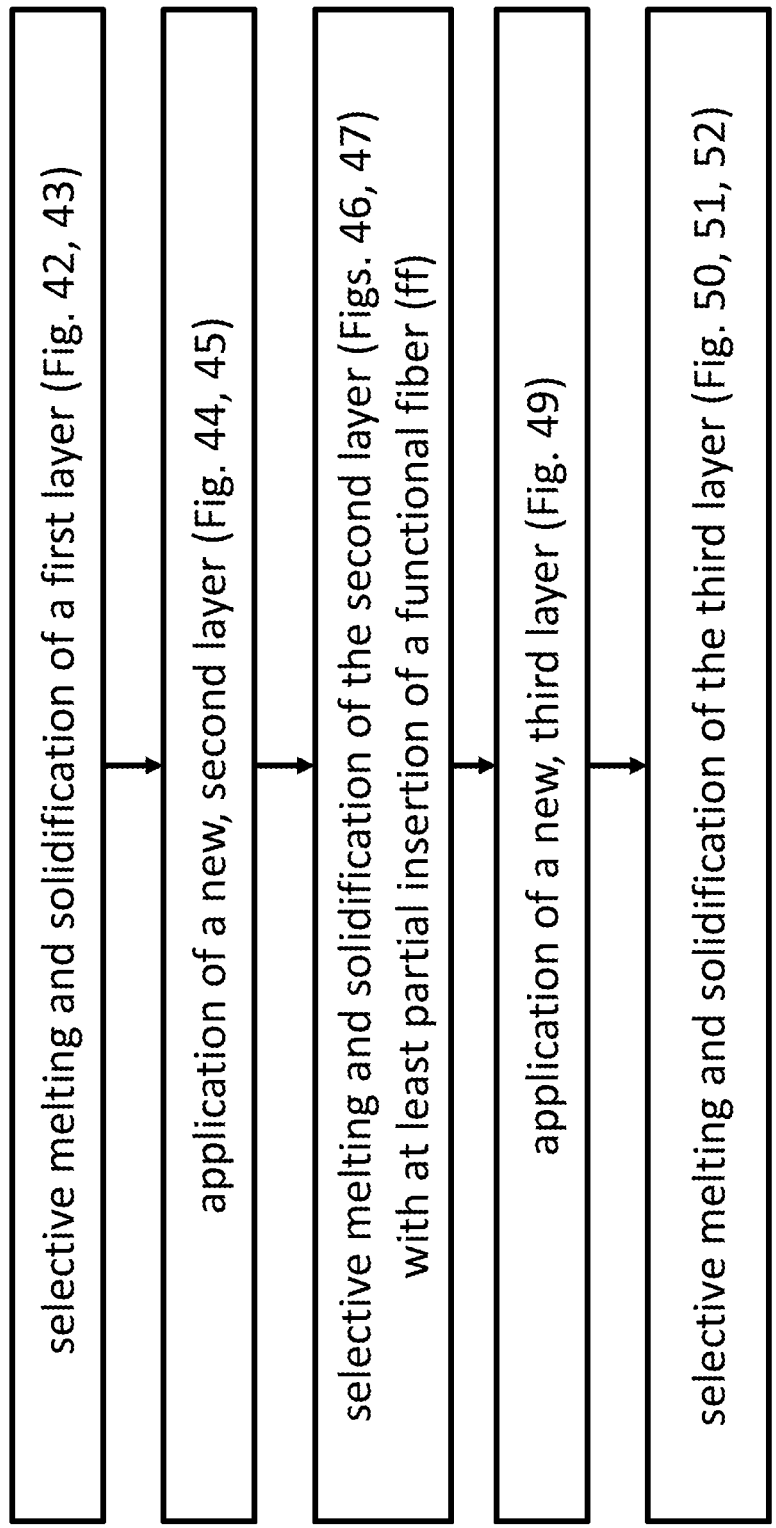
FIG. 53 is a block diagram of an example process for a complete embedding of a thick functional fiber by thermal transfer sintering of an unmelted power layer.

FIG. 53 shoes the exemplary process sequence for a complete embedding of a thick functional fiber (ff) by thermal transfer sintering (selective heat sintering) of the unmelted powder of the layer (pw).

FIG. 54

Figure 54:
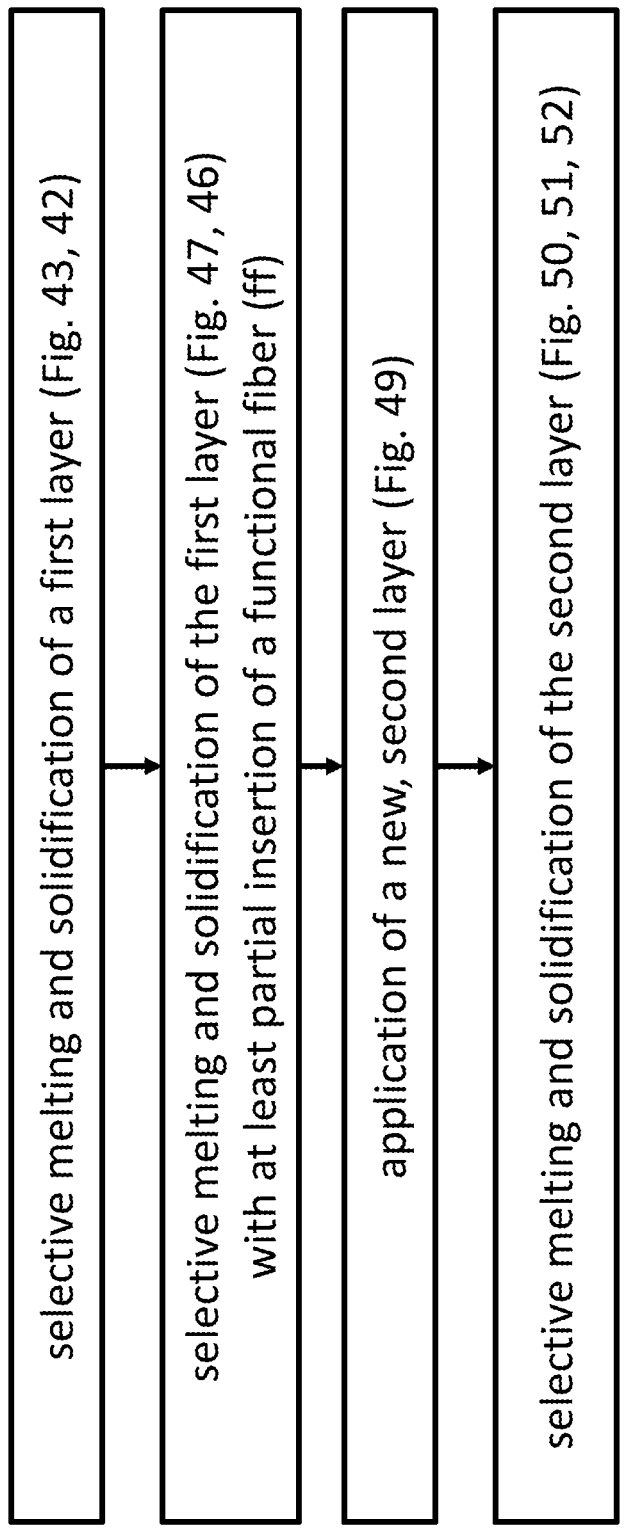
FIG. 54 is a block diagram of an example process for a complete embedding of a thick functional fiber by thermal transfer sintering of already melted and resolidified powder.

FIG. 54 shows the exemplary process sequence for a complete embedding of a thick functional fiber (ff) by thermal transfer sintering (selective heat sintering) and/or laser sintering of the already melted and resolidified powder of the layer (pw).

FIG. 55

Figure 55:
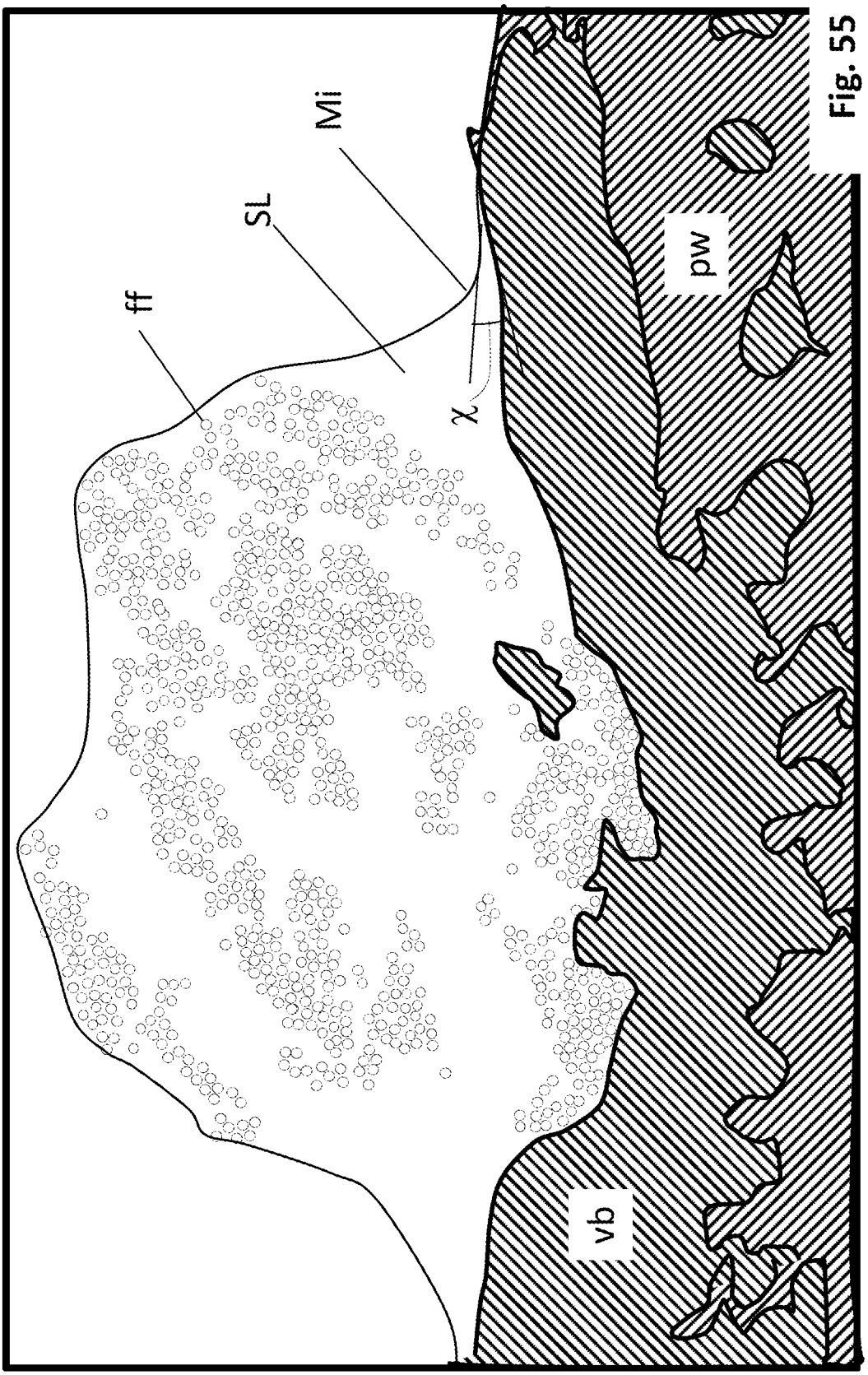
FIG. 55 is a schematic drawing illustrating a strand of functional fibers embedded in thermoplastic powder.
Figure 56:
FIG. 56 is a photograph of a cut that corresponds directly to FIG. 55.

FIG. 55 shows a schematic drawing of a strand of functional fibers (ff) embedded in a thermoplastic powder. FIG. 55 shows the functional fibers as points in the cross section. The solidified area (vb) is irregularly demarcated at the bottom from the still powdery area (pw). The functional fiber strand, here a carbon fiber, is provided comprising a sizing (SL). It is of particular importance that the siting (SL) of the functional fiber strand is selected so that it wets both the functional fibers (ff) and the solidified area (vb) and an outwardly directed meniscus (mi) having an edge contact angle χ<90° is formed. If the process for embedding the functional fiber (ff) does not use a size or if the functional fibers (ff) do not have a size on their surface, the wetting angle between the melt of the melted area (melting region (b)) and the surface of the functional fiber (ff) should be less than 90° better less than 45°, better less than 25', better less than 10°.

FIG. 56

Shows a photo of a cut that corresponds directly to the FIG. 55.

FIG. 57

FIG. 57A)

Figure 57:
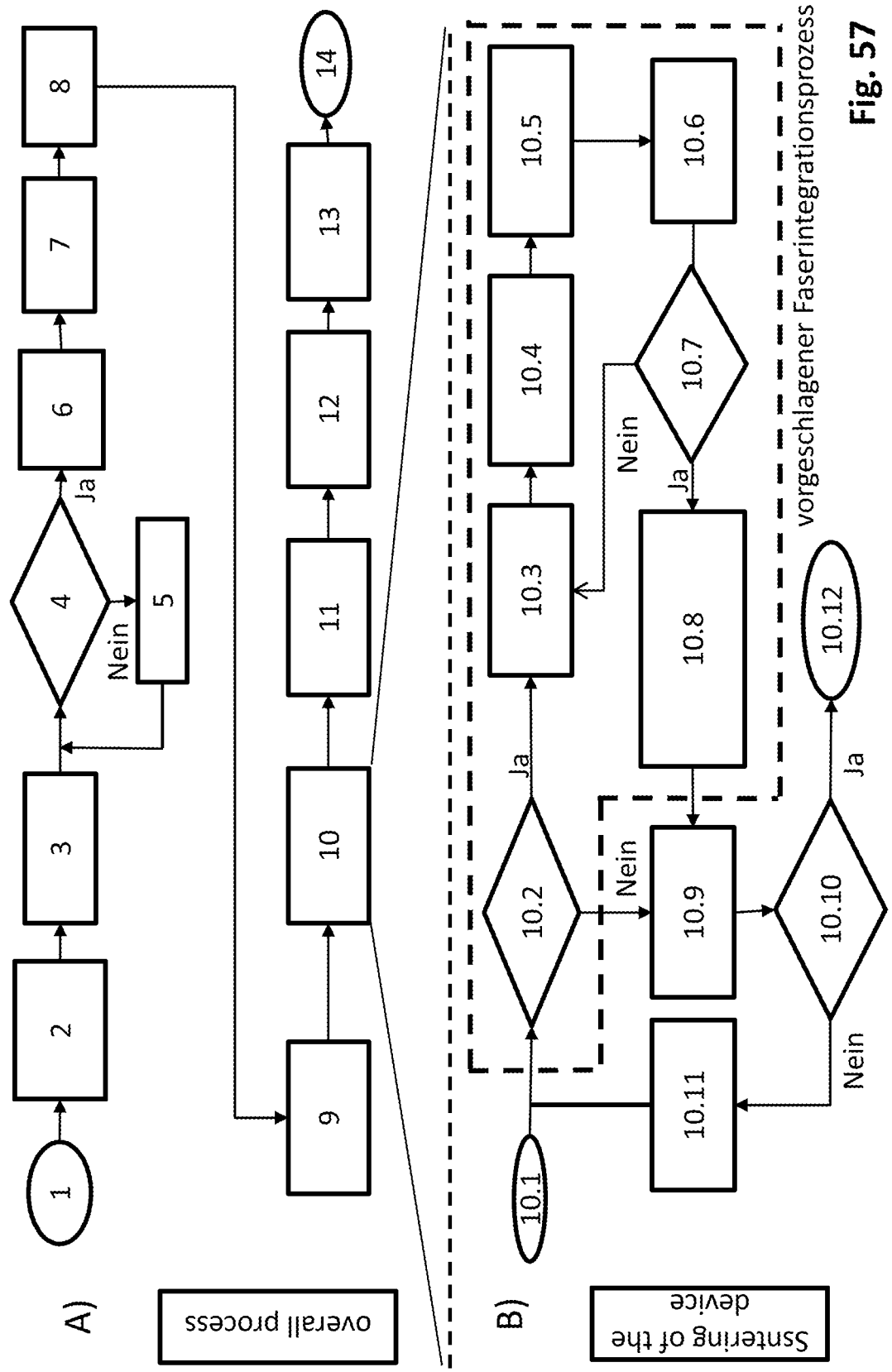
FIG. 57A is a block diagram of an example process of an SLS plant based on a diagram according to Pirrung.
FIG. 57B is a block diagram of an example process illustrating a modification of the "sintering of the component" step.

FIG. 57 A) shows the process flow in an SLS plant based on a diagram according to Pirrung.

The diagram according to Pirrung corresponds to the state of the art.

FIG. 57 B)

The step "Sintering of the component" is modified here. FIG. 57B illustrates this modification of the "sintering of the component" step. The additional process steps according to the proposal, which distinguish the process proposed here from the prior art, are surrounded by a dashed polygon and labeled "proposed fiber integration process". The proposed process additionally includes a repeated query as to whether a functional fiber OD should be introduced into the current surface col) of the workpiece (wst). If it is necessary to insert another functional fiber (ff) in the respective layer of the workpiece (wst), the positioning device moves an at least temporary unit of the tool changing device (wwv) and the functional fiber insertion device (ft) and thus the functional fiber (ff) relative to the workpiece (wst) and positions it. The functional fiber insertion device (ft) and/or a functional fiber degree-of-freedom restricting device restrict the degrees of freedom of the functional fiber (ff). This can be done, as proposed here, by placing the functional fiber (ff) in a melt previously generated at the insertion point (ep) of the functional fiber (ff) on the surface (of) of the workpiece (wst). However, this can also be done by depositing the functional fiber (ff) on the surface (of) of the workpiece (wst) and then restricting the degrees of freedom of the functional fiber (ff). This can be done, for example, by covering the functional fiber (ff) using material and then melting it down and/or sintering it in or gluing or tacking it in place. The deposition of adhesive can take place before the functional fiber (ff) is deposited, in particular on the layer of adhesive. Since "continuous fibers", i.e. extremely long functional fibers (ff), are preferably involved, a step of fiber separation of the functional fiber (ff) is typically necessary, preferably by means or cutting and severing device (av).

If it is necessary to insert further functional fibers (ff) at this component level, the device according to the proposal typically repeats the process.

Preferably, the positioning device transports the functional fiber insertion device (ft) after insertion of the functional fibers (ff) to a typically predetermined parking position, for example the position of a tool set-down device (wav1, wav2), where it typically remains until the next use.

The process variant described here typically includes additional steps inserted before powder application, if the functional fiber insertion device (ff) is to insert a functional fiber (ff):

A one motor of the functional fiber spool unwinds a piece of functional fiber (ff).

The functional fiber insertion device (ft) moves and positions the unwound piece of functional fiber (ff) relative to the surface (of) of the workpiece (wst) or layer.

The functional fiber insertion device (ft) or a functional fiber degree of freedom restriction device restricts the degrees of freedom of the functional fiber (ff). This can be done, as proposed here as a first option, by melting the surface of the workpiece or layer (pw) and then solidifying the melt comprising the inserted functional fiber (ff). A first alternative method comprises bonding the functional fiber (ff) to the workpiece surface. A second alternative process for restricting the degrees of freedom of the functional fiber (ff) comprises opening a groove, e.g. by means of milling and suctioning off the chips, inserting the functional fiber (ff), and immobilizing the functional fiber (ff), e.g. by bonding or overmolding using plastic or the like in the groove. A third, alternative process comprises producing the groove walls by sintering, in particular by a selective sintering process, for example by selective laser sintering. The third method preferably comprises removing the unsintered material of the layer (pw) inside the groove. Suction of the unused powder material from the groove is one way of removing the non-sintered material from the groove. The third method further preferably comprises inserting the functional fiber UT into the groove thus created and finally bonding or potting the groove. It is conceivable that the feed of a squeegee (rk) by means of a squeegee feed device again fills the void spaces in the groove (nut) remaining next to the functional fiber (ff), for example, using powder intended for sintering. The problem is, however, that the powder material layer to be melted is then thicker. It is conceivable to melt this material sufficiently using a greater heating power, e.g. by means of a longer dwelling laser beam or a slower moving laser beam or a hotter or longer moving heating device (hk). It is also conceivable to select a groove depth smaller than the thickness of the functional fiber (ff) to enable an intimate mechanical bond between the functional fiber (ff) and the melted material.

If the process of restricting the degrees of freedom is completed or about to be completed, the functional fiber (ff) is separated, for example, by means of a cutting and severing device (av).

If necessary, the functional fiber insertion device inserts the ends of the functional fiber (ff) separately. Typically, there is a distance between the insertion point of the functional fiber (ff) into the workpiece (wst) and the cutting point, at which the cutting and severing device (av) separates the functional fiber ((l) if necessary. Only then is the next powder layer applied.

FIG. 38

FIG. 58A)

Figure 58:
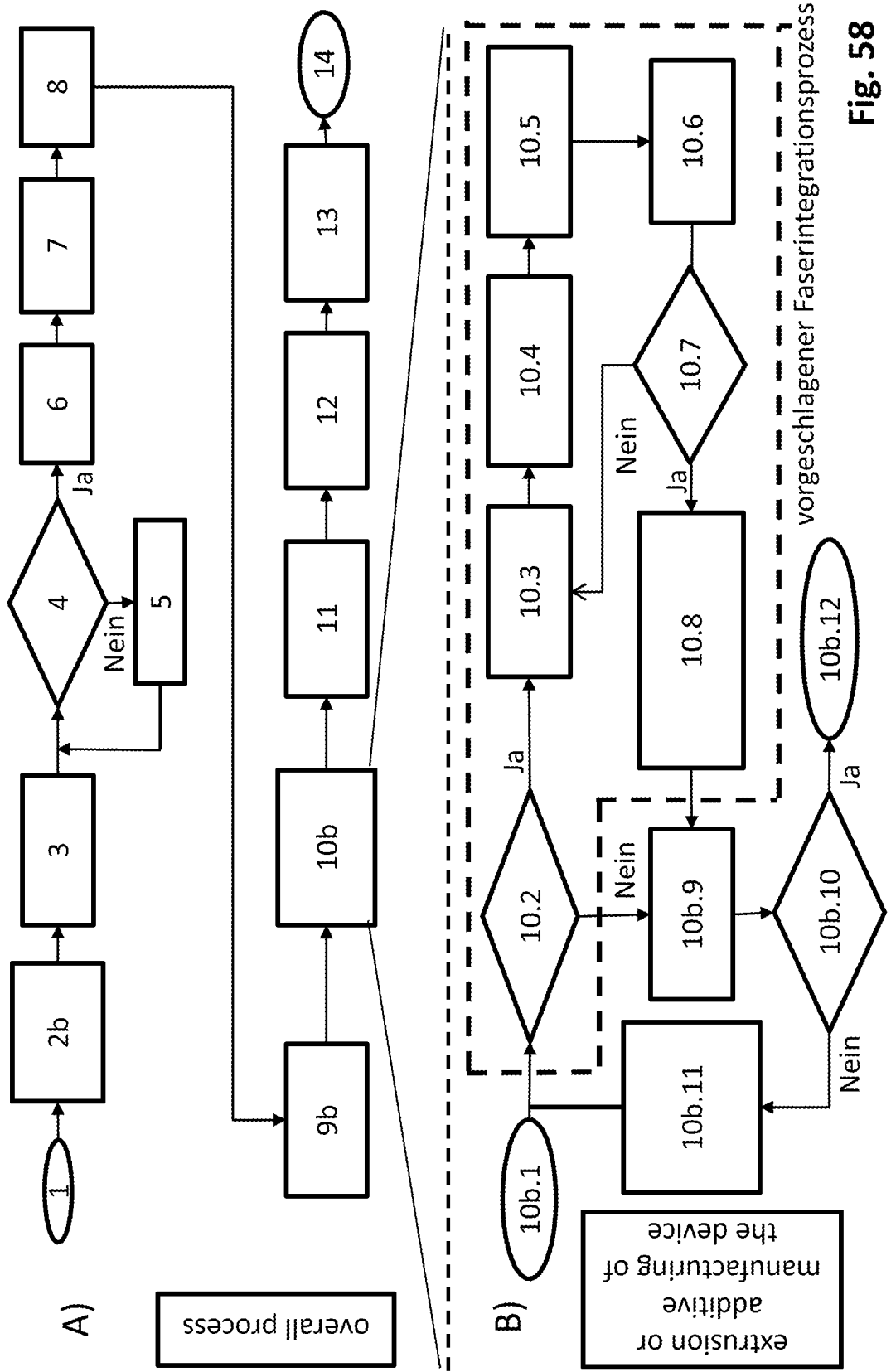
FIG. 58A is a block diagram of example process in an additive manufacturing system based on a diagram according to Pirrung.
FIG. 58B is a block diagram illustrating a modification of the example process of FIG. 58A including a "proposed fiber integration process."

FIG. 58 A) shows the process flow in an additive manufacturing system based on a diagram according to Pirrung. FIG. 58 shows the applicability of the technical teaching disclosed here to other additive manufacturing processes. In this respect, all features disclosed herein are applicable to other additive manufacturing processes as well, to the extent useful.

The diagram according to Pirrung corresponds to the state of the art.

FIG. 58B)

The step "extrusion or additive manufacturing of the component" is modified here. This modification of the "extrusion or additive manufacturing of the component" step is shown in FIG. 58B. The additional process steps according to the proposal, which distinguish the process proposed here from the prior art, are surrounded by a dashed polygon and labeled "proposed fiber integration process". The proposed process additionally includes a repeated query as to whether the device should introduce a functional fiber (ff). If the device is to insert a functional fiber (ff) in the respective layer of the workpiece (wst), the functional fiber insertion device (ft) moves and positions the functional fiber (ff) relative to the surface (of) of the workpiece (wst). The functional fiber insertion device (ft) or a special functional fiber degree of freedom restricting device restricts the degrees of freedom of the functional fiber (ff). This can be done, as suggested here, by placing the functional fiber (ff) in a melt that, for example, the heating device (hk) of the functional fiber insertion device (ft) previously generated at the insertion point (ep). However, this can also be done by depositing the functional fiber (ff) on the surface Ion of the workpiece (wst) and then restricting the degrees of freedom of the functional fiber (ff). This can be done, for example, by covering the functional fiber (ff) using material and then melting and/or sintering it into the workpiece (wst) or gluing or tacking the functional fiber (ff) to the workpiece (wst). The deposition of adhesive can take place before the functional fiber (ff) is deposited. Since "continuous fibers", i.e. extremely long functional fibers (ff), are preferably involved, the process should include a step of fiber separation of the functional fiber (ff).

If the device is to insert further functional fibers (ff) at this component level, the device can repeat the process.

Preferably, a positioning device transports the tool changing device (wwv) comprising the functional fiber insertion device (ft) after insertion of the fibers to a typically predetermined parking position, for example a tool set-down device (wav1, wav2) and sets down the functional fiber insertion device (ft) there by actuating the tool changing device (wwv) until the next use.

Thus, if the process is to include the deposition of a functional fiber (ff), then preferably the process includes additional inserted steps prior to the deposition of the next layer on the workpiece (wst):

The motor of the functional fiber spool or another device unwinds a piece of functional fiber (ff) from the functional fiber spool comprising the functional fiber supply.

A positioning device moves and positions the unwound piece of functional fiber (ff) relative to the surface (of) of the workpiece (wst) or layer (pw). The functional fiber insertion device or a special functional fiber degree of freedom restricting device restricts the degrees of freedom of the functional fiber (ff). This can be done, as proposed here as a first option, by melting the surface of the workpiece or layer (pw) and finally solidifying the melt comprising the inserted functional fiber (ff). A first alternative method comprises bonding the functional fiber (ff) to the workpiece surface. A second alternative method for restricting the degrees of freedom of the functional fiber (ff) comprises opening a groove, e.g. by means of milling and suctioning off the chips, inserting the functional fiber (ff) and immobilizing the functional fiber (ff) in the groove, e.g. by bonding or overmolding using plastic or the like. A third alternative method for limiting the degrees of freedom of the functional fiber (ff) comprises manufacturing the groove walls by extension and/or an additive manufacturing process. Further, the third alternative process may comprise removing excess material within the groove. In this case, this removal of excess material may be performed, for example, by milling or other machining manufacturing processes, laser ablation, electrical discharge machining or similar functionally equivalent processes on the one hand and/or suction or rinsing on the other hand. Likewise, insertion of the functional fiber (ff) into the groove thus created and final bonding or casting of the groove takes place. It is conceivable that the feed of a squeegee (rk) again fills the groove using powder intended for sintering, for example. In a subsequent laser sintering step, the laser beam then melts this powder in the groove (nut), for example. The subsequently resolidifying melt of the melted powder restricts the degrees of freedom of the functional fiber (ff). It is also conceivable that an extruder melts a filament and fills the groove (nut) using the material of the filament thus melted, where the material thus melted then solidifies and thus restricts the degrees of freedom of the functional fiber (ff). It is conceivable to then sufficiently melt this material using a greater heating power, i.e., e.g., by means of a longer dwelling laser beam or slower moving laser beam or using a higher extruder temperature. It is also conceivable to select a groove depth (groove) smaller than the thickness of the functional fiber (ff) to enable an intimate mechanical bond between the functional fiber (ff) and the melted material.

When the apparatus has completed the process of restricting the degrees of freedom of the functional fiber (ff), or when the apparatus is about to complete this process, the apparatus performs the cutting of the functional fiber (ff), for example, by means of a cutting and severing device (av).

If necessary, the device inserts the ends of the functional fiber (ff) separately by means of the functional fiber insertion device (ft). Typically, there is a distance between the insertion point of the functional fiber (ff) into the workpiece (wst) and the cut-off point Only then is the next layer applied by means of an extrusion process or another additive manufacturing process.

FIG. 59

Figure 59:
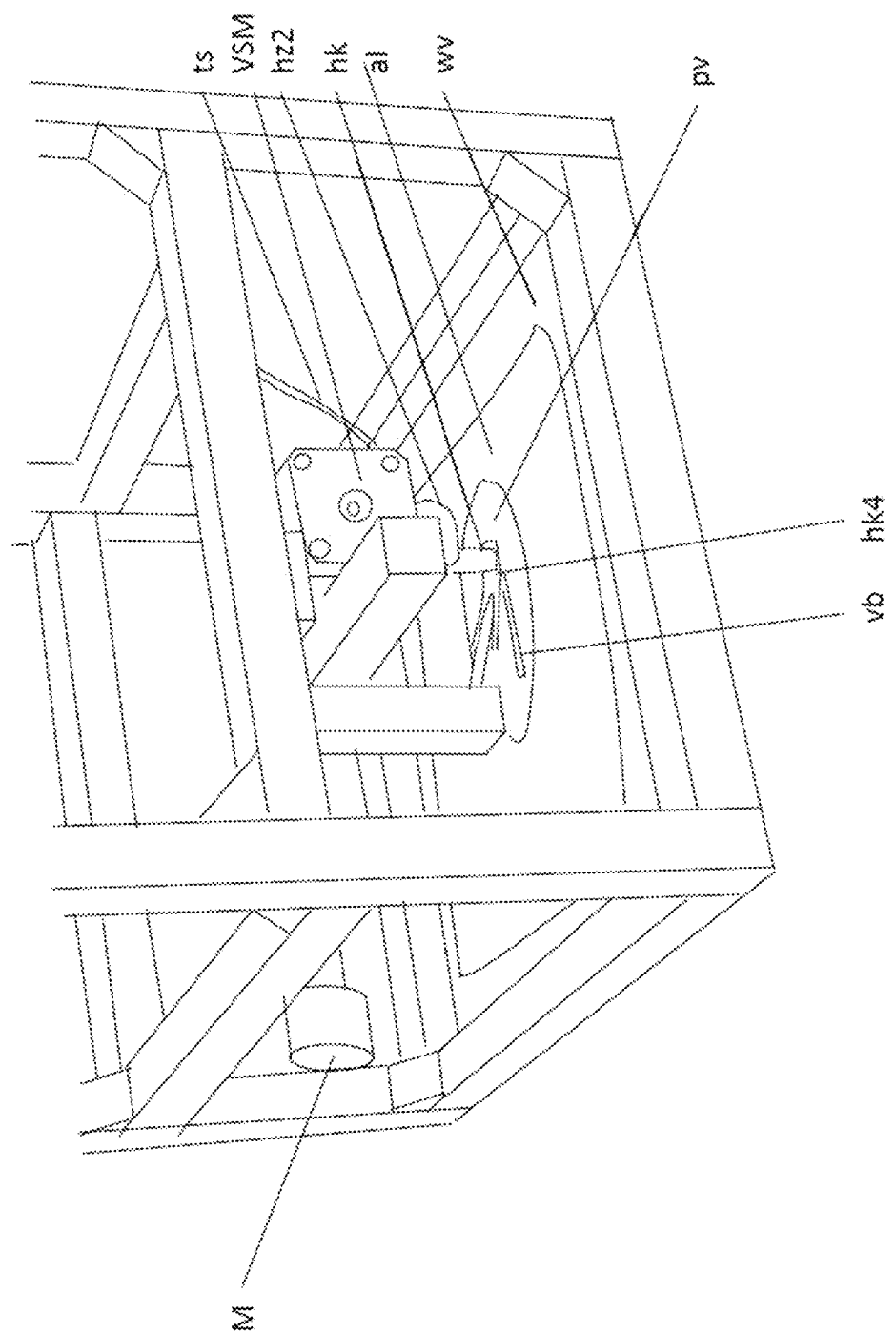
FIG. 59 corresponds to FIGS. 21 and 22 with better resolution.

FIG. 59 corresponds in content to FIGS. 21 and 22, although it is not gridded, and shows better resolution. The elements are labeled in plain text. It is attached to the application documents for documentation purposes, since the screening may lead to a loss of disclosure.

Figure 60:
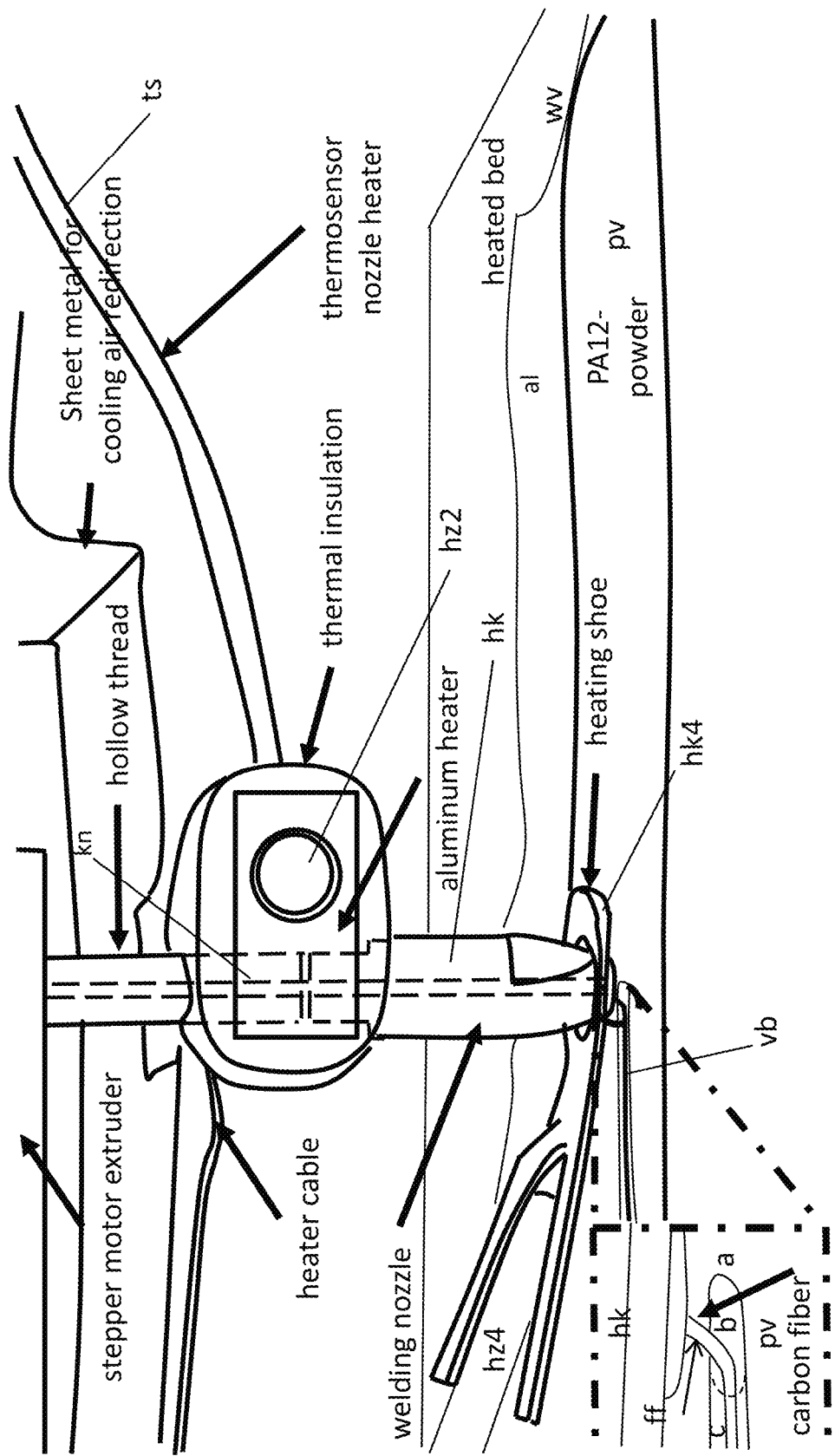
FIG. 60 corresponds to FIG. 23 with better resolution.
Figure 61:
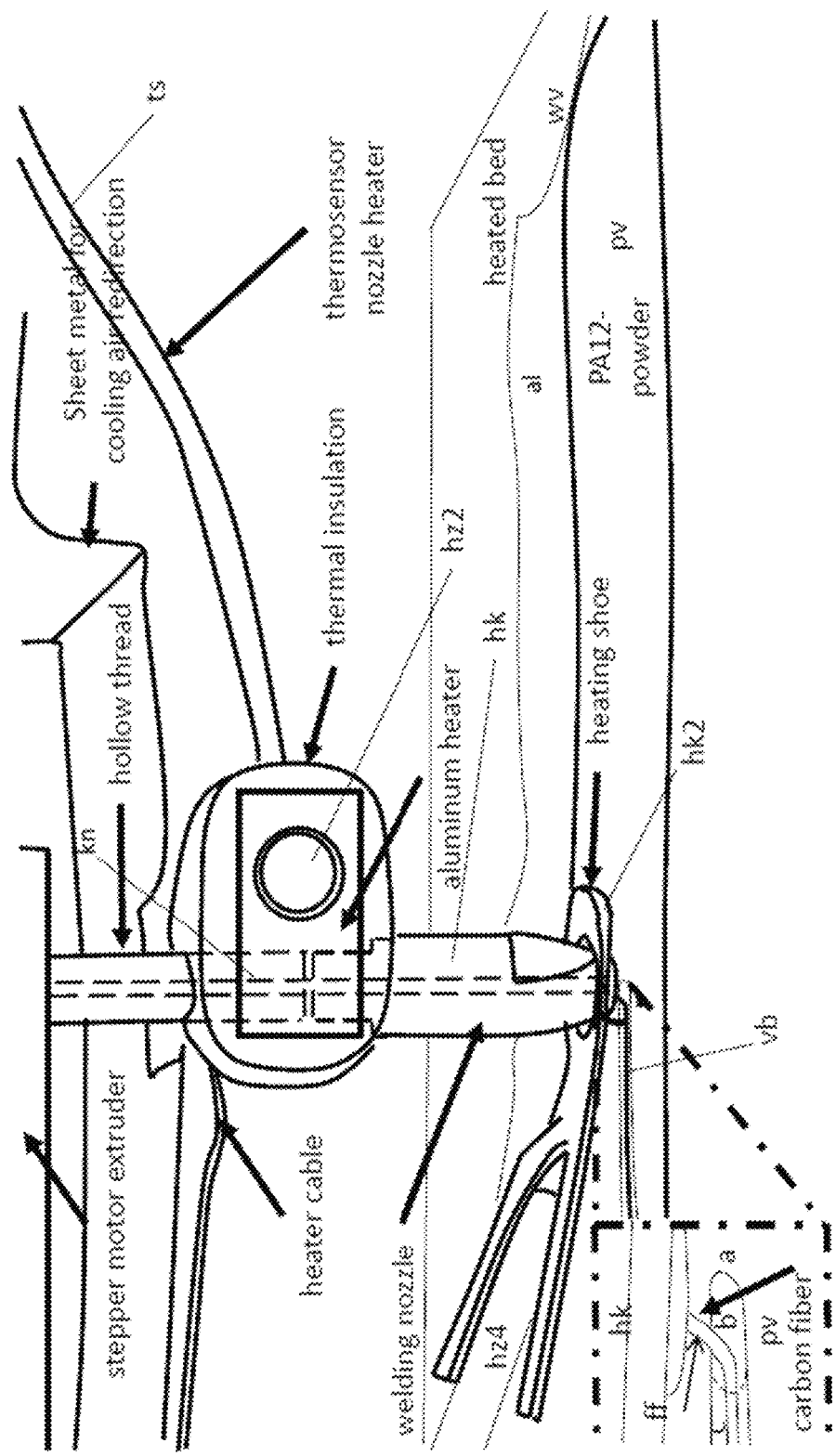
FIG. 61 corresponds to FIG. 24 with better resolution.

FIGS. 60 and 61

The contents of FIGS. 60 and 61 correspond to FIGS. 23 and 24 in terms of content, although it is not gridded, and shows better resolution. FIG. 60 is the drawing corresponding to FIG. 61. The elements are labeled in plain text. It is attached to the first application documents for documentation purposes, since the screening may lead to a loss of disclosure.

Figure 62:
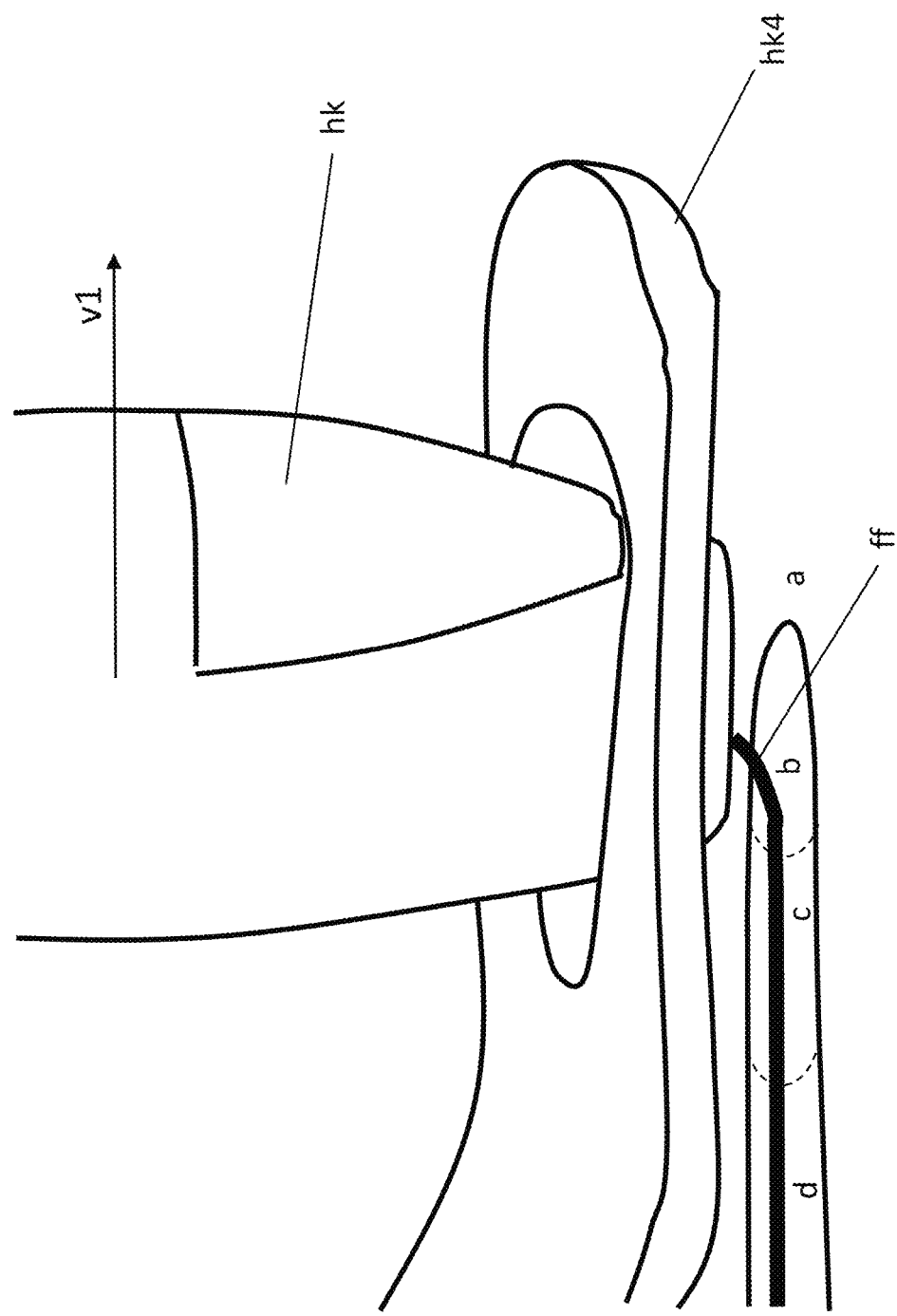
FIG. 62 corresponds to FIG. 26.
Figure 63:
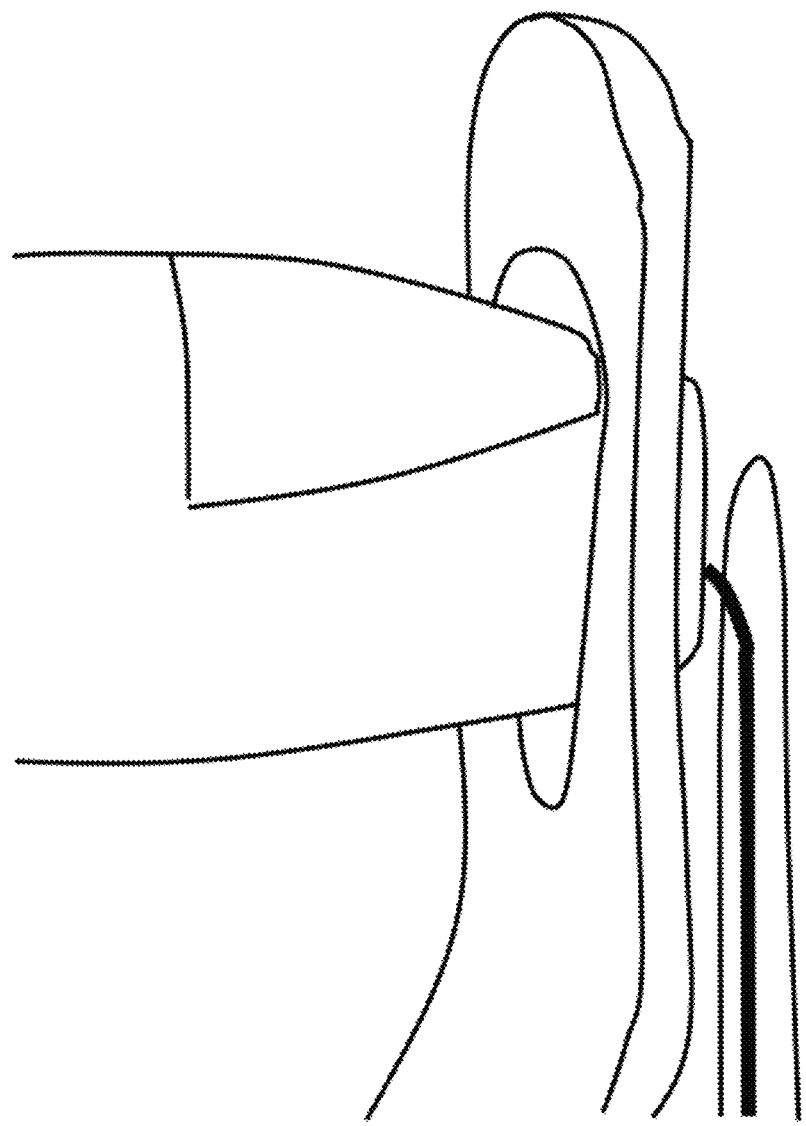
FIG. 63 corresponds to FIG. 27 with better resolution.

FIGS. 62 and 63

FIG. 62 corresponds to FIG. 26. FIG. 63 is the non-gridded version of FIG. 27. It is attached to the application documents for documentation purposes, since the grid may lead to a loss of disclosure.

FIGS. 64 to 67

FIGS. 64 to 67 show schematically and in simplified form an exemplary and successfully tested version or functional fiber insertion device (ft) (fiber tool). FIG. 64a shows the exemplary functional fiber insertion device (ft) (fiber tool) from the front. FIG. 64b shows the exemplary functional fiber insertion device (ft) (fiber tool) from the left side. FIG. 64c shows the exemplary functional fiber insertion device (ft) (fiber tool) from the rear side. FIG. 64d shoes the exemplary functional fiber insertion device t ft) (fiber tool) from the right side. FIG. 64e shows the exemplary functional fiber insertion device (ft) (fiber tool) from the top side. FIG. 64l shows the exemplary functional fiber insertion device (ft) (fiber tool) from the underside.

The underside of the exemplary functional fiber insertion device (ft) (fiber tool) comprising the heating device (hk) faces the surface (of) of the workpiece (wst) or the powder layer (pv) as a special shape of a workpiece (wst) during operation.

Figure 65:
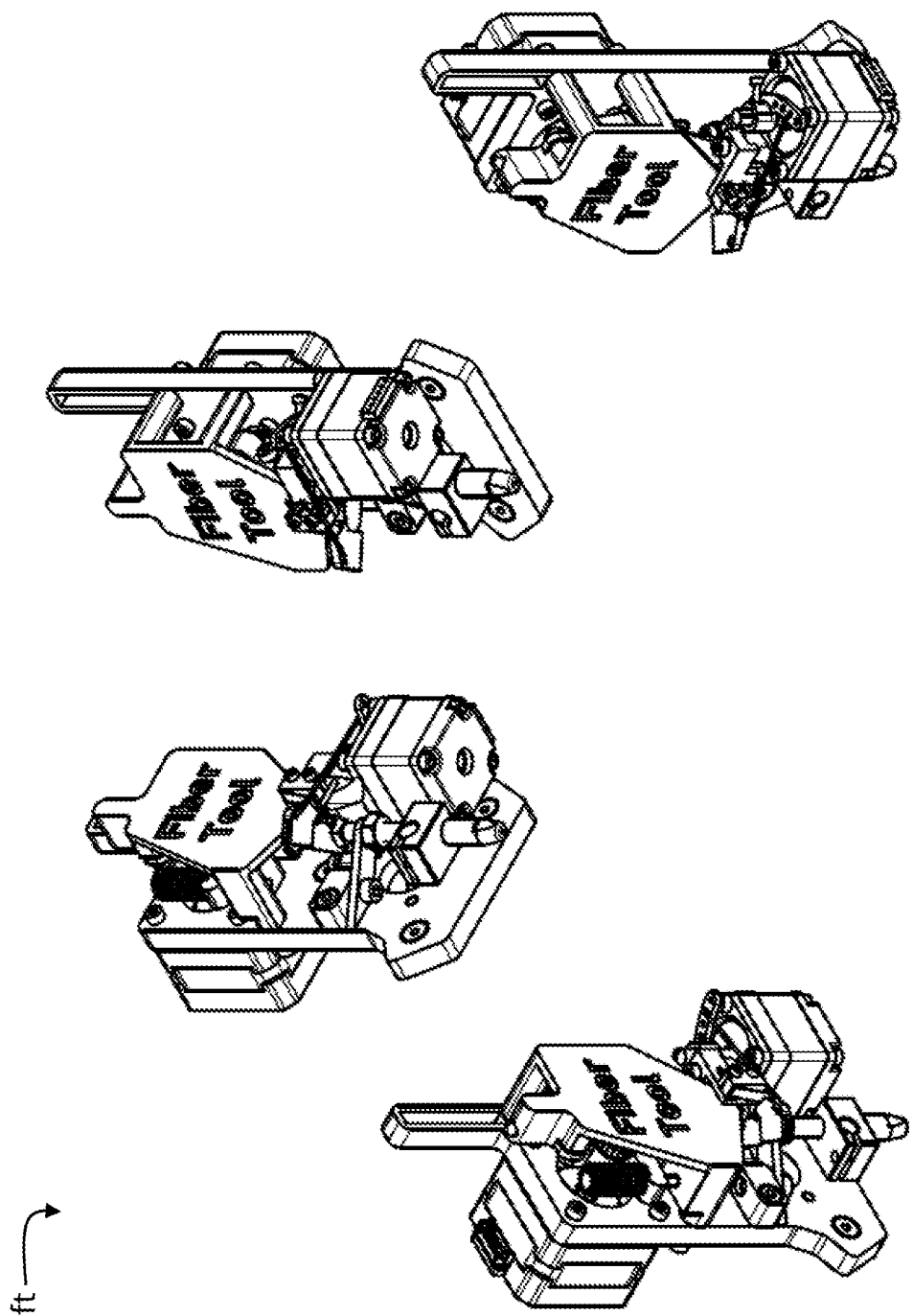
FIG. 65 shows the example functional fiber insertional device of FIG. 64*a* in four different perspective views.

FIG. 65 shows the exemplary functional fiber insertion device (ft) (fiber tool) from four different spatial perspectives from oblique views.

In the following, this document marks a device part only in at least the representations of FIGS. 64 to 67. Such a device part can be seen in all perspective drawings of FIGS. 64 to 68 if other components of the functional fiber insertion device (II) do not obscure this device part.

Figure 64:
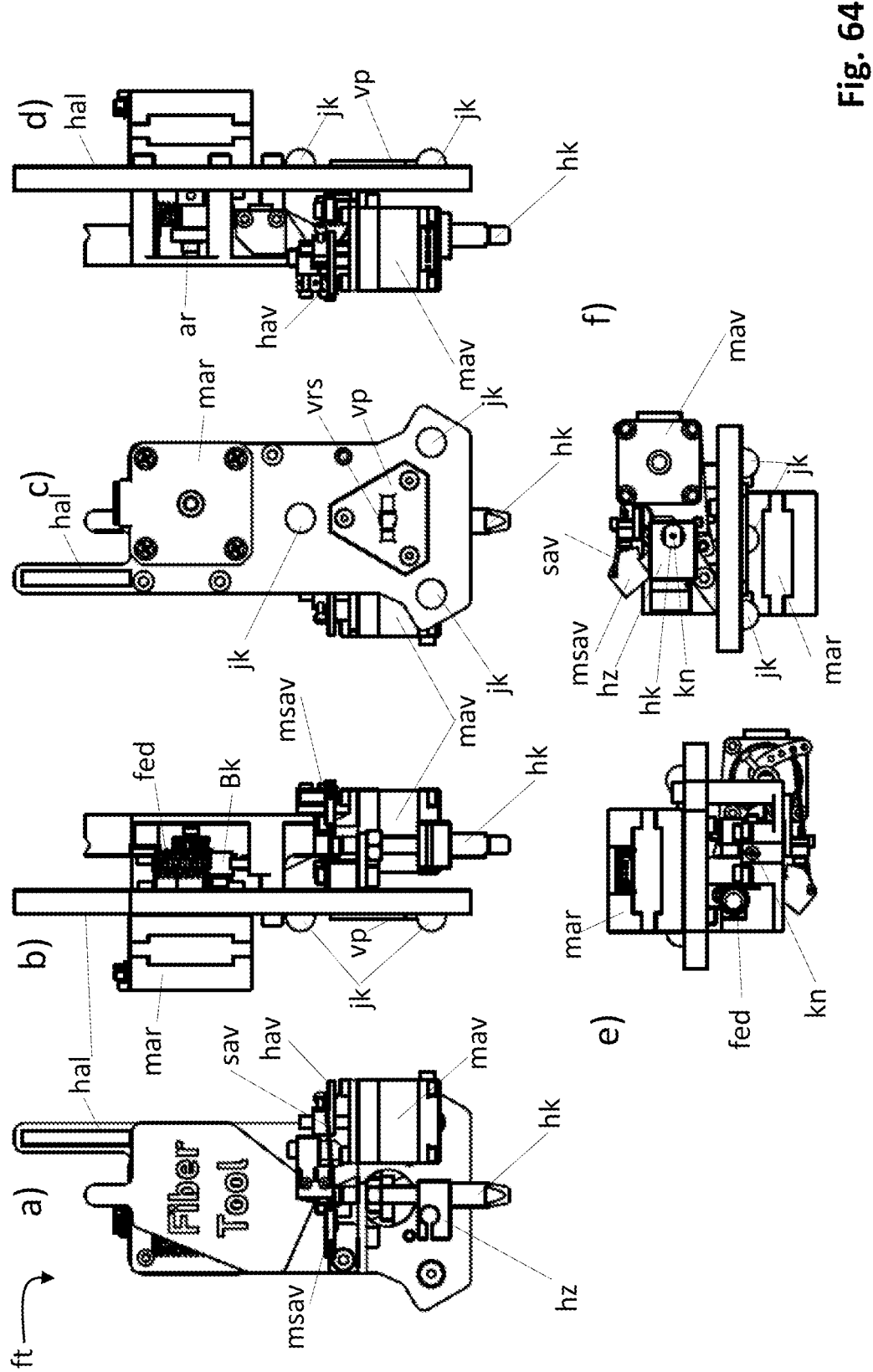
FIG. 64*a* is a front view of an example functional fiber insertion device.
FIG. 64*b* is a left-side view of the example functional fiber insertion device of FIG. 64*a*.
FIG. 64*c* is a back view of an example functional fiber insertion device of FIG. 64*a*.
FIG. 64*d* is a right-side view of the example functional fiber insertion device of FIG. 64*a*.
FIG. 64*e* is a top view of the example functional fiber insertion device of FIG. 64*a*.
FIG. 64*f* is a bottom view of the example functional fiber insertion device of FIG. 64*a*.
Figure 67:
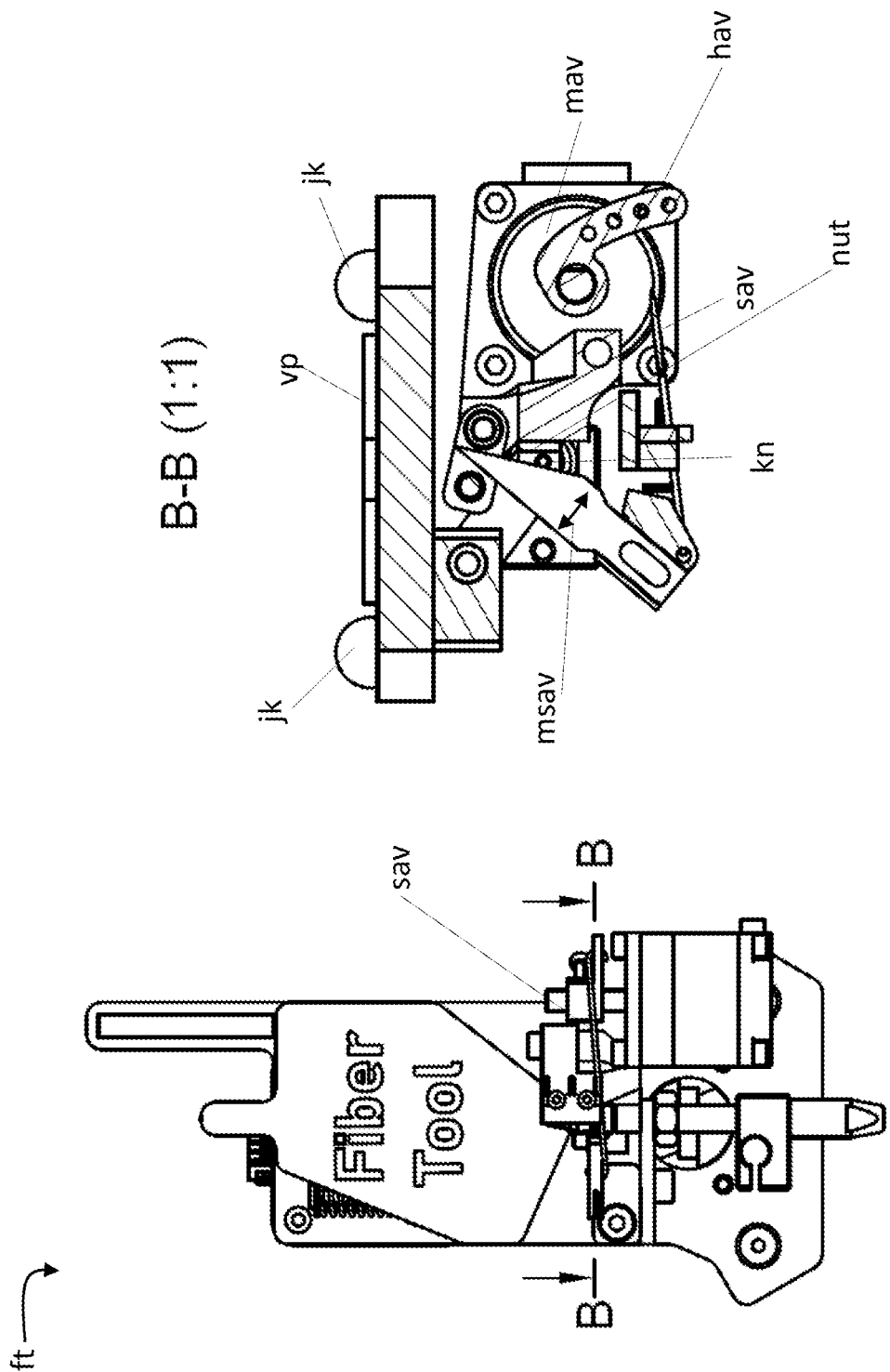
FIG. 67 shows a section along line B-B through the example functional fiber insertion device of FIG. 64*a*.

As already described, FIG. 64a shows the exemplary functional fiber insertion device (ft) (fiber tool) from the front side. The heating device (hk) can be seen, which can melt a surface (of) located in the vicinity of the heating device (hk) according to the proposal. The cutting and severing device (av) can also be seen. The cutting and severing device (av) separates the functional fiber (ff), which may be located in the channel (kn) of the fiber insertion device, on the basis of a signaling of the computing or control system, for example, comprising a separating direction meter (masv). The motor (mav) of the cutting and severing device (av) actuates the separation direction knife (masv) via a linkage (sav, hab) preferably in dependence on a signal of the computing or control system. Said linkage comprises in the example of FIG. 64 a lever (hav), which in the example of FIG. 64 is directly attached to the axis of the motor (mav) of the cutting and severing device (av). If the rotor of the motor (mav) changes its angular position, the lever (hav) pushes or pulls horizontally on the end of the knife (msav) via a rod, depending on the direction of rotation. The knife is rotatably mounted. FIG. 67 shows a section through the functional fiber insertion device (ft), whereby the choice of the section line ensures that FIG. 67 well represents the mode of operation of the exemplary cutting and severing device (av).

A holder (ha1) is attached to the top of the functional fiber insertion device (ft) of FIG. 64. The holder (ha1) allows, for example, the attachment of a hose for feeding the functional fiber (ff) from a functional fiber supply. For example, a cable tie may mechanically secure the tubing or other conduit to the holder (ha1).

As already mentioned. FIG. 64b shows the exemplary functional fiber insertion device (ft) (fiber tool) from the left side. The motor (mar) of the functional fiber feed device (mar, ar, vpr) can be seen. The pressure roller (pr) of the functional fiber feed device (mar, ar, pr, fed, B) for transporting the functional fiber (ff) ran be seen in FIG. 64d). By means of an L-shaped beam (B), which is mounted rotatably about an axis in the bend of the "L"-s of its L-shape, a spring (fed) presses the pressure roller (pr) against the drive roller (ar) by means of the L-shaped beam (Bk).

Figure 68:
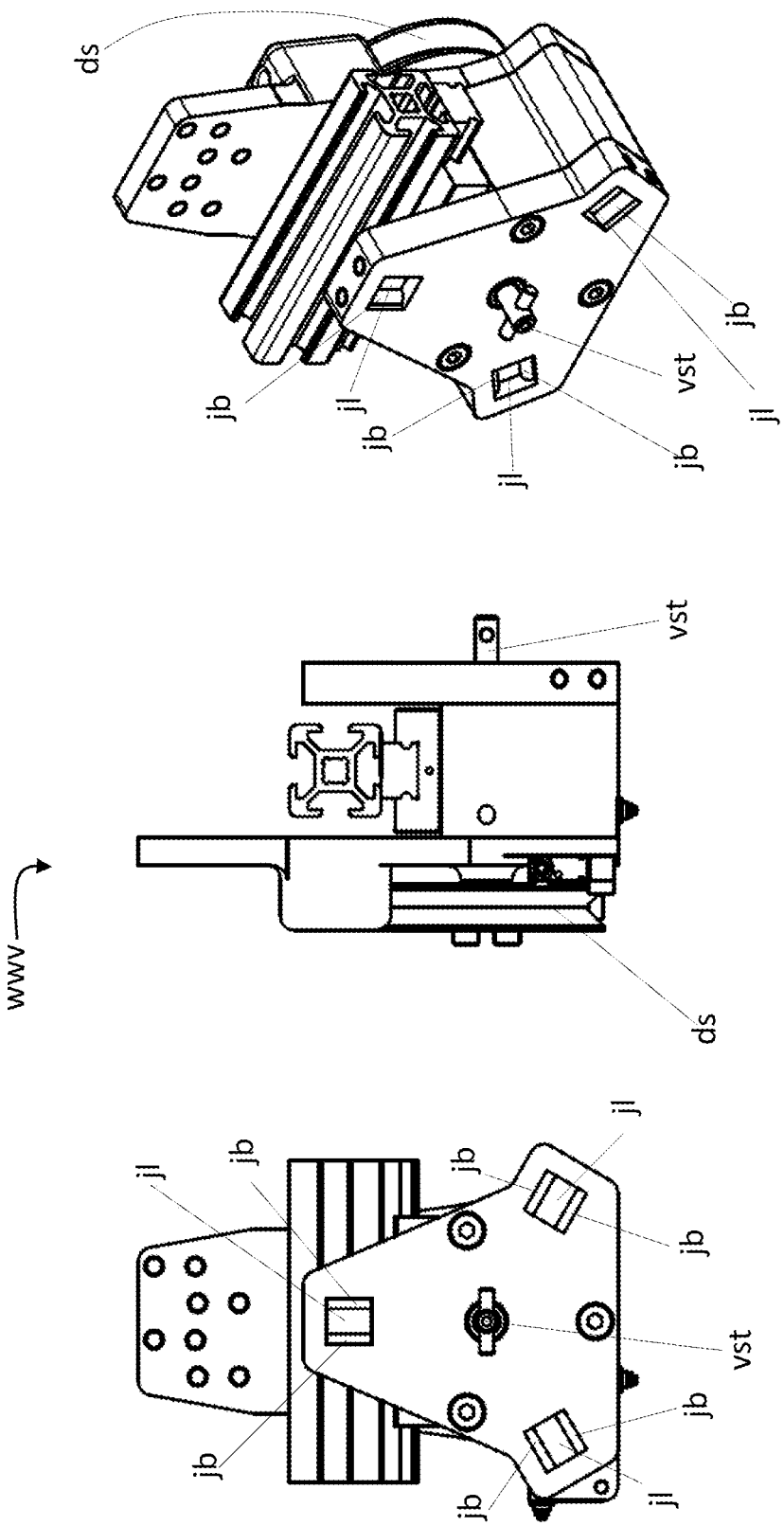
FIG. 68 shows an example tool changing device.

A locking plate (vp) is located at the rear of the functional fiber insertion device (ft). The locking plate (vp) has a slot (vrs) which corresponds with a cross bolt of a locking pin (vst). The locking pill (vst) is shown in FIG. 68. A turntable (ds) can rotate the locking pin (vst) about its longitudinal axis. In a first position, which can adjust such a rotation of the locking pin (vst) around its longitudinal axis, the transverse pin of the locking pin (vst) can pass the slot (vrs) in the locking plate (vp) of the functional fiber insertion device (ft). In this first position of the locking pin (vst), the rotation of the locking pin (vst) of the tool changing device (wwv) in cooperation with the locking plate (vp) of the functional fiber insertion device (ft) can connect the functional fiber insertion device (ft) comprising the tool changing device (wwv) of FIG. 68 by pressing them together mechanically or an release the functional fiber insertion device (ft) from the tool changing device (wwv) of FIG. 68 by a rotation in the opposite direction. The tool changing device (wwv) of FIG. 68 is preferably located on a positioning device which, after coupling the functional fiber insertion device (ft) to the tool changing device (wwv), can position this composite of tool changing device (wwv) and functional fiber insertion device (ft) depending on the task, in particular relative to the workpiece (wst). In the area of the slot (vrs), the locking plate (vp) preferably has a thickness which depends on the angle around the hare axis of a bore in the center of the slot (vrs). A rotation of the locking pin (vst) in the said bore of the slot (vrs) converts the torque of the rotary disk (ds) of the tool changing device (wwv) into a force that presses the functional fiber insertion device (ft) against the tool changing device (wwv). In order to ensure the repeatability of the positioning after the tool change, the functional fiber insertion device (ft) in the example of FIG. 64 is provided comprising three adjustment ball segments (jk). Corresponding to these three adjustment ball segments (jk) are three adjustment bearings (jl) of the tool changing device (wwv) (see also FIG. 68). In the example of FIG. 68, each of the exemplary three adjusting bearings comprises two round adjusting bolts (jb) installed parallel to each other on the left and right of an adjusting opening. Each pair of adjusting bolts (jb) is preferably installed such that its adjusting bolts (jb) define a surface whose normal vector is preferably parallel to the axis of the adjustment ball segments (jk). After locking the connection between the locking plate (vp) of the functional fiber insertion device (ft) and the locking pin (vs) of the tool changing device (wwv), the adjustment ball segments (jk) are then mechanically securely mounted on these adjusting bolts (jb) having a repeatable geometric arrangement relative to one another.

As already mentioned, FIG. 64d shows the exemplary functional fiber insertion device (ft) (fiber tool) from the right side. In addition to the parts of the device already mentioned above, a limit switch can also be seen. The limit switch signals to the computer of the computing and control system that the knife (msav) has reached an end position. Then the computer preferably switches the motor (msav) off and stops in this way then preferentially the further movement of the knife (msav). Alternatively, it may be possible to use other position sensors, for example Hall sensors, to determine and/or detect the position of the knife (msav). Thus, in order to prevent damage to the device, it is useful for the computer or control system to monitor the position of the knife (msav) and to control the motor (mav) of the cutting and separating device depending on the determined position.

As mentioned above, FIG. 64e shows the exemplary functional fiber insertion device (ft) (fiber tool) from the top side From this perspective, the channel (kn) is visible, via which, for example, an undrawn hose feeds the functional fiber (ff) to the functional fiber insertion device (ft), for example, from an equally undrawn functional fiber spool comprising the functional fiber supply.

As mentioned above, FIG. 64f shows the exemplary functional fiber insertion device (ft) (fiber tool) from the underside. From this perspective, the channel (kn) in the heating device (hk) is visible, through which the functional fiber (ff) leaves the functional fiber insertion device (ft) again in the typically heated state and enters the melting region (b) of the surface (of) of the workpiece (wst) at the insertion point (ep) not drawn in FIG. 64 and remains there.

FIG. 65 shows the functional fiber insertion device (ft) of FIG. 64 from four different oblique views for clarity.

FIG. 66 shows a section along line A-A through the functional fiber insertion device (ft). The cut A-A is selected so that the cut A-A intersects the channel (kn), which mechanically guides the functional fiber (ff) during the insertion process, in its full length. The positioning of the cut is shown in the lets partial figure of FIG. 66, which shows the functional fiber insertion device (ft) in side view.

The right partial figure shows the said section along the line A-A. The channel (kn) has two different diameters in the example of FIG. 66. In the upper part of the duct (kn) in the section of the duct (kn) opposite the heating device (hk), the diameter of the duct (kn) is larger. In the lower part of the duct (kn) in the section of the duct that also passes the heating device (hk), the diameter of the duct (kn) is smaller in this example. A funnel (tr) adjusts the diameter of the upper section of the duct (kn) to the smaller diameter of the duct (kn). This funnel simplifies the rethreading of the functional fiber (ff) into the lower section of the channel (kn) after passing the functional fiber feeding device (ar, pr). As described above, a spring (fed) presses the pressure roller (pr) against the drive roller (ar) by means of an L-shaped beans (Bk). The motor (mar) of the functional fiber feed device drives the drive roller (ar). The functional fiber an passes from above through the upper section of the channel (kn) between the drive roller (ar) and the pressure roller (pr). The drive roller (art rotates and therefore conveys the functional fiber (ff) further into the lower section of the channel (kn). The funnel (tr) ensures that the beginning of the functional fiber (ff) threads securely into the lower section of the channel when first passing this functional fiber feed device. In the lower third of the channel (kn), the functional fiber then passes the cutting and severing device (av) This comprises, as in FIGS. 64 and 65 here exemplarily the knife (msav), the linkage (sav, hav). In FIG. 66, the locking plate (vp) can be seen from the rear. In the example, the locking plate has two wedge structures on the surface of its now facing side, the height of which above the rear surface of the locking plate (vp) depends on the angular position relative to die axis of the bore through the slot of the locking plate (vp).

FIG. 67 shows a further section through the functional fiber insertion device (ft). The cutting plane is now perpendicular to the channel (kn). The position of the cutting plane intersects the functional fiber insertion device (ft) in such a way that the cutting and severing device (av) of the functional fiber insertion device (ft) is clearly visible.

The coupling rod (sav) between the knife (msav) and the lever (hav) of the cutting and severing device (av) dues not run parallel to the sectional plane of FIG. 67 in the example of FIGS. 64 to 67. Therefore, the right partial figure of FIG. 67, which reproduces the section B-B of the left partial figure, shows only a part of the coupling rod (sav) between the knife (msav) and the lever (hav) of the cutting and severing device (av). The coupling rod (sav) couples the knife (msav) and the lever (hav) of the cutting and severing device (av). The motor (mav) of the cutting and separating device turns the lever (hav) in response to a control signal from the computer or control system. This also pivots the blade (msav) about an axis of rotation by means of a power transmission through the coupling rod (sav) between the blade (msav) and the lever (hav) of the cut-off and separation device (av). The blade of the knife (msav) swivels into a corresponding groove (nut) opposite the blade of the knife (msav). This forces a functional fiber (ff) located in the channel (kn) to assume a very small bending radius. If the functional fiber (ff) in the channel (kn) is a carbon fiber, for example, it typically has a minimum bending radius. The bending radius into which the combination of blade (msav) and groove (nut) force the functional fiber when the blade of the blade (msav) is swiveled into the channel (kn) is preferably smaller than the minimum bending radius of the functional fiber (ff) to be processed, so that it breaks through. This cutting and severing device (av) has proven effective for carbon fibers as functional fibers (ff). If necessary, the use of other cutting and separating mechanisms, such as the use of mechanized shears, is possible for other types of functional fibers (ff) in a functionally equivalent manner.

FIG. 68

FIG. 68 shows the tool changing device (wwv), which is preferably attached to the positioning device. In the previously described FIGS. 64 to 67, the proposed functional fiber insertion device (ff) has three adjustment ball segments (jk) in each case, to which four adjustment bearings (jl) correspond here. In the example of FIG. 68, the adjusting bearings (jl) are manufactured in a bearing plate. Each adjustment bearing (jl) comprises two parallel oriented round adjusting bolts (jb). The adjusting bolts (jb) are spaced from one another in such a way, that a) the surface of an adjustment ball segment (jk) of the functional fiber insertion device (ft) is in contact with the first adjusting bolt (jb) of an adjustment bearing (jl) only at a first point, and that b) the surface of this adjustment ball segment (jk) of the functional fiber insertion device (ft) is in contact with the second adjusting bolt (jb) of the adjustment bearing (jl) only at a second point, is in contact with the second adjusting bolt (jb) of this adjusting bearing (jl) only at a second point, and in that c) the surface of this adjustment ball segment (jk) of the functional fiber insertion device (ft) is not in contact with any further points of the surface of the tool changing device (wwv). Thus, in this example, the functional fiber insertion device (ft) preferably has exactly six points of contact with the tool changing device (wwv).

FIG. 68 also shows the turntable (ds). The actuating device (btv) shown in FIG. 70 turns the turntable (ds) in one direction or the other, for example, by means of Bowden cables not shown in the figures. The locking pin (vst) has a transverse pin at its end opposite the turntable. Turning the turntable (ds) changes the orientation of the cross bolt of the locking pin (vst). This rotation of the cross bolt of the locking pin (vst) can couple or decouple the functional fiber insertion device (ff) to or from the tool changing device (wwv) on the positioning device by means of the locking plate (vp), the adjustment ball segments (jk) and the adjustment bearings (jl).

FIG. 69

Figure 69:
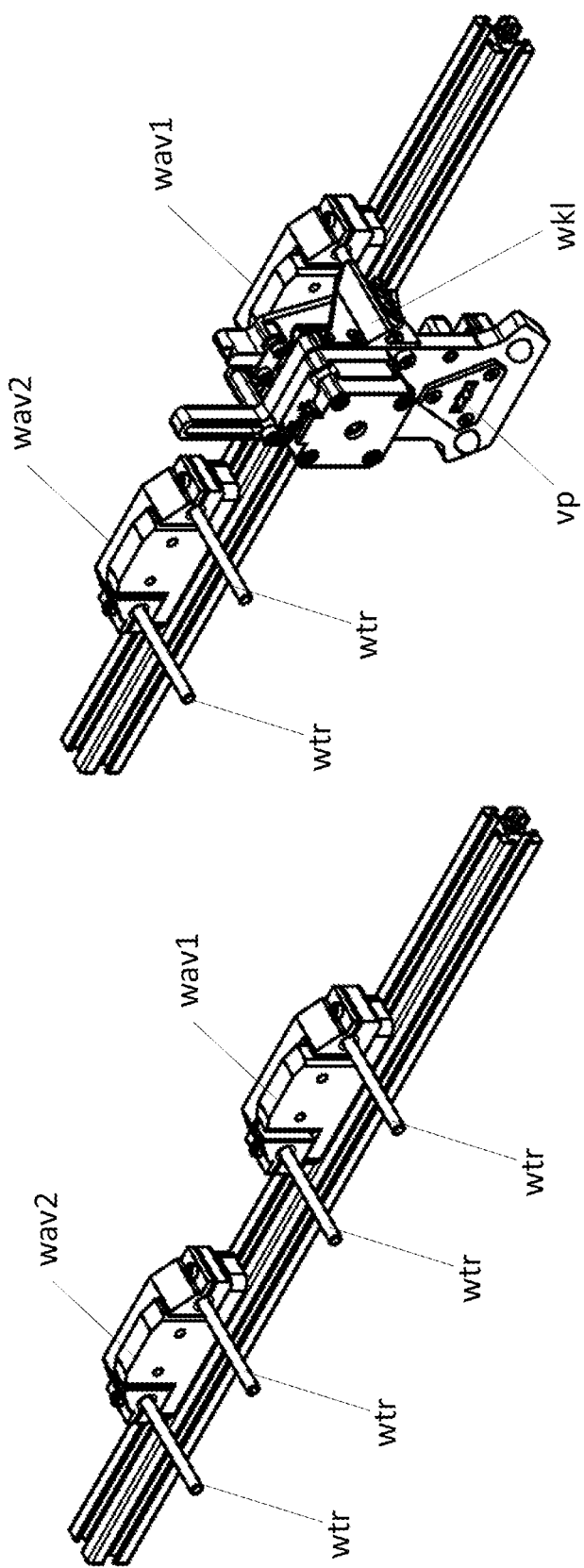
FIG. 69 shows an example first tool set-down device and an example second tool set-down device.

FIG. 69 shows a first tool set-down device (wav1) and a second tool set-down device (wav2) mounted on a linkage of the 3D printing device. Each of the tool set-down devices (wav1, wav2) has two tool support bolts (wtr) in this example. The positioning device of the 3D printing device sets down on this. To make this possible, tool clamps (wk1) are attached to the tools on the left and right of the tools in the example of a 30 printing device according to the proposal described here. The tool clamps (wk1) hold the tools on the respective tool set-down devices (wav1, wav2) after being set down by the positioning device of the 3D printing device. This enables the computing and control system of the 3D printing device according to the proposal, in dependence on control signals of said computing and control system, to set down the respective tool on a tool set-down device (wav1, wav2), which is preferably assigned to the respective tool at least temporarily, at a corresponding parking position within the 3D printing device. The tools may be, for example, the FD_extruder (extr) and/or the said functional fiber insertion device (ff). The left partial figure of FIG. 69 shows two tool set-down devices (wav1, wav2) without set-down tools. In the right partial figure, a tool is set off on the right tool set-down device (wav1). This is the exemplary functional fiber insertion device (ft) described above.

FIG. 70

Figure 70:
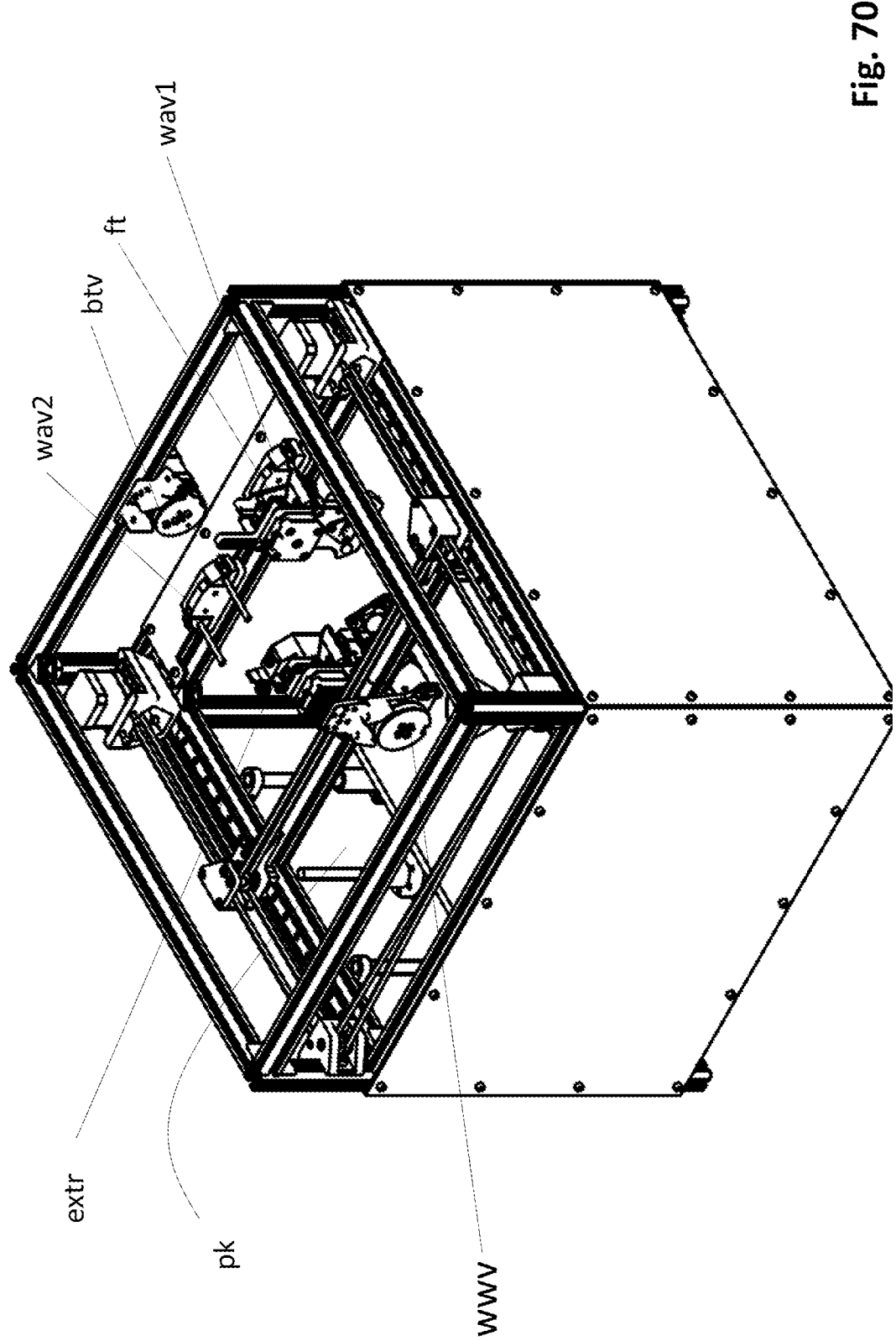
FIG. 70 shows an example 3D FDM printing device.

FIG. 70 shows an exemplary 3D FDM priming device having the proposed capability for inserting a functional fiber (ff) into a workpiece (wst) during 3D printing.

The exemplary 3D-FDM printing device comprises the aforementioned tool changing device (wwv), an extruder (extr) for FDM printing with the aid of an undrawn filament, a second tool set-down device (wav2) as a parking position for the extruder (extr), a functional fiber insertion device (ft), a first die set-down device (wav1) for this functional fiber insertion device (ft), a positioning device, an actuating device (btv) for the clamping device comprising a locking pin (vst) of the die change device (wwv) and a locking plate (vp) of the respective die, and a computer system or control system for controlling the system. The figure leaves heating plates, air conditioning, etc. are omitted for simplification. Reference is taken here to the state of the art for FDM 3D printers.

As a rule, the 3D printer comprising the tool changing device (wwv) will first pick up the extruder (extr) at the second tool set-down device (wav2). For this purpose, the actuating device (btv) for the clamping device brings the cross bolt of the locking pin (vst) of the tool changing device (wwv) into such a position that the cross bolt can pass the slot (vrs) of the locking plate (vp) of the extruder. The die changing device (wwv) picks up the extruder (extr). After the cross bolt of the locking pill (vst) has passed the slot (vrs) of the locking plate (vp) of the extruder, the actuating device (btv) for the clamping device rotates the cross bolt of the locking pin (vst) of the die changing device t wwv) to such a position that the cross bolt can no longer pass the slot (vrs) of the locking plate (vp) of the extruder. Wedges on the back of the locking plate (vp) of the extruder (extr) mechanically tighten the mechanical connection between the die changing device (wwv) and the extruder (extr). Now extruder (extr) and die changing device (wwv) form a second mechanical unit. Preferably, the proposed printing device determines the exact coordinate of the extruder opening by means of sensors and/or switches and targeted movements of this unit consisting of extruder (extr) and die chancing device (wwv). After tempering, the FDM printing known from the prior art then begins.

For the insertion of a functional fiber (ff) the document presented here now suggests that the extruder (extr) interrupts the FDM printing, preferably after completing the layer in which the functional fiber insertion device (ft) is to embed the functional fiber (ff). For this purpose, the positioning device brings the unit consisting of extruder (extr) and tool changing device (wwv) back to the second tool set-down (wav2). After the positioning device has brought the unit consisting of extruder (extr) and die change device (wwv) to the second die set-down device (wav2), the actuating device (btv) for the clamping device brings the cross bolt of the locking pin (vst) of the die change device (wwv) back into such a position that the cross bolt can pass the slot (vrs) of the locking plate (vp) of the extruder. This releases the second mechanical unit consisting of extruder (extra and die changing device (wwv) again.

The positioning device now moves the tool changing device (wwv) to the first tool set-down device (wav1). In the first die set-down device (wav1), the functional fiber insertion device (ft) is located in the example described here.

The tool changing device (wwv) receives the functional fiber insertion device (ft) in the first tool set-down device (wav1). After the cross holt of the locking pin (vst) has passed the slot (vrs) of the locking plate (vp) of the functional fiber insertion device (ft), the actuating device (btv) for the clamping device turns the cross bolt of the locking pin (vst) of the tool changing device (wwv) into such a position that the cross bolt can no longer pass the slot (vrs) of the locking plate (vp) of the functional fiber insertion device (ft). Wedges on the back of the locking plate (vp) of the functional fiber insertion device (ft) mechanically tension the mechanical connection between the tool changing device (wwv) and the functional fiber insertion device (ft) and press this mechanical connection together. Now the functional fiber insertion device (ft) and the die changing device (wwv) form a second mechanical unit.

Preferably, the proposed printing device uses sensors and/or switches and targeted movements of this first mechanical unit consisting of the functional fiber insertion device (II) and the tool changing device (wwv) to determine the exact coordinate of the exit opening of the channel (kn) of the functional fiber insertion device (ft) or a functionally equivalent coordinate that is in a fixed relationship relative to this opening. An offset value determined, if applicable, is then suitably taken into account in the following 3D printing process steps by means of an affine coordinate transformation by the computer and control system. After the heating device (hk) has been tempered, one of the processes described above for inserting a functional fiber (ff) into the surface (of) of a workpiece then begins.

Now, this document suggests for resuming FDM 3D printing after inserting the functional fiber (ff) that the functional fiber insertion device (ff) finishes inserting the functional fiber (ff) into the surface (of) of the workpiece (wst), in that the cutting and severing device (av) separates the functional fiber at a typically predetermined point and the functional fiber insertion device (ff) inserts this remaining piece of the functional fiber (ff) between the cutting and separating device on the one hand and the insertion point (ep) on the other hand into the surface (of) of the workpiece (wst). After finishing the insertion of the functional fiber (ff) into the surface (of) of the workpiece (wst), the positioning device brings the first mechanical unit consisting of the functional fiber insertion device (ft) and the tool changing device (wwv) back to the first tool set-down device (wav1). After the positioning device has brought the first mechanical unit consisting of the functional fiber insertion device (ft) and the tool changing device (wwv) to the first tool set-down device (wav1), the actuating device (btv) for the clamping device brings the cross bolt of the locking pin (vst) of the tool changing device (wwv) back into such a position that the cross bolt can pass the slot (vrs) of the locking plate (vp) of the functional fiber insertion device (ft). This releases the first mechanical unit consisting of the functional fiber insertion device (ft) and the tool changing device (wwv) again.

Provided that the 3D printing device is to continue the FDM printing further layers, which is typically the case, the positioning device of the 3D printing device now brings the tool changing device (wwv) back to the second tool set-down device (wav2), in which the extruder (ext) is located. After the extruder (extr) has been picked up by the tool changing device (wwv), the then newly formed second mechanical unit comprising the extruder (extr) and the tool changing device (wwv) continues the process of FDM printing by printing the next layer.

FIG. 71

Figure 71:
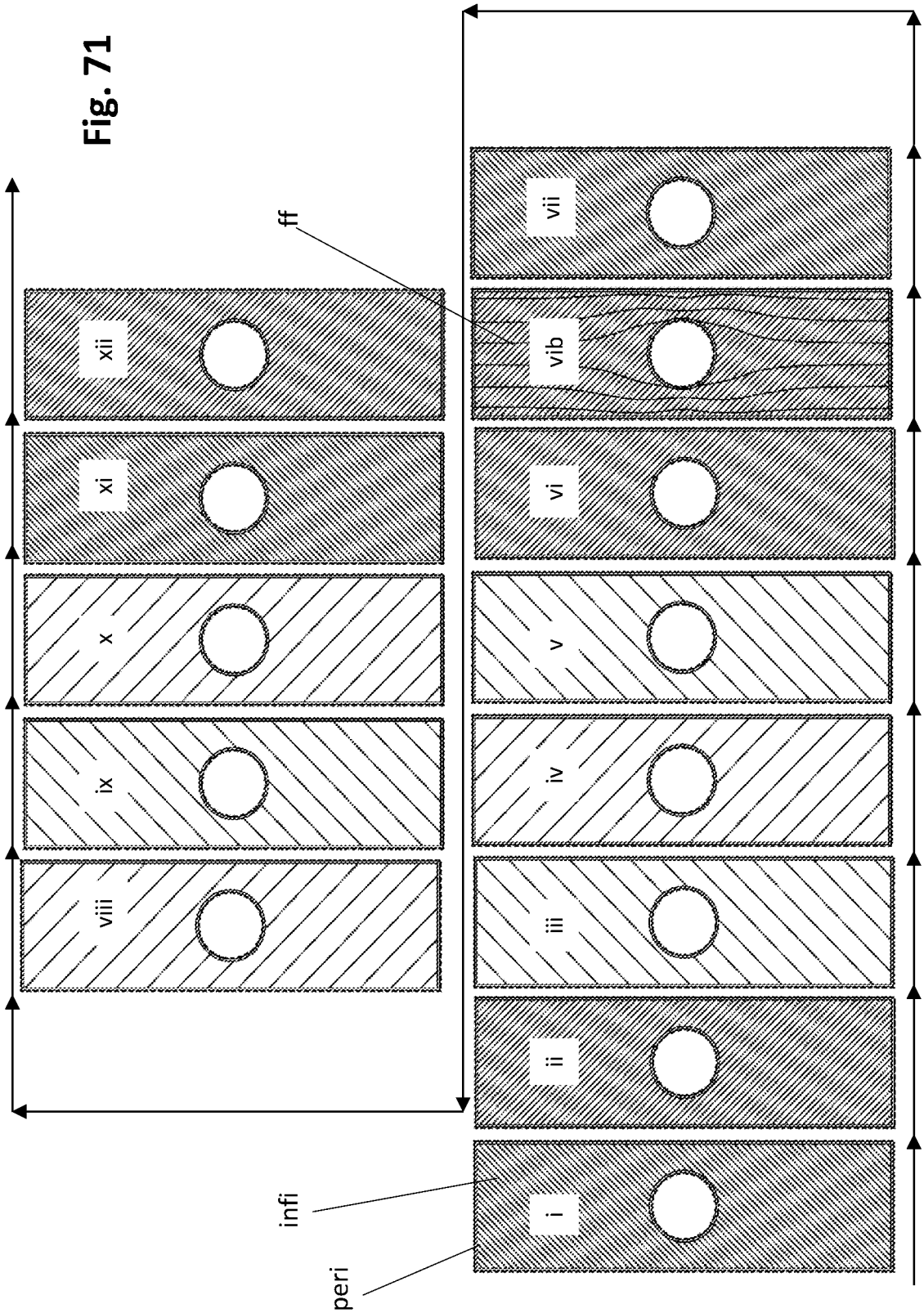
FIG. 71 shows an example of a procedure for 3D printing of an example test specimen using an FDM printing technique.

FIG. 71 shows an example of the procedure for 3D printing an exemplary test specimen using an FDM printing technique. The dashed lines represent the external dimensions of the test specimen. The solid lines represent the material lines of the molten filament material deposited by the extruder (extr) in the relevant layer during the creation of the workpiece (wst).

A computer system executes a data processing program, hereinafter referred to as slicer. The slicer converts a first set of data describing the geometry of the workpiece (wst) to be created into data that can control the depositing of the line material on the workpiece (wst) by the extruder (extr) and that can control the insertion of the functional fiber (ff) into the workpiece.

Typically, the 3D printing fixture begins by depositing the material lines that define the perimeter of the workpiece in the layer in question. This document hereafter names these material lines with the term perimeter (peri). After 3D printing the perimeter lines, which later form the surfaces of the workpiece (wst), the 3D printing device fills the interior of the workpiece (wst) using a so-called infill (infi). In the example of FIG. 71, the lowest layer (i) later forms an outer surface of the workpiece (wst). Therefore, the 3D printing device places the material lines of the infill (infi) in the first layer (i) and in the second layer (ii) so close to each other that the material lines preferably touch and adhere to each other. Preferably, the material lines of the first layer (i) are not parallel to the material lines of the second layer (i). In the step-by-step, simplified, schematic process shown in FIG. 71, the 3D printing apparatus according to the proposal produces an exemplary test specimen having exemplary 12 layers (i to xii). In the example of FIG. 71, the layers (iii to v) printed after the two outer layers, the first layer (i) and the second layer (ii), also have an infill (infi). However, in the example of FIG. 71, the 3D printing device does not perform the infill of the third layer (iii) and the infill of the fourth layer (iv) and the infill (infi) of the fifth layer (v) as densely as the infill (infi) of the first layer (i) and the infill of the second layer (ii). This saves filament material.

In the example of FIG. 71, the 3D printing apparatus is to insert a carbon fiber as an exemplary functional fiber (ff) into the sixth layer (vi) to obtain a sixth layer (vib) comprising the functional fiber (ff) inserted.

For good insertion of the functional fiber (ff) and for a good mechanical connection between the functional fiber (ff) and the infill at the location of the insertion of the functional fiber (ff), for example by adhesion, it is useful if the 3D printing device places the material lines of the infill so densely, at least in the area of the insertion of the functional fiber (ff), that they preferably already form a closed area in these insertion areas of the functional fiber (ff) before the insertion of the functional fiber (ff). Preferably, this closedness of this surface extends to a minimum distance to the left and right of the planned insertion line for the insertion of the functional fiber (ff) into the temporary surface of the workpiece (wst). In the example of FIG. 71, this temporary surface (of) of the workpiece (wst) before the insertion of the functional fiber (ff) is the temporary surface of the sixth layer (vi). In the example of FIG. 71, for simplicity, the sixth layer (vi) is not only made dense to the minimum distance to the left and right of the planned insertion line of the functional fiber (ff) so that it forms a closed surface. In the example shown in FIG. 71, the sixth layer (vi) is alternatively dense over the entire surface so that it forms a closed surface over the entire surface. With the aid of the functional fiber insertion device (ft), the device according to the proposal inserts the functional fiber (ff) into the sixth layer (vi). Preferably, the slicer calculates the intended insertion line based on one or more finite element simulations of the workpiece based on one or more mechanical load cases relevant to the application. Preferably, an intended insertion line of a functional fiber (ff) thereby essentially corresponds to the course of a mechanical stress field within the plane of the layer, here exemplarily the sixth layer (vi). Preferably, the 3D printing device covers this modified sixth layer (vi) using a seventh layer (vii) after insertion of the functional fiber (ff) or after insertion of the functional fiber (ff). For a good coverage of the functional fiber (ff) comprising filament material and for a good mechanical connection between the functional fiber (ff) and the infill of the seventh layer (vii) at the place of insertion of the functional fiber (ff) into the sixth layer (vi), for example by adhesion, it is useful, if the 3D priming device also places the material lines of the infill of the seventh layer (vii) at least in the region of the insertion of the functional fiber (ff) so densely that they preferably form a closed surface above the functional fiber (ff) in these insertion regions of the functional fiber (ff). Preferably, this closedness of this area extends to a minimum distance to the left and right of the insertion line for the insertion of the functional fiber (ff) into the sixth layer (vi) of the workpiece (wst). In the example of FIG. 71, for simplicity, the seventh layer (vii) is also made dense not only to the minimum distance to the left and right of the insertion line of the functional fiber (ff) into the sixth layer (vi) so as to form a closed surface. In the example shown in FIG. 71, the seventh layer (vii) is alternatively dense over the entire surface so that it forms a closed surface over the entire surface.

Figure 72:
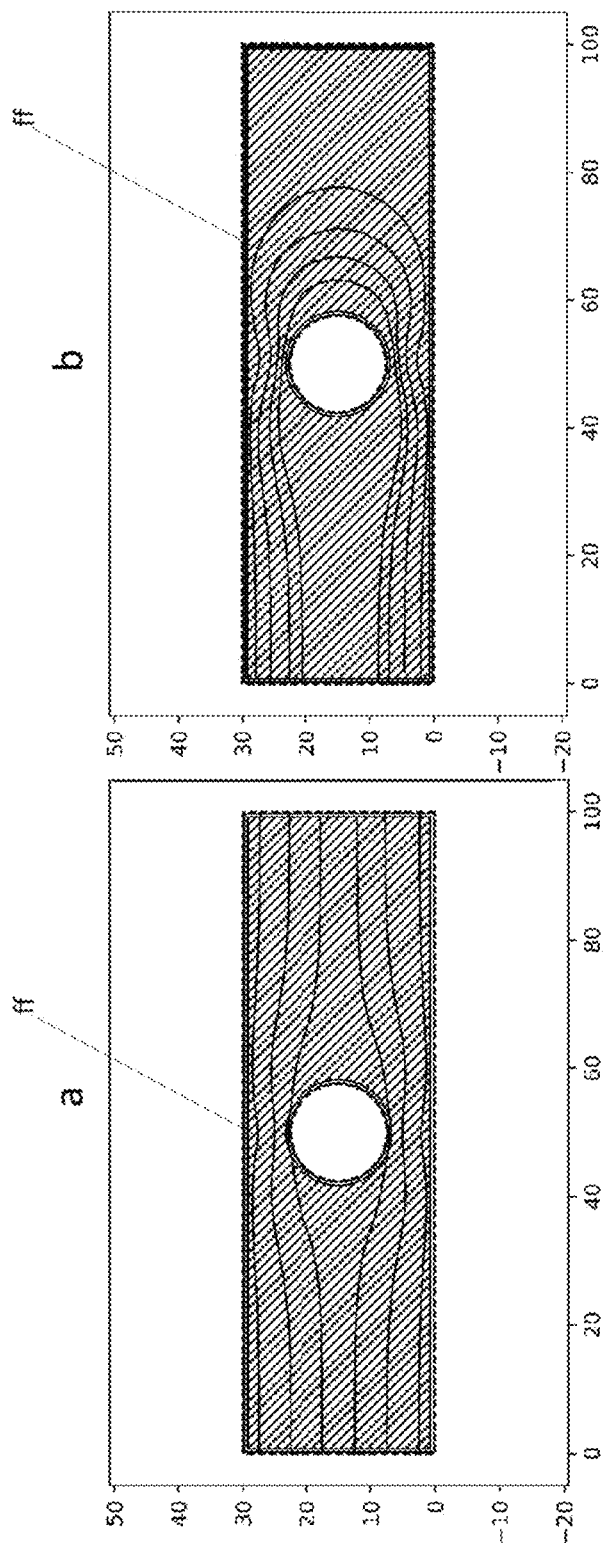
FIG. 72 shows example favorable loading lines for the example test specimen of FIG. 71.

In the example of FIG. 71, the exemplary layers (viii to x) printed after the seventh layer (vii) also have infill (infi). However, in the example of FIG. 71, the 3D printing device does not perform the infill of the eighth layer (viii) and the infill of the ninth layer (ix) and the infill (infi) of the tenth layer (x) as densely as the infill (infi) of the seventh layer (vii). This again saves filament material. In addition, this less dense infill (ini) in the eighth layer (viii), the ninth layer (ix) and the tenth layer (x) also mitigates the disturbances caused by the functional fiber (ff) and the insertion of the functional fiber (ff) in the sixth layer (vi). This makes it possible that, in the example of the test specimen of FIG. 71, the uppermost twelfth layer (xii) normally does not allow any conclusion to be drawn without further ado about the embedding of the functional fiber (ff) in the test specimen. After printing the tenth layer (x), the 3D printing device prints the eleventh layer (xi) and the twelfth layer (xii) using the extruder (extr). Since the twelfth layer (xii) is again to be an outer layer of the specimen, the slicer in the data set for the 3D printer provides for dense printing of the material lines so that preferably both the twelfth layer (xii) and the eleventh layer (xi) form closed cases. The chain of arrows in FIG. 71 is intended to illustrate the processing sequence.
FIG. 72

FIG. 72 shows possible favorable loading lines for the test specimen of FIG. 71 for Iwo different load cases FIG. 72a shows exemplary load lines for carbon fibers as functional fibers (ff) for an exemplars intended load case, which is based on an exemplary restraint of the specimen at the left outer edge of the specimen and at the right outer edge of the specimen and assumes an exemplary tensile load having these restraints.

FIG. 72b shoes exemplary insertion lines for carbon fibers as functional fibers (ff) for an exemplary intended load case, which assumes an exemplary clamping of the specimen at the left outer edge of the specimen and an exemplary bolt load in the round hole in the center of the specimen. The case of FIG. 72b also assumes an exemplary tensile load having the clamping on the left side and a bolt load directed to the right in the hole of the exemplary test specimen.

LIST OF REFERENCE SYMBOLS

1 Start of the overall process;
2 Fill the printer using sufficient powder;
2b Fill the printer using sufficient filament;
3 Check the printer's readiness for operation;
4 Does the machine work?;
5 Perform troubleshooting;
6 Place the component in the construction chamber;
7 Set pressure parameters;
8 Transfer construction commands to the primer;
9 Heating of the construction space, preparation of the powder bed;
9b Heating of the construction space, preparation of the heating bed;
10 Sintering of the component;
10b Extrusion or additive manufacturing of the component;
10.1 Starting the sub-process "Sintering of the component";
10b.1 Start of the sub-process "Extrude or additive manufacturing of the component";
10.2 Should the 3D priming device insert a functional fiber (ff);
10.3 Unwind the functional fiber (ff);
10.4 Move functional fiber (ff) relatively;
10.5 Restricting the degrees of freedom of the functional fiber (ff);
10.6 Separate functional fiber (ff);
10.7 Last functional fiber (ff)?;
10.8 No protruding functional fibers (ff)?, functional fiber embedding device (ft) and build chamber in starting position;
10.9 Powder application+heating+sintering;
10b.9 Extrusion or additive manufacturing of a layer;
10.10 Last layer sintered?;
10b.10 Last layer manufactured?;
10.11 Lowering of construction platform;
10b.11 Lowering of the construction platform or increasing typical vertical clearance;
10.12 End of the subprocess "Sintering of the component";
10b.12 End of the sub-process "Extrude or additive manufacturing of the component";
11 Cooling process;
12 Remove the component from the construction chamber;
13 Sandblasting, fiber overhangs;
14 End of the overall process;
a heating region;
a1 first axis of the robot;
a2 second axis of the robot;
a3 third axis of the robot;
a4 fourth axis of the robot;
a5 fifth axis of the robot;
a6 sixth axis of the robot;
A1 first connection of the resistor (R);
A2 second connection of the resistor (R);

ab heating region;
ab1 first heating region;
ab2 second heating region;
ach axis;
a1 optional aluminum foil;
aof old surface of the layer (pw), which was previously the new surface torn);
ar drive roller of the functional fiber Iced device;
av cutting and see Bring device;
b melting region (is part of the heating region (ab));
B fixing means;
Bk L-shaped bar of the functional fiber feed device, using which the spring (fed) presses the pressure roller (pr) against the drive roller (ar) of the functional fiber teed device. The channel (kn) typically guides the functional fiber (ff) in operation between the pressure roller (pr) and the drive roller (ar). If the motor (mar) of the functional fiber feed device rotates the drive roller (ar), the drive roller transports the functional fiber (ff) as it rotates;
btv actuating device for the clamping device. The exemplary actuating device can, for example, rotate the locking pin (vst) in its position about its axis via Bowden cables not shown in the figures and by means of the rotary disk (ds), so that the transverse bolt of the locking pin (vst) is no longer positioned in such a way that it can pass through the slot (vrs) in the locking plate (vp). The exemplary actuating device can, for example, by means of Bowden cables not shown in the figures and by means of the rotary disc (ds), then rotate the locking pin (vst) in its position about its axis in the opposite direction such so that the transverse pin of the locking pin (vst) is positioned in such a way that it cannot pass through the slot (vrs) in the locking plate (vp) and the die change device (wwv) (FIG. 68) is finely clamped together with the functional fiber insertion device (ft) (FIGS. 64 and 65), for example;
e solidificating region;
d solidificated region;
d1 first wire;
dhk heating device (hk), for example, made of diamond;
ds turntable. The actuating device for the clamping device (btv) can be operated, for example, via Bowden cables not shown in the figures and can change the position of the turntable (ds) by rotating it about the axis of rotation of the locking pin (vst), which is preferably the axis of rotation of the turntable. This changes the orientation of the cross bolt of the locking pin (vst), so that in a first positioning the cross bolt of the locking pin (vst) is no longer positioned so that it can pass through the slot in the locking plate (vp), and in a second positioning it can pass through the said slot in the locking plate (vp);
e depth of melting of the material of the layer (pw) from the new surface (ofn) measured;
eb area of solidification;
ep insertion point;
extr extruder;
f first distance of the heating device (hk) to the new surface (ofn) of the heat spreader (w);
F pressure force of the pressure roller against the drive roller (ar) for transporting the functional fiber (ff). The pressure roller is typically stationary relative to the heating device (hk), as a counter bearing,
f1 first distance of the first heating device (hk1) to the new surface (ofn) of the heat spreader (wv);
f2 first distance of the second heating device (hk2) to the new surface (ofn) of the heat spreader (wv);
ff functional fiber;
fed spring, which presses the pressure roller (pr) against the drive roller (ar) by moans of the L-shaped bar (Bk),
fm filling material;
ft functional fiber insertion device;
g second distance (g) of the lower edge (uk) of the squeegee (rk) to the old surface (aof) of the layer (pw) previously held the new surface (ofn). The second distance is the thickness of the new layer (npw);
hav lever of the cutting and severing device (av);
hk heating device;
hk1 first heating device,
hk2 second heating device;
hk4 fourth heating device
hz1 first heating element;
hz2 second heating element;
hz21 second heating element of the first heating device Mkt;
hz22 second heating element of the second heating device (hk2);
hz4 fourth heating element of the fourth heating device (hk4);
ini infill;
jb adjusting bolt;
jk adjustment ball segment;
K1 first contact;
K2 second contact;
K3 third contact;
K4 fourth contact;
K5 fifth contact;
K6 sixth contact;
K7 seventh contact;
K8 eighth contact;
k1 second cooling device;
k11 second cooling device of the first heating element (hz1);
k12 second cooling device of the second heating element (hz2);
kn channel for the functional fiber (ff);
kt edge of the channel (kn);
kv first cooling device;
kz1 first cone gear wheel;
kw1 first spline shaft;
kw2 second spline shaft;
kw3 third spline shaft;
kz1 first cone gear wheel;
kz2 second cone gear wheel;
kz3 third cone gear wheel;
kz4 fourth cone gear wheel;
l1 first plain bearing sleeve;
l2 second bearing of the second spline shaft (kw2);
l3 third bearing of the third spline shaft (kw3);
LB1 first laser beam;
LB2 second laser beam;
lk electrically insulating lacquer or functionally equivalent layer;
lsp mirreot,
M motor;
Mi Meniscus of wetting;
mar motor of the functional fiber feed device (mar, ar, pr);
mav motor of the cutting and severing device (av);
msav severing device knife of the cutting and severing device (av);

npw new layer;
o1 first opening;
o2 second opening;
of first surface of the heat spreader (wv);
of2 second surface of the heat spreader (wv);
ofn new surface of the heat spreader (wv) by applying a layer (pw) of the material;
peri perimeter;
pk process chamber;
pp1 first tool set-down point for the functional fiber insertion device (ft) (fiber tool);
pr pressure roller tier transporting the functional fiber (ff);
pv stiffened powder layer;
pw layer (pw) of a material on the surface (of) comprising the formation of a new surface (ofn) parallel to the surface;
pwv advance material supply of fresh powder for the sintering process;
K electrical resistor;
rk the squeegee;
sav coupling rod between knife (msav) and lever (hav) of the cutting and severing device (av);
sl hose;
SL size;
SP spindle;
$\vartheta_1$ first process temperature. This is the target process temperature of the heat spreader (wv);
$\vartheta_2$ second process temperature. This is the target process temperature of the heating device (hk);
$\vartheta_{2a}$ process temperature of the first part oldie heating device (hk);
$\vartheta_{2b}$ process temperature of the second part of the heating element of the heating device (hk);
$\vartheta_{21}$ second process temperature of the first heating device (hk1);
$\vartheta_{21}$ second process temperature of the second heating device (hk2);
$\vartheta_3$ third process temperature. This is the nominal process temperature of the functional fiber (ff) before it is placed in the melt;
$\vartheta_4$ fourth process temperature. This is the process temperature of the process chamber (pk) or the process chamber temperature;
$\vartheta hk$ hctual heating device temperature of the heating device (hk);
$\vartheta_{wv}$ hctual heat spreader temperature of the heat spreader (wv);
ts temperature sensor;
uk bottom edge of the squeegee (rk).
vrs slot in the locking plate (vp);
v1 first speed of movement of the heating device (hk) relative to the heat spreader (wv);
v2 second speed at which the functional fiber feed device feeds the functional fiber (ff) to the workpiece (wst) (in FIG. 13 in the form of the new layer (npw));
v3 third speed at which the squeegee feed device moves the squeegee (rk) over the old surface (aof);
vb solidified area;
vb1 first solidified area;
vb2 second solidified area;
vp Locking plate;
vr stock supply roll for the functional fiber (ff);
VSM motor tier transporting the functional fiber (ff) towards the surface (OF) of the layer (pw);
wav1 first tool set down device;
wav2 second tool set down device;
wk1 tool clamp
wsl workpiece. The workpiece is preferably an object produced by an additive manufacturing process. Preferably, it is an intermediate state of the printing process of the additive manufacturing process. However, in the spirit of this proposal, it is also conceivable to use other workpieces for the insertion process detached from the manufacturing process. For example, the workpiece in such a case can be an injection-molded part or a part from a machining manufacturing process, into the surface of which a device then inserts functional fibers on with the aid of a process such as that presented here and/or with the aid of a functional fiber insertion device (ft) according to the proposal;
wtr tool support bolt;
wv heat spreader;
wwv tool changing device;
wzt tool carrier;
$\chi$ contact angle;

REFERENCES

DE 10 2010 015 199 B9, Fiber guiding device and device for building a three-dimensional preform.
EP 1 274 976 131. Pressure and temperature sensor.
US 2016/0 067 928 A1. Multilayer fiber reinforcement design for 3d printing (2014).
VDI 3405. Additive manufacturing processes; Fundamentals. Terms. Process Descriptions, Berlin.
Akhoundi, B., Behravesh, A. H. & Bagheri Saed, A. (2019). "Improving mechanical properties of continuous fiber-reinforced thermoplastic composites produced by FDM 3D printer", in Journal of Reinforced Plastics and Composites, vol. 38, no. 3, pp. 99-116. http://dx.doi.org/10.1177/0731684418807300.
Baumann, F., Scholz, J. & Fleischer, J. (2017), "Investigation of a New Approach for Additively Manufactured Continuous Fiber-reinforced Polymers." in Procedia CIRP, vol. 66, pp. 323-328. http://dx.doi.org/10.1016/j.procir.2017.03.276.
Becker, J. (2019), Experimental capability analysis of a system for selective laser sintering of plastics, Master's thesis. Karlsruhe; Karlsruhe Institute of Technology.
Breuninger, J., Becker, R., Wolf, A., Rommel, S. & Verl. A. (2013), Generative Fertigung mit Kunststoffen, Springer Berlin Heidelberg, Berlin, Heidelberg. http://dx.doi.org/10.1007/978-3-642-24325-7.
Budding, A. & Vaneker, T. (2013). "New Strategies for Powder Compaction in Powder-based Rapid Prototyping Technique," in Procedia CIRP, vol. 6, pp. 527-532. http://dx.doi.org/10.1016/j.procir.2013.03.100.
Dickson, A. N., Barry, J. N., McDonnell, K. A. & Dowling, D. P. (2017). "Fabrication of continuous carbon, glass and Kevlar fiber reinforced polymer composites using additive manufacturing", in Additive Manufacturing, vol. 16, pp. 146-152. http://dx.doi.org/10.1016/j.addma.2017.06.004.
DIN EN ISO ASTM 52000:2018-60. Additive manufacturing—Fundamentals—Terminology (ISO/ASTM DIS 52900:2018); German and English version prEN ISO/ASTM52900; 2018. Berlin.
Fidan, I., Imeri, A., Gupta, A., Hasanov, S., Nasirov, A., Elliott, A., Alifui-Segbaya, F. & Nanami, N. (2019). "The trends and challenges of fiber reinforced additive manufacturing", in The International Journal of Advanced Manufacturing Technology, vol. 102, no. 5-8, pp. 1801-1818. http://dx.doi.org/10.1007/s00170-018-03269-7.

Gebhardt, A. (2016). Additive Manufacturing Processes; Additive Manufacturing and 3D Printing for Prototyping—Tooling—Production, 5th, newly revised and expanded ed. Aufl., Hanser, Munich.

Mark, G. T. & Gozdz, A. S. (2017), U.S. Pat. No. 9,579,851B2, Apparatus for fiber reinforced additive manufacturing.

Mark, G. T. & Gozdz, A. S. (2018), U.S. Pat. No. 10,099,427B2, Three dimensional printer with composite filament fabrication.

Matsuzaki, R., Ueda, M., Namiki, M., Jeong, T.-K., Asahara, H., Horiguchi, K., Nakamura, T., Todoroki, A. & Hirano, V. (2016), "Three-dimensional printing of continuous fiber composites by in-nozzle impregnation," in Scientific reports, vol. 6, pp. 23058. http://dx.doi.org/10.1038/srep23058.

Meyer, O. (2008), Short-fiber preform technology for force-flux compatible manufacturing of fiber composite components, PhD thesis, Stuttgart; University of Stuttgart.

Mielicki, C., Wegner, A., Gronhoff, B., Wortberg, J. & Witt, G. (2012). "Prediction of PAI2 melt viscosity in laser sintering by a time and temperature dependent Theological model", in: RTejournal.

Pirrung, F. (2019). Concept development to include continuous reinforcing fibres into the selective laser sintering process. Master thesis. Karlsruhe; Karlsruhe institute of Technology.

Prüß, H. & Victor, T. (2015). "Design for Fiber-Reinforced Additive Manufacturing", in Journal of Mechanical Design, No. Vol. 137.

Rahim, T. N. A. T., Abdullah, A. M. & Md Akil, H. (2019). "Recent Developments in Fused Deposition Modeling-Based 3D Printing of Polymers and Their Composites," in Polymer Reviews, vol. 59, no. 4, pp. 589-624. http://dx.doi.org/10.1080/15583724.2019.1597883.

Reis Silva, M., Pereira, A. M., Alves, N., Mateus, G., Mateus, A. & Malça, C. (2019), "Development of an Additive Manufacturing System for the Deposition of Thermoplastics Impregnated with Carbon Fibers", in Journal of Manufacturing and Materials Processing, vol. 3, no. 2, p. 35. http://dx.doi.org/10.3390/jmmp3020035.

Schmid, M. (2015a), Additive Manufacturing with Selective Laser Sintering (SLS), Springer Fachmedien Wiesbaden, Wiesbaden. http://dx.doi.org/10.1007/978-3-658-12289-8.

Schmid, M. (2015b), Selective laser sintering (SLS) with plastics: Technology, Processes and Materials, Hanser, Munich.

Schwarze, D., Wiesner, A. & Hermann, A. (2016), EP2818305B1, Powder application device and operating method for a powder application device.

Thüning, A. (2019), Research on system components in powder bed-based additive manufacturing processes, Seminar paper, Karlsruhe: Karlsruhe Institute of Technology.

Wendel, B., Rietzel, D., Kühnlein, F., Feulner, R., Hülder, G. & Schmachtenberg, E. (2008), "Additive Processing of Polymers," in Macromolecular Materials and Engineering, vol. 293, no. 10, pp. 799-809. http://dx.doi.org/10.1002/mame.200800121.

Zhu, W., Yan, C., Shi, Y., Wen, S., Liu, J., Wei, Q. & Shi, V. (2016), "A novel method based on selective laser sintering tier preparing high-performance carbon fibres/polyamide12/epoxy ternary composites", in Scientific reports, vol. 6, pp. 33780. http://dx.doi.org/10.1038/srep33780.

What is claimed is:

1. A functional fiber insertion device assembly comprising:
   a functional fiber insertion device (ft), wherein the functional fiber insertion device comprises:
      a channel (kn);
      a functional fiber feed device (mar, ar, pr) configured to feed a functional fiber (ff), wherein the functional fiber feed device (ar, pr) transports a functional fiber (ff) within the channel (kn) by the functional fiber feed device;
      a heating device (hk) and a heating element (hz); wherein the heating element (hz) provides heat to the heating device (hk) and wherein the heating device (hk) provides for a melting region (b) of a surface (of) of a workpiece (wst) where a surface of the heating device (hk) is adjacent at a distance (f) from the surface (of) of the workpiece (wst); and
      a cutting and severing device (av); and
   a heated shoe, wherein the heated shoe comprises:
      a fourth heating device (hk4), wherein the fourth heating device (hk4) comprises a metal sheet with a hole through the metal sheet; and
      a fourth heating element (hz4), wherein the fourth heating element (hz4) heats the fourth heating device (hk4) via a thermally conductive mechanical connection;
   wherein the heated shoe is fixedly attached to the functional fiber insertion device (ft);
   wherein the fourth heating device (hk4) is aligned essentially parallel to the surface (of) of the workpiece (wst);
   wherein the heated shoe is thermally isolated from the heating device (hk);
   wherein the heating device (hk) extends into the hole of the metal sheet without touching the metal sheet such that the metal shoe generates a temperature profile in the region surrounding the melting region (b); as the functional fiber insertion device assembly is swept at a first speed (v1) parallel to the surface (of) of the workpiece (wst); and
   wherein: the functional fiber insertion device (ft) inserts the functional fiber (ff) into a melt of a material of the surface (of) in the melting region (b) while the heated shoe generates the temperature profile surrounding the melting region (b).

2. The functional fiber insertion device assembly according to claim 1, wherein the functional fiber feed device includes a drive roller.

3. The functional fiber insertion device assembly according to claim 1, wherein the functional fiber feed device includes a pressure roller.

4. The functional fiber insertion device assembly according to claim 1, wherein the fourth heating device (hk4) has a thermally conductive connecting sleeve and the thermally conductive connecting sleeve is plugged onto the fourth heating element (hz4).

5. The functional fiber insertion device assembly according to claim 1,
   wherein the cutting and severing device (av) included in the functional fiber insertion device (ft) (fiber tool) is configured to separate the functional fiber (ff).

6. An additive manufacturing device comprising:
   a positioning device (SP, B, wv);
   means to perform a basic additive manufacturing process;
   a functional fiber feeder configured to transport a functional fiber (ff);

a computer and/or control system;
a functional fiber insertion device assembly according to claim 1 for carrying out a functional fiber insertion process different from the basic additive manufacturing process;
wherein the positioning device (SP, B, wv) positions the functional fiber insertion device (ft) (fiber tool) relative to the surface (of) of a workpiece (wst) in response to signals from the computer and/or control system, and
wherein the functional fiber feeder feeds the functional fiber (ff) to the functional fiber insertion device (ft) (fiber tool).

7. The additive manufacturing device according to claim 6, wherein the functional fiber feeder is a hose.

8. A device comprising:
the functional fiber insertion device (ft) (fiber tool) according to claim 1; and
a tool changing device (wwv); wherein:
the functional fiber insertion device (ft) (fiber tool) comprises a clamping device (vp);
the clamping device (vp) is suitable for mechanically coupling the functional fiber insertion device (ft) (fiber tool) to the tool changing device (wwv) and/or for mechanically decoupling the functional fiber insertion device (ft) (fiber tool) from the tool changing device (wwv) again;
the tool changing device (wwv) in cooperation with a positioning device is adapted to mechanically deposit the functional fiber insertion device (ft) (fiber tool) on a tool setting down device (wav1, wav2) having limited mobility;
the tool changing device (wwv) is adapted to mechanically resume the functional fiber insertion device (ft) (fiber tool) at the tool setting down device (wav1, wav2); and
the tool changing device (wwv) is positioned with respect to the workpiece with at least one degree of freedom in dependence on one or more control signals of a computing and/or control system in cooperation with the positioning device.

9. The device according to claim 8, wherein the clamping device (vp) is a locking plate.

10. A method for producing a three-dimensional device, comprising: providing a heat spreader (wv) comprising a planar surface (of);
applicating a layer (pw) of a material on a surface (of) of a workpiece (wst) with formation of a new surface (ofn) parallel to the planar surface (of);
bringing an assembly comprising a heating device (hk) and a heated shoe to the new surface (ofn), wherein the heated shoe comprises a fourth heating element (hz4) wherein the heated shoe comprises a metal sheet with a hole through the metal sheet, wherein the fourth heating element (hz4) heats the heated shoe via a thermally conductive mechanical connection, wherein the heated shoe is thermally isolated from the heating device (hk), and wherein the heating device (hk) extends into the hole of the metal sheet without touching the metal sheet such that the metal shoe generates a temperature profile in a region surrounding a melting region (b) as the assembly is swept at a first speed (v1) parallel to the new surface (ofn);
heating of the heating device (hk) to a second process temperature ($\vartheta_2$), wherein the heating takes place one of or both temporally before or temporally after the heating device (hk) is brought to the surface (of) and wherein the heating device (hk) comprises one or more heating devices (hk1, hk2) having one or more different second process temperatures ($\vartheta_{2a}$, $\vartheta_{2b}$);
generating the temperature profile around the heating device (hk) with the metal shoe;
heating the material in an area of the heating device (hk) in a warm-up area (a, b),
by infrared radiation of the heating device (hk), and/or
by heat transfer by convection from the heating device (hk) to the new surface (ofn), and/or
by direct mechanical contact between the heating device (hk) and the new surface (ofn), and/or
by heat transfer by means of a heat conducting device in a form of a functional fiber (ff), from the heating device (hk) to the new surface (ofn);
melting a portion of the material in the warm-up area (a, b) in a melting region (b) within the warm-up area (a, b) as a result of the heating the material in the warm-up area (a, b);
finishing the melting process:
by finally transporting the heating device (hk) away from the new surface (ofn), and/or
by lowering the temperature of the heating device (hk) below the second process temperature ($\vartheta_2$), the lowering of the temperature of the heating device (hk) converting the melting region (b) into a solidificating region (c); and
solidifying the melted material to solidified material in the solidificating region (c).

11. The method according to claim 10, wherein the functional fiber (ff) is an optical wave guide comprising an optically active section.

12. The method according to claim 11, wherein the optical wave guide comprises a quantum dot.

13. The method according to claim 12, wherein the quantum dot comprises a paramagnetic center.

14. The method according to claim 12, wherein the quantum dot comprises a rare-earth doping.

15. The method according to claim 14, wherein the rare-earth doping includes an erbium doping.

16. The method according to claim 11, wherein the optical wave guide comprises a diamond.

17. The method according to claim 16, wherein the diamond comprises a paramagnetic center.

18. The method according to claim 16, wherein the diamond comprises an NV center.

* * * * *